United States Patent
Bereza et al.

(10) Patent No.: US 10,444,963 B2
(45) Date of Patent: Oct. 15, 2019

(54) IMAGE DATA FOR ENHANCED USER INTERACTIONS

(71) Applicant: Apple Inc., Cupertino, CA (US)

(72) Inventors: Marek Bereza, San Francisco, CA (US); Adi Berenson, Tel Aviv (IL); Jeffrey Traer Bernstein, San Francisco, CA (US); Lukas Robert Tom Girling, San Francisco, CA (US); Mark Hauenstein, San Francisco, CA (US); Amir Hoffnung, Tel Aviv (IL); William D. Lindmeier, San Francisco, CA (US); Joseph A. Malia, San Francisco, CA (US); Julian Missig, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/035,419

(22) Filed: Jul. 13, 2018

(65) Prior Publication Data
US 2018/0321826 A1    Nov. 8, 2018

Related U.S. Application Data

(63) Continuation of application No. 15/714,887, filed on Sep. 25, 2017.
(Continued)

(51) Int. Cl.
*G06F 3/041* (2006.01)
*G06F 3/0481* (2013.01)
(Continued)

(52) U.S. Cl.
CPC ........ *G06F 3/04845* (2013.01); *G06F 3/0412* (2013.01); *G06F 3/0416* (2013.01);
(Continued)

(58) Field of Classification Search
CPC ... G06F 3/04845; G06F 3/0412; G06F 3/0416
See application file for complete search history.

(56) References Cited

U.S. PATENT DOCUMENTS

| 6,088,040 A | 7/2000 | Oda et al. |
| 6,173,402 B1 * | 1/2001 | Chapman ............ G06F 21/6218 |
| | | 713/182 |

(Continued)

FOREIGN PATENT DOCUMENTS

| EP | 2713298 A1 | 4/2014 |
| EP | 2960822 A1 | 12/2015 |

(Continued)

OTHER PUBLICATIONS

Intention to Grant received for Danish Patent Application No. PA201770419, dated Mar. 28, 2018, 2 pages.
(Continued)

*Primary Examiner* — Li P Sun
(74) *Attorney, Agent, or Firm* — Dentons US LLP

(57) ABSTRACT

The present disclosure generally relates to using avatars and image data for enhanced user interactions. In some examples, user status dependent avatars are generated and displayed with a message associated with the user status. In some examples, a device captures image information to scan an object to create a 3D model of the object. The device determines an algorithm for the 3D model based on the capture image information and provides visual feedback on additional image data that is needed for the algorithm to build the 3D model. In some examples, an application's operation on a device is restricted based on whether an authorized user is identified as using the device based on captured image data. In some examples, depth data is used to combine two sets of image data.

36 Claims, 108 Drawing Sheets

Related U.S. Application Data

(60) Provisional application No. 62/507,148, filed on May 16, 2017, provisional application No. 62/399,226, filed on Sep. 23, 2016.

(51) Int. Cl.

| | | |
|---|---|---|
| *G06F 3/0484* | (2013.01) | |
| *G06F 3/0488* | (2013.01) | |
| *G06T 19/20* | (2011.01) | |
| *G06Q 50/00* | (2012.01) | |

(52) U.S. Cl.
CPC ........ *G06F 3/0488* (2013.01); *G06F 3/04815* (2013.01); *G06F 3/04842* (2013.01); *G06F 3/04883* (2013.01); *G06T 19/20* (2013.01); *G06Q 50/01* (2013.01)

(56) References Cited

U.S. PATENT DOCUMENTS

| | | | |
|---|---|---|---|
| 7,180,524 | B1 | 2/2007 | Axelrod |
| 7,227,976 | B1 | 6/2007 | Jung et al. |
| 7,908,554 | B1 | 3/2011 | Blattner |
| 8,169,438 | B1 | 5/2012 | Baraff et al. |
| 8,949,618 | B1 | 2/2015 | Lee et al. |
| 9,104,908 | B1 | 8/2015 | Rogers et al. |
| 9,639,974 | B2 | 5/2017 | Smith et al. |
| 2001/0047365 | A1* | 11/2001 | Yonaitis ............ G06F 16/986 |
| 2006/0188144 | A1 | 8/2006 | Sasaki et al. |
| 2006/0294465 | A1 | 12/2006 | Ronen et al. |
| 2008/0052242 | A1 | 2/2008 | Merritt et al. |
| 2008/0267459 | A1 | 10/2008 | Nakada et al. |
| 2009/0027337 | A1 | 1/2009 | Hildreth |
| 2009/0055484 | A1 | 2/2009 | Vuong et al. |
| 2009/0132371 | A1 | 5/2009 | Strietzel et al. |
| 2009/0144173 | A1 | 6/2009 | Mo et al. |
| 2009/0168756 | A1* | 7/2009 | Kurapati ................ H04L 63/08 |
| | | | 370/352 |
| 2009/0175509 | A1 | 7/2009 | Gonion et al. |
| 2009/0202114 | A1 | 8/2009 | Morin et al. |
| 2009/0297022 | A1 | 12/2009 | Pettigrew et al. |
| 2009/0300513 | A1 | 12/2009 | Nims et al. |
| 2010/0026640 | A1* | 2/2010 | Kim ...................... G06F 3/0414 |
| | | | 345/173 |
| 2010/0153847 | A1 | 6/2010 | Fama |
| 2010/0164684 | A1* | 7/2010 | Sasa .................... G07C 9/00087 |
| | | | 340/5.83 |
| 2010/0203968 | A1 | 8/2010 | Gill et al. |
| 2011/0007174 | A1 | 1/2011 | Bacivarov et al. |
| 2011/0080356 | A1 | 4/2011 | Kang et al. |
| 2011/0248992 | A1 | 10/2011 | van os et al. |
| 2011/0252344 | A1 | 10/2011 | Van Os |
| 2012/0069028 | A1 | 3/2012 | Bouguerra |
| 2012/0079377 | A1 | 3/2012 | Goossens |
| 2012/0079378 | A1 | 3/2012 | Goossens |
| 2012/0081282 | A1 | 4/2012 | Chin |
| 2012/0289290 | A1 | 11/2012 | Chae et al. |
| 2012/0299945 | A1 | 11/2012 | Aarabi |
| 2013/0015946 | A1 | 1/2013 | Lau et al. |
| 2013/0147933 | A1 | 6/2013 | Kulas |
| 2013/0148867 | A1 | 6/2013 | Wang |
| 2013/0342672 | A1* | 12/2013 | Gray ...................... G06F 3/013 |
| | | | 348/78 |
| 2014/0013422 | A1 | 1/2014 | Janus et al. |
| 2014/0047560 | A1 | 2/2014 | Meyer et al. |
| 2014/0085293 | A1 | 3/2014 | Konoplev et al. |
| 2014/0085487 | A1 | 3/2014 | Park et al. |
| 2014/0092130 | A1 | 4/2014 | Anderson et al. |
| 2014/0137013 | A1 | 5/2014 | Matas |
| 2014/0143693 | A1 | 5/2014 | Goossens et al. |
| 2014/0157153 | A1 | 6/2014 | Yuen et al. |
| 2014/0198121 | A1 | 7/2014 | Tong et al. |
| 2014/0213318 | A1 | 7/2014 | Leem et al. |
| 2014/0292641 | A1 | 10/2014 | Cho et al. |
| 2014/0313307 | A1 | 10/2014 | Oh et al. |
| 2014/0361974 | A1 | 12/2014 | Li et al. |
| 2014/0362091 | A1 | 12/2014 | Bouaziz et al. |
| 2015/0033364 | A1 | 1/2015 | Wong |
| 2015/0084950 | A1 | 3/2015 | Li et al. |
| 2015/0172238 | A1 | 6/2015 | Ahmed et al. |
| 2015/0172584 | A1 | 6/2015 | Park et al. |
| 2015/0310259 | A1 | 10/2015 | Lau et al. |
| 2015/0312185 | A1 | 10/2015 | Langholz et al. |
| 2015/0325029 | A1 | 11/2015 | Li et al. |
| 2015/0346912 | A1 | 12/2015 | Yang et al. |
| 2016/0005206 | A1 | 1/2016 | Li et al. |
| 2016/0006987 | A1 | 1/2016 | Li et al. |
| 2016/0030844 | A1 | 2/2016 | Nair et al. |
| 2016/0042548 | A1 | 2/2016 | Du et al. |
| 2016/0050169 | A1 | 2/2016 | Ben atar et al. |
| 2016/0092043 | A1 | 3/2016 | Missig et al. |
| 2016/0104034 | A1* | 4/2016 | Wilder ................ G06K 9/00926 |
| | | | 382/118 |
| 2016/0105388 | A1 | 4/2016 | Bin mahfooz et al. |
| 2016/0134840 | A1 | 5/2016 | Mcculloch |
| 2016/0163084 | A1 | 6/2016 | Corazza et al. |
| 2016/0191958 | A1 | 6/2016 | Nauseef et al. |
| 2016/0217601 | A1 | 7/2016 | Tsuda et al. |
| 2016/0227115 | A1 | 8/2016 | Bin mahfooz et al. |
| 2016/0247308 | A1 | 8/2016 | Jiao et al. |
| 2016/0247309 | A1 | 8/2016 | Li et al. |
| 2016/0267699 | A1 | 9/2016 | Borke et al. |
| 2016/0291822 | A1 | 10/2016 | Ahuja et al. |
| 2016/0292901 | A1 | 10/2016 | Li et al. |
| 2016/0292903 | A1 | 10/2016 | Li et al. |
| 2016/0328874 | A1 | 11/2016 | Tong et al. |
| 2016/0328875 | A1 | 11/2016 | Fang et al. |
| 2016/0328876 | A1 | 11/2016 | Tong et al. |
| 2017/0018289 | A1 | 1/2017 | Morgenstern |
| 2017/0046045 | A1 | 2/2017 | Tung et al. |
| 2017/0046065 | A1 | 2/2017 | Zeng et al. |
| 2017/0069124 | A1 | 3/2017 | Tong et al. |
| 2017/0080346 | A1 | 3/2017 | Abbas |
| 2017/0083086 | A1 | 3/2017 | Mazur et al. |
| 2017/0083524 | A1 | 3/2017 | Huang et al. |
| 2017/0083586 | A1 | 3/2017 | Huang et al. |
| 2017/0098122 | A1 | 4/2017 | El Kaliouby et al. |
| 2017/0140214 | A1 | 5/2017 | Matas et al. |
| 2017/0164888 | A1 | 6/2017 | Matsuda et al. |
| 2017/0206095 | A1 | 7/2017 | Gibbs et al. |
| 2017/0285764 | A1 | 10/2017 | Kim et al. |
| 2018/0004404 | A1 | 1/2018 | Delfino et al. |
| 2018/0047200 | A1 | 2/2018 | O'hara et al. |
| 2018/0063603 | A1 | 3/2018 | Tang et al. |
| 2018/0088787 | A1 | 3/2018 | Bereza et al. |
| 2018/0091732 | A1 | 3/2018 | Wilson et al. |
| 2018/0165862 | A1 | 6/2018 | Sawaki |
| 2018/0189549 | A1 | 7/2018 | Inomata |
| 2018/0225263 | A1 | 8/2018 | Zhong et al. |
| 2018/0268589 | A1 | 9/2018 | Grant |
| 2018/0335927 | A1 | 11/2018 | Anzures et al. |
| 2018/0335929 | A1 | 11/2018 | Scapel et al. |
| 2018/0335930 | A1 | 11/2018 | Scapel et al. |
| 2018/0336715 | A1 | 11/2018 | Rickwald et al. |

FOREIGN PATENT DOCUMENTS

| | | |
|---|---|---|
| JP | 2010-28404 A | 2/2010 |
| JP | 6240301 B1 | 11/2017 |
| JP | 6266736 B1 | 1/2018 |
| JP | 2018-106365 A | 7/2018 |
| WO | 2013/097139 A1 | 7/2013 |
| WO | 2013/152453 A1 | 10/2013 |
| WO | 2013/152454 A1 | 10/2013 |
| WO | 2014/012456 A1 | 1/2014 |
| WO | 2014/094199 A1 | 6/2014 |
| WO | 2015/065928 A1 | 5/2015 |
| WO | 2015/069153 A1 | 5/2015 |
| WO | 2015/195216 A1 | 12/2015 |
| WO | 2015/196448 A1 | 12/2015 |
| WO | 2016/045005 A1 | 3/2016 |
| WO | 2016/101124 A1 | 6/2016 |
| WO | 2016/101132 A1 | 6/2016 |
| WO | 2017/015949 A1 | 2/2017 |

(56) References Cited

FOREIGN PATENT DOCUMENTS

OTHER PUBLICATIONS

International Search Report and Written Opinion received for PCT Patent Application No. PCT/US17/49760, dated Jan. 19, 2018, 12 pages.
International Search Report and Written Opinion received for PCT Patent Application No. PCT/US2018/14658, dated Jun. 6, 2018, 20 pages.
Invitation to Pay Addition Fees and Partial International Search Report received for PCT Patent Application No. PCT/US2018/14658, dated Apr. 11, 2018, 14 pages.
Invitation to pay Additional fees received for PCT Patent Application No. PCT/US17/49760, dated Nov. 21, 2017, 2 pages.
Office Action received for Danish Patent Application No. PA201770418, dated May 8, 2018, 3 pages.
Office Action received for Danish Patent Application No. PA201770419, dated Jan. 10, 2018, 4 pages.
Search Report and Opinion received for Danish Patent Application No. PA201770418, dated Jun. 23, 2017, 8 pages.
Search Report and Opinion received for Danish Patent Application No. PA201770419, dated Jun. 19, 2017, 6 pages.
Androidslide, "Camera Zoom FX", Online Available at: <https://www.youtube.com/watch?v=AHmPn8y74wY>, Nov. 5, 2011, pp. 1-3.
Finton, Trina, "Intel Pocket Avatars App", Onlne Availabe at <https://www.youtube.com/watch?v=qFCx4gTZIGw>, Jan. 9, 2015, 3 pages.
Giphy Inc. Communication, "Giphy Cam. The GIF Camera", Online Available at: <https://web.archive.org/web/20170309234909/https://play.google.com/store/apps/details?id=com.giphy.camera>, Mar. 9, 2017, pp. 1-3.
Holotech Studios Entertainment, "FaceRig", Online Available at: <https://web.archive.org/web/20161120090627/https://play.google.com/store/apps/details?id=com.holotech.facerig&hl=da>, Nov. 9, 2016, pp. 1-3.
Intel Newsroom, "New Pocket Avatars App from Intel", Online Available at <https://www.youtube.com/watch?v=R6q4sa7Q4ws>, Jun. 19, 2014, 3 pages.
Jinxy, Thrifty, "Pocket Avatars App Review", Online Available at <https://www.youtube.com/watch?v=-hhw17GLHsU>, Jan. 16, 2015, 3 pages.
Shah, Agam, "Intel's Pocket Avatars Chat App Packs 3D Avatars That Mimic Your Face and Mood", Online Available at <http://www.pcworld.com/article/2365600/intel-ventures-into-3d-mobile-chat-app-that-tracks-faces-moods.html>, Jun. 19, 2014, 3 pages.
Decision to Grant received for Danish Patent Application No. PA201770419, dated Oct. 25, 2018, 2 pages.
Mega Ninja "Face rig review", Available online at: https://www.youtube.com/watch?v=8YqeeiEVkRg, Feb. 6, 2017, 3 pages.
FaceRig "FaceRig Mobile Selfie Tip", Available online at: https://www.youtube.com/watch?v=x3DZHnXWZ3U, Oct. 18, 2016, 3 pages.
FaceRig "FaceRig Mobile Tip: How to record with and without the camera feed", Available Online at: https://www.youtube.com/watch?v=lwk9FIWGvVM, Nov. 8, 2016, 3 pages.
Beyouravatar "Faceshift studio tutorial part 4.8: tracking—fbx export", Available online at: https://www.youtube.com/watch?v=_yqmc9yzKLM, Nov. 19, 2012, 3 pages.
NCCU DCT "Faceshift", Available online at: https://www.youtube.com/watch?v=4Ph0_SP8tpA, Dec. 1, 2014, 3 pages.
Final Office Action received for U.S. Appl. No. 15/870,195, dated Dec. 13, 2018, 27 pages.
Final Office Action received for U.S. Appl. No. 15/940,017, dated Dec. 20, 2018, 17 pages.

Office Action received for Danish Patent Application No. PA201770393, dated Dec. 12, 2018, 7 pages.
Opuni, Kojo, "FaceShift Studio Demo", Available online at: https://www.youtube.com/watch?v=72ty7PYKwGU, Oct. 1, 2012, 3 pages.
Twins, Tornado, "New Tutorial: Add Facial Expressions to your Game Characters!", Available online at: https://www.youtube.com/watch?v=wKSjByNyaKA, Mar. 14, 2014, 4 pages.
Ting, "Giphy Cam (iOS) | Ting Download", Available online at : <https://www.youtube.com/watch?v=mykfBpyD3gg>, Oct. 2, 2015, 3 pages.
PC World, "How to make AR Emojis on the Samsung Galaxy S9", YouTube, Available Online: "https://www.youtube.com/watch?v=8wQICfulkz0", Feb. 25, 2018, 2 pages.
Spellburst, "The Sims 3: Create a Sim With Me | #2—Dark Fairy + Full CC List!" Online Available at: <https://www.youtube.com/watch?v=Dy_5g9B-wkA>, Oct. 9, 2017, 2 pages.
"Here are Warez Files: Eve Online Character Creator", Available online at: <http://theherearewarezfiles.blogspot.com/2014/03/eve-online-character-creator-download.html>, Mar. 3, 2014, 7 pages.
Intention to Grant received for Danish Patent Application No. PA201770418, dated Nov. 16, 2018, 3 pages.
Office Action received for Danish Patent Application No. PA201770720, dated Nov. 16, 2018, 3 pages.
Office Action received for Danish Patent Application No. PA201770721, dated Nov. 16, 2018, 3 pages.
International Search Report and Written Opinion received for PCT Patent Application No. PCT/US2018/014892, dated Mar. 7, 2018, 10 pages.
International Search Report and Written Opinion received for PCT Patent Application No. PCT/US2018/033044, dated Sep. 11, 2018, 13 pages.
Non-Final Office Action received for U.S. Appl. No. 15/940,017, dated Jun. 18, 2018, 15 pages.
Non-Final Office Action received for U.S. Appl. No. 15/940,232, dated Jun. 18, 2018, 23 pages.
Non-Final Office Action received for U.S. Appl. No. 15/870,195, dated May 2, 2018, 22 pages.
Office Action received for Danish Patent Application No. PA201770393, dated Mar. 19, 2018, 8 pages.
Office Action received for Danish Patent Application No. PA201770720, dated Apr. 26, 2018, 3 pages.
Office Action received for Danish Patent Application No. PA201770720, dated Oct. 18, 2017, 8 pages.
Office Action received for Danish Patent Application No. PA201770721, dated Apr. 26, 2018, 3 pages.
Office Action received for Danish Patent Application No. PA201770721, dated Oct. 19, 2017, 8 pages.
Search Report received for Danish Patent Application No. PA201870381, dated Sep. 13, 2018, 7 pages.
Koti, Kotresh, "Colour with Asian Paints.A Mobail App by Android Application—2018", Available Online at: https://www.youtube.com/watch?v=M6EIO7ErYd0&feature=youtu.be&t=81, May 6, 2018, 2 pages.
Slashgear, "Samsung AR Emoji demo on the Galaxy S9", Available Online at: https://www.youtube.com/watch?v=GQwNKzY4C9Y, Feb. 25, 2018, 3 pages.
Final Office Action received for U.S. Appl. No. 15/940,232, dated Jan. 10, 2019, 27 pages.
Intention to Grant received for Danish Patent Application No. PA201770720, dated Apr. 4, 2019, 2 pages.
Intention to Grant received for Danish Patent Application No. PA201770721, dated Apr. 4, 2019, 2 pages.
International Preliminary Report on Patentability received for PCT Patent Application No. PCT/US2017/049760, dated Apr. 4, 2019, 9 pages.
Extended European Search Report received for European Patent Application No. 17853654.6, dated Jul. 8, 2019, 9 pages.
Office Action received for Australian Patent Application No. 2017330208, dated Jul. 25, 2019, 5 pages.

\* cited by examiner

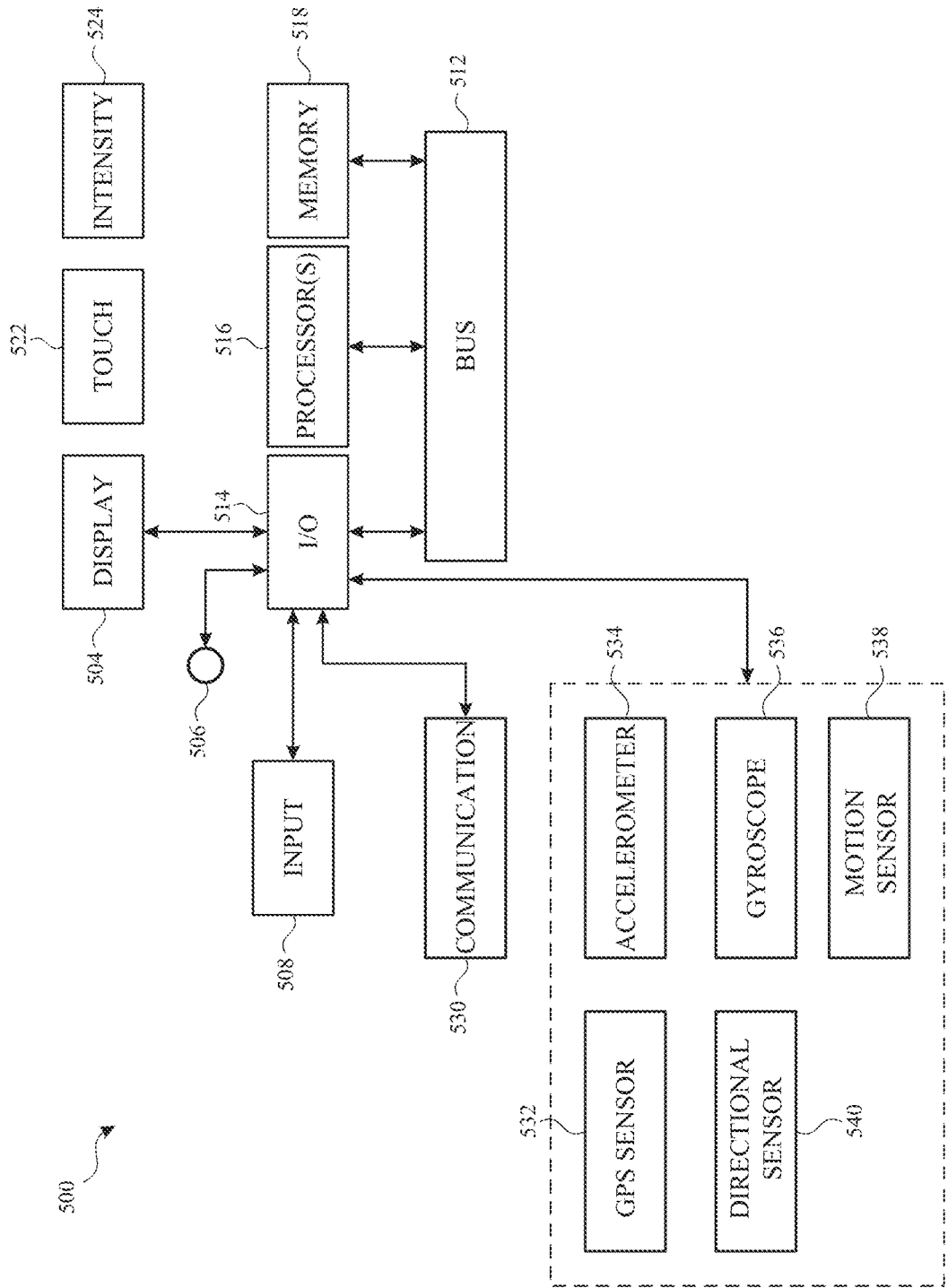

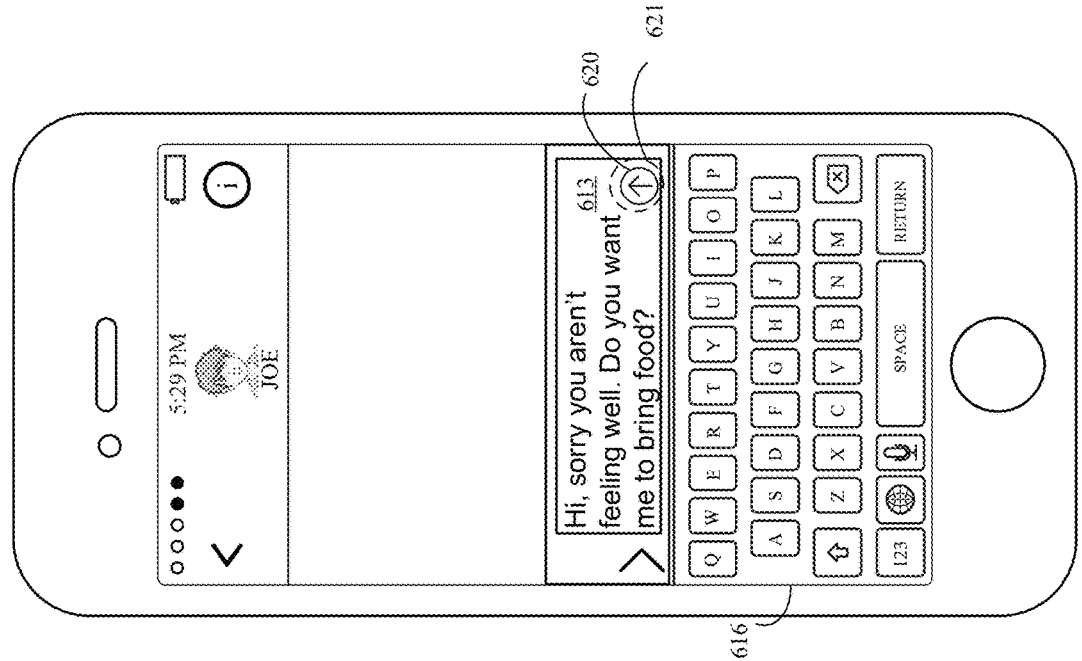
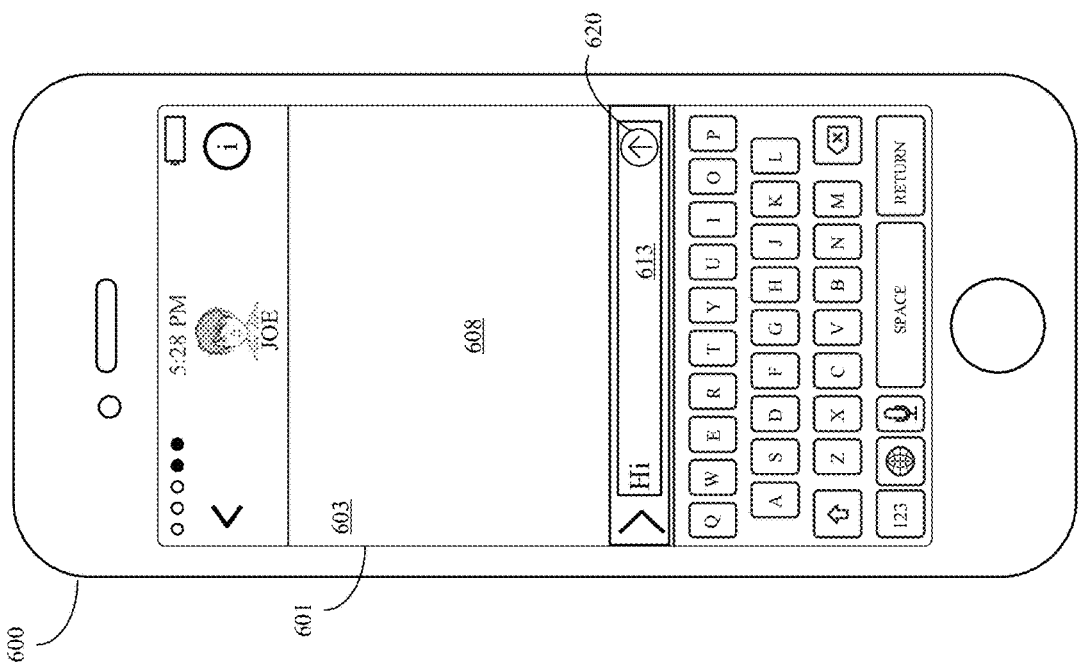

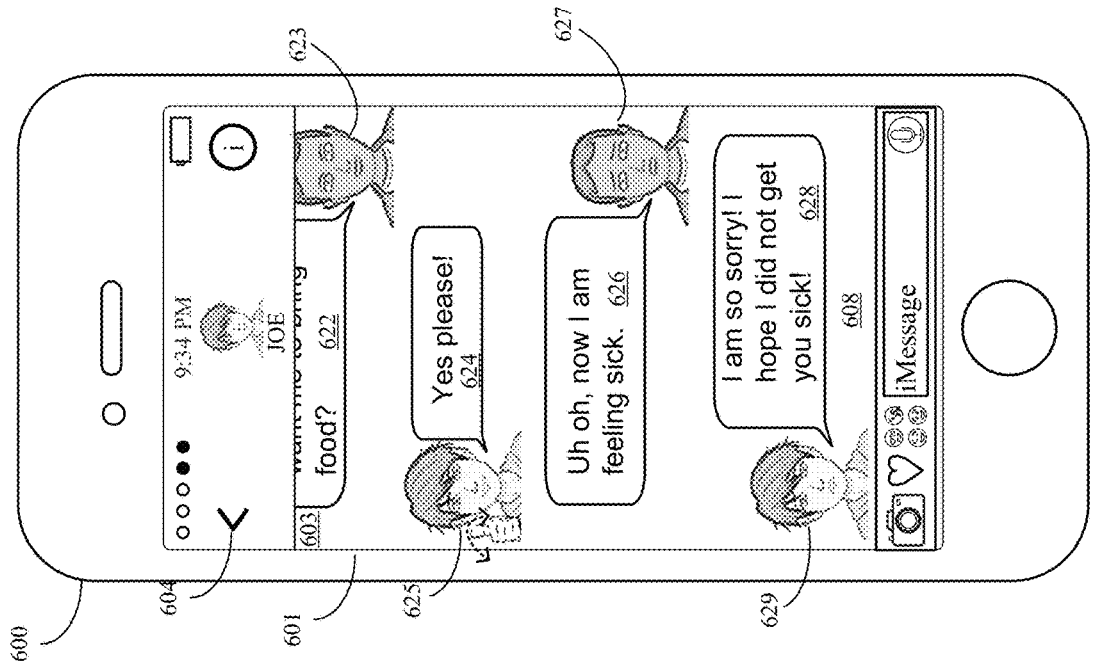
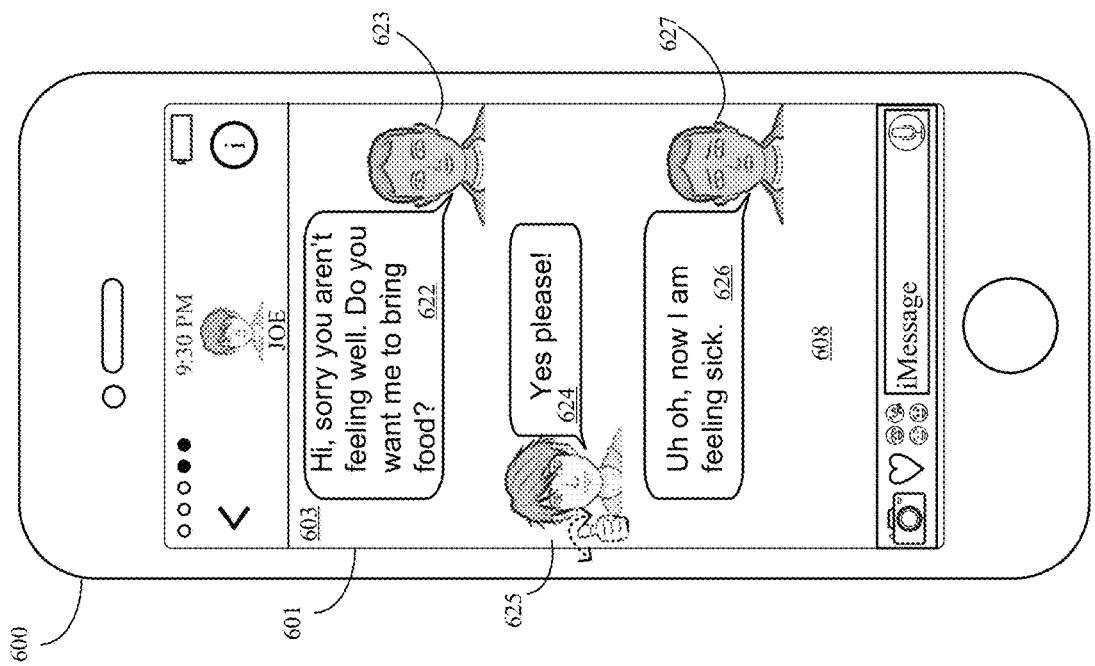

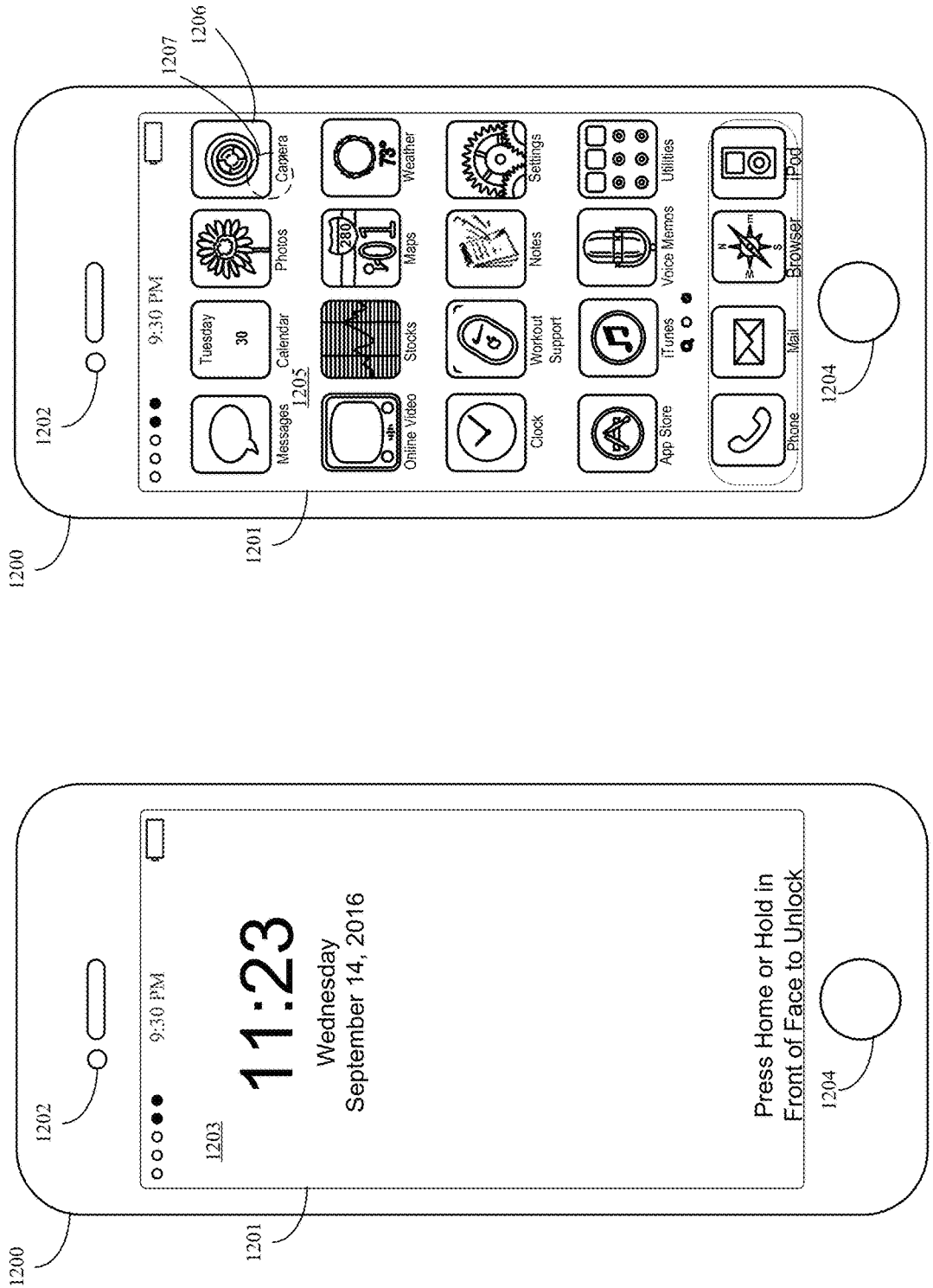

IMAGE DATA FOR ENHANCED USER INTERACTIONS

CROSS-REFERENCE TO RELATED APPLICATIONS

This application is a continuation of U.S. patent application Ser. No. 15/714,887, entitled "IMAGE DATA FOR ENHANCED USER INTERACTIONS", filed Sep. 25, 2017, which claims priority to U.S. Provisional Patent Application 62/399,226, entitled "IMAGE DATA FOR ENHANCED USER INTERACTIONS", filed Sep. 23, 2016, and U.S. Provisional Patent Application 62/507,148, entitled "IMAGE DATA FOR ENHANCED USER INTERACTIONS", filed May 16, 2017, the content of which are hereby incorporated by reference in their entirety.

FIELD

The present disclosure relates generally to computer user interfaces, and more specifically to techniques for using avatars and/or image data for enhanced user interactions.

BACKGROUND

Avatars are used to represent the users of electronic devices. The avatars can represent the appearance of a user or can represent an idealized or completely fictional representation of the user. Avatars can be then be associated with a user so that the appearance of the avatar to others indicates triggers an association or link with the user.

Many electronic devices today include sensors, such as image sensors. For example, some smartphones include image sensors on both the front and back of the phone and may even include multiple image sensors on the same side. These image sensors are typical used to capture still images and video, which can then be shared and viewed later.

BRIEF SUMMARY

Some techniques for using avatars and/or image data to enhance user interactions with electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for using avatars and/or image data to enhance user interactions. Such methods and interfaces optionally complement or replace other methods for using avatars and/or image data to enhance user interactions. Such methods and interfaces reduce the cognitive burden on a user and produce a more efficient human-machine interface. For battery-operated computing devices, such methods and interfaces conserve power and increase the time between battery charges.

In accordance with an embodiment, an electronic device with a display and associated with a first user receives a first message from a second user, wherein the first message includes first content; receives first status data for the second user, wherein the first status data is associated with the first message and separate from the first content; displays concurrently, on the display, the first message, including the first content, and a first avatar, wherein the first avatar is based on the first status data and the displayed first avatar is adjacent to the displayed first message; after displaying the first message and the first avatar, receives a second message from the second user, wherein the second message includes second content; receives second status data for the second user, wherein the second status is associated with the second message and separate from the second content; and while maintaining the display of the first message and the first avatar, displays, on the display, the second message, including the second content, and a second avatar, wherein the displayed second avatar is adjacent to the displayed second message, the second avatar is based on the second status data, and the first avatar and the second avatar are different.

An embodiment of a transitory computer readable storage medium stores one or more programs, the one or more programs comprise instructions, which when executed by one or more processors of an electronic device with a display and one or more input devices, cause the device to: display, on the display, content in an application, wherein the content is displayed while the application is in a first configuration; while displaying the content, capture image data (from the one or more image sensors of the electronic device; after capturing the image data, receive a request to navigate away from the content; and in response to receiving a request to navigate away from the content: in accordance with a determination that a first set of content-lock criteria have been met, prevent navigation away from the content while maintaining display of the content, wherein the first set of content-lock criteria includes a first criterion that is met when the captured image data indicates that an unauthorized user is using the device; and in accordance with a determination that the first set of content-lock criteria have not been met, navigate away from the content in accordance with the request.

In accordance with an embodiment, an electronic device with one or more image sensors, memory, and a display: captures first image data from one or more image sensors of the electronic device, wherein the first image data includes first optical image data of an object from a first perspective; captures second image data from the one or more image sensors of the electronic device, wherein the second image data includes second optical image light data of the object from a second perspective that is different from the first perspective; selects an algorithm based on the change in perspective from the first perspective to the second perspective; based on the algorithm, determines additional image data that is needed to continue the 3D modeling of the object; and displays, on the display, visual feedback that provides instructions for capturing the additional image data determined based on the selected algorithm.

An embodiment of a transitory computer readable storage medium stores one or more programs, the one or more programs comprise instructions, which when executed by one or more processors of an electronic device with a display and one or more image sensors, cause the device to: capture first image data from one or more image sensors of the electronic device, wherein the first image data includes first optical image data of an object from a first perspective; capture second image data from the one or more image sensors of the electronic device, wherein the second image data includes second optical image light data of the object from a second perspective that is different from the first perspective; select an algorithm based on the change in perspective from the first perspective to the second perspective; based on the algorithm, determine additional image data that is needed to continue the 3D modeling of the object; and display, on the display, visual feedback that provides instructions for capturing the additional image data determined based on the selected algorithm.

In accordance with an embodiment, an electronic device with a display and one or more image sensors: displays, on the display, content in an application, wherein the content is displayed while the application is in a first configuration; while displaying the content, captures image data (from the one or more image sensors of the electronic device; after capturing the image data, receives a request to navigate away from the content; and in response to receiving a request to navigate away from the content: in accordance with a determination that a first set of content-lock criteria have been met, prevents navigation away from the content while maintaining display of the content, wherein the first set of content-lock criteria includes a first criterion that is met when the captured image data indicates that an unauthorized user is using the device; and in accordance with a determination that the first set of content-lock criteria have not been met, navigates away from the content in accordance with the request.

An embodiment of a transitory computer readable storage medium stores one or more programs, the one or more programs comprise instructions, which when executed by one or more processors of an electronic device with a display and one or more image sensors, cause the device to: display, on the display, content in an application, wherein the content is displayed while the application is in a first configuration; while displaying the content, capture image data from the one or more image sensors of the electronic device; after capturing the image data, receive a request to navigate away from the content; and in response to receiving a request to navigate away from the content: in accordance with a determination that a first set of content-lock criteria have been met, prevent navigation away from the content while maintaining display of the content, wherein the first set of content-lock criteria includes a first criterion that is met when the captured image data indicates that an unauthorized user is using the device; and in accordance with a determination that the first set of content-lock criteria have not been met, navigate away from the content in accordance with the request.

In accordance with an embodiment, an electronic device has a display and a camera. The electronic device causes display of, on the display, a user interface that includes a representation of content. While displaying the user interface that includes the representation of content, the electronic device receives first user input on the electronic device corresponding to a request for performing a predefined action on the content. In response to receiving the first user input: the electronic device, in accordance with a determination, based on captured image data captured by the camera, that a set of authorization criteria is met, wherein the authorization criteria include a criterion that is met when the captured image data indicates that the face of an authorized user was present in front of the camera and was looking at the display at the time that the user input was received, performs the predefined action; and the electronic device, in accordance with a determination, based on the captured image data, that the set of authorization criteria is not met, forgoes performance of the predefined action.

An embodiment of a transitory computer readable storage medium storing one or more programs configured to be executed by one or more processors of an electronic device with a display and a camera, the one or more programs including instructions for: displaying, on the display, a user interface that includes a representation of content; while displaying the user interface that includes the representation of content, receiving first user input on the electronic device corresponding to a request for performing a predefined action on the content; in response to receiving the first user input: in accordance with a determination, based on captured image data captured by the camera, that a set of authorization criteria is met, wherein the authorization criteria include a criterion that is met when the captured image data indicates that the face of an authorized user was present in front of the camera and was looking at the display at the time that the user input was received, performing the predefined action; and in accordance with a determination, based on the captured image data, that the set of authorization criteria is not met, forgoing performance of the predefined action.

In accordance with an embodiment, an electronic device has a display and a camera. The electronic device: displays, on the display, a user interface that includes a representation of content; while displaying the user interface that includes the representation of content, receiving first user input on the electronic device corresponding to a request for performing a predefined action on the content; in response to receiving the first user input: in accordance with a determination, based on captured image data captured by the camera, that a set of authorization criteria is met, wherein the authorization criteria include a criterion that is met when the captured image data indicates that the face of an authorized user was present in front of the camera and was looking at the display at the time that the user input was received, performs the predefined action; and in accordance with a determination, based on the captured image data, that the set of authorization criteria is not met, forgoes performance of the predefined action.

An embodiment of a transitory computer readable storage medium storing one or more programs configured to be executed by one or more processors of an electronic device with a display and a camera. The electronic device displays, on the display, a graphical user interface element representing a function; while displaying the graphical user interface element on the display, receives first user input corresponding to a request to execute the function; in response to receiving the first user input: in accordance with a determination that the function is subject to enhanced security and that a set of authorization criteria is met, including that captured image data indicates that the face of an authorized user was present in front of the camera at the time that the user input was received, executes the function; in accordance with a determination that the function is subject to enhanced security and that the set of authorization criteria is not met, forgoes execution of the function; and in accordance with a determination that the function is not subject to enhanced security, executes the function without regard to whether or not the set of authorization criteria are met.

In accordance with an embodiment, an electronic device has a display and a camera. The electronic device: displays, on the display, a graphical user interface element representing a function; while displaying the graphical user interface element on the display, receives first user input corresponding to a request to execute the function; in response to receiving the first user input: in accordance with a determination that the function is subject to enhanced security and that a set of authorization criteria is met, including that captured image data indicates that the face of an authorized user was present in front of the camera at the time that the user input was received, executing the function; in accordance with a determination that the function is subject to enhanced security and that the set of authorization criteria is not met, forgoing execution of the function; and in accordance with a determination that the function is not subject to enhanced security, executing the function without regard to whether or not the set of authorization criteria are met.

An embodiment of a transitory computer readable storage medium storing one or more programs configured to be executed by one or more processors of an electronic device with a display and a camera, the one or more programs including instructions for: displaying, on the display, a graphical user interface element representing a function; while displaying the graphical user interface element on the display, receiving first user input corresponding to a request to execute the function; in response to receiving the first user input: in accordance with a determination that the function is subject to enhanced security and that a set of authorization criteria is met, including that captured image data indicates that the face of an authorized user was present in front of the camera at the time that the user input was received, executing the function; in accordance with a determination that the function is subject to enhanced security and that the set of authorization criteria is not met, forgoing execution of the function; and in accordance with a determination that the function is not subject to enhanced security, executing the function without regard to whether or not the set of authorization criteria are met.

In accordance with an embodiment, an electronic device has a display and a camera. The electronic device: detects the occurrence of an alert condition that corresponds to an event that occurred at the device; in response to detecting the occurrence of the alert condition: in accordance with a determination, based on captured image data, that a set of alert criteria is met, including that the captured image data indicates that a face of a user is present in front of the camera, responds to the alert condition in a first manner; in accordance with a determination, based on the captured image data, that the set of alert criteria is not met, responds to the alert condition in a second manner different than the first manner.

An embodiment of a transitory computer readable storage medium storing one or more programs configured to be executed by one or more processors of an electronic device with a display and a camera, the one or more programs including instructions for: detecting the occurrence of an alert condition that corresponds to an event that occurred at the device; in response to detecting the occurrence of the alert condition: in accordance with a determination, based on captured image data, that a set of alert criteria is met, including that the captured image data indicates that a face of a user is present in front of the camera, responding to the alert condition in a first manner; in accordance with a determination, based on the captured image data, that the set of alert criteria is not met, responding to the alert condition in a second manner different than the first manner.

In accordance with an embodiment, an electronic device has a display and a camera. The electronic device: displays a user interface including a plurality of user interface elements including a first GUI element and a second GUI element; receives verbal user input via the microphone corresponding to a request to execute a function wherein the input includes a request to perform an action that could be performed with respect to the first user interface element or the second user interface element and the user input received via the microphone does not include information enabling the device to determine whether to perform the action with respect to the first user interface element or the second GUI element; in response to receiving the verbal user input via the microphone: in accordance with a determination that image data captured at a time corresponding to when the verbal user input was received indicates that the user was looking at the first user interface element, performs the requested function with data, associated with the first user interface element; and in accordance with a determination that image data captured at the time corresponding to when the verbal user input was received indicates that the user was looking at the second user interface element, performs the requested function with data, associated with the second user interface element.

An embodiment of a transitory computer readable storage medium storing one or more programs configured to be executed by one or more processors of an electronic device with a display and a camera, the one or more programs including instructions for: displaying a user interface including a plurality of user interface elements including a first GUI element and a second GUI element; receiving verbal user input via the microphone corresponding to a request to execute a function wherein the input includes a request to perform an action that could be performed with respect to the first user interface element or the second user interface element and the user input received via the microphone does not include information enabling the device to determine whether to perform the action with respect to the first user interface element or the second GUI element; in response to receiving the verbal user input via the microphone: in accordance with a determination that image data captured at a time corresponding to when the verbal user input was received indicates that the user was looking at the first user interface element, performing the requested function with data, associated with the first user interface element; and in accordance with a determination that image data captured at the time corresponding to when the verbal user input was received indicates that the user was looking at the second user interface element, performing the requested function with data, associated with the second user interface element.

In accordance with an embodiment, an electronic device has a display and a camera. The electronic device: while a scene is in a field of view of the camera, receives a request to capture image data with the camera; in response to the request to capture the image data, captures image data corresponding to the scene, wherein capturing the image data includes: captures first image data with first image capture settings that are selected based on an appearance of a first portion of the scene that is determined to correspond to a first depth region that is a first distance from the image sensors; and captures second image data with second image capture settings that are different from the first image capture settings, wherein the second image capture settings are selected based on an appearance of a second portion of the scene that is determined to correspond to a second depth region that is a second distance from the camera; after capturing the image data corresponding to the scene, displays, on the display, an image of the scene, wherein the image of the scene is generated by combining the first image data and the second image data.

An embodiment of a transitory computer readable storage medium storing one or more programs configured to be executed by one or more processors of an electronic device with a display and a camera, the one or more programs including instructions for: while a scene is in a field of view of the camera, receiving a request to capture image data with the camera; in response to the request to capture the image data, capturing image data corresponding to the scene, wherein capturing the image data includes: capturing first image data with first image capture settings that are selected based on an appearance of a first portion of the scene that is determined to correspond to a first depth region that is a first distance from the image sensors; and capturing second image data with second image capture settings that are different from the first image capture settings, wherein the second image capture settings are selected based on an appearance of a second portion of the scene that is determined to correspond to a second depth region that is a second distance from the camera; after capturing the image data corresponding to the scene, displaying, on the display, an image of the scene, wherein the image of the scene is generated by combining the first image data and the second image data.

In accordance with an embodiment, an electronic device has a display, a first camera, and a second camera. The electronic device: while a first scene is in a field of view of the first camera and a second scene different than the first scene is in a field of view of the second camera: captures first image data of the first scene with the first camera, wherein the first image data includes depth image data and visible light image data and the depth image data indicates that a first portion of the first image data corresponds to a first portion of the scene that is in a first depth region that is a first distance from the first camera and a second portion of the image data corresponds to a second portion of the scene that is in a second depth region that is a second distance from the first image sensor that is different from the first distance; captures second image data of the second scene from the second camera; and after capturing the first image data and the second image data, combines the second image data and the first portion of the first image data to create a combined image.

An embodiment of a transitory computer readable storage medium storing one or more programs configured to be executed by one or more processors of an electronic device with a display, a first camera, and a second camera, the one or more programs including instructions for: while a first scene is in a field of view of the first camera and a second scene different than the first scene is in a field of view of the second camera: capturing first image data of the first scene with the first camera, wherein the first image data includes depth image data and visible light image data and the depth image data indicates that a first portion of the first image data corresponds to a first portion of the scene that is in a first depth region that is a first distance from the first camera and a second portion of the image data corresponds to a second portion of the scene that is in a second depth region that is a second distance from the first image sensor that is different from the first distance; capturing second image data of the second scene from the second camera; and after capturing the first image data and the second image data, combining the second image data and the first portion of the first image data to create a combined image.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for using image data to enhance user interactions, thereby increasing the effectiveness, efficiency, and user satisfaction with such devices. Such methods and interfaces may complement or replace other methods for using image data to enhance user interactions.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 5B is a block diagram illustrating a personal electronic device in accordance with some embodiments.

FIGS. 6A-6J illustrate exemplary user interfaces for communicating user status information for a message.

FIGS. 12A-12J illustrate exemplary user interfaces for restricting access to data and applications based on the user.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for using avatars and/or image data for more than simply saving visual representations of particular moments in time. Using embodiments of some of the techniques described below, avatars and/or image data can be used to enhance user interactions with electronic devices and other users. Such techniques can reduce the cognitive burden on a user who is using avatars and/or image data to communicate with other users and interact with their electronic devices, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for using image data to enhance user interaction, as described below.

Figure 6B:
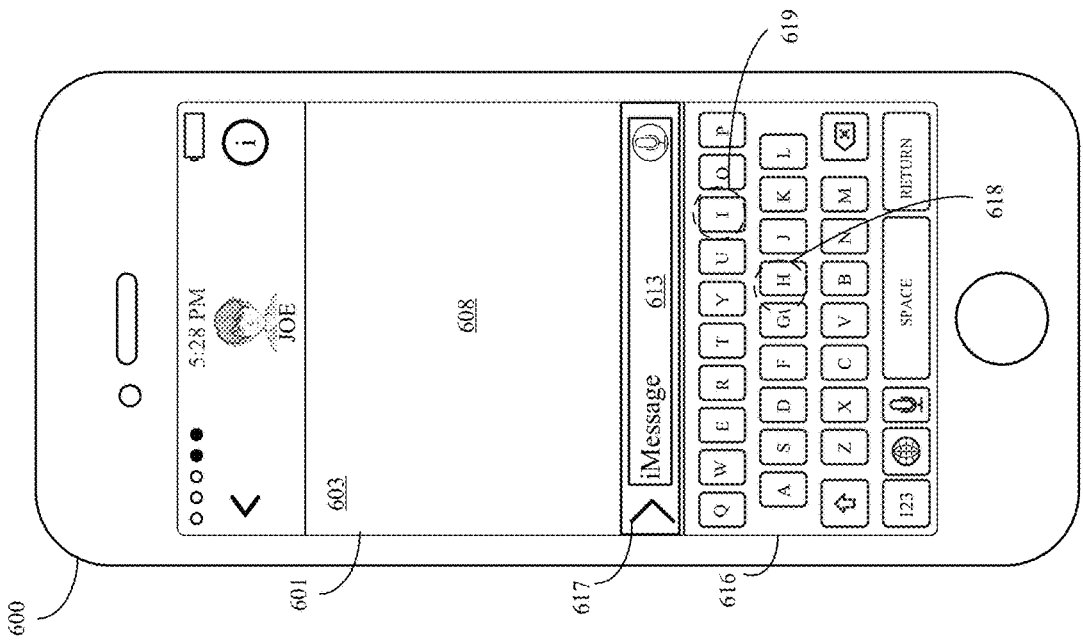

FIGS. 6A-6J illustrate exemplary user interfaces for communicating user status information for a message with an avatar. FIGS. 7A-7B is a flow diagram illustrating methods of communicating user status information for a message with an avatar in accordance with some embodiments. The user interfaces in FIGS. 6A-6G are used to illustrate the processes described below, including the processes in FIGS. 7A-7B.

FIGS. 9A-9L illustrate exemplary user interfaces for capturing data for building 3D models. FIGS. 10A-10B is a flow diagram illustrating methods of capturing data for building 3D models in accordance with some embodiments. The user interfaces in FIGS. 9A-9L are used to illustrate the processes described below, including the processes in FIGS. 10A-10B.

Figure 12D:
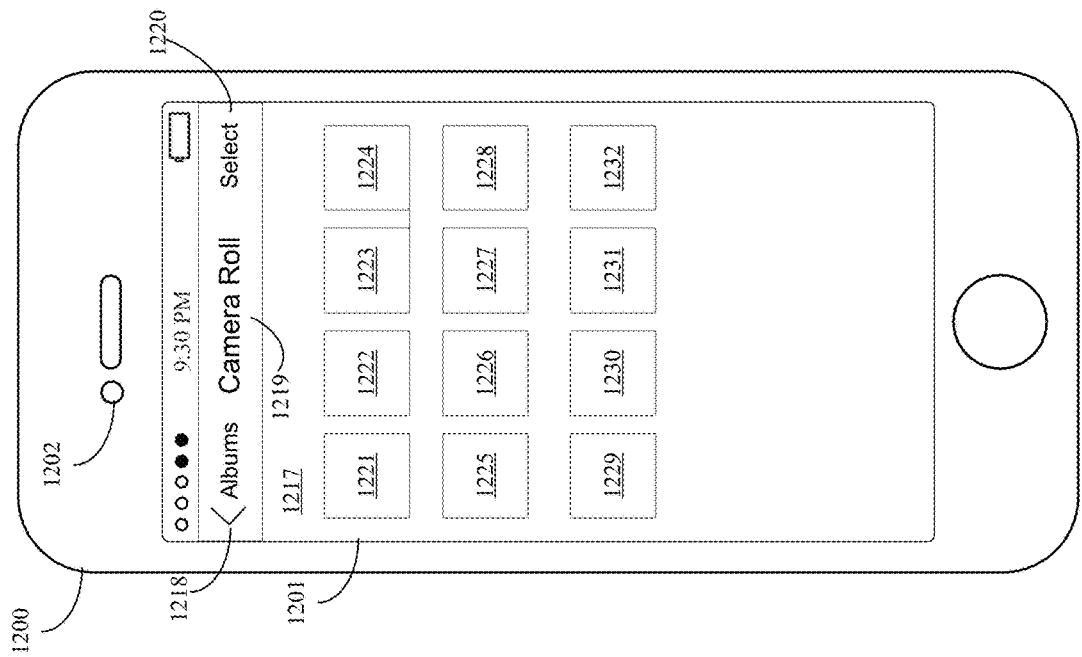

FIGS. 12A-12J illustrate exemplary user interfaces for restricting access to data and applications based on the user. FIGS. 13A-13B is a flow diagram illustrating methods of restricting access to data and applications based on the user in accordance with some embodiments. The user interfaces in FIGS. 12A-12J are used to illustrate the processes described below, including the processes in FIGS. 13A-13B.

FIGS. 16A-16G illustrate exemplary user interfaces for restricting execution of operations based captured image data and a set of one or more criteria. FIGS. 17A-17B are a flow diagram illustrating methods for restricting execution of operations based captured image data and a set of one or more criteria in accordance with some embodiments. The user interfaces in FIGS. 16A-16G illustrate the processes described below, including the processes in FIGS. 17A-17B.

FIGS. 18A-18L illustrate exemplary user interfaces for enhanced security based captured image data and a set of one or more authorization criteria. FIGS. 19A-19B are a flow diagram illustrating methods for enhanced security based captured image data and a set of one or more authorization criteria in accordance with some embodiments. The user interfaces in FIGS. 18A-18L illustrate the processes described below, including the processes in FIGS. 19A-19B.

FIGS. 20A-20F illustrate exemplary user interfaces and scenes for processing alerts conditions, based on captured image data, corresponding to events on an electronic device. FIGS. 21A-21B are a flow diagram illustrating methods for processing alerts conditions, based on captured image data, corresponding to events on an electronic device criteria in accordance with some embodiments. The user interfaces in FIGS. 20A-20F illustrate the processes described below, including the processes in FIGS. 21A-21B.

FIGS. 22A-22F illustrate exemplary user interfaces and scenes for performing ambiguous voice commands based on captured image data. FIGS. 23A-23B are a flow diagram illustrating methods for performing ambiguous voice commands based on captured image data in accordance with some embodiments. The user interfaces in FIGS. 22A-22F illustrate the processes described below, including the processes in FIGS. 23A-23B.

Figure 24A:
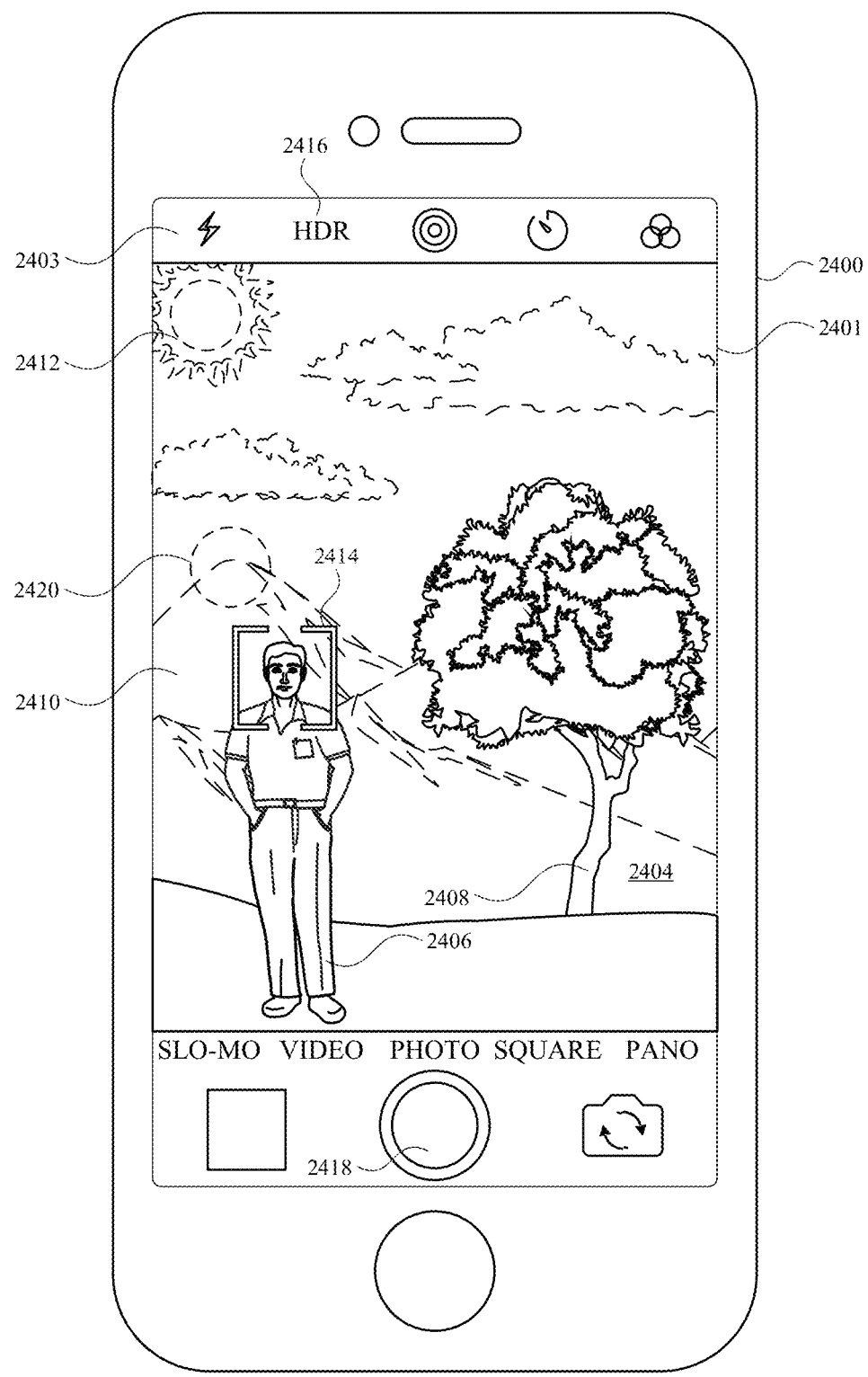
FIGS. 24A-24H illustrate exemplary user interfaces, scenes, and image data for generating a high dynamic range (HDR) image.
Figure 24B:
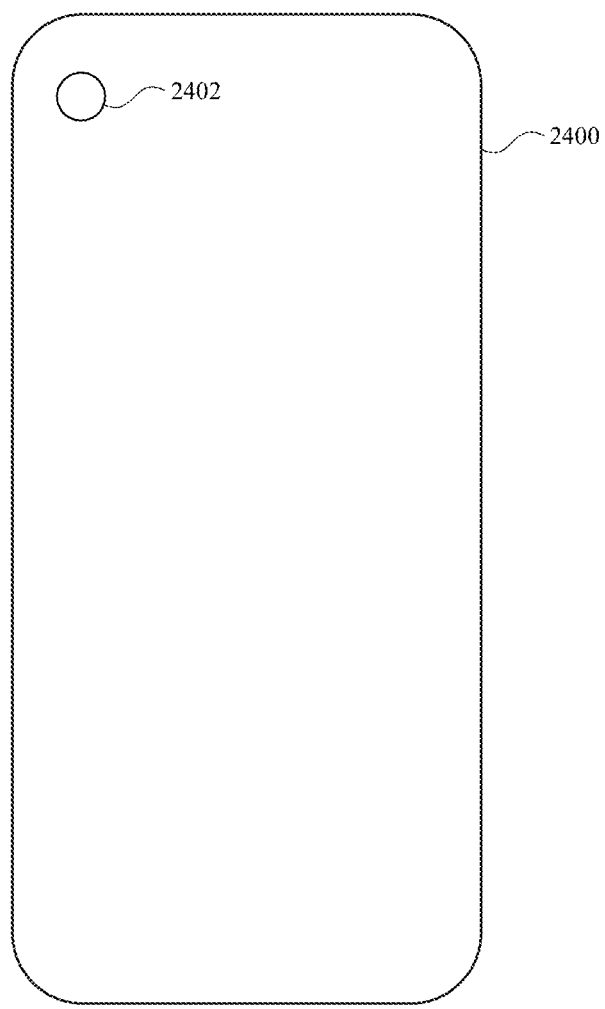

FIGS. 24A-24H illustrate exemplary user interfaces and captured image data for generating high dynamic range (HDR) images. FIGS. 25A-24B are a flow diagram illustrating methods for generating high dynamic range (HDR) images in accordance with some embodiments. The user interfaces in FIGS. 24A-24H illustrate the processes described below, including the processes in FIGS. 25A-25B.

FIGS. 26A-26K illustrate exemplary user interfaces, scenes, and captured image data for generating composite images. FIGS. 27A-27B are a flow diagram illustrating methods for generating composite images in accordance with some embodiments. The user interfaces in FIGS. 26A-26K illustrate the processes described below, including the processes in FIGS. 27A-27B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
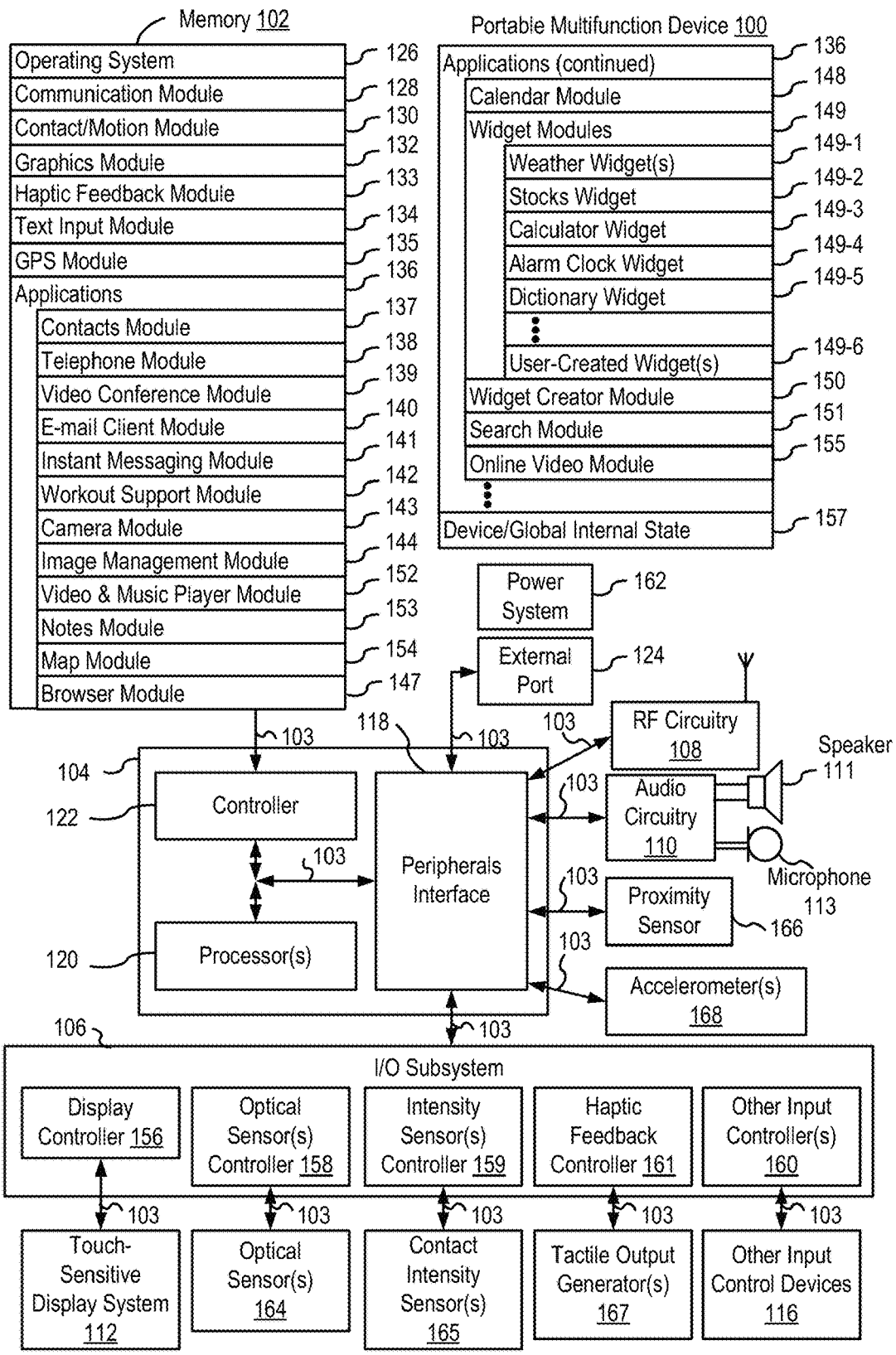
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
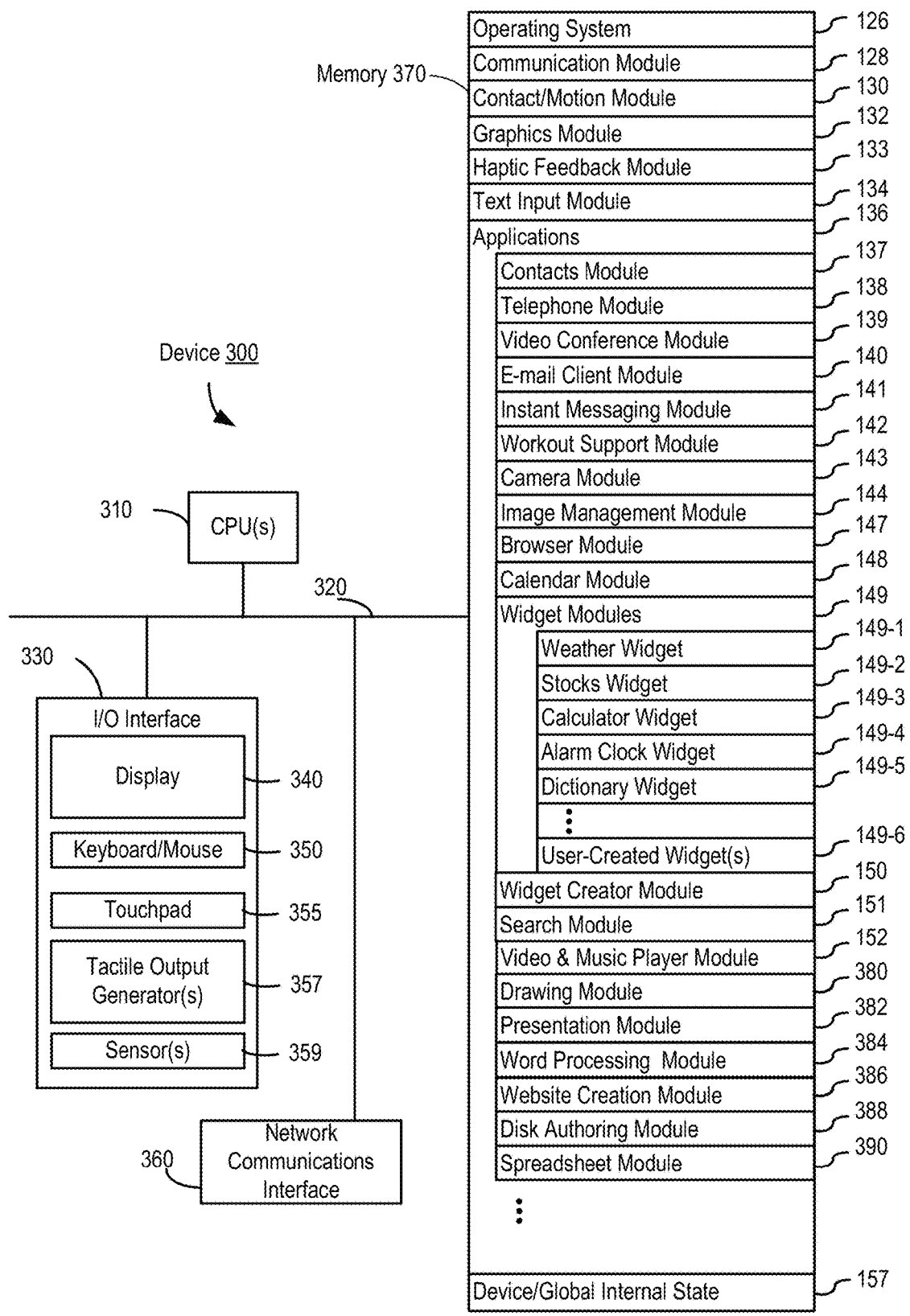
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XIVIPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
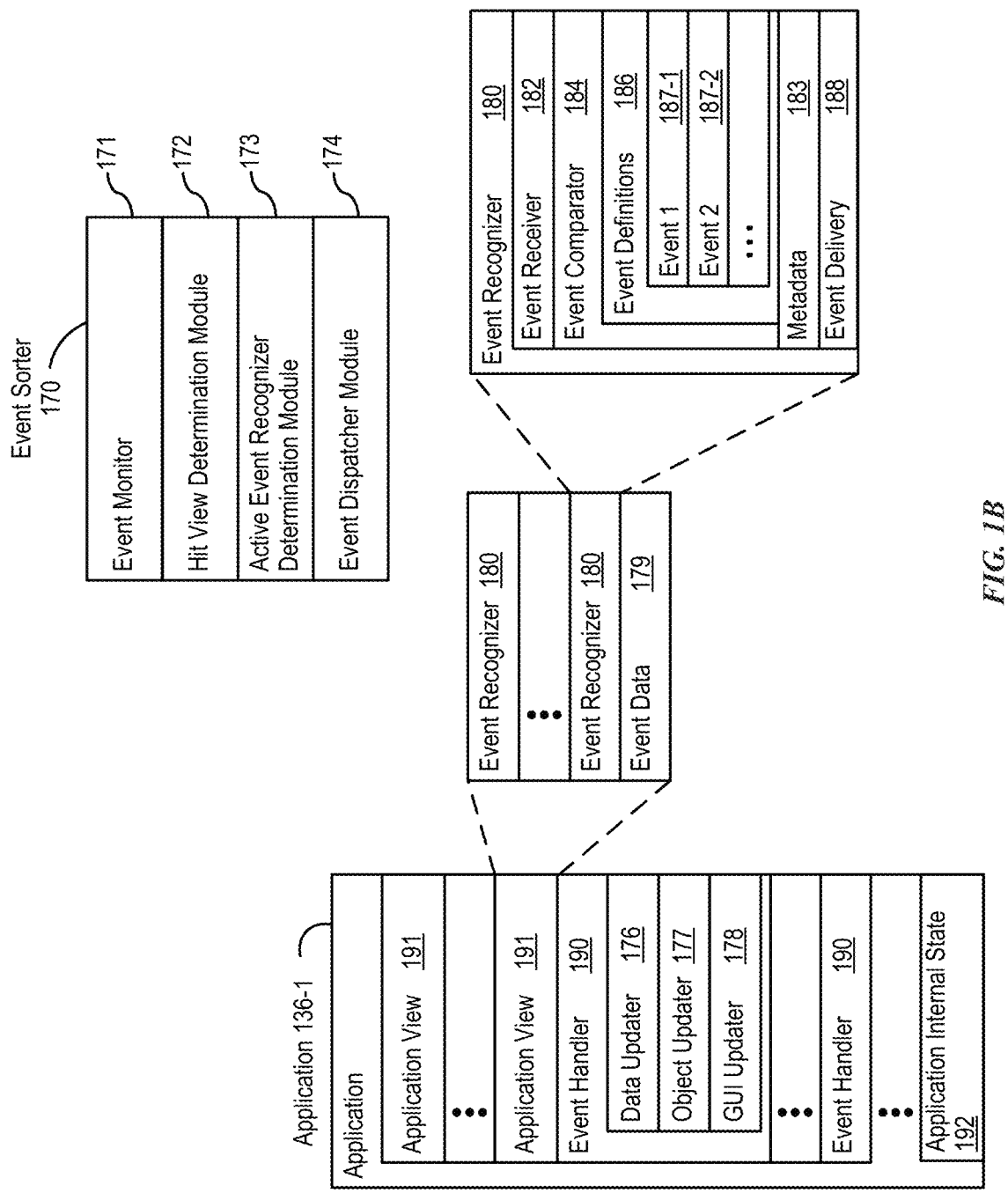
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
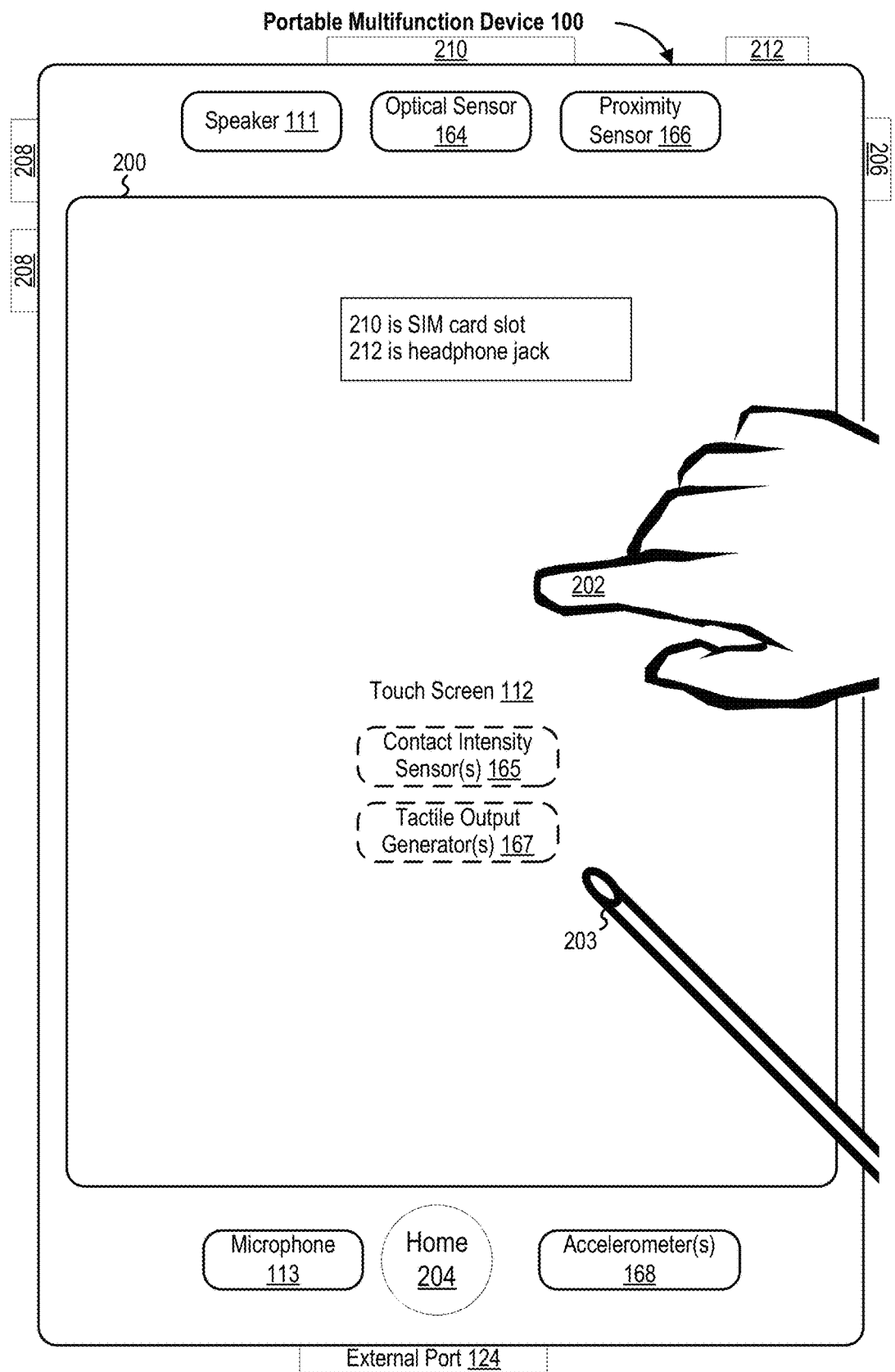
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
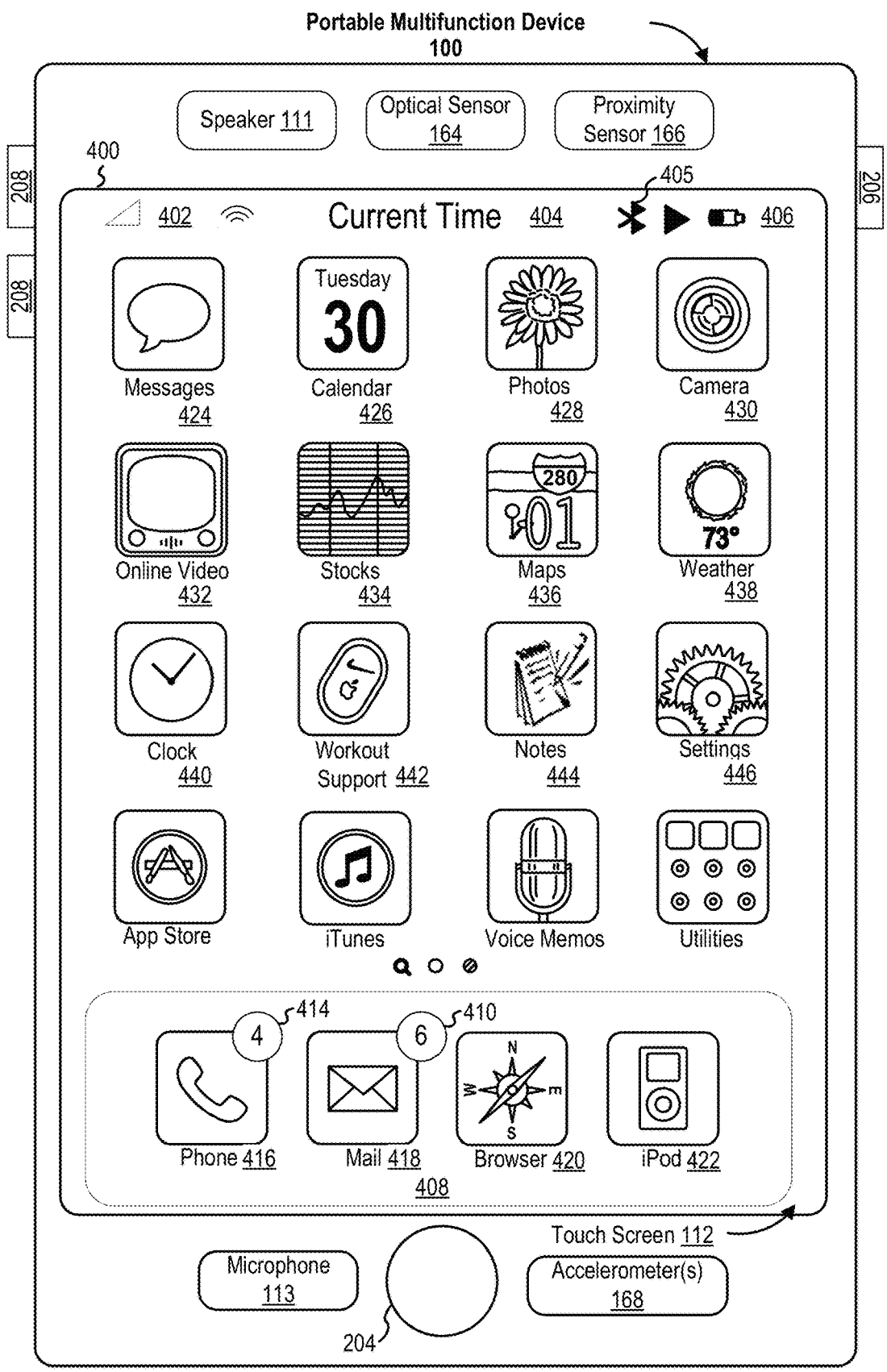
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
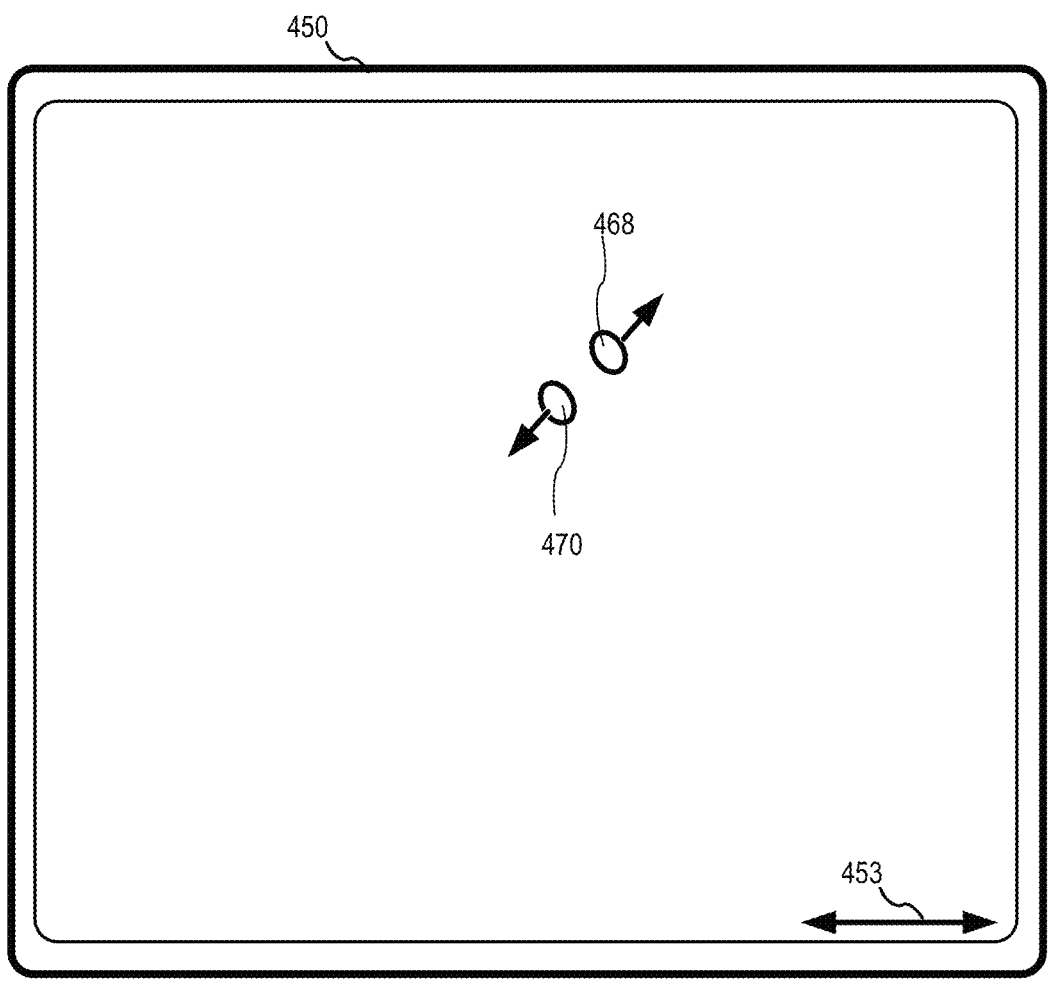
FIG. 4B illustrates an exemplary user interface for a multifunction device with a touch-sensitive surface that is separate from the display in accordance with some embodiments.
Figure 4B:
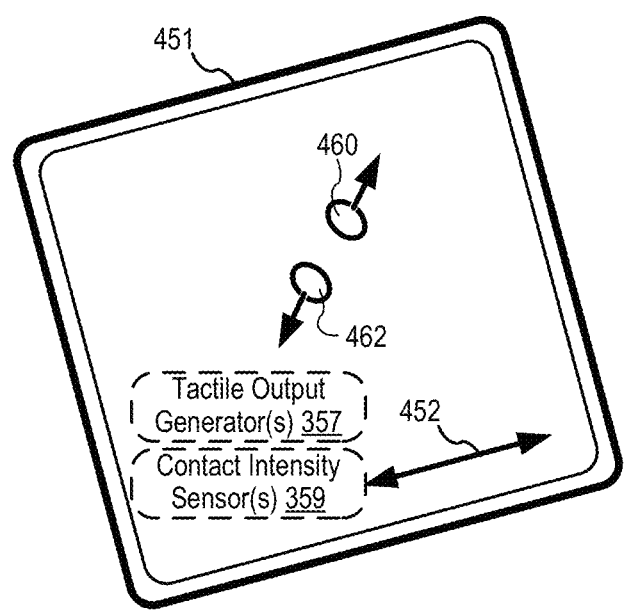

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
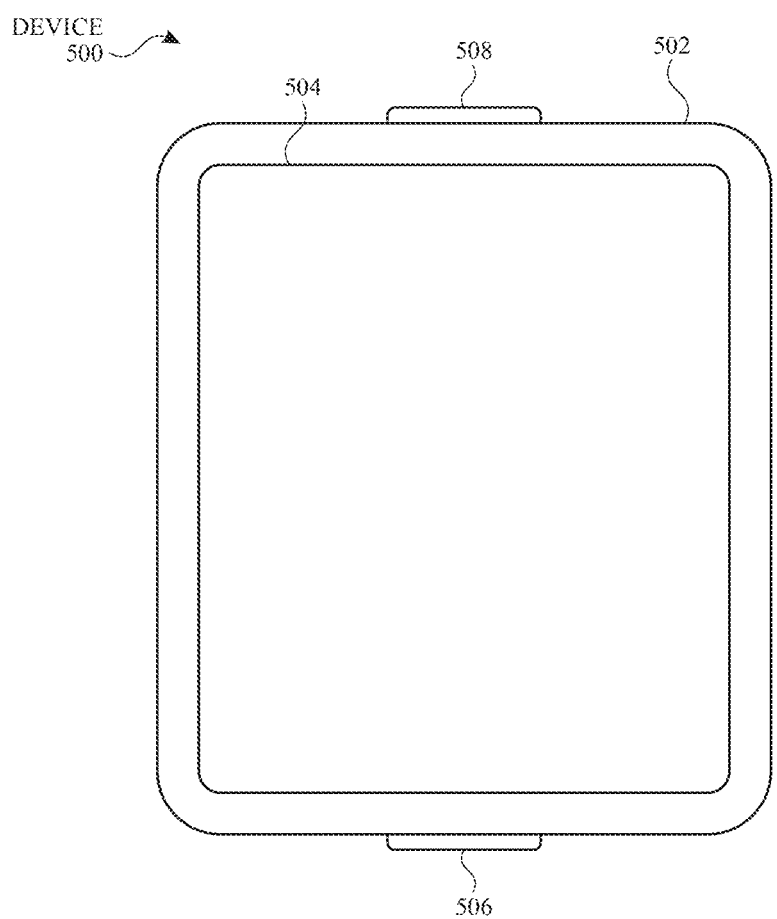
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications:

International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 1000, and 1300 (FIGS. 7, 10, and 13). Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
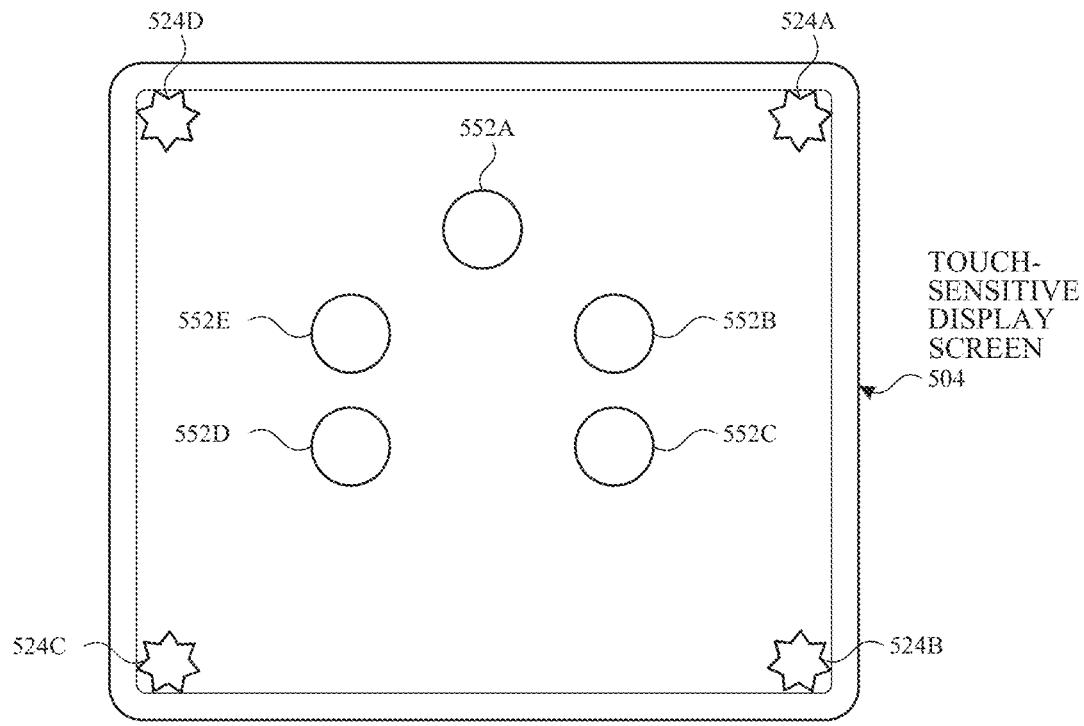
FIGS. 5C-5D illustrate exemplary components of a personal electronic device having a touch-sensitive display and intensity sensors in accordance with some embodiments.
Figure 5C:
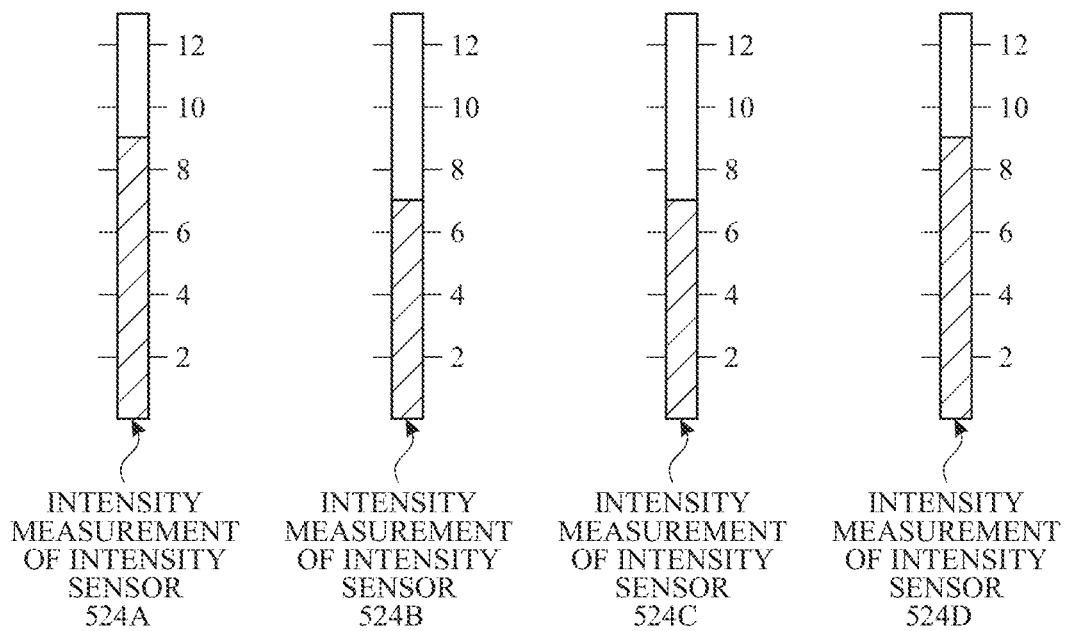
Figure 5D:
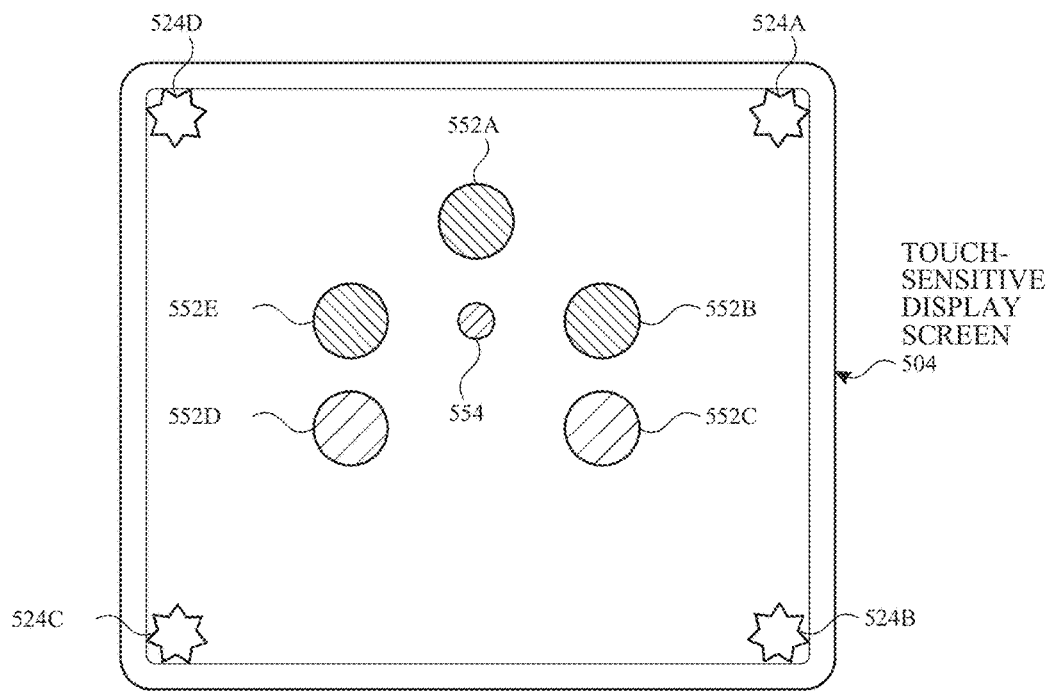
Figure 5D:
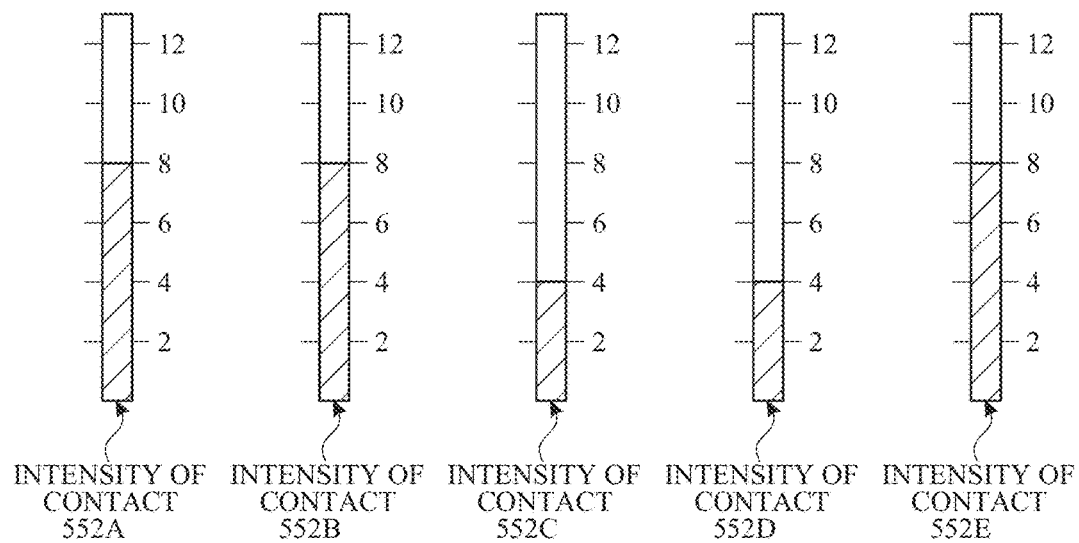

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
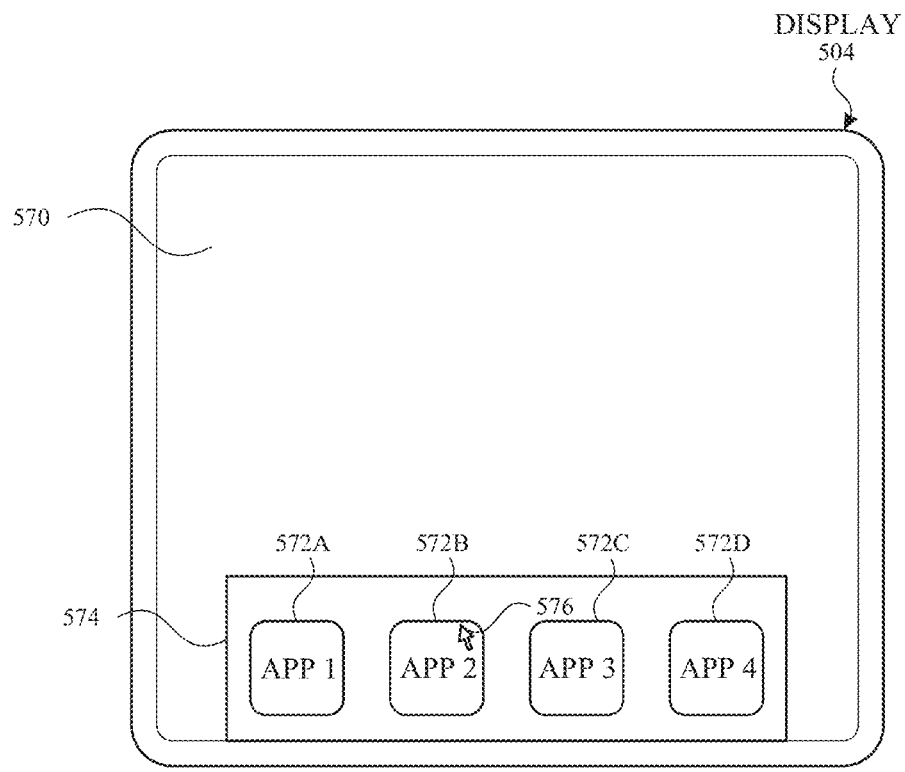
FIGS. 5E-5H illustrate exemplary components and user interfaces of a personal electronic device in accordance with some embodiments.
Figure 5E:
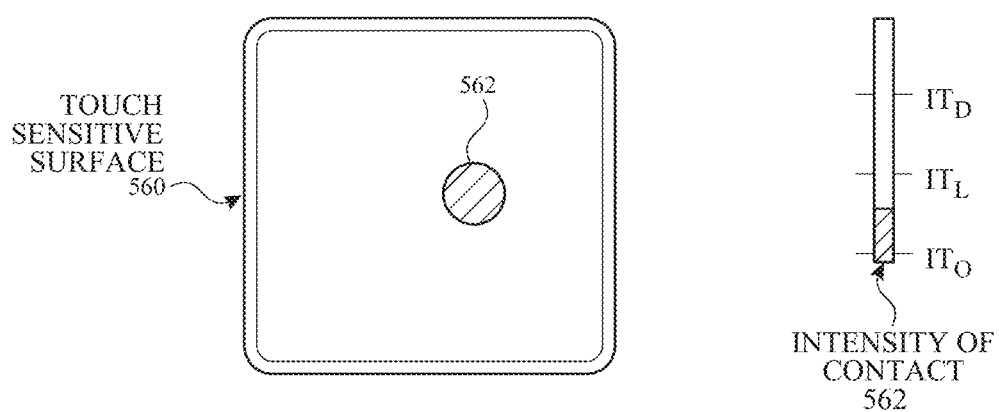
Figure 5F:
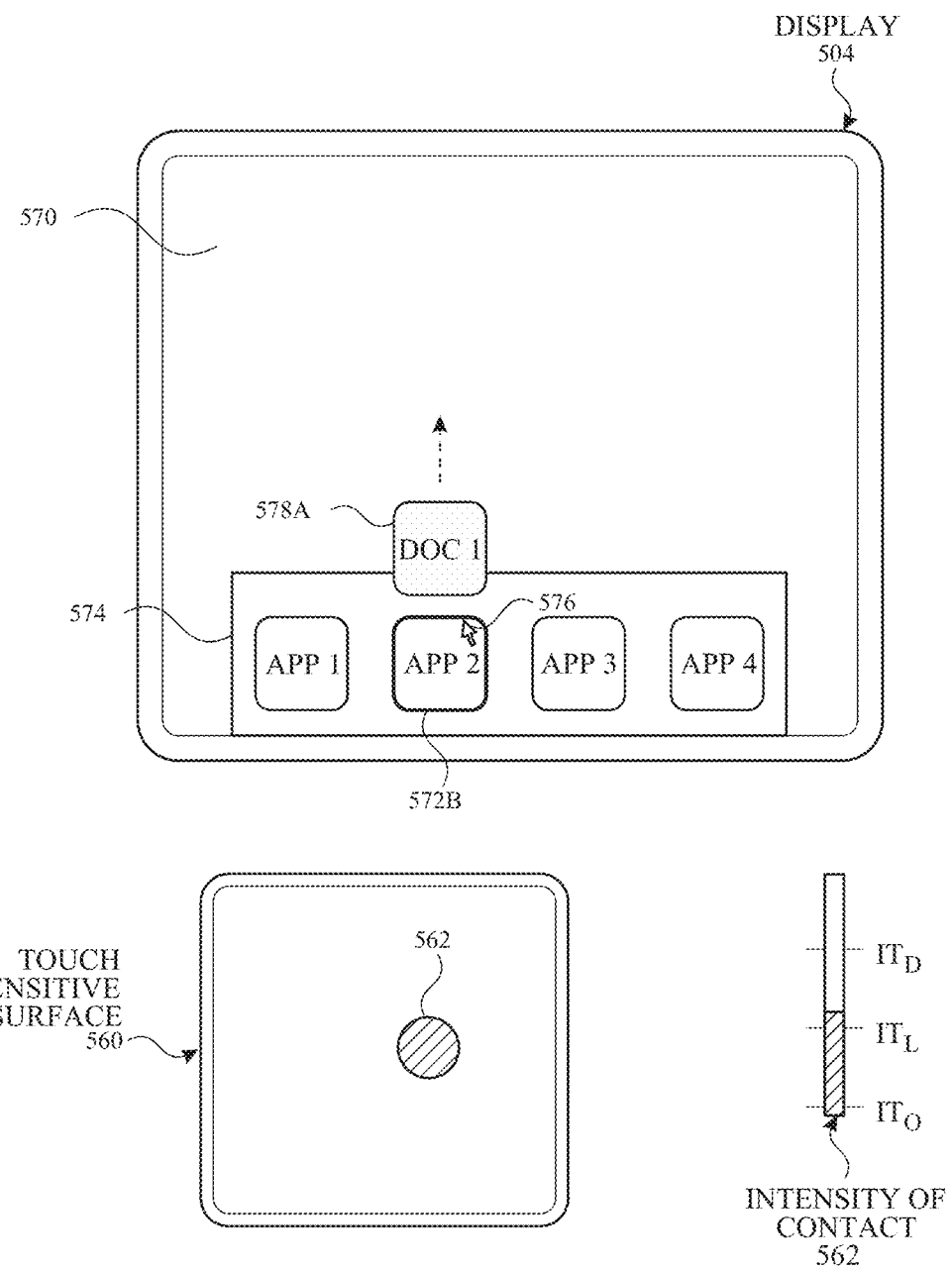
Figure 5G:
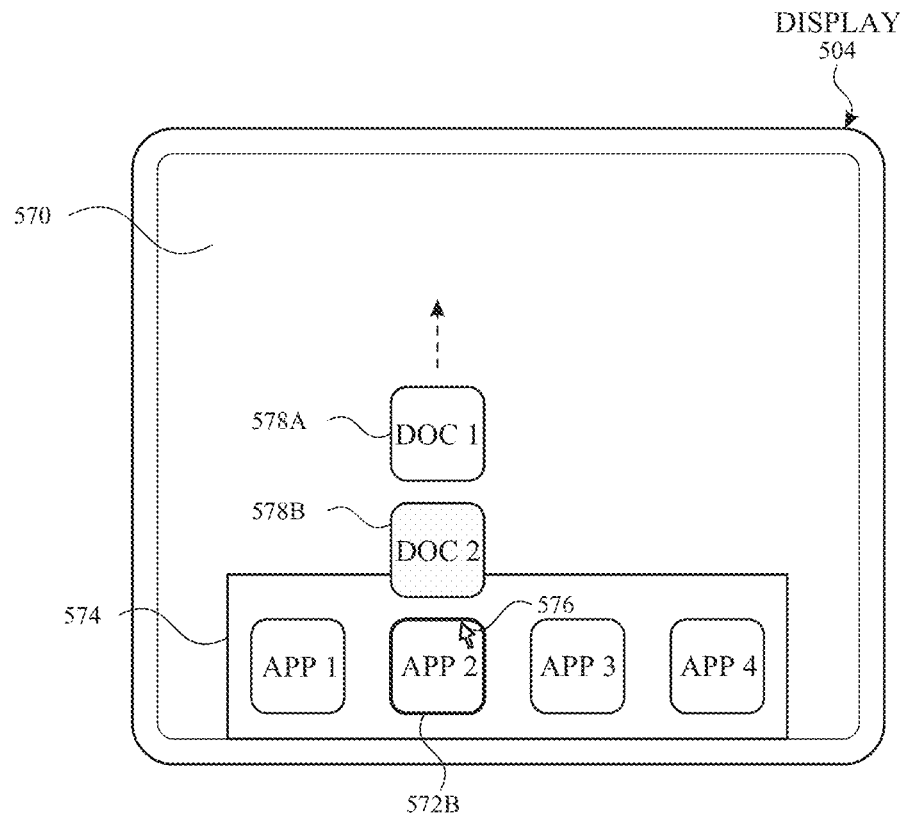
Figure 5G:
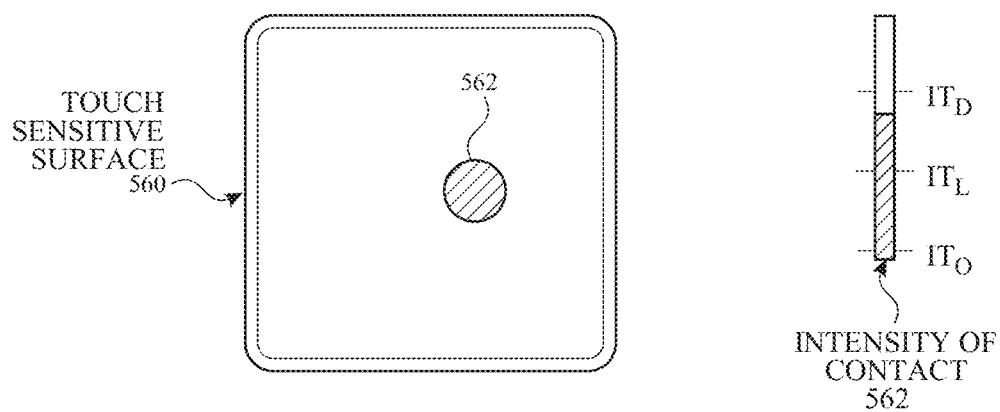
Figure 5H:
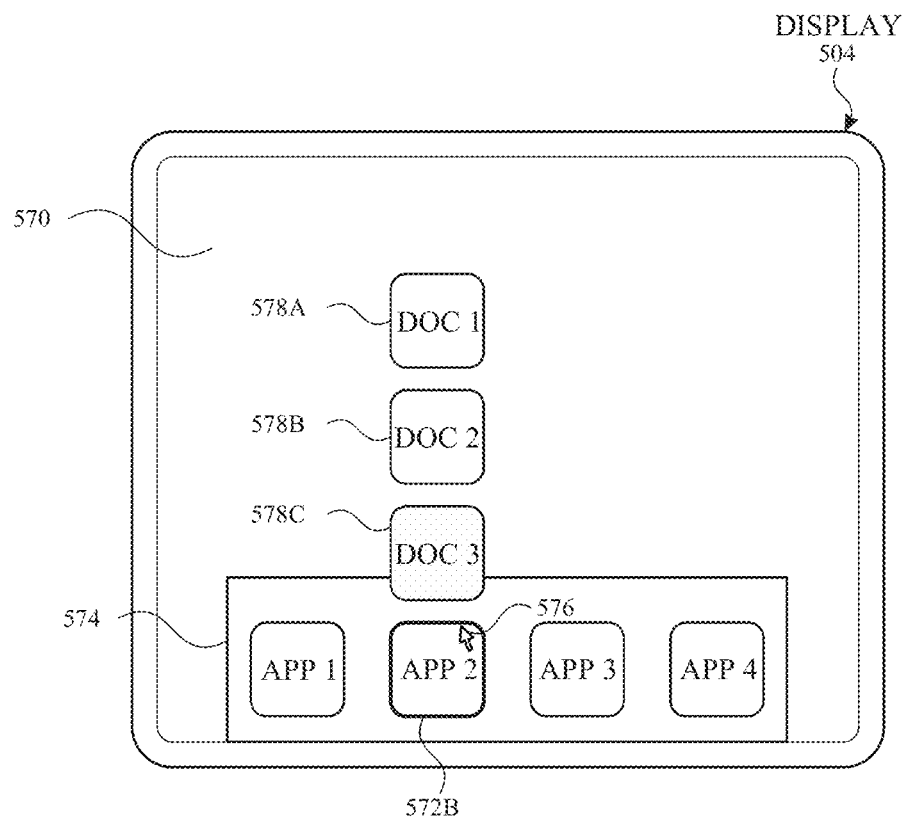
Figure 5H:
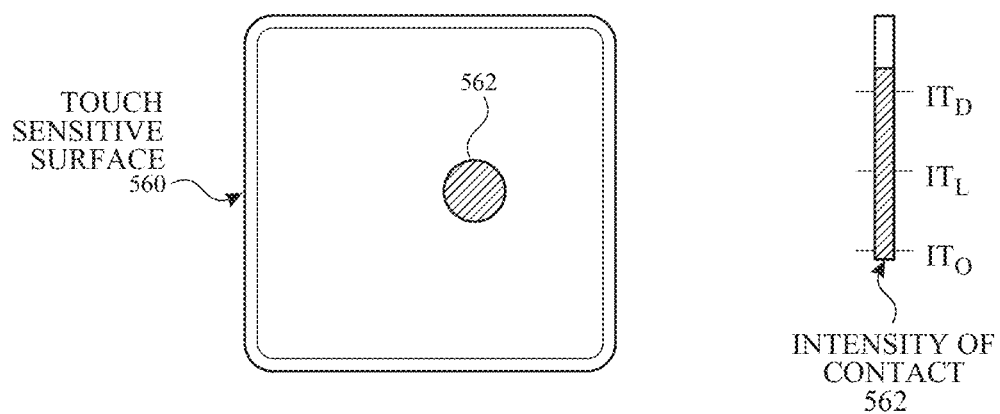

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UP") and associated processes that are implemented on an electronic device, such as portable multifunction device 100, device 300, or device 500.

FIGS. 6A-6J illustrate exemplary user interfaces for communicating user status information for a message, in accordance with some embodiments. The user interfaces in these figures are used to illustrate the processes described below, including the processes in FIGS. 7A-7B.

Figure 6A:
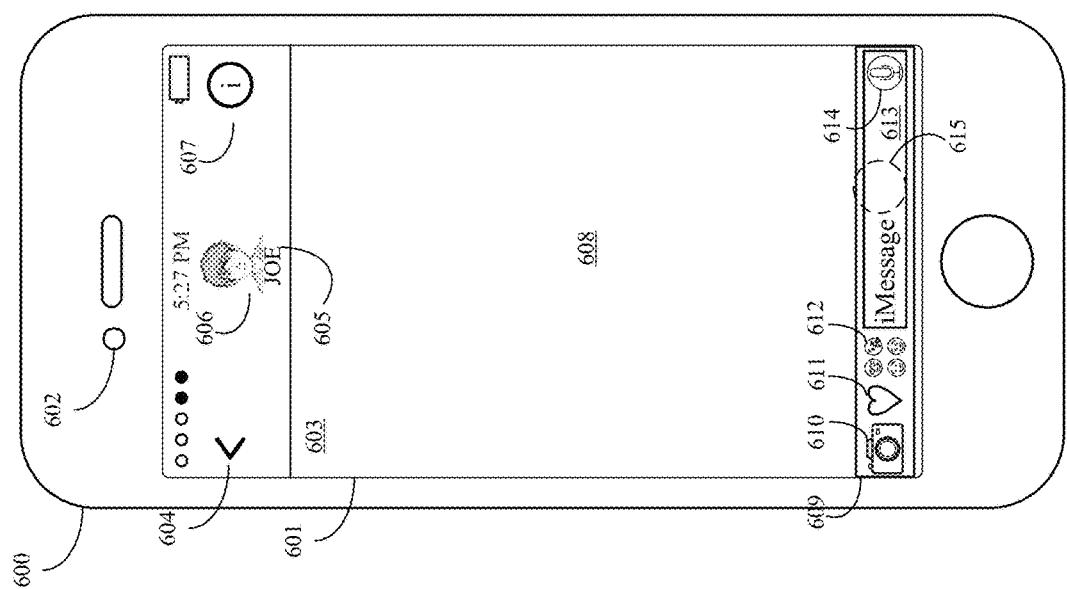
Figure 7A:
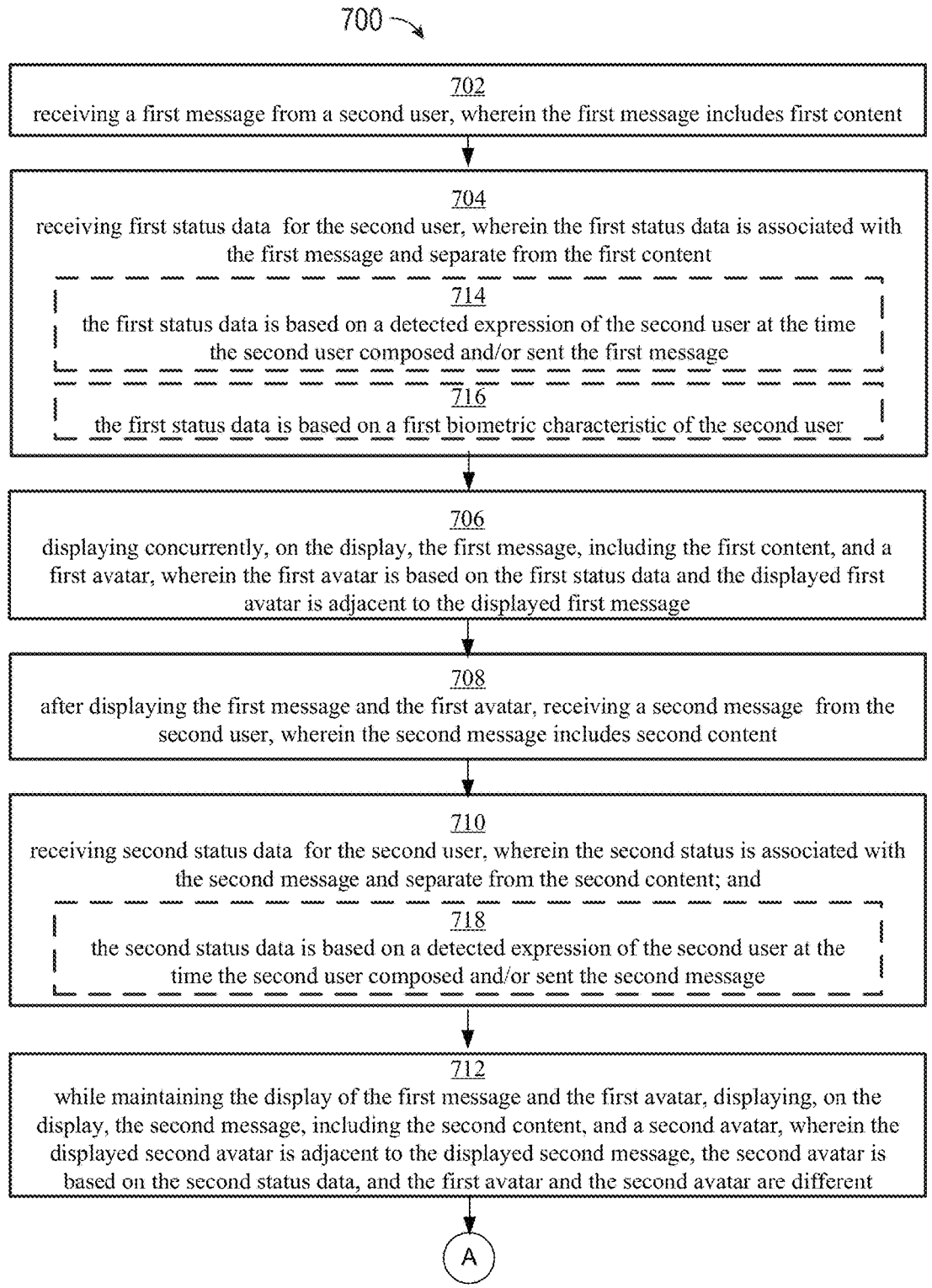
FIGS. 7A-7B is a flow diagram illustrating a method for communicating user status information for a message.
Figure 7B:
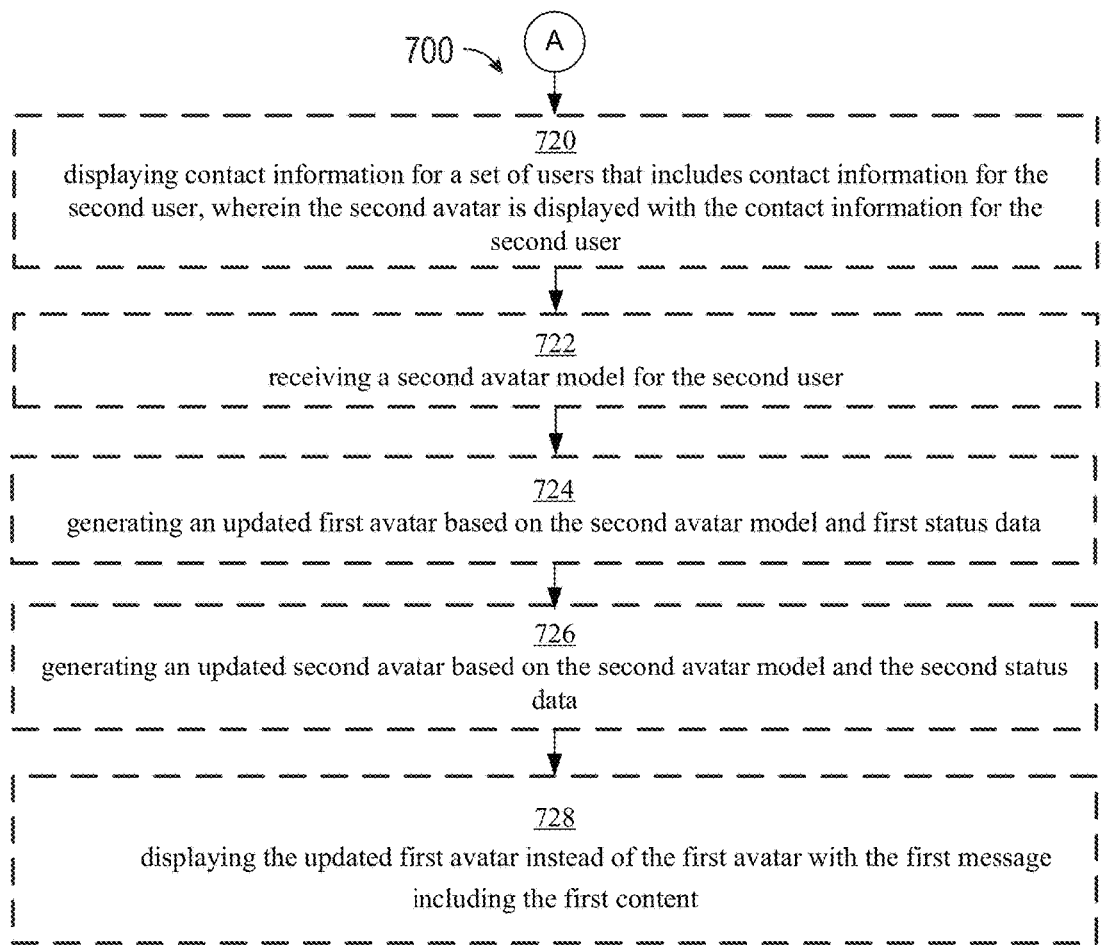

FIG. 6A depicts device 600, which in some examples is a specific form factor for device 100, device 300, or device 500 described above. Device 600 includes display 601, which in some embodiments is a touch-sensitive display, and image sensor 602. Additionally, in some embodiments of device 600, additional sensors (e.g., depth sensors, IR sensors, etc.) and/or other components (e.g., flash or IR emitter) are present along with image sensors 602.

In FIG. 6A, device 600 displays, on display 601, messaging interface 603 for communicating with the device of a contact named "Joe." Messaging interface 603 includes back button 604, username 605, user picture 606, and contact information button 607. In response to the user selecting back button 604, by, for example, touching back button 604 on display 601, messaging interface 603 returns to a main messaging screen where recent messages are displayed and/or other contacts are selected for communicating with. User name 605 and user picture 606 indicate the other user that messaging interface 603 is configured to communicate with. User picture 606 is, for example, an avatar (e.g., emoji or other graphical representation such as a non-photorealistic graphical representation) for the other user, a picture of the other user, or some other image associated with the other contact. In response to the user selecting contact information button 607, options, settings, and other actions associated with the other user are accessible. In some examples, the contact information button 607 causes device 600 to open a user interface page that allows the user to initiate communicate with the other user using other channels of communication, allows the user to send certain types of information (e.g., a current location) to the other user, allows the user to change communications settings for the other user, and/or allows the user to review information related to previous communications with the other user.

Messaging interface 603 includes message area 608, which is empty in FIG. 6A, and message entry area 609. Message entry area includes photo button 610, drawing button 611, sticker/emoji button 612, text entry field 613, and voice recognition button 614. Photo button 610 allows the user to either select an existing picture/video or capture a new picture/video to include in a message to the other user. Drawing button 611 allows the user to create a sketch to include in a message to the other user. Sticker/emoji button 612 allows a user to select stickers and/or emojis to include in a message to the other user. Text entry field 613 allows a user to enter text that will be included in a message to the other user. In FIG. 6A, text entry field 613 includes the word "iMessage," which indicates the type of textual message that will be sent to the other user. Voice recognition button 614 allows a user to enter text for text entry field 613 by speaking into device 600 instead of manually entering the text.

As depicted in FIG. 6B, in response to user input selecting text entry field 613, such as touch 615 in FIG. 6A, keyboard 616 is displayed on display 601. Additionally, text entry field 613 is moved up the display and expanded by hiding photo button 610, drawing button 611, and sticker/emoji button 612 of FIG. 6A. These buttons are redisplayed if the user selects expand button 617. Additionally, in some examples, a cursor (not shown) is displayed inside of text entry field 613.

As depicted in FIG. 6C, in response to selection of letters on keyboard 616 (e.g., via touches on keyboard 616, such as touches 618 and 619 in FIG. 6B on the letters "H" and "I," respectively), text entry field 613 is updated to include the selected letters. Additionally, voice recognition button 614 (FIG. 6B) is replaced with send button 620, which sends the currently entered message, including entered text and other data such as image data, to the other user.

FIG. 6D depicts messaging interface 603 after additional text entry via additional touches on keyboard 616. Text entry field 613 includes the additional entered text.

Once the user is done entering text in text entry field 613, the user indicates that the message is ready to be sent by, for example, selecting send button 620 via touch 621 on display 601. In response, device 600 prepares the message that includes, in the example of FIG. 6D, the text in text entry field 613. Once the message is ready to send, device 600 sends the message to the other user (the other user named "Joe" in the case of the example of FIGS. 6A-6F). Either as part of the message or as a separate data transmission, device 600 also sends status data of the user of device 600 to the other user (e.g., status data associated with a user account currently associated with device 600). In some embodiments, the status data of the user represents a physical state (e.g., tired, sick, hot, cold, bored) or an emotional state (e.g., happy, sad, worried, angry).

The status data can be obtained from any number of sources. In one example, the status data is obtained by presenting the user with a list of statuses and allowing the user to select one of the statuses that represents the user or the content of the message that the user is sending. In other words, after the user has selected send button 620, device 600 prompts the user with a list of statuses that the user can chose to associate and send with the message having content that includes the text of text entry field 613. In another example, to obtain status data, device 600 is configured to determine automatically a status data for the user. Device 600 (e.g., via the messaging application) determines status data, in some examples, based on the content of the message, based on image data of the user using one or more image sensors (e.g., image sensor 602 of FIG. 6A), and/or based on other contextual information (e.g., calendar entries, weather, time of day/year, location, etc.) that is available to device 600. Device 600 can use the data from image sensor 602 or other sensors, such as biometric sensors, to perform facial recognition to identify a facial expression or obtain physiological data (e.g., heart rate or temperature) for determining a user status. In some examples, the user status is personal to the user and not associated with objects (e.g., electronic devices) related to the user. Once the user status data is determined, the user status data is associated with the message and sent to the other user either with the message (e.g., as part of the message) or separately from the message (e.g., before, after, or concurrently with sending the message).

Figure 6F:
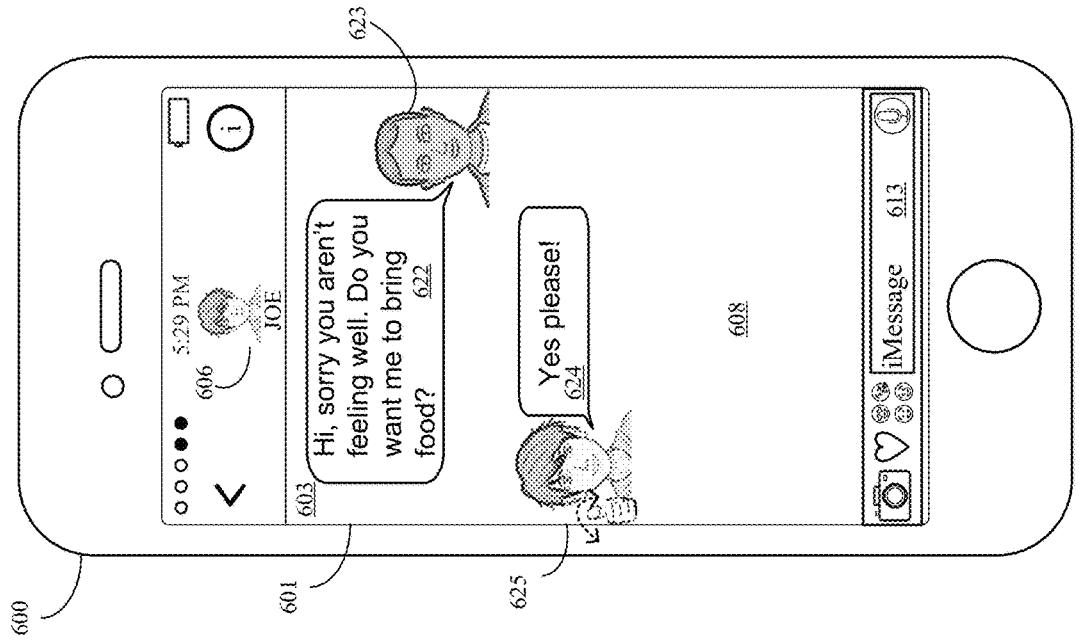
Figure 6E:
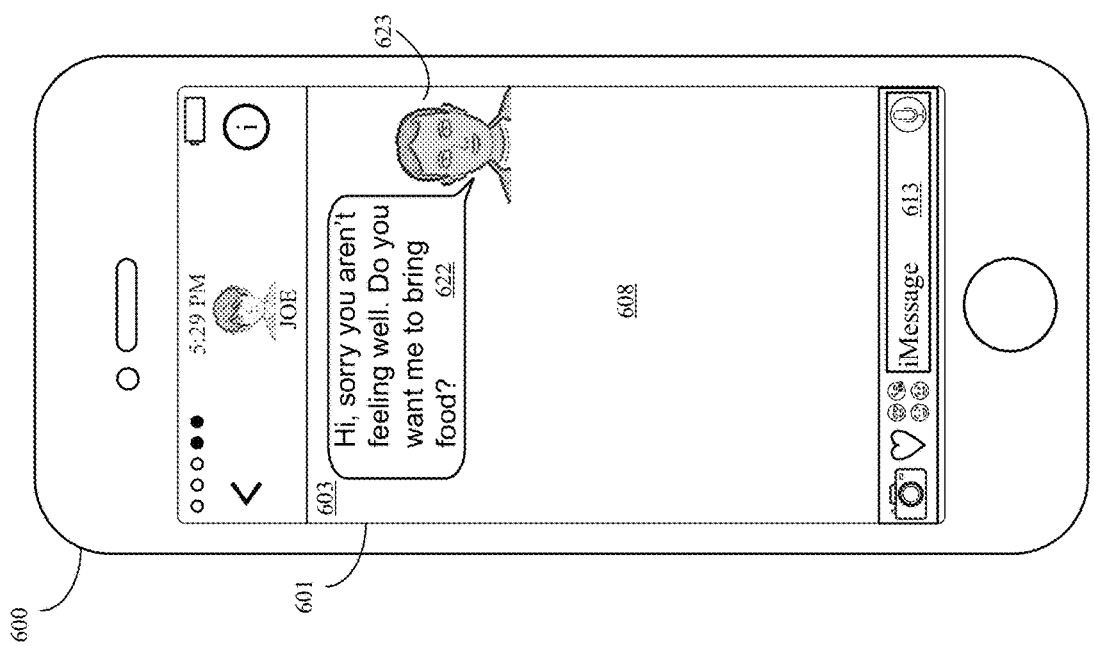

As depicted in FIG. 6E, after sending the message to the other user, the message content, including the text of text entry field 613, is displayed in message area 608 in displayed in text box 622. Text box 622, optionally, also includes other, non-textual content of the message (e.g., images, animations, video, etc.). In addition to displaying text box 622, avatar 623 is also displayed adjacent to text box 622 (e.g., the message is coming from the avatar's mouth). In some embodiments, avatar 623 is generated based on a previously defined (e.g., baseline) avatar or avatar model (e.g., a wire, mesh, or structural model) that represents the user of device 600. Additionally, avatar 623 is based on the user status data that is associated with the message in text box 622. For example, the user status data for the message in text box 622 was sympathetic. The messaging application determined that a smiling avatar is most appropriate for this status data. Accordingly, avatar 623 was generated to show a smile and a warm expression. In some examples, the generated avatar can include accessories (e.g., an umbrella in rain, sunglasses when on the beach, a costume on Halloween, or gift when wishing someone a happy birthday). In some examples, the generated avatar is an animated avatar.

FIG. 6F depicts messaging interface 603 after a message and associated status data was received from the other user named "Joe" (e.g., received from an electronic device associated with the other user "Joe"). The content of the message is displayed in text box 624 in message area 608. Additionally, an associated avatar 625 is displayed adjacent text box 624. Like avatar 623, avatar 625 is based on a previously defined avatar or avatar model, except the predefined (e.g., baseline) avatar or avatar model is for "Joe," instead of the user of device 600. The previously defined avatar or avatar model is, optionally, set by the user of device 600 or is provided by the other user or by a remote server. Device 600, optionally, stores the previously defined avatar or avatar model locally or it retrieves the previously defined avatar or avatar model as needed. When device 600 receives a message from another user, such as Joe, the message application on device 600 loads the previously defined avatar or avatar model and modifies it or uses it to generate an avatar based on the user status data associated with the received message. Similar to the sending of user status data described above, the user status data for a message received from another user can be received as part of the message or separately from the message (e.g., before, after, or concurrently with the message).

The user status data for the other user, optionally, is determined in a similar manner as described above with respect to the user except that the other user's device (e.g., "Joe's" device) does the determination. For the message associated with text box 624, the other user's device determined that the user status was agreeable and thankful.

Similar to avatar 623, avatar 625 is based on the user status data. In the case of avatar 625, the messaging application generated avatar 625 based on the agreeable and thankful user status data to include a smile and a thumbs-up. Additionally, avatar 625 is an animated avatar (the arrow represents animated shaking of the avatar thumb).

In some embodiments, avatar 625 is optionally saved on device 600 and associated with the other user. For example, user picture 606 is replaced with avatar 625 or subsequently generated avatars for the contact. Whenever the other user's information is displayed (e.g., in other applications or in a contact list), the avatar that represents the most recently received user status data for the other user is displayed.

FIG. 6G depicts messaging interface 603 after the user of device 600 has entered and sent another message to the other user named "Joe." The content of the message is displayed in text box 626 in message area 608. Additionally, avatar 627 is displayed adjacent to text box 626 and is generated based on user status data for the user when the message associated with text box 626 was sent. In this case, device 600 (e.g., as programed by the messaging application) determined that the user status was sad. Based on this status, avatar 627 was generated to have a sad expression as compared to avatar 623 (e.g., the eyes, eyebrows, and mouth were all changed to reflect a sad expression). Although avatar 627 reflects new user status data as compared to avatar 623, avatar 623 remains unchanged. In other words, avatar 623 stays the same despite device 600 receiving updated user status data. In such embodiments, the unchanged status of avatar 623 may function as a historical record of the user's status, even as status data is subsequently updated.

In some embodiments, avatars 623 and 627 can be updated based on a new baseline avatar or avatar model. For example, if the user of device 600 shaves his beard and updates his baseline avatar or avatar model accordingly, avatars 623 and 627 are updated to remove the beard, but the expressions and other features based on the user status data remain (although they can be modified based on the new baseline avatar or avatar model). In some embodiments, previously generate avatars, such as avatars 623 and 627, are not updated even when the baseline avatar or avatar model is updated.

FIG. 6G depicts messaging interface 603 after the user of device 600 has received another message from the other user named "Joe." The content of the message is displayed in text box 628 in message area 608. Additionally, avatar 629 is displayed adjacent to text box 628 and is generated based on user status data for the other user that was received and associated with the message represented in text box 628. Based on user status data indicating that the other user was apologetic, avatar 629 was generated to have a concerned expression. Although avatar 629 reflects new user status data for the other user as compared to avatar 625, avatar 625 remains unchanged. As shown in FIG. 6G, avatar 625 stays the same despite device 600 receiving updated user status data. In this manner, it is easy to determine the state of a user when they set a particular message. This results in a more efficient interface that allows a user to search for and comprehend messages faster.

In some embodiments, avatars 625 and 629 can be updated based on a new baseline avatar or avatar model. For example, if the other user starts wearing glasses and updates his baseline avatar or avatar model accordingly and the other user sends out a new baseline avatar or avatar models and avatars 625 and 629 are updated to add glasses, but the expressions and other features based on the user status data remain (although they can be modified based on the new baseline avatar or avatar model). In some embodiments, previously generate avatars, such as avatars 625 and 629, are not updated even when the baseline avatar or avatar model for the other user is updated.

Figure 6J:
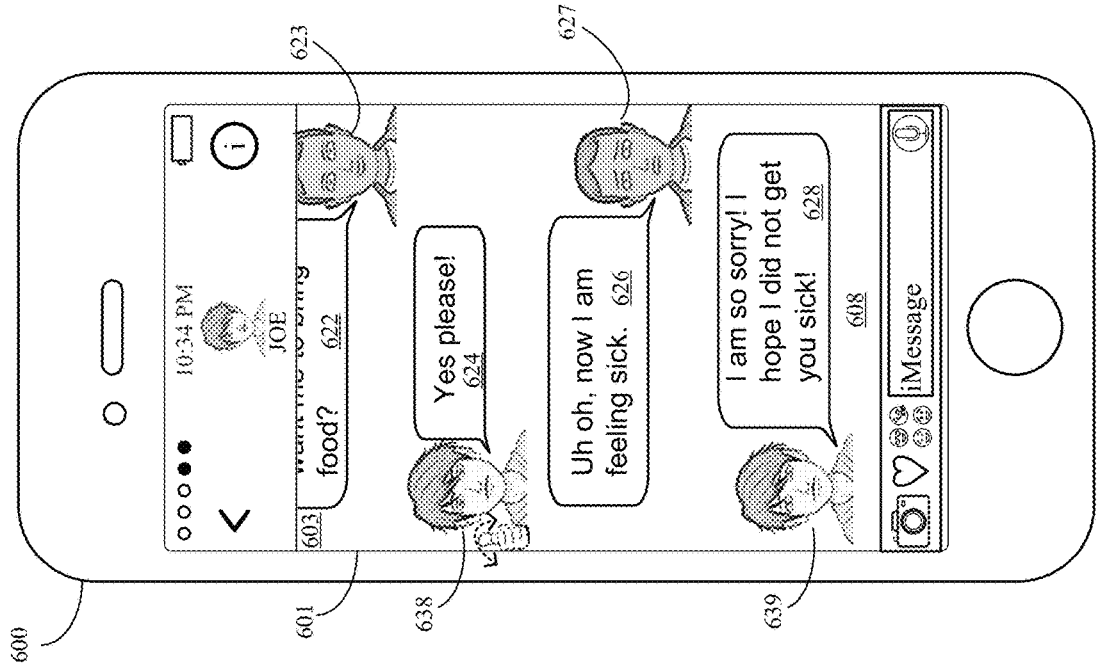
Figure 6I:
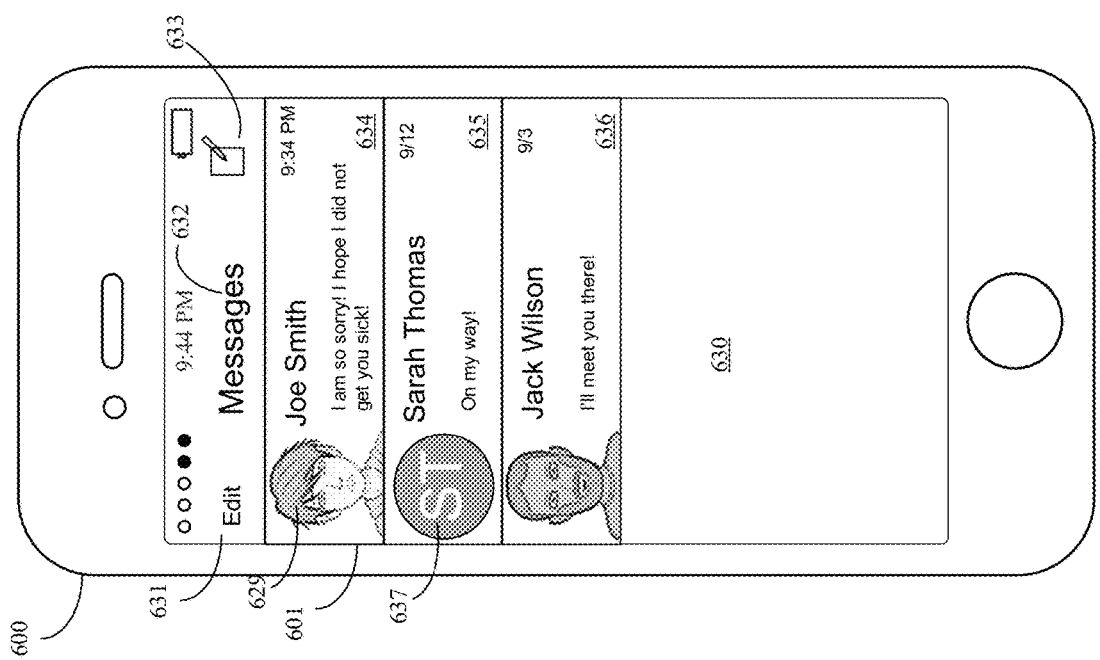

FIG. 6I depicts message application interface 630 that includes edit button 631, title 632, compose button 633, and affordances 634-636. Interface 630 is optionally displayed in response to selection of back button 604 in FIG. 6H. Selection of edit button 631 of interface 630 allows a user to select particular contact affordances and perform an operation (e.g., deletion) on contact information associated with the selected affordances. Title 632 provides the name of the message application. Selection of compose button 633 allows a user to create a new message and select recipients for the message.

Affordances 634-636 display contact information for different remote users. In this example, each affordance includes contact information, such as a user name, a summary of the most recent communication with the other user, a graphical element associated with the other user, and the time of the most recent communication. In some embodiments, the graphical element is the most recently generated avatar for the other user. For example, affordance 634 for "Joe Smith" includes avatar 629, which was the most recently generated avatar for "Joe Smith" based on the user status received with the message associated with text box 629 of FIG. 6H. This avatar is optionally updated with subsequently generated avatars that are based on subsequently received user status data so that the contact list in interface 630 always includes an avatar reflecting the most up-to-date status of the other user.

Selection of one of the affordance returns the display of messaging interface 603. For example, selection of contact affordance 634 will return the display of messaging interface 603 as depicted in FIG. 6H.

Affordance 635 does not have an associated avatar. Instead monogram 637 is displayed in place of displaying an avatar.

FIG. 6J depicts messaging interface 603 for the other user "Joe" after a new baseline avatar or avatar model is received for "Joe." In this example, Joe has grown a mustache and updated his avatar accordingly. In response to receiving the new baseline avatar or avatar model, device 600, for example via the messaging program, has updated avatars 625 and 629 with avatars 638 and 639 to reflect Joe's new mustache. Avatars 628 and 629 continue to be based on the user status data received with the corresponding messages. In the example shown in FIG. 6J, this means that the facial expressions remain the same.

FIGS. 7A-7B are a flow diagram illustrating a method for an enhanced messaging interface using an electronic device in accordance with some embodiments. Method 700 is performed at a device (e.g., 100, 300, 500) with a display. Some operations in method 700 are, optionally, combined, the order of some operations are, optionally, changed, and some operations are, optionally, omitted.

As described below, method 700 provides an intuitive way for communicating user status information for a message. The method reduces the cognitive burden on a user for communicating status information, thereby creating a more efficient human-machine interface. For battery-operated computing devices, enabling a user to comprehend and respond to messages faster and more efficiently conserves power and increases the time between battery charges.

An electronic device (e.g., device 600 of FIGS. 6A-6J) with a display (e.g., display 601 of device 600), is associated a first user (e.g., the owner or user of device 600). The electronic device receives (702) a first message (e.g., message associated with text box 624 of FIGS. 6F-6J) (e.g., a SMS message, a MMS message, an iMessage, or other type of message) from a second user (e.g., the other user having user name 605 and user picture 606 of FIG. 6A). The first message includes first content (e.g., content in text box 624 of FIGS. 6F-6H). In accordance with some embodiments, the second user is associated with a source electronic device that sends the first message and the second message.

The electronic device receives (704) first status data (e.g., an emotional or physical state or other state associated with or personal to the other user) for the second user. The first status data is associated with the first message and separate from the first content (e.g., the first status data is transmitted as a part of the message that is separate from the content or is sent separately from the message but in a manner that allows identification of the status data as being for a message). The status data can be obtained from any number of sources. In some embodiments, the status data is obtained by presenting the user with a list of statuses and allowing the user to select one of the statuses that represents the user or the content of the message that the user is sending. In some embodiments, to obtain status data, the electronic device is configured to determine automatically a status data for the user based on, for example, image data of the user using one or more image sensors (e.g., image sensor 602 of FIG. 6A), and/or based on other contextual information (e.g., calendar entries, weather, time of day/year, location, etc.) that is available to the electronic device. Optionally, data from image sensor 602 or other sensors, such as biometric, are used to perform facial recognition to identify a facial expression or obtain physiological data (e.g., heart rate or temperature) for determining a user status. In some embodiments, the user status is personal to the user and not associated with objects (e.g., electronic devices) related to the user. Once the user status data is determined, the user status data is associated with the message and sent to the other user either with the message (e.g., as part of the message) or separately from the message (e.g., before, after, or concurrently with sending the message).

The display of the electronic device displays (706) the first message, including the first content (e.g., content in text box 624), and a first avatar (e.g., avatar 624 of FIGS. 6F-6H) (e.g., emoji or other graphical representations). The first avatar is based on the first status data and the displayed first avatar is adjacent to the displayed first message (e.g., the message is coming from the avatar's mouth).

After displaying the first message and the first avatar, the electronic device receives (708) a second message (e.g., another SMS message, MMS message, iMessage, or other type of message) from the second user, wherein the second message includes second content (e.g., context in text box 629 of FIG. 6H).

The electronic device receives (710) second status data (e.g., emotional or physical state) for the sender, wherein the second status is associated with the second message and separate from the second content. In some embodiments, the second status data is generated and sent in a similar manner as the first status data.

While maintaining the display of the first message and the first avatar, the display of the electronic device displays (712) the second message, including the second content (e.g., text box 629 of FIG. 6H), and a second avatar (e.g., avatar 629 of FIG. 6H) (e.g., emoji or other graphical representations), wherein the displayed second avatar is adjacent to the displayed second message (e.g., the message is coming from the avatar's mouth), the second avatar is based on the second status data, and the first avatar and the second avatar are different. By including different avatars based on different user statuses for different messages, the operability of the electronic device is enhanced by increasing the amount of information presented on the display. For example, users can quickly scan messages and determine some context associated with the messages based on the avatars without having to read the text content of the message. This improved operability of the electronic device makes it more efficient, reduces power usage, and improves battery life of the device by enabling the user to use the device more quickly and efficiently. For example, the different avatars for different messages can help when a user is trying to find a particular message that the user knows to be associated with a particular status (e.g., a sad message, in some instances, will have a sad avatar). Additionally, when a message can be interpreted to have multiple meanings, a message-specific avatar may help the reader accurately interpret the meaning of the message.

In accordance with some embodiments, the electronic device displays (720) contact information (e.g., FIG. 6I) (e.g., phone number, email address, user names, recent communications, etc.) for a set of users that includes contact information for the second user (e.g., information in affordance 633 of FIG. 6J), wherein the second avatar (e.g., avatar 629) is displayed with the contact information for the second user. In some embodiments, upon detection of a change in status of the second user, the second avatar is replaced with a third avatar for the second user. By updating the avatar of the second user as new avatars are received, the user of the electronic device also has access to the avatar that represents the most recent status of the second user. This provides for a more efficient interface by eliminating the need for the user of the electronic device to review old messages to determine the second user's status during the last communication. Thus, the user is required to make fewer interactions with the electronic device to retrieved desired information, which makes the electronic device more efficient, reduces power usage, and improves battery life of the device by enabling the user to use the device more quickly and efficiently.

In some embodiments, the electronic device stores a first association of the first avatar or first status data with contact information for the second user (e.g., linking the first avatar or first status data with contact information in a database or as part of the contact information) and stores a second association of the second avatar or second status data with contact information for the second user (e.g., linking the first avatar or first status data with contact information in a database or as part of the contact information).

In accordance with some embodiments, the electronic device receives a first avatar model (e.g., a wire mesh, parameterized model) for the second user, generates the first avatar (e.g., 625) based on the first avatar model and first status data (e.g., an avatar that looks like the second user with a first expression such as a smile), and generates the second avatar (e.g., 629) based on the first avatar model and the second status data. (e.g., an avatar that looks like the second user with a second expression such as a frown). In accordance with some embodiments, the electronic device maps the first status data on to a predefined avatar model (e.g., a preexisting avatar on the electronic device) to create the first avatar (e.g., 625). By using an avatar model, the electronic device can more efficiently generate the second user avatars based on the received status data because a baseline avatar need not be received or generated each time a new avatar is generated. Thus, the electronic device is more efficient, uses less power, and has longer battery life by limiting the processing power necessary to generate the avatars.

In accordance with some embodiments, the electronic device receives (722) a second avatar model (e.g., a wire mesh, parameterized model) for the second user and generates (724) an updated first avatar (e.g., 637) based on the second avatar model and first status data. The electronic device generates (726) an updated second avatar (e.g., 638) based on the second avatar model and the second status data. The electronic device also displays (728) the updated first avatar instead of the first avatar with the first message including the first content (e.g., FIG. 6J) (e.g., updating the displayed avatars while leaving the message content and the contextual information related to the avatar unchanged). In accordance with some embodiments, the first avatar (e.g., 625) and second avatar (629) represent the physical appearance of the second user (e.g., the avatars are reflective of the second user's appearance). By allowing for the updating of the baseline avatar for the second user, the messaging interface ensures that the avatars always reflect the second user's current avatar. This provides for a more efficient interface by eliminating the need for the user of the electronic device to recognize multiple different baseline avatars being associated with the second user. Thus, the user can more quickly and efficiently interact with the electronic device, which makes the electronic device more efficient, reduces power usage, and improves battery life of the device.

In accordance with some embodiments, the first status data is based on (716) a first biometric characteristic (e.g., depth information, facial recognition, heart rate, etc.) of the second user. In accordance with some embodiments, the first status data is based on an optical image or a depth image of the sender. In accordance with some embodiments, the first status data is based on (714) a detected expression (e.g., based on a facial map (e.g., description of various facial features)) of the second user at the time the second user composed and/or sent the first message. In accordance with some embodiments, the second status data is based on (718) a detected expression (e.g., based on a facial map (e.g., description of various facial features)) of the second user at the time the second user composed and/or sent the second message. By using biometric characteristics or image data of the second user to generate the first status data, the messaging interface is enhanced by minimizing the burden on the second user to determine and/or enter status data. Additionally, using biometric characteristics may provide for a more granular and/or accurate status for the second user as compared to other methods. Thus, the electronic device provides for an improved man-machine interface, which makes the electronic device more efficient, reduces power usage, and improves battery life.

In accordance with some embodiments, the electronic device selects (e.g., choosing a predefined avatar or generating a new avatar) one or more characteristics (e.g., eyes, mouth, and eyebrows for a sad expression of avatars 629 or 638) (e.g., an expression or accessory) for the first avatar based on the first status data. In accordance with some embodiments, the electronic device selects (e.g., chooses an existing avatar or generating a new avatar) one or more characteristics for the second avatar based on the second status data, wherein the second status data is based on a second biometric characteristic (e.g., depth information, facial recognition, heart rate, etc.). In accordance with some embodiments, the first status data represents an emotion (e.g., happy, sad, smiling, etc.) of the second user. By selecting characteristics for an avatar instead of selecting an entire avatar, the electronic device more efficiently generates new avatars based on the status by only modifying the subset of characteristics that are relevant to a particular status. Thus, the electronic device is more efficient, uses less power, and has longer battery life by limiting the processing power necessary to generate the avatars.

In accordance with some embodiments, the first avatar is an animated avatar (e.g., 629 or 638) (e.g., a Quicktime-based avatar, a GIF Avatar, etc. based on a series of recorded expressions). By using an animated avatar, the range and granularity of statuses that of the first avatar can represent is increased, thereby making for a more efficient first avatar and messaging interface.

In accordance with some embodiments, the electronic device receives, from the first user and on the electronic device, third content (e.g., content in text box 626 of FIGS. 6G and 6H) for a third message (e.g., a message 626 replying the second user's first message 624). The electronic device generates third status data for the first user and associates the third status data with the third message (e.g., sending them together or cross-referencing the message and the status data). The electronic device sends the third message to the second user sending the third status data to the second user. In accordance with some embodiments, the electronic device concurrently displays on the display the third message including the third content (e.g., content in text box 626 of FIGS. 6G and 6H) and a third avatar (e.g., avatar 627 of FIGS. 6G and 6H). The third avatar is based on the third status data, and the third message and third avatar are displayed concurrently with the second message and second avatar. By including different avatars based on different user statuses for different messages, the operability of the electronic device is enhanced by increasing the amount of information presented on the display. For example, users can quickly scan messages and determine some context associated with the messages based on the avatars without having to read the text content of the message. This improved operability of the electronic device makes it more efficient, reduces power usage, and improves battery life of the device by enabling the user to use the device more quickly and efficiently. For example, the different avatars for different messages can help when a user is trying to find a particular message that the user knows to be associated with a particular status (e.g., a sad message, in some instances, will have a sad avatar). Additionally, when a message can be interpreted to have multiple meanings, a message-specific avatar may help the reader accurate interpret the meaning of the message.

In accordance with some embodiments, displaying the first message and the first avatar (e.g., 625) includes displaying the first message as a text bubble (e.g., 624) coming from a mouth of the first avatar. Displaying the first message coming from a mouth of the first avatar enables the association between the first avatar and the first message to be clear, even with minimal review of the messaging interface.

Figure 8:
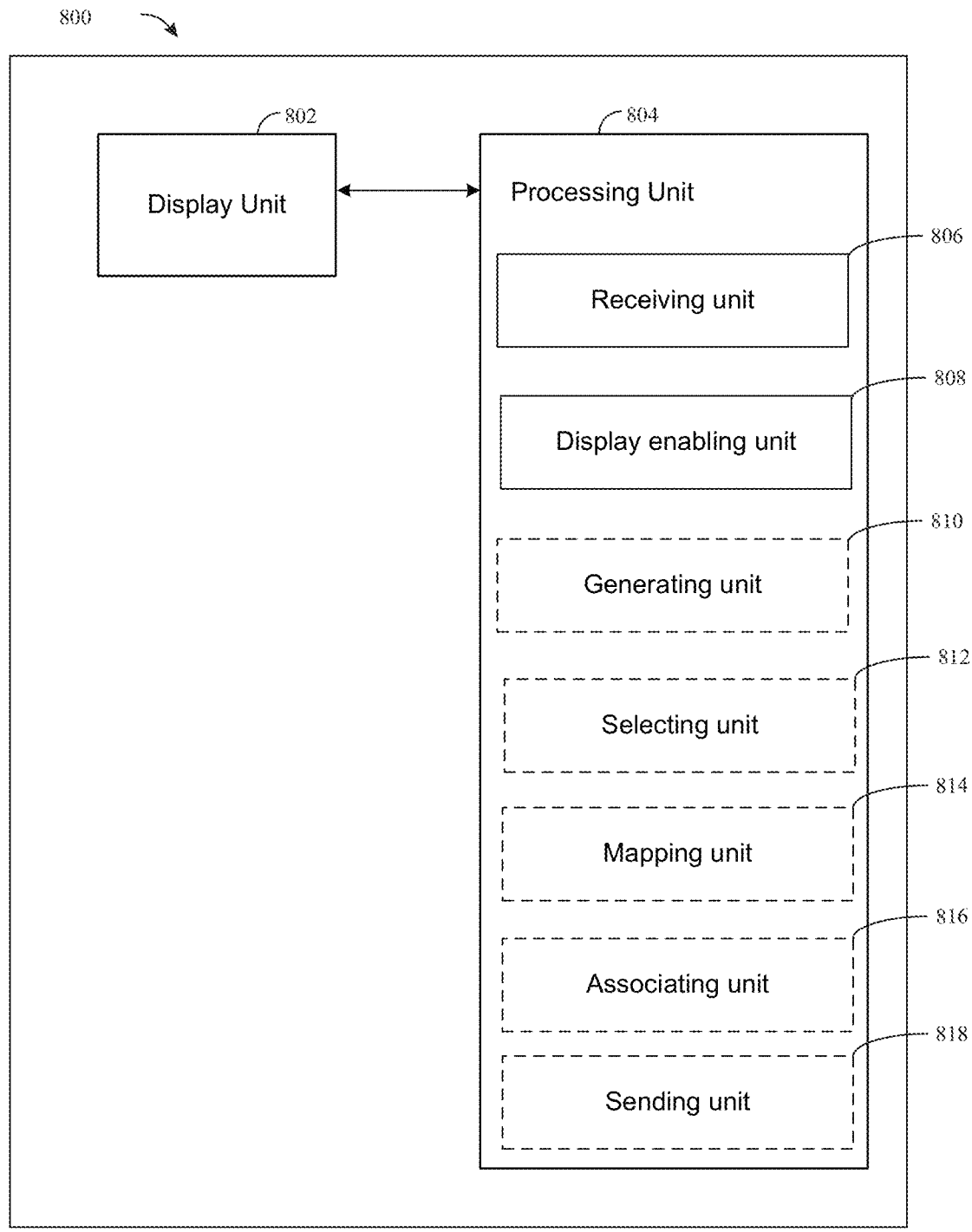
FIG. 8 shows an exemplary functional block diagram of an electronic device.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a display unit 802 and a processing unit 804 coupled to the display unit 802. In some embodiments, the processing unit 804 includes a receiving unit 806, a display enabling unit 808, generating unit 810, selecting unit 812, mapping unit 814, associating unit 816, and sending unit 818.

The processing unit 804 is configured to: receive (e.g., using receiving unit 806) a first message from a second user, wherein the first message includes first content; receive (e.g., using receiving unit 806) first status data for the second user, wherein the first status data is associated with the first message and separate from the first content; enable display (e.g., using display enabling unit 808) concurrently, on the display, the first message, including the first content, and a first avatar, wherein the first avatar is based on the first status data and the displayed first avatar is adjacent to the displayed first message; after displaying the first message and the first avatar, receive (e.g., using receiving unit 806) a second message from the second user, wherein the second message includes second content; receive (e.g., using receiving unit 806) second status data for the second user, wherein the second status is associated with the second message and separate from the second content; and while maintaining the display of the first message and the first avatar, display (e.g., using display enabling unit 808), on the display, the second message, including the second content, and a second avatar, wherein the displayed second avatar is adjacent to the displayed second message, the second avatar is based on the second status data, and the first avatar and the second avatar are different.

In some embodiments, the processing unit 804 is further configured to display (e.g., using display enabling unit 808) contact information for a set of users that includes contact information for the second user, wherein the second avatar is displayed with the contact information for the second user.

In some embodiments, the processing unit 804 is further configured to: receive (e.g., using receiving unit 806) a first avatar model for the second user; and generate (e.g., using generating unit 810) the first avatar based on the first avatar model and first status data; and generating the second avatar based on the first avatar model and the second status data.

In some embodiments, the processing unit 804 is further configured to: receive (e.g., using receiving unit 806) a second avatar model for the second user; generate (e.g., using generating unit 810) an updated first avatar based on the second avatar model and first status data; generate (e.g., using generating unit 810) an updated second avatar based on the second avatar model and the second status data; and display (e.g., using display enabling unit 808) the updated first avatar instead of the first avatar with the first message including the first content.

In some embodiments, the first status data is based on a first biometric characteristic of the second user.

In some embodiments, the processing unit 804 is further configured to select (e.g., using selectin unit 812) one or more characteristics for the first avatar based on the first status data.

In some embodiments, the processing unit 804 is further configured to select (e.g., using selecting unit 812) one or more characteristics for the second avatar based on the second status data, wherein the second status data is based on a second biometric characteristic.

In some embodiments the first avatar is an animated avatar.

In some embodiments the first status data is based on an optical image or a depth image of the second user.

In some embodiments, the processing unit 804 is further configured to map (e.g., using mapping unit 814) the first status data on to a predefined avatar model to create the first avatar.

In some embodiments the first status data represents an emotion of the second user.

In some embodiments the first status data is based on a detected expression of the second user at the time the second user composed and/or sent the first message.

In some embodiments the second status data is based on a detected expression of the second user at the time the second user composed and/or sent the second message.

In some embodiments, the processing unit 804 is further configured to: receive (e.g., using receiving unit 806), from the first user and on the electronic device, third content for a third message; generate (e.g., using generating unit 810) third status data for the first user; associate (e.g., using associating unit 816) the third status data with the third message; send (e.g., using sending unit 818) the third message to the second user; and send (e.g., using sending unit 818) the third status data to the second user.

In some embodiments, the processing unit 804 is further configured to concurrently display (e.g., using display enabling unit 808) the third message including the third content and a third avatar, wherein the third avatar is based on the third status data, and the third message and third avatar are displayed concurrently with the second message and second avatar.

In some embodiments the first avatar and second avatar represent the physical appearance of the second user.

In some embodiments display of the first message and the first avatar includes displaying the first message as a text bubble coming from a mouth of the first avatar.

In some embodiments the second user is associated with a source electronic device that sends the first message and the second message.

It should be understood that the particular order in which the operations in FIGS. 7A 7B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1300, 1700, 1900, 2100, 2300, 2500, 2700) are also applicable in an analogous manner to method 700 described above with respect to FIGS. 7A-7B. For example, the messages and content described above with reference to method 700 can, in some cases, be operated on with the operations described (e.g., applying enhanced security, executing functions specified in voice commands, confirming actions) herein with reference to other methods described herein (e.g., methods 1700, 1900, 2100, 2300). For brevity, these details are not repeated here.

The operations in the information processing methods described above are, optionally, implemented by running one or more functional modules in an information processing apparatus such as general purpose processors (e.g., as described with respect to FIGS. 1A, 3, 5A) or application specific chips. Further, the operations described above with reference to FIGS. 7A-7B are, optionally, implemented by components depicted in FIGS. 1A-1B. For example, receiving first status data and second status are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 9A-9K illustrate exemplary user interfaces for capturing data for building 3D models, in accordance with some embodiments. The user interfaces in these figures are used to illustrate the processes described below, including the processes in FIGS. 10A-10B.

Figure 9A:
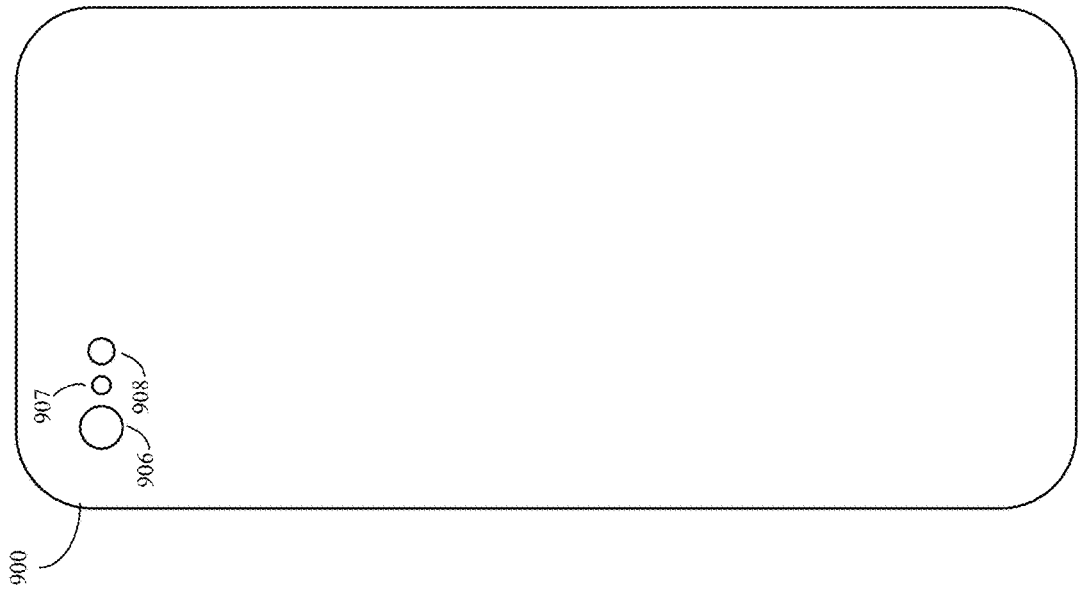
FIGS. 9A-9L illustrate exemplary user interfaces for capturing data for building 3D models.
Figure 10A:
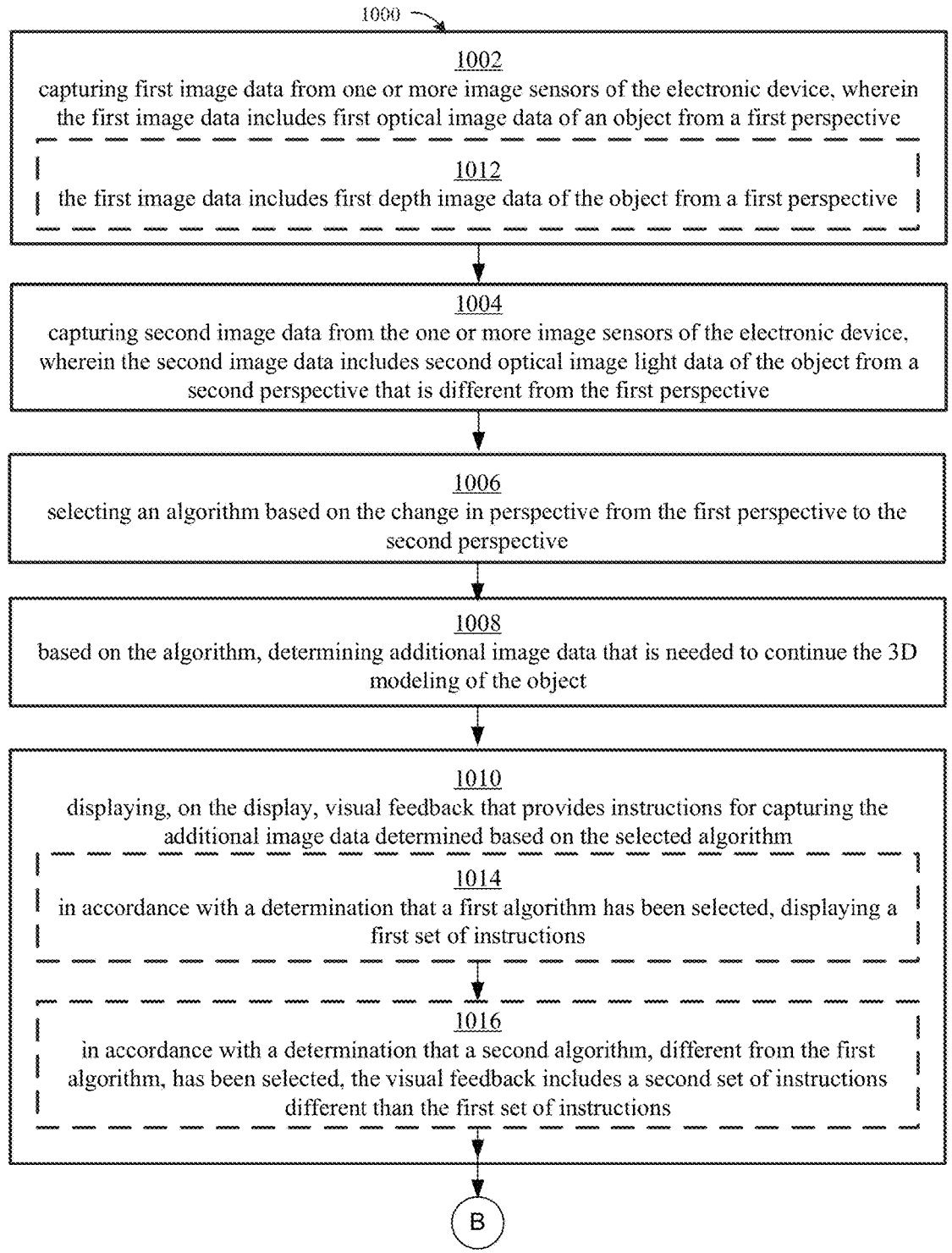
FIGS. 10A-10B is a flow diagram illustrating a method for capturing data for building 3D models.
Figure 10B:
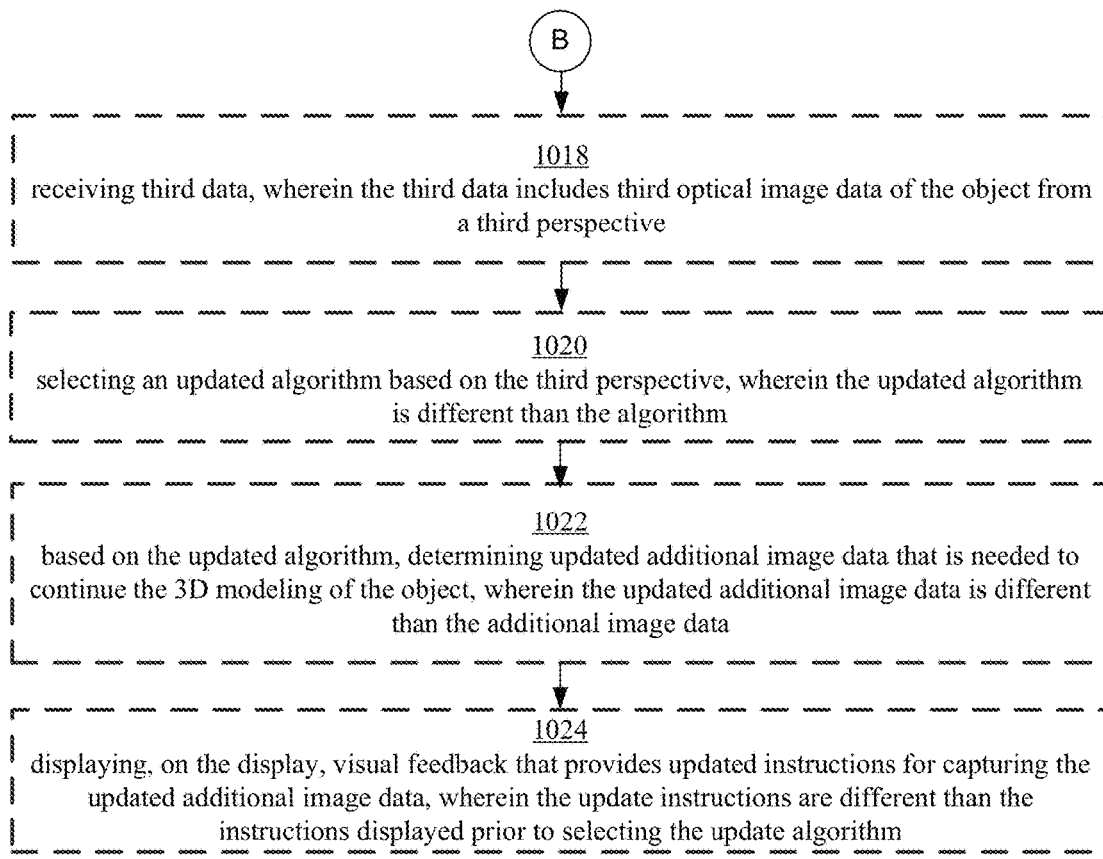

FIG. 9A depicts device 900, which in some examples is a specific form factor for device 100, device 300, or device 500 described above. Device 900 includes display 901, which in some examples is a touch-sensitive display, and image sensor 902. Additionally, in some embodiments of device 900, additional sensors (e.g., depth sensors, IR sensors, etc.) and/or other components (e.g., flash or IR emitter) are present along with image sensor 902.

In FIG. 9A, display 901 is displaying a scanning interface 903 of a scanning program, which includes instructions for how to proceed, and an image data area 904 that depicts the data that has been captured so far for the 3D model. Image data area 904 includes add data button 905.

Figure 9B:
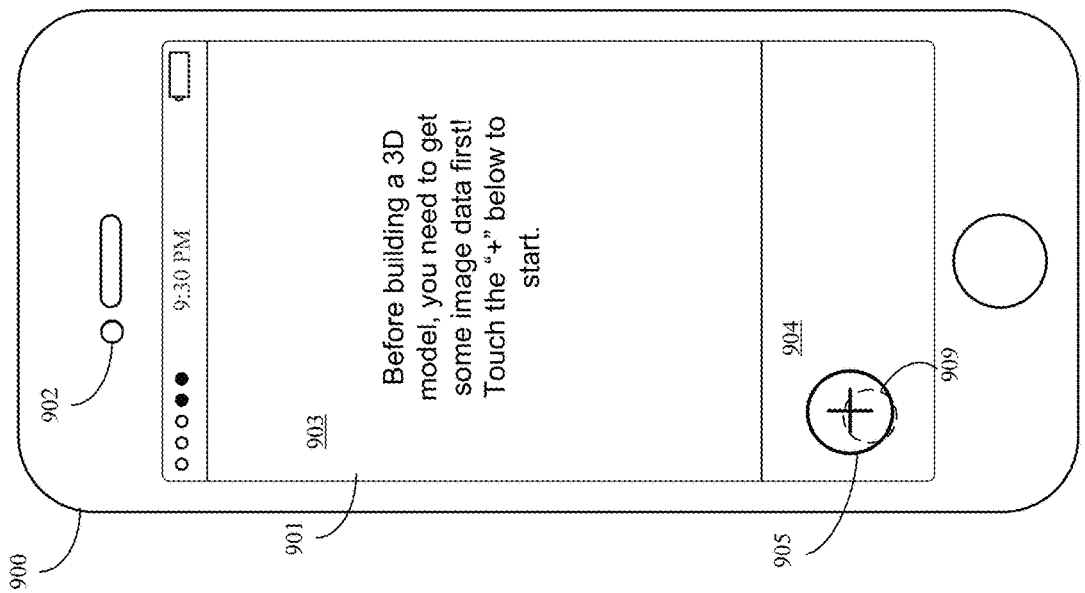

FIG. 9B depicts device 900 from the opposite side as depicted in FIG. 9A. On this side of device 900, image sensor 906, light sensor 907, and flash 908 are present. Image sensor 906, in some examples, is a high quality visible light sensor. Optionally, it also captures other types of light, such as IR. Image sensor 906, optionally, also is configured to capture depth information using time of flight or other techniques. Light sensor 907, in some examples, is used to determine lighting characteristics, which can be used to properly configure and operate image sensor 906. Flash 908 provides a visible light flash for image sensor 906. Flash 908, in some examples, is also configured based on data measured from light sensor 907. In addition to the components depicted in FIG. 9B, other components (e.g., an additional image sensor, an IR detector, an IR emitter, etc.) are also present in some embodiments.

Figure 9D:
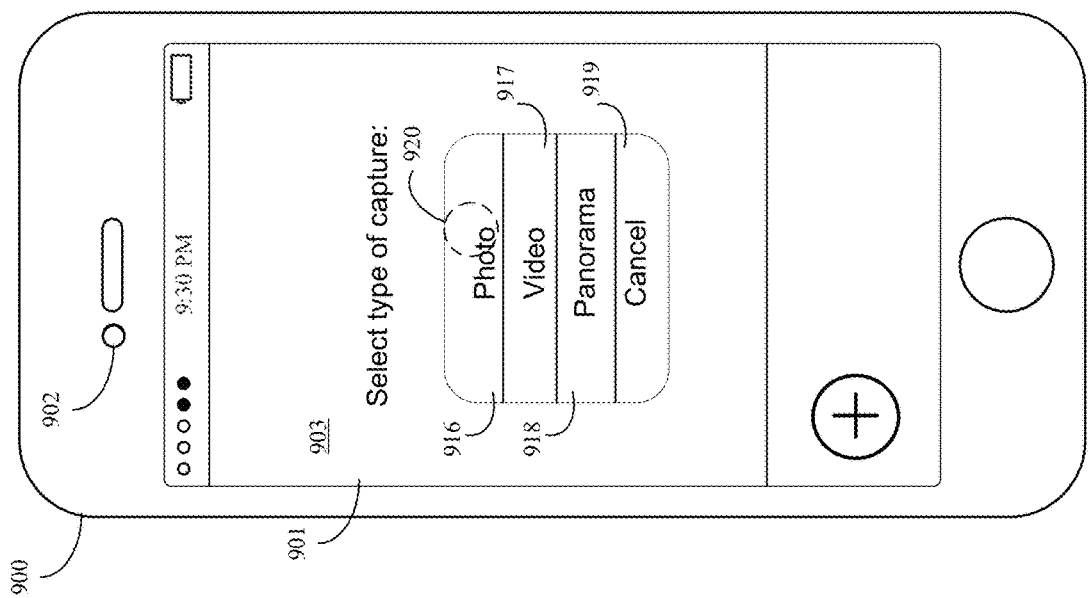
Figure 9C:
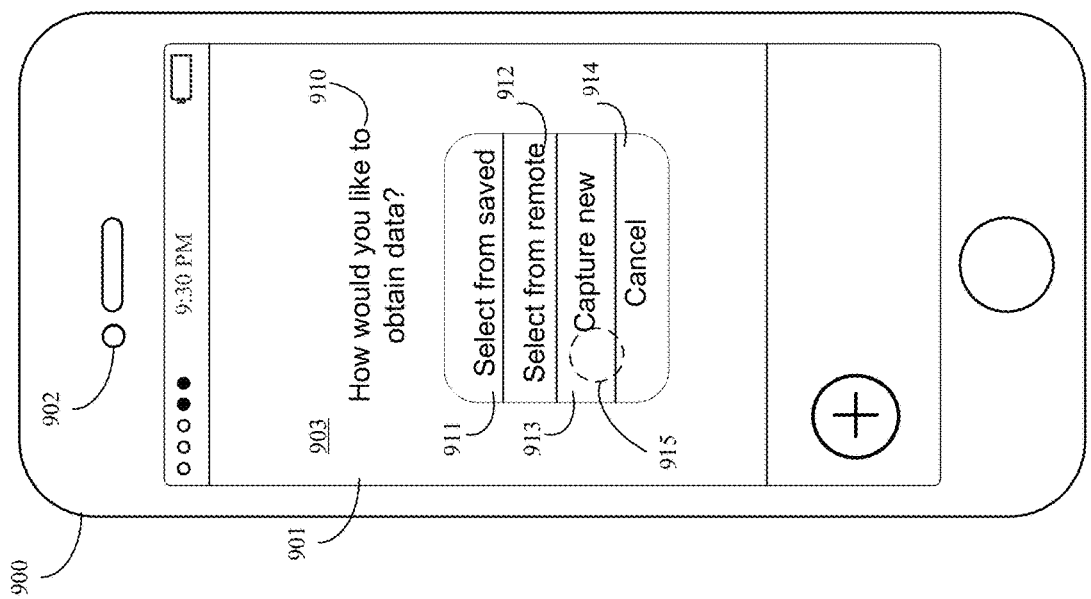

FIG. 9C depicts scanning interface 903 after add data button 905 (FIG. 9A) has been selected via, for example, touch 909 on display 901. In FIG. 9C, scanning interface 903 includes instructions 910 for selecting one of four affordances (affordances 911-914) for determining how data is to be added. Affordance 911 allows a user to select image data that is already stored on device 900. Affordance 912 allows a user to select image data that is already present on a remote device (e.g., doing an Internet search, accessing a particular remote server, or selecting from a particular remote device). Affordance 913 allows a user to capture new data using, for example, image sensor 902 or image sensor 906 (FIG. 9C). Affordance 914 returns the user to the state of the interface depicted in FIG. 9A.

FIG. 9D depicts scanning interface 903 after affordance 913 (FIG. 9C) has been selected, for example, via touch 915 on display 901. In FIG. 9D scanning interface 903 provides four affordances (916-919) for selecting the type of image data to capture. Affordance 916 selects a still image. Affordance 917 selects video image data. Affordance 918 selects panorama image data. Affordance 919 returns the scanning interface to the state depicted in FIG. 9C.

Figure 9E:

FIG. 9E depicts scanning interface 903 after affordance 916 (FIG. 9D) has been selected, for example, via touch 920 on display 901. In FIG. 9E, a capture interface is displayed on display 901 to capture a portion of scene 920 using image sensor 906 (FIG. 9B). View finder 921 represents the current field of view of image sensor 906 (FIG. 9B). Home button 922 of device 900, in this example, is used to capture the image data in view finder 921. For example, in response to a user depressing home button 922 (e.g., depression 923), the image data represented by the data displayed in view finder 921 is captured and saved to device 900. Similar interfaces are available for the other types of image capture described with respect to FIG. 9D. In addition to data representing the visible or other types of light captured by image sensor 906, the image data, optionally, also includes positional data, such as location data (e.g., GPS data) and orientation data (e.g., data collected from accelerometers, gyroscopes, and/or electronic compasses).

Figure 9F:
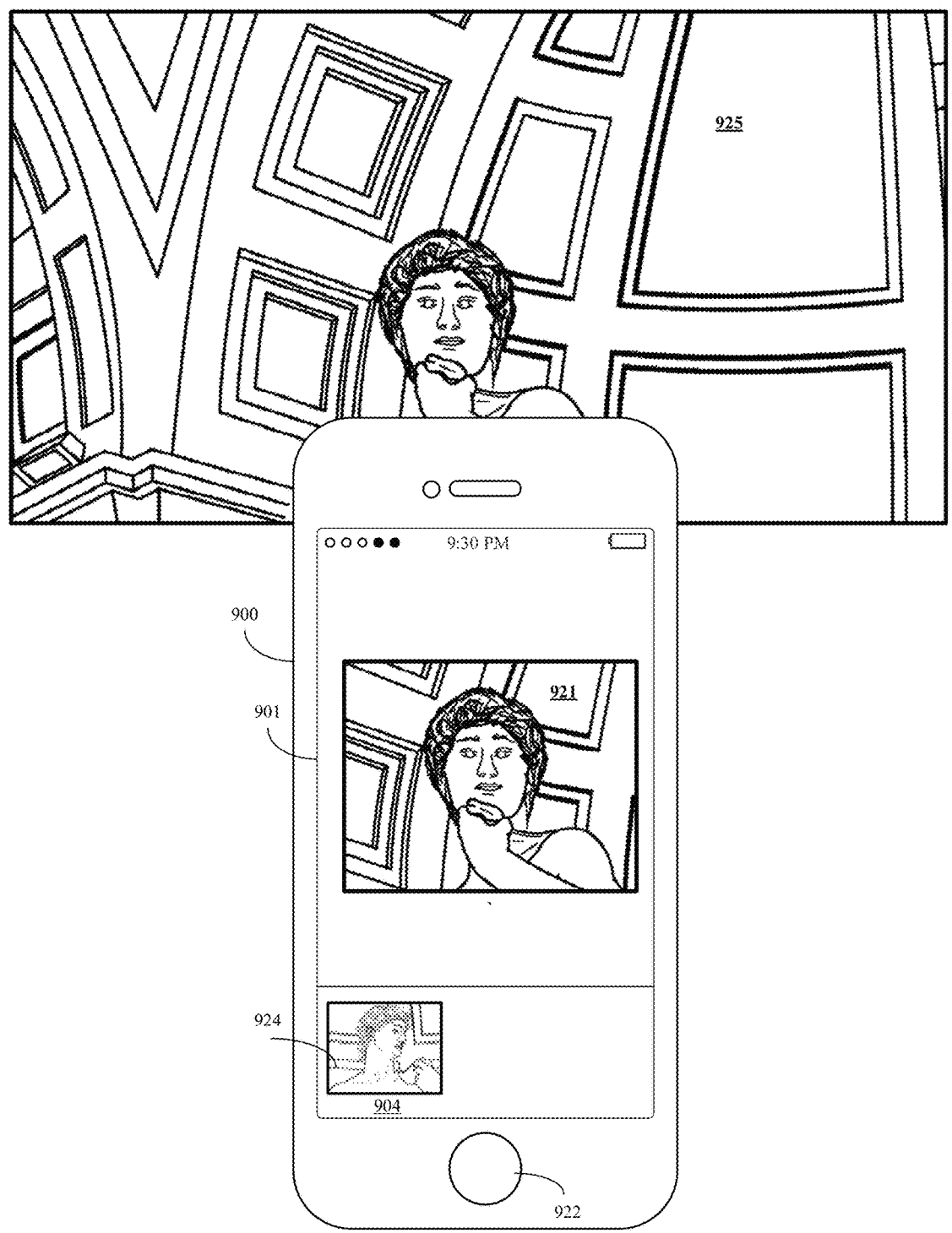

FIG. 9F depicts scanning interface 903 after the image data depicted in FIG. 9E was captured. Representation 924 of the image data captured as described with respect to FIG. 9E is now present in image data area 904. In FIG. 9F, scanning interface 903 has already been returned to the photo capture state via the process described with respect to FIGS. 9A and 9C-9D. Device 900 has moved with respect to the target as compared to FIG. 9E. Display 901 shows view finder 921 is pointed at a portion of scene 925, which is of the same target but a different angle as compared to scene 920 (FIG. 9E). Home button 922, in some examples, is used to capture image data represented in view finder 921.

Figure 9H:
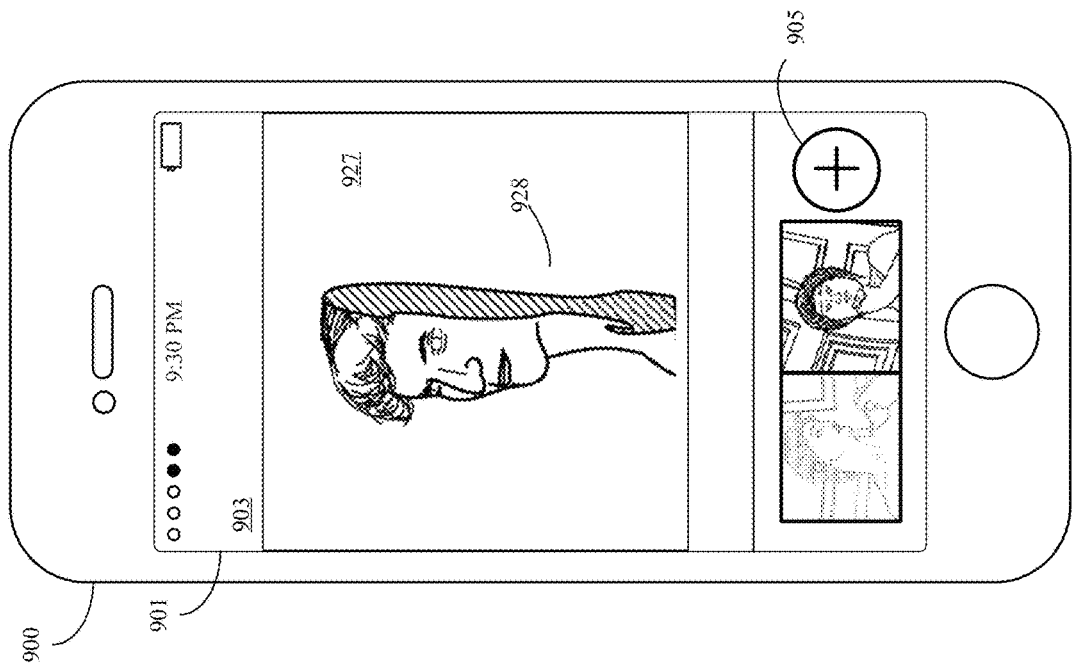
Figure 9G:
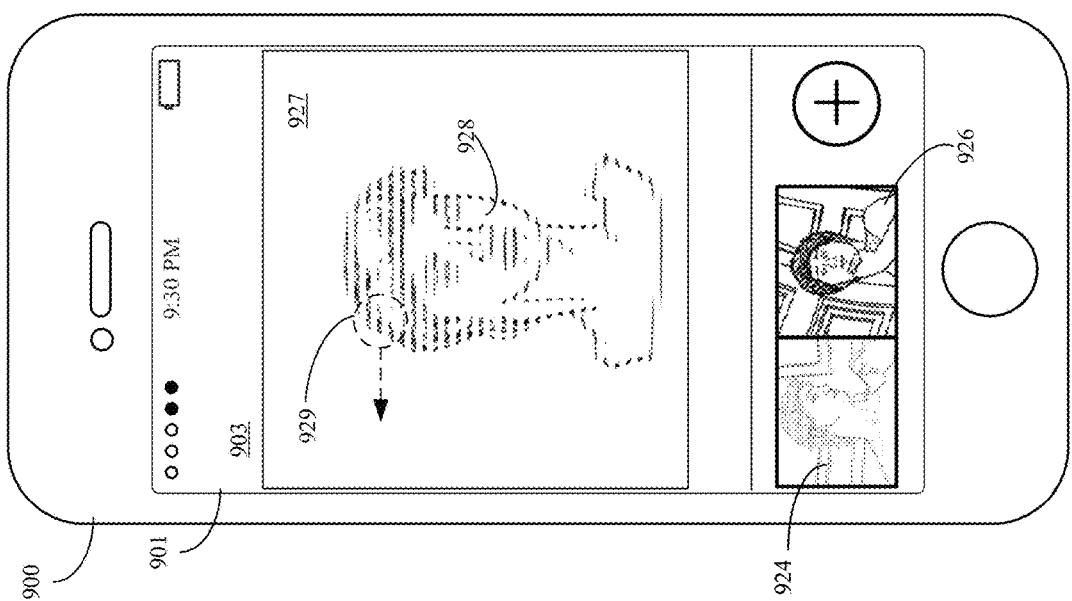

FIG. 9G depicts scanning interface 903 after image data represented by representation 926 has been captured. Based on the image data represented by representations 924 and 926, device 900 via the scanning program determines an appropriate algorithm to use to build a 3D model of the target in the image data. The scanning program takes various factors into account when determining an appropriate algorithm. In one example, the type of image data (e.g., still image versus video versus panorama) is a factor. In another example, the orientation and/or location that device 900 was in when the image data was captured is a factor. Other factors, such as whether the image data includes depth information and the amount of image data are also considered in various embodiments.

FIG. 9G also includes 3D model preview area 927 that includes model preview 928, which may be manipulated to be viewed from different angles and perspectives. For example, in response to touch and drag 929 on display 901, model preview 928 is rotated as depicted in FIG. 9H, which shows that model preview 928 is not complete due to incomplete image data capture. In some embodiments, to complete the model, the user selects add data button 905 to add additional image data.

Figure 9J:
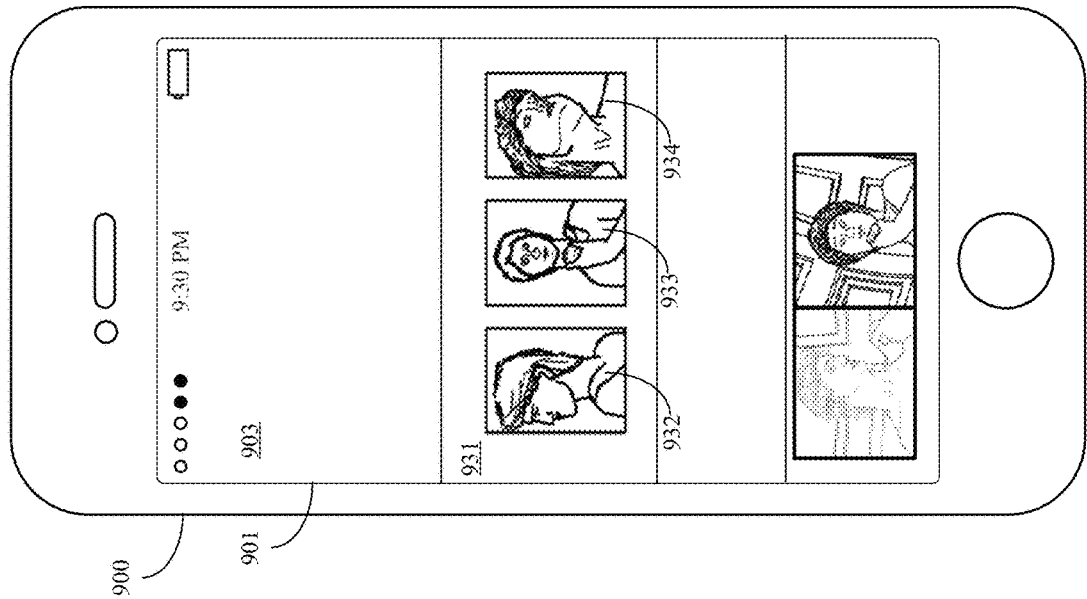
Figure 9I:
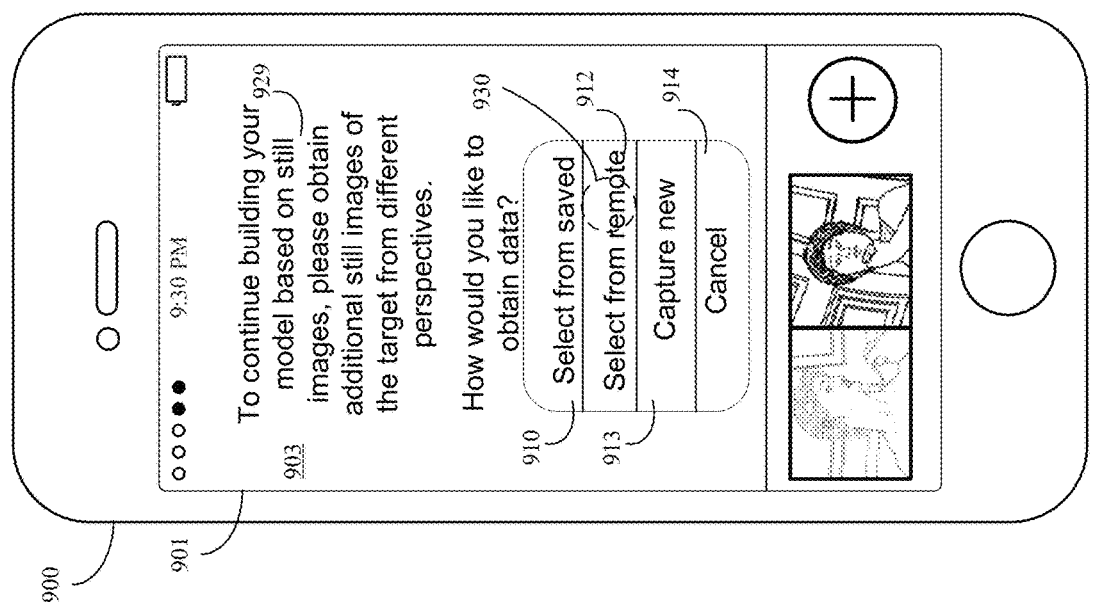

FIG. 9I depicts scanning interface 903 after selection of add data button 905 in FIG. 9H. In FIG. 9I, device 900 has determined that based on the still image data captured so far, a still image algorithm is best suited to build the model. Accordingly, scanning interface 903 is displaying instructions 929 to the user to obtain additional image data of the type that will be most useful in building the model. In other examples, scanning interface 903 provides instructions and/or suggestion to obtain video data or panorama data image data instead. Scanning interface 903, optionally, also provides instructions for how to position device 900 to obtain the most useful image data. The same capture options as described with respect to FIG. 9C are also displayed.

In response to selection of affordance 912 in FIG. 9I via touch 930 on display 901, scanning interface 903 displays remote selection interface 931, as depicted in FIG. 9J. Remote selection interface 931 includes representations 932-934 that depict image data that is available from a remote location. The representations 932-934 are determined to represent image data that is potentially relevant to the model that is currently being built. For example, device 900 optionally transmits its location to a remote server that uses the location to determine other image data captured in the same approximate location. As another example, device 900 optionally transmits some or all of the image data that has already been captured. A remote server then performs image recognition to determine other image data that is potentially relevant. As yet another example, a standard Internet search is performed using search criteria provided by the user. In some embodiments, remote selection interface 931 is implemented as a web browser interface displaying the results of an Internet search. In some examples of selection interface 931, a swipe gesture on the interface will allow a user to scroll through additional image data that is available. In response to selection of image data associated with representation 932 in FIG. 9J, device 900 retrieves the respective image data and adds it to the available image data for building the model, as indicated by representation 935 in FIG. 9K.

Figure 9L:
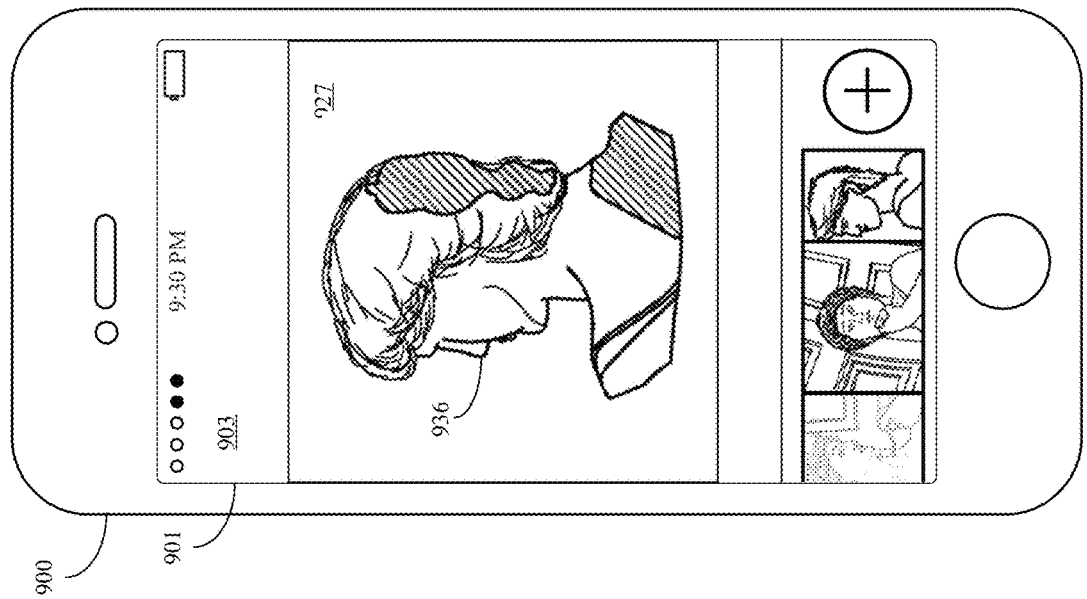
Figure 9K:
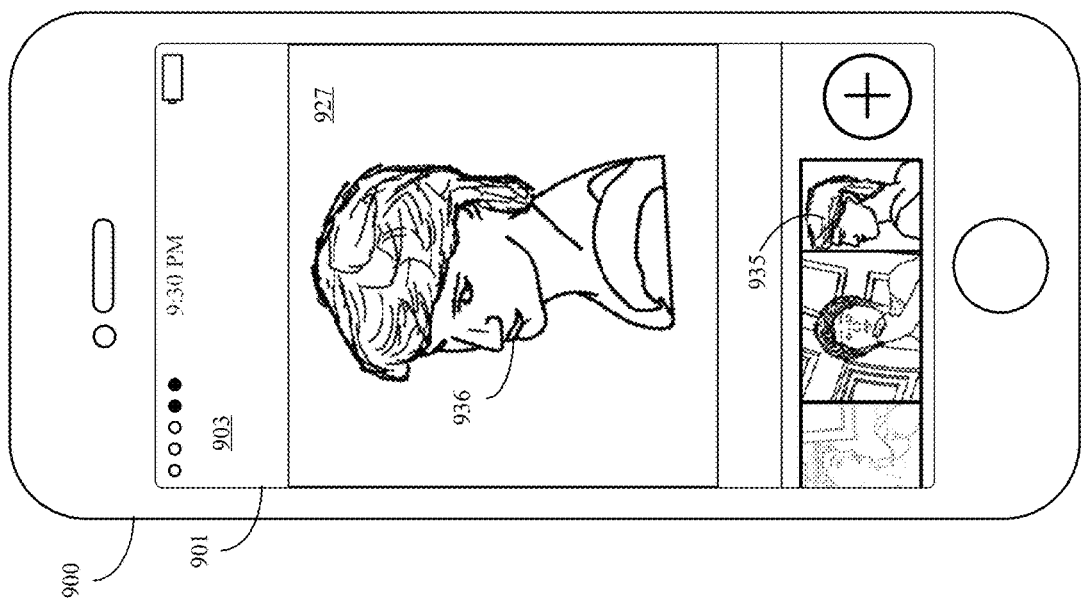

In FIG. 9K, 3D model preview area 927 has been updated with a new model, model preview 936 that is based on the available image data. FIG. 9L depicts model preview 936 after the user has rotated the model, for example, via a touch on display 901 as described above with respect to FIGS. 9G and 9H. In some cases, model preview 936 is built using a different algorithm than device 900, via the scanning program, selected earlier with respect to FIG. 9G.

FIGS. 10A-10B is a flow diagram illustrating a method for building a 3D model of an object using an electronic device in accordance with some embodiments. Method 1000 is performed at a device (e.g., 100, 300, 500) with a display and one or more image sensors. Some operations in method 1000 are, optionally, combined, the order of some operations are, optionally, changed, and some operations are, optionally, omitted.

As described below, method 1000 provides an intuitive way for building a 3D model of an object. The method reduces the cognitive burden on a user for building a 3D model of an object, thereby creating a more efficient human-machine interface. For battery-operated computing devices, enabling a user to build a 3D model of an object faster and more efficiently conserves power and increases the time between battery charges.

An electronic device (e.g., 900) with one or more image sensors (e.g., 902, 906), memory, and a display (e.g., 901) captures (1002) first image data (e.g., 921, 904) (e.g., still or video with optical data, depth data, etc. and, optionally, position data) from one or more image sensors (e.g., 902, 906) (e.g., depth sensor, light sensor, IR sensor) of the electronic device. The first image data includes first optical image data of an object (e.g., 920) from a first perspective (e.g., FIG. 9E).

The electronic device also captures (1004) second image data (e.g., 921, 926) from the one or more image sensors (e.g., 921, 904) (e.g., depth sensor, light sensor) of the electronic device, wherein the second image data includes second optical image light data of the object from a second perspective (e.g., FIG. 9F) that is different from the first perspective.

The electronic device selects (1006) an algorithm (e.g., algorithm that stitches different captures, algorithm that uses panning data) based on the change in perspective from the first perspective to the second perspective and based on the algorithm, determines additional image data (e.g., FIG. 9I) that is needed to continue the 3D modeling of the object.

Finally, the electronic device displays (1010), on the display, visual feedback (929) that provides instructions for capturing the additional image data determined based on the selected algorithm. By providing instructions to the user about additional data needed to model the object, the electronic device is enhanced to reduce the cognitive burden on the user to determine what further image data (e.g., types of image data and locations of image data) is needed. This increases the likelihood that a user will be successful in creating an accurate model.

In accordance with some embodiments, the electronic device receives (1018) third data (e.g., 935) (e.g., from the image sensors or a remote server). The third data includes third optical image data of the object from a third perspective. The electronic device selects (1020) an updated algorithm (e.g., algorithm that stitches different captures, algorithm that uses panning data) based on the third perspective. The updated algorithm is different than the algorithm. Based on the updated algorithm, the electronic device determines (1022) updated additional image data that is needed to continue the 3D modeling of the object, wherein the updated additional image data is different than the additional image data. The electronic device displays (1024), on the display, visual feedback that provides updated instructions for capturing the updated additional image data, wherein the update instructions are different than the instructions displayed prior to selecting the update algorithm. By selecting an updated algorithm based on the third data, the electronic device's ability to build a model is enhanced by adjusting how the model will be built based on the image data that is available. Thus, the electronic device's building of the model based on an algorithm based on the captured image data is more efficient, uses less power, and improves battery life.

In accordance with some embodiments, the electronic device builds a 3D model (e.g., 936) of the object based on the first image data (e.g., 924), the second image data (e.g., 926), and the third image (e.g., 935) data using the selected updated algorithm.

In accordance with some embodiments, the electronic device sends at least a portion of the first image data (e.g., 924) (e.g., position data) to a remote server and receives an indication from the remote server that the third data (e.g., 932) is available for the object (e.g., FIG. 9J). In some embodiments, the third data is from the data available from other users. By using data from other users, the electronic device can more efficiently build a model by not having to recapture data that is already available. Thus, the electronic device is more efficient, uses less power, and has longer battery life. Additionally, the electronic device reduces the burden on the user by eliminating the need for the user to capture additional data that is not already available or that could be difficult for the user to capture.

In accordance with some embodiments, displaying, on the display, visual feedback that provides updated instructions for capturing the updated additional image data includes: the electronic device, in accordance with a determination that a first algorithm has been selected, displays (1014) a first set of instructions (e.g., 929) and in accordance with a determination that a second algorithm, different from the first algorithm, has been selected, the visual feedback includes (1016) a second set of instructions different than the first set of instructions (e.g., prompting the user to slide the camera horizontally rather than rotating the camera around a fixed point or taking still images of an object).

In accordance with some embodiments the first image data includes (1012) first depth image data of the object from a first perspective.

In accordance with some embodiments, the electronic device obtains (e.g., from a sensor or the image data) first position data (e.g., GPS, tilt, orientation data) for the first perspective (e.g., perspective of FIG. 9E) (e.g., orientation or relative position).

In accordance with some embodiments selecting the algorithm is also based on the first position data.

In accordance with some embodiments, the electronic device captures second position data (e.g., GPS, tilt, orientation data) for the second perspective (e.g., perspective of FIG. 9F) (e.g., orientation or relative position), wherein the second image data includes second depth image data of the object from the second perspective and selecting the algorithm is also based on the second position data.

In accordance with some embodiments, the electronic device builds a 3D model (e.g., 936) of the object based on the first image data (e.g., 924), the second image data (e.g., 926), and the additional image data (e.g., 935) using the selected algorithm and stores, in the memory, the 3D model. In some embodiments, a graphical representation of the 3D model (e.g., 936) is displayed to the user (e.g., a partially generated 3D model is displayed to the user while the user is scanning the object to help the user complete scanning the object and/or a completed 3D model is displayed to the user after the user has finished scanning the object optionally in response to a detected request to display the model such as activation of a displayed affordance to display the 3D model).

In accordance with some embodiments selecting the algorithm includes selecting a scan-based algorithm based on the change from the first perspective to the second perspective indicating that the first image data and the second image data are from a scan of the object.

In accordance with some embodiments selecting the algorithm includes selecting a discrete-image-based algorithm based on the change from the first perspective to the second perspective indicating that the first perspective and the second perspective are for discrete images (e.g., the perspectives shown in FIGS. 9E and 9F).

In accordance with some embodiments the electronic device identifies a support (e.g., a hand or a table) in the first image data that is touching the object and builds a 3D model of the object based on the first image data and the second image data using the selected algorithm. The 3D model does not include the support touching the first object (e.g., the 3D model is generated at least in part by excluding detected points that are determined to be a part of the support rather than part of the first object). By not including the support touching the first object in the model of the object, the electronic device is enhanced to be capable of producing a model that is more useful to a user by not including extraneous detail that is not relevant to the user. Thus the user is not required to manually remove the support later, which makes the electronic device more efficient, use less power, and have longer battery life.

In accordance with some embodiments, the electronic device displays on a display of the electronic device a first window that includes a live image of the object (e.g., 921) and displays on the display a second window that includes an image of a model (e.g., 927) (e.g., either full or partial) of the object, wherein the model is based on the first image data and the second image data. In some embodiments, the image of the model of the object is updated as additional images are captured and the model of the object is improved. This feedback enables the user to more accurately scan the object by providing real-time feedback to the user as to the progress of the scan and the type of movement of the device that is likely, at least in some cases, to improve the quality of the scan, which results in a more accurate model.

Figure 11:
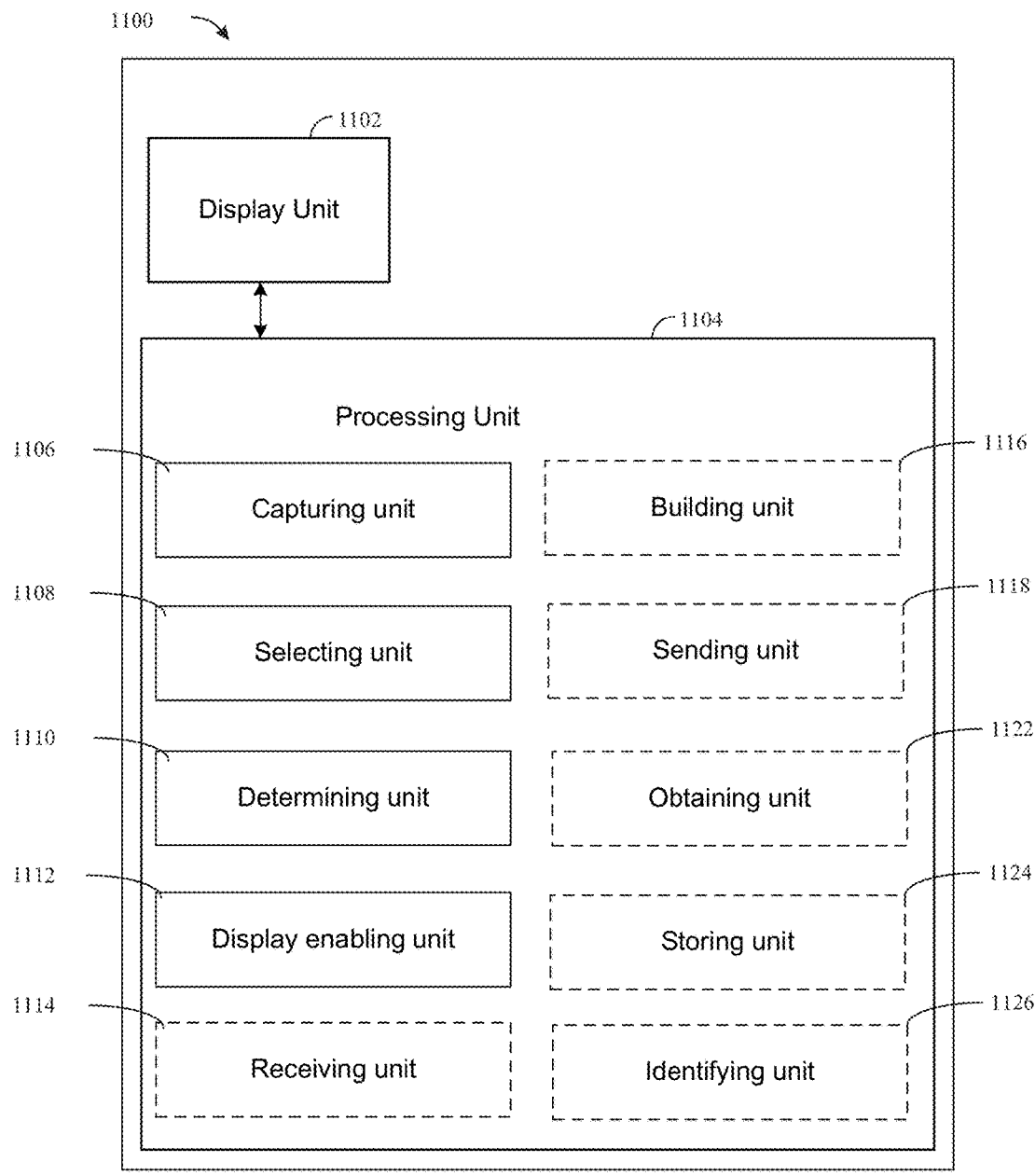
FIG. 11 shows an exemplary functional block diagram of an electronic device.

In accordance with some embodiments, FIG. 11 shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

As shown in FIG. 11, an electronic device 1100 includes a display unit 1102 and a processing unit 1104 coupled to the display unit 1102. In some embodiments, the processing unit 1104 includes a capturing unit 1106, selecting enabling unit 1108, determining unit 1110, display enabling unit 1112, receiving unit 1114, building unit 1116, sending unit 1118, obtaining unit 1022, storing unit 1124, and identifying unit 1126.

The processing unit 1104 is configured to: capture (e.g., using capturing unit 1006) first image data from one or more image sensors of the electronic device, wherein the first image data includes first optical image data of an object from a first perspective; capture (e.g., using capturing unit 1106) second image data from the one or more image sensors of the electronic device, wherein the second image data includes second optical image light data of the object from a second perspective that is different from the first perspective; select (e.g., using selecting unit 1108) an algorithm based on the change in perspective from the first perspective to the second perspective; based on the algorithm, determine (e.g., using determining unit 1110) additional image data that is needed to continue the 3D modeling of the object; and display (e.g., using display enabling unit 1112), on the display, visual feedback that provides instructions for capturing the additional image data determined based on the selected algorithm.

In some embodiments, the processing unit 1104 is further configured to: receive (e.g., using receiving unit 1114) third data, wherein the third data includes third optical image data of the object from a third perspective; select (e.g., using selecting unit 1108) an updated algorithm based on the third perspective, wherein the updated algorithm is different than the algorithm; based on the updated algorithm, determine (e.g., using determining unit 1110) updated additional image data that is needed to continue the 3D modeling of the object, wherein the updated additional image data is different than the additional image data; and display (e.g., using display enabling unit 1112), on the display, visual feedback that provides updated instructions for capturing the updated additional image data, wherein the update instructions are different than the instructions displayed prior to selecting the update algorithm.

In some embodiments, the processing unit 1104 is further configured to build (e.g., using building unit 1116) a 3D model of the object based on the first image data, the second image data, the third image data, and the updated additional image data using the selected updated algorithm.

In some embodiments, the processing unit 1104 is further configured to send (e.g., using sending unit 1118) at least a portion of the first image data to a remote server; and receive (e.g., using receiving unit 1114) an indication from the remote server that the third data is available for the object.

In some embodiments display, on the display, of visual feedback that provides updated instructions for capturing the updated additional image data includes: in accordance with a determination that a first algorithm has been selected, display of a first set of instructions; and in accordance with a determination that a second algorithm, different from the first algorithm, has been selected, the visual feedback includes a second set of instructions different than the first set of instructions.

In some embodiments the first image data includes first depth image data of the object from the first perspective.

In some embodiments, the processing unit 1104 is further configured to obtain (e.g., using obtaining unit 1122) first position data for the first perspective.

In some embodiments selecting the algorithm is also based on the first position data.

In some embodiments, the processing unit 1104 is further configured to capture (e.g., using capturing unit 1106) second position data for the second perspective, wherein the second image data includes second depth image data of the object from the second perspective and selecting the algorithm is also based on the second position data.

In some embodiments, the processing unit 1104 is further configured to build (e.g., using building unit 1116) a 3D model of the object based on the first image data, the second image data, and the additional image data using the selected algorithm; and store (e.g., using storing unit 1124), in the memory, the 3D model.

In some embodiments selecting the algorithm includes selecting a scan-based algorithm based on the change from the first perspective to the second perspective indicating that the first image data and the second image data are from a scan of the object.

In some embodiments selecting the algorithm includes selecting a discrete-image-based algorithm based on the change from the first perspective to the second perspective indicating that the first perspective and the second perspective are for discrete images.

In some embodiments, the processing unit 1104 is further configured to identify (e.g., using identifying unit 1126) a support in the first image data that is touching the object; and build (e.g., using building unit 1116) a 3D model of the object based on the first image data and the second image data using the selected algorithm, wherein the 3D model does not include the support touching the first object.

In some embodiments, the processing unit 1104 is further configured to display (e.g., using display enabling unit 1112) on a display of the electronic device a first window that includes a live image of the object; and display (e.g., using display enabling unit 1112) on the display a second window that includes an image of a model of the object, wherein the model is based on the first image data and the second image data.

It should be understood that the particular order in which the operations in FIGS. 10A 10B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1300, 1700, 1900, 2100, 2300, 2500, 2700) are also applicable in an analogous manner to method 1000 described above with respect to FIGS. 10A-10B. For example, capturing first image data and second image data described above with reference to method 1000 optionally has one or more of the characteristics of the captured image data described herein with reference to other methods described herein (e.g., methods 2500 and 2700). For brevity, these details are not repeated here.

The operations in the information processing methods described above are, optionally, implemented by running one or more functional modules in an information processing apparatus such as general purpose processors (e.g., as described with respect to FIGS. 1A, 3, 5A) or application specific chips. Further, the operations described above with reference to FIGS. 10A-10B are, optionally, implemented by components depicted in FIGS. 1A-1B. For example, inputs that cause the first and second image data to be captured are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 12A-12J illustrate exemplary user interfaces for restricting access to data and applications based on the user, in accordance with some embodiments. The user interfaces in these figures are used to illustrate the processes described below, including the processes in FIGS. 13A-13B.

FIG. 12A depicts device 1200 having display 1201, image sensor 1202, and home button 1204. In some embodiments, display 1201 is a touch-sensitive display. In some embodiments home button 1204 is a mechanical button separate from display 1201 and includes a fingerprint sensor for identifying a user that places a finger on home button 1204. In some embodiments, home button 1204 is integrated with display 1201 and still includes a fingerprint sensor. In FIG. 12A device 1200 is displaying, on display 1201, lock screen interface 1203. Lock screen interface 1203 is displayed when device 1200 is in a locked stated with restricted functionality. For example, access to most applications on device 1200 and other functionality is not permitted when in the locked state. In some examples, however, some applications (e.g., a camera application) or functionality (e.g., calling an emergency number) is available. These applications and functions that are permitted from the locked state, optionally, accessed via buttons (not shown) that appear in lock screen interface 1203 or other gestures (e.g., swipes) on lock screen interface 1203. In some cases, device 1200 is unlocked via the authentication of fingerprint data measured by the fingerprint sensor present in home button 1204. In other cases, device 1200 is unlocked via authentication of a pin code that is entered via a pin code interface (not shown). In some embodiments, image sensor 1202 is configured to capture image data of the user using device 1200. The image data is then processed in device 1200 and compared against image data or other data for authorized users. Device 1200 can also be unlocked if the image data allows for the user to be authenticated.

FIG. 12B depicts device 1200 displaying home screen interface 1205 after device 1200 has been unlocked, for example, using one of the techniques described with respect to FIG. 12A. Home screen interface 1205 includes a plurality of icons for applications installed on device 1200, including a photo application associated with icon 1206. In response to selection of icon 1206 via, for example, touch 1207 on display 1201 at the location of 1206, the photo application is launched or, if the photo application has already been launched, the photo application is displayed.

Figure 12C:
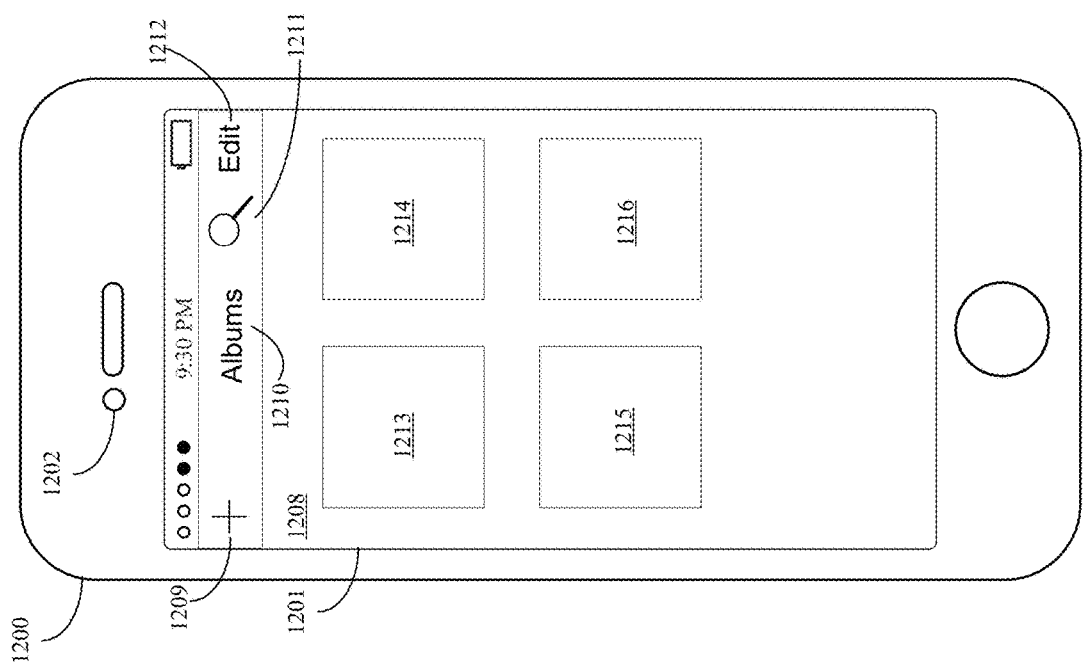
Figure 13A:
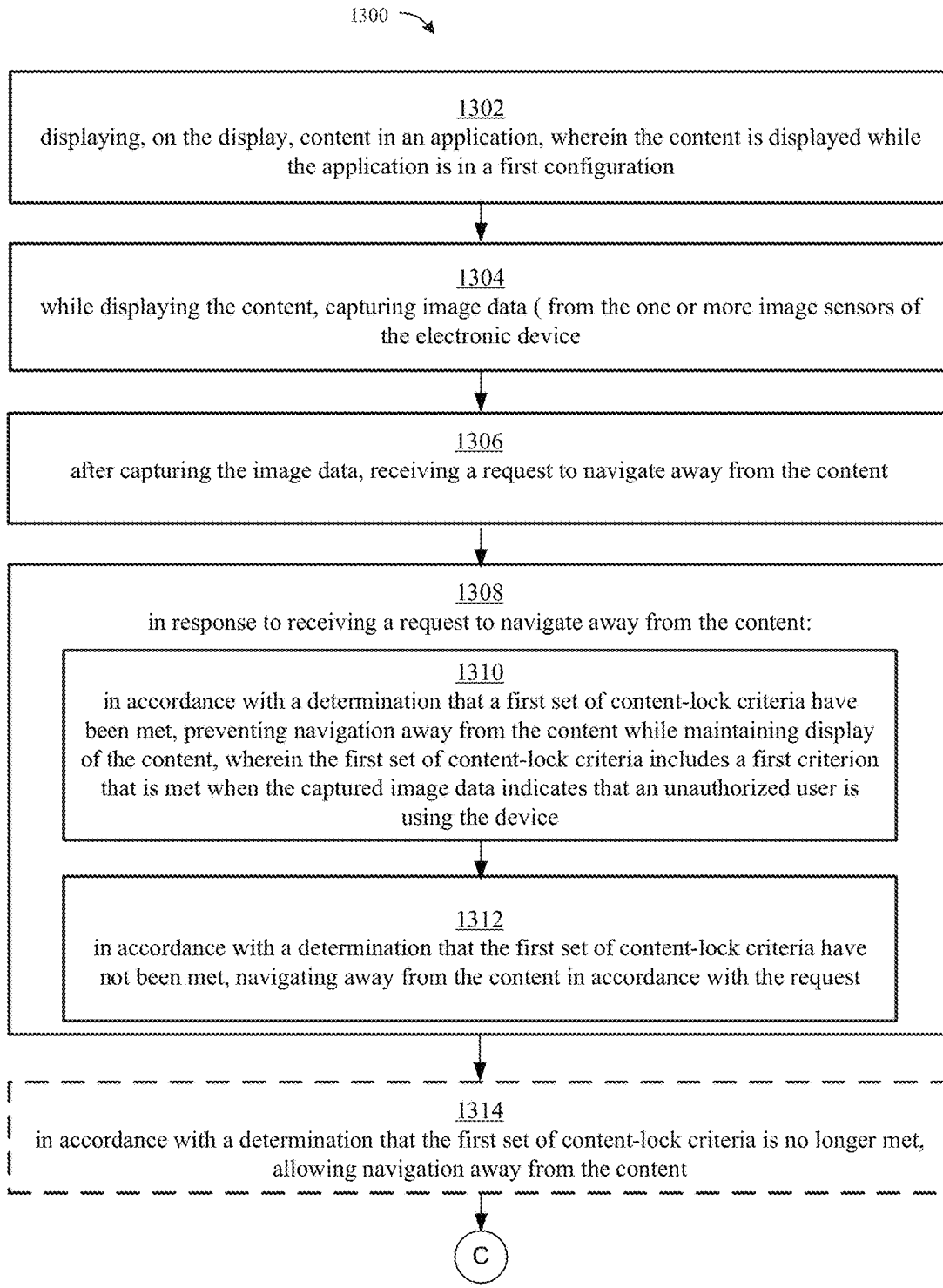
FIGS. 13A-13B is a flow diagram illustrating a method for restricting access to data and applications based on the user.
Figure 13B:
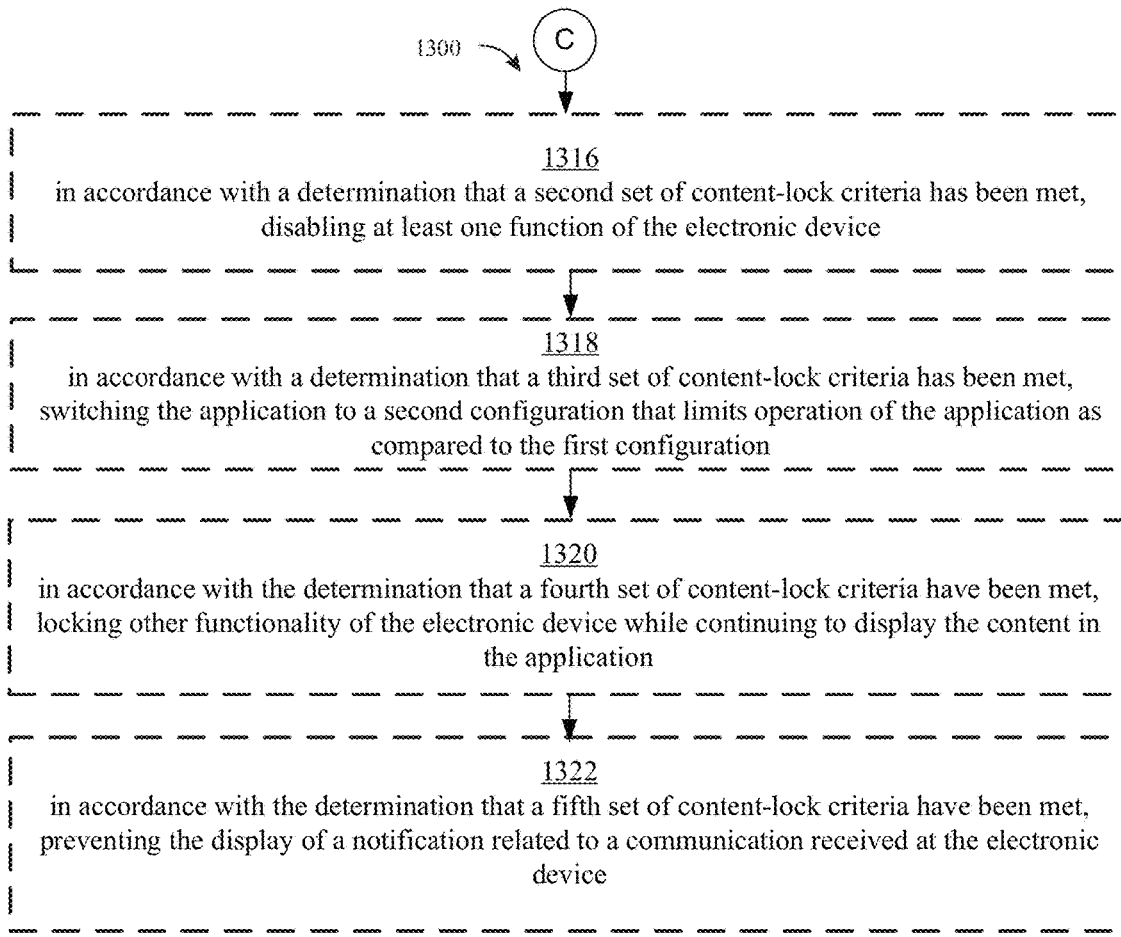

FIG. 12C depicts device 1200 displaying the photo application, and more specifically, photo album interface 1208, which includes add button 1209, title 1210, search button 1211, and edit button 1212. Selection of add button 1209 causes an add album interface to be displayed that enables creation of an additional photo album. Title 1210 identifies the interface as the album interface. Selection of search button 1210 causes a search interface to be displayed that enables searching of photos in the photo application. Selection of edit button 1212 enables an album edit interface that enables deleting of albums or other functions.

Photo album interface 1208 also includes thumbnails 1213-1216 that each represents a respective photo album in the photo application. In some examples, each thumbnail is a smaller version of a photo that is present in that album. Thumbnails 1213-1216 are also selectable, for example, via a touch on display 1201.

FIG. 12D depicts the photo application after selection of thumbnail 1213 (FIG. 12C). Photo selection interface 1217 is displayed, which includes back button 1218, title 1219, and select button 1220. Selection of back button 1218 returns the photo application to album interface 1208 (FIG. 12C). Title 1219 identifies the current album that is displayed in photo selection interface 1217. Selection of select button 1220 allows the user to select multiple of the photos in the current album and perform an operation (e.g., deleting) on the selected photos.

Photo album interface 1217 also includes thumbnails 1221-1232 that each represents a respective photo in the album. In some examples, each thumbnail is a smaller version of the photo that is present in that album. Thumbnails 1221-1232 are also selectable, for example, via a touch on display 1201.

Figure 12F:
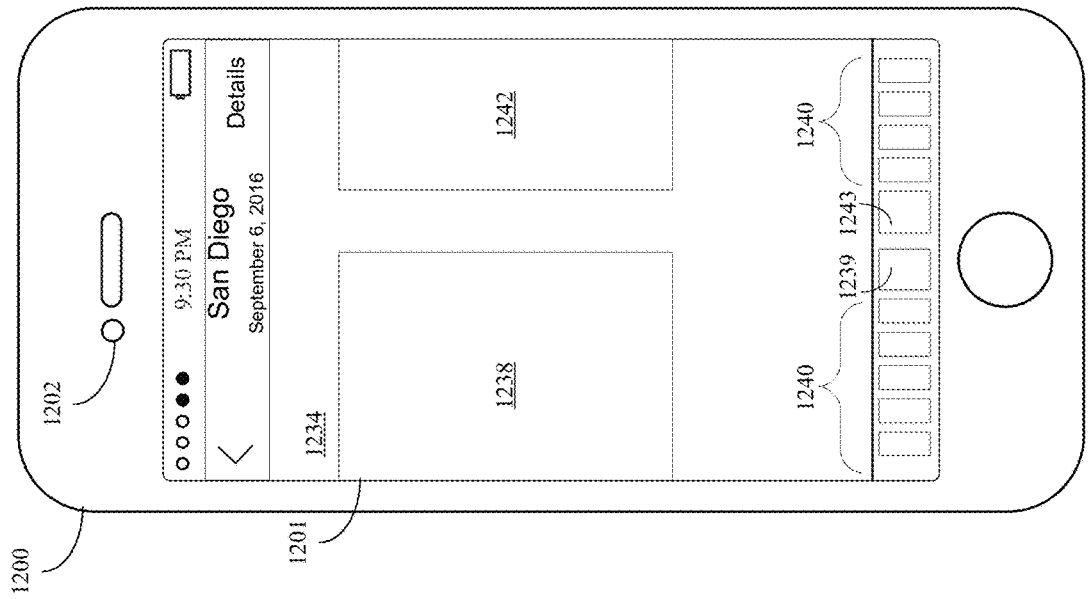
Figure 12E:
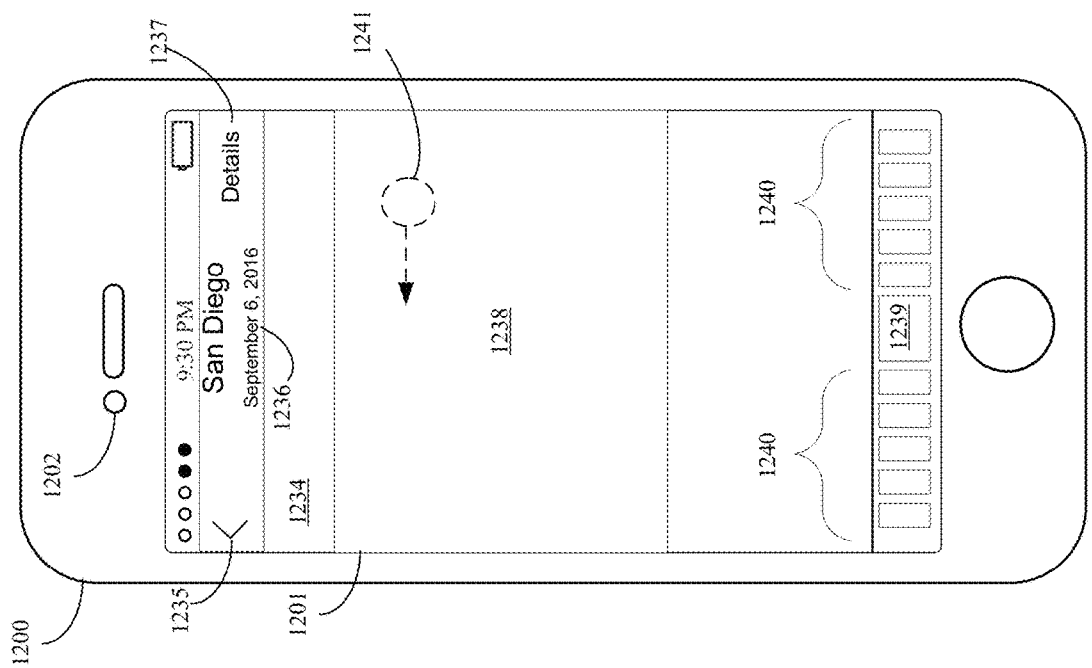

FIG. 12E depicts the photo application after selection of thumbnail 1227 (FIG. 12D). Photo interface 1234 is displayed, which includes back button 1235, photo information 1236, and details button 1237. Selection of back button 1235 returns the photo application to photo selection interface 1217 (FIG. 12D). Photo information 1235 provides information, such as location and time, related to the currently displayed photo (1238). Selection of details button 1237 displays a details interface that provides additional information about the currently displayed photo (1238), such as related photos or people identified in the photo Photo interface 1234 also includes display of the currently selected photo, photo 1238. The interface also includes a preview area that includes thumbnail 1239 of photo 1238 and other reduced sized thumbnails 1240 representing some of the other photos in the album. If there is not sufficient room for all photos in the album to have a displayed thumbnail in the preview area, in some embodiments, a user can scroll through the thumbnails, for example, via a swipe gesture on display 1201 over the preview area.

While displaying photo interface 1234, the user of device 1200 can request the interface to navigate away from photo 1238 to the next photo in the album (e.g., photo represented by thumbnail 1228 of FIG. 12D). The request to navigate away from the current photo, in some examples, is a gesture on display 1201 received on the currently selected photo (e.g., photo 1238 in the case of FIG. 12E). In one example, swipe gesture 1241 is received. In response to receiving swipe gesture 1241, device 1200 captures image data using image sensor 1202. In other examples, the image data is captured prior to receiving a request to navigate away from the current photo.

Once the image data is captured and the request to navigate away from the currently selected photo is received, device 1200 (e.g., via an authentication program) determines whether a set of content-lock criteria is met. In some examples, the set of content-lock criteria includes a criterion that is met if an unauthorized user is detected as using device 1200 based on analysis of the captured image. In other examples, other criteria are also used, such as detecting the absence of an authorized user (e.g., by analyzing the captured image data), the orientation or movement of the device (e.g., detection of a handoff of the device or that the device is lying flat), a time delay since an authorized user was last detected, and/or information associated with the content that is being displayed (e.g., sensitive or private content could have a stricter set of criteria).

In response to a determination that the set of content-lock criteria is not met (e.g., an unauthorized user is not detected as using the device based on the captured image data), navigation away from the currently selected content is permitted to proceed. This is depicted in FIGS. 12F and 12G.

Specifically, in FIG. 12F, in response to swipe gesture 1241 (FIG. 12E), photo interface 1234 transitions from photo 1238 to the next photo in the album, photo 1242. Additionally, thumbnail 1239 associated with photo 1238 shrinks as thumbnail 1243 associated with photo 1242 grows.

Figure 12H:
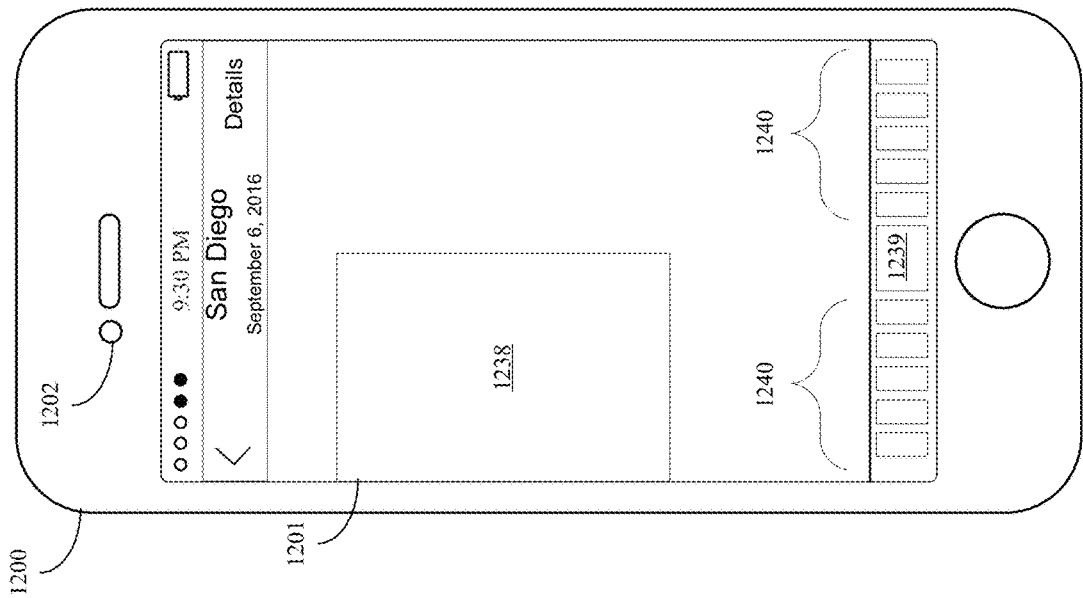
Figure 12G:
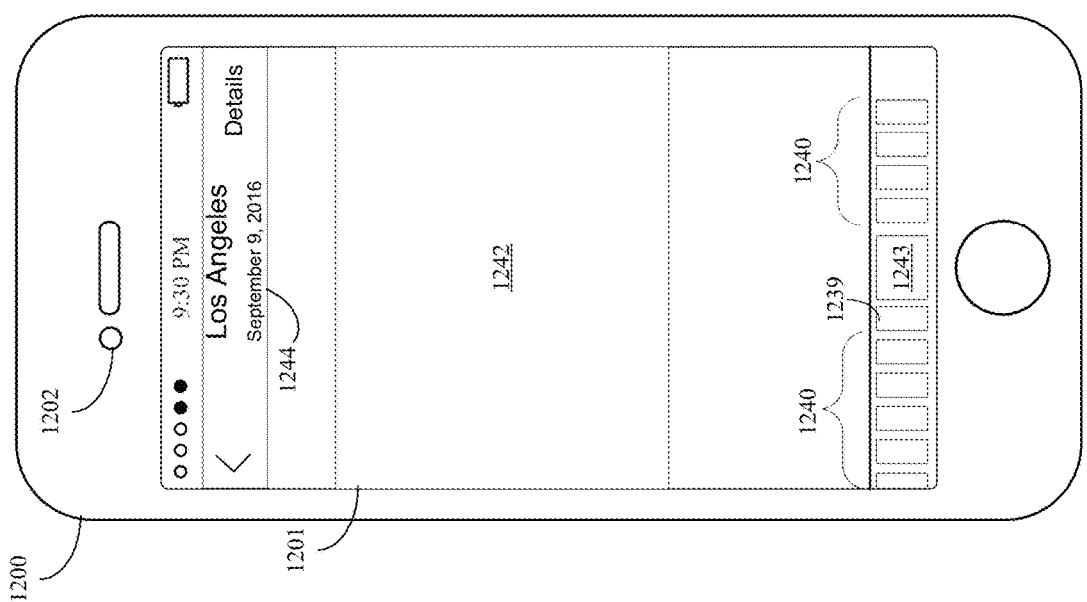

FIG. 12G depicts the completed navigation away from the previously selected content (photo 1238 in FIG. 12E) to the newly selected content (photo 1242). The photo information for photo interface 1234 has been updated with photo information 1244 associated with photo 1242.

On the other hand, in response to a determination that the set of content-lock criteria is met (e.g., an unauthorized user is detected as using the device based on the captured image data), navigation away from the currently selected content is denied. This is depicted in FIG. 12H.

In FIG. 12H, device 1200 has determined that the set of content-lock criteria has been met. In response to a request to navigate away from the currently selected content (photo 1238) via, for example, swipe gesture 1241 of FIG. 12E, device 1200 does not show the next photo in the album as was described with respect to FIGS. 12F and 12G. Additionally, the photo preview area with thumbnail 1239 is not updated in response to the request. In some embodiments the photo preview area is completely hidden. In response to the swipe gesture ceasing, photo 1238 returns to the center of display 1201, as depicted in FIG. 12E. The ability to navigate away from photo 1238 is permitted again once the set of content-lock criteria is no longer met.

In addition to preventing the navigation away from currently displayed or selected content, in some embodiments, other, potentially different sets of lock criteria are also used to restrict or change other functionality of device 1200. For example, a set of lock criteria is associated with a function of the device, such as the ability to exit an application, switch to another open application, or launch a new application. If this set of lock criteria is met, the associated function of the device is disabled. In another example, a set of lock criteria is associated with a configuration of an application on the device, such as read-only configuration. If this set of lock criteria is met, the configuration of the application is switched (e.g., the application's functionality is restricted or the application is switched from a read/write configuration to a read-only configuration). In yet another example, a set of lock criteria is associated with locking all other functionality of the device other than the current function (e.g., if the device is displaying a photo, that is the only function permitted on the device other than, perhaps, locking the device).

Figure 12J:
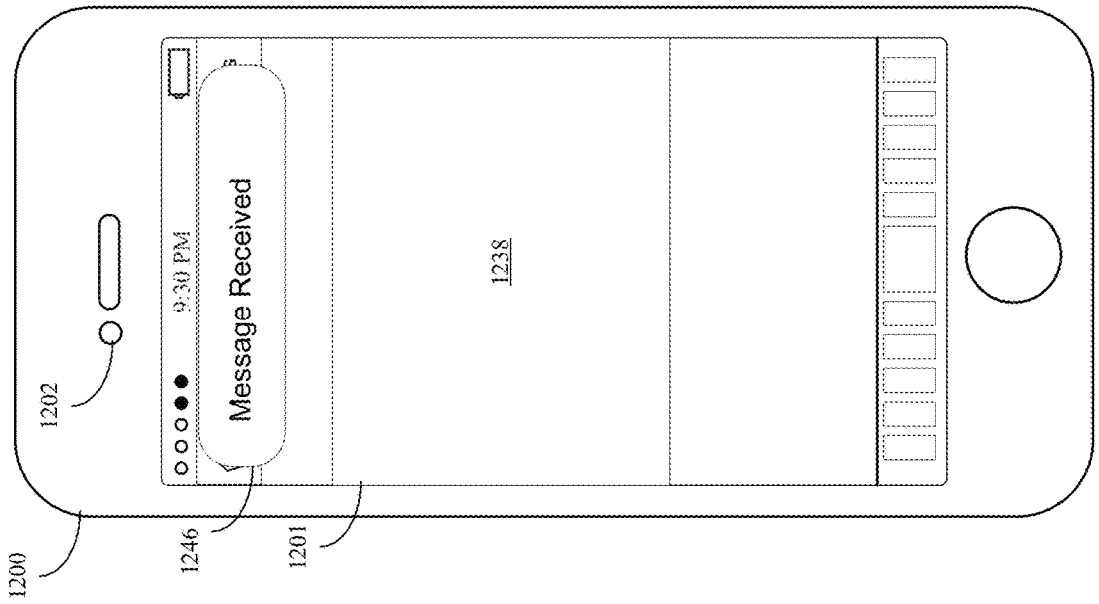
Figure 12I:
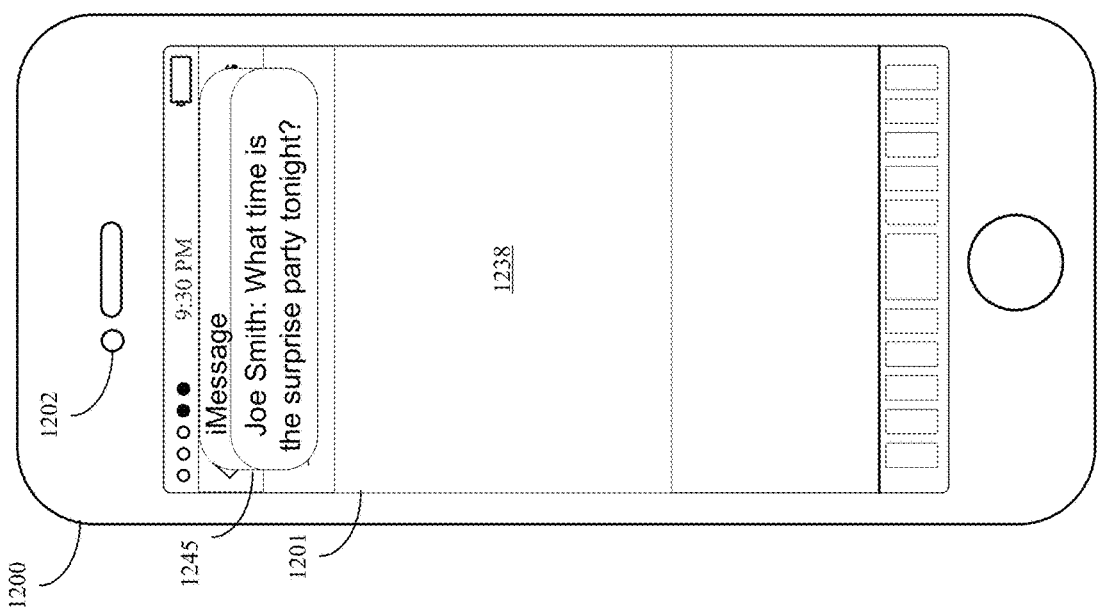

FIGS. 12I and 12J depict another example of an application of a set of lock criteria. In FIG. 12I, a communication has been received in the form of an iMessage message. Device 1200 has determined that a set of lock criteria is not met. Device 1200 thus displays notification 1245 to indicate that the communication was received and to preview the message content and sender. In contrasts, in FIG. 12J, device 1200 has determined that the same set of lock criteria is met. This set of lock criteria is associated with whether to display notifications about communications or, alternatively, what kind of notification to display. In FIG. 12J, notification 1246 only indicates that a message or communication has been received without showing content of the message or who sent the message. In some embodiments, the display of a notification is suppressed entirely in response to lock criteria being met.

Restricted functionality and features of device 1200 and its applications are optionally restored when an associated set of lock criteria is no longer met. In some embodiments, the restricted functionality and features are also restored when the device is unlocked, for example, using a pin code or fingerprint identification.

FIGS. 13A-13B are a flow diagram illustrating a method for restricting access to data and applications based on the user using an electronic device in accordance with some embodiments. Method 1300 is performed at a device (e.g., 100, 300, 500) with a display and an image sensor. Some operations in method 1300 are, optionally, combined, the order of some operations are, optionally, changed, and some operations are, optionally, omitted.

As described below, method 1300 provides an intuitive way for restricting access to data and applications based on the user using the device. The method reduces the cognitive burden on a user for restricting access to data and applications based on the user using the device, thereby creating a more efficient human-machine interface. For battery-operated computing devices, enabling a user to restrict access to data and applications based on the user using the device faster and more efficiently conserves power and increases the time between battery charges.

An electronic device (e.g., 1200) with a display (e.g., 1201) and one or more image sensors (e.g., 1202) displays, on the display, content (e.g., 1238) (e.g., a photo) in an application (e.g., Photos, photo sharing application, messaging application). The electronic device displays (1302) the content while the application is in a first configuration (e.g., a normal configuration). While displaying the content, the electronic device captures (1304) image data (e.g., image and/or depth information) from the one or more image sensors (e.g., 1202) of the electronic device. After capturing the image data, the electronic device receives (1306) a request e.g., (e.g., 1241) to navigate away from the content. In response to receiving a request to navigate away from the content (e.g., swiping to a different photo or going to a different webpage), the electronic device: in accordance with a determination that a first set of content-lock criteria have been met, prevents (1310) navigation away (e.g., FIG. 12F) (e.g., swiping to a different photo or going to a different webpage) from the content while maintaining display of the content (e.g., 1238), wherein the first set of content-lock criteria includes a first criterion that is met when the captured image data indicates that an unauthorized user is using the device; and in accordance with a determination that the first set of content-lock criteria have not been met, navigating (e.g., FIGS. 12F-12G) (1312) away from the content in accordance with the request. By preventing navigation away from content when certain criteria are met, the security of the electronic device is enhanced by preventing access to other content while still enabling view of content that an authorized user intends to allow access to (e.g., preventing access to other photos when an authorized user is not using the device).

In accordance with some embodiments, the electronic device navigating away from the content includes translating currently displayed content (e.g., scrolling a map or a list in response to a scroll input such as a drag gesture on a touch-sensitive surface). In accordance with some embodiments the electronic device navigating away from the content includes switching between content items (e.g., 1238 and 1242) in an application (e.g., FIG. 12F) (e.g., switching through pages in a book or pdf, pictures in a camera roll, webpages in a browser based on a next content item input such as a swipe gesture on a touch-sensitive surface).

In accordance with some embodiments, the electronic device, in accordance with a determination that the first set of content-lock criteria is no longer met, allows (1314) navigation away (e.g., FIGS. 12F-12G) (e.g., swiping to a different photo or going to a different webpage) from the content.

In accordance with some embodiments the first set of lock-criteria includes a second criterion that is met when the captured image data indicates that an authorized user of the electronic device is not using the device (e.g., a face of an authorized user is not detected in the field of view of the camera for more than a predetermined amount of time such as 1 second, 15 seconds, or 1 minute). In accordance with some embodiments the first set of lock-criteria includes a third criterion that is met when the captured image data indicates that the unauthorized user is present and an authorized user is not present (e.g., a face of a user that is not recognized as an authorized user is detected in the field of view of the camera without a face of an authorized user being detected in the field of view of the camera). In some embodiments, the first set of lock-criteria is met when any of the included criterions are met. In some embodiments, the first set of lock-criteria is only met when all the include criterions are met. By including multiple lock criterion in the first set of lock-criteria, the electronic device is enhanced by providing for flexible levels of security that allow for a balance between the user's ability to show content to others and preventing access to content the user does not wish others to view.

In accordance with some embodiments the first set of lock-criteria is met when the captured image data indicates that the unauthorized user is present without regard to whether or not an authorized user is present (e.g., the first set of lock-criteria is met if the first criterion is met). In accordance with some embodiments, the electronic device determines whether the captured image data indicates the presence of an unauthorized user of the electronic device.

In accordance with some embodiments, the electronic device, in accordance with a determination that a second set of content-lock criteria has been met, disabling (1316) at least one function of the electronic device (FIGS. 12I and 12J) (e.g., suppressing the display of notifications). In accordance with some embodiments, the electronic device, in accordance with the determination that a fourth set of (e.g., same or different as other sets) content-lock criteria have been met, locking (1320) other functionality (e.g., all other functionality except the sleep/wake button functionality) of the electronic device while continuing to display the content in the application. In accordance with some embodiments in accordance with the fourth criterion being met, preventing navigation between applications on the electronic device and in accordance with the fifth criterion being met, preventing navigation within the application (e.g., transition from the photo view in FIG. 12E back to the album view in FIG. 12D). For example, if the fourth criterion is met (and accordingly, the fifth set of lock-criteria) are met, a user press of the home button will not return the device to the home screen. Instead, either the application display remains or the device is locked and the lock interface (e.g., 1203) is displayed. For example, the fourth set of content-lock criteria is met when the image data indicate no authorized user is using the electronic device. In response to the fourth set of content-lock criteria being met, switching between applications and/or viewing notifications is disabled. By disabling or locking one or more functions of the electronic device, the security of the electronic device is enhanced by restricting access to certain functionality when the user is allowing others to view content on the electronic device. For example, if the user provides the electronic device to another person to view a displayed image and the electronic device receives a phone call, the electronic device can determine that the user (e.g., an authorized user) is not using the electronic device and prevent the phone call from being answered.

In accordance with some embodiments the first set of lock-criteria and the second set of lock-criteria are different (e.g., the first set of lock-criteria is met is the image data indicates an unauthorized user is using the electronic device regardless of whether an authorized user is present and the second set of lock-criteria is met if the image data indicates an authorized user is not using the electronic device, regardless of whether an unauthorized user is present).

In accordance with some embodiments, the electronic device, in accordance with a determination that a third set of content-lock criteria has been met, switching (1318) the application to a second configuration (e.g., FIG. 12G) that limits operation of the application as compared to the first configuration (e.g., FIG. 12F) (e.g., navigation is locked if an unauthorized user and authorized user present and the entire device is locked an unauthorized user is present without authorized user).

In accordance with some embodiments, the electronic device, in accordance with the determination that a fifth set (e.g., same or different as other sets) of content-lock criteria have been met, preventing (1322) the display of a notification related to a communication received at the electronic device (e.g., detecting a notification triggering condition, and in accordance with a determination that the content-lock criteria have been met, suppressing presentation of the notification/in accordance with a determination that the content-lock criteria have not been met, presenting the notification (e.g., via audible, tactile, or visual output)).

In accordance with some embodiments the fifth set of lock-criteria includes a fourth criterion that is met when the captured image data indicates that an unauthorized user is using the electronic device and the fifth set of lock-criteria is met if the fourth criterion is met and the first set of lock-criteria includes a fifth criteria that is met when the captured image data indicates the absence of an authorized user. For example, the fourth criterion of the fifth set of lock-criteria is met when image data captured from the electronic device indicates that a user other than an authorized user is present in the captured image data (e.g., the image data indicates that an unauthorized user (with or without an authorized user) is within the field of view of a camera on the front of the electronic device). Additionally, the fifth set of lock-criteria is met as long as the fourth criterion is met regardless of whether other criterions in the fifth set of lock criteria are met (e.g., as long as an unauthorized user is present in the captured image data, no other criterion need to be met in order for the fifth set of lock-criteria to be met).

In accordance with some embodiments the image data includes optical data and depth data, and wherein determining whether the first set of content-lock criteria have been met is based on the optical data and the depth data. In some embodiments, the optical data is provided by a first camera with a first resolution and the depth data is provided by a second camera with a second resolution that is lower than the first resolution. In some embodiments, the depth data is generated by a combination of images from two cameras that are located a known distance apart. In some embodiments the depth data and the optical data are generated by the same camera.

In accordance with some embodiments the electronic device navigating away from the content includes switching applications or closing the application (e.g., the photo application of FIGS. 12C-12J) to display the home screen (e.g., 1205) (e.g., switching through applications in a multitasking mode triggered by repeated activation of a button such as a home button or exiting to an application launch user interface triggered by activation of a button such as a home button).

In accordance with some embodiments, the electronic device receives unlock information (e.g., a pin code, a password, or biometric information, such as fingerprint information or iris information) associated with an authorized user of the electronic device; determines whether the unlock information is authentic; and in accordance with a determination that the unlock information is authentic, enables navigation away (e.g., FIG. 12F) (e.g., swiping to a different photo or going to a different webpage) from the content (e.g., 1238) (e.g., returning the electronic device to normal operation).

It should be understood that the particular order in which the operations in FIGS. 13A-13B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1000, 1700, 1900, 2100, 2300, 2500, 2700) are also applicable in an analogous manner to method 1300 described above with respect to FIGS. 13A-13B. For example, the content-lock criteria and the determination of whether criteria are met based on captured image data described above with reference to method 1300 optionally has one or more of the characteristics of the authorization criteria and alert criteria and associated determinations described herein with reference to other methods described herein (e.g., methods 1700, 1900, 2100). For brevity, these details are not repeated here.

The operations in the information processing methods described above are, optionally, implemented by running one or more functional modules in an information processing apparatus such as general purpose processors (e.g., as described with respect to FIGS. 1A, 3, 5A) or application specific chips. Further, the operations described above with reference to FIGS. 13A-13B are, optionally, implemented by components depicted in FIGS. 1A-1B. For example, receiving the request to navigate away from content is, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 14:
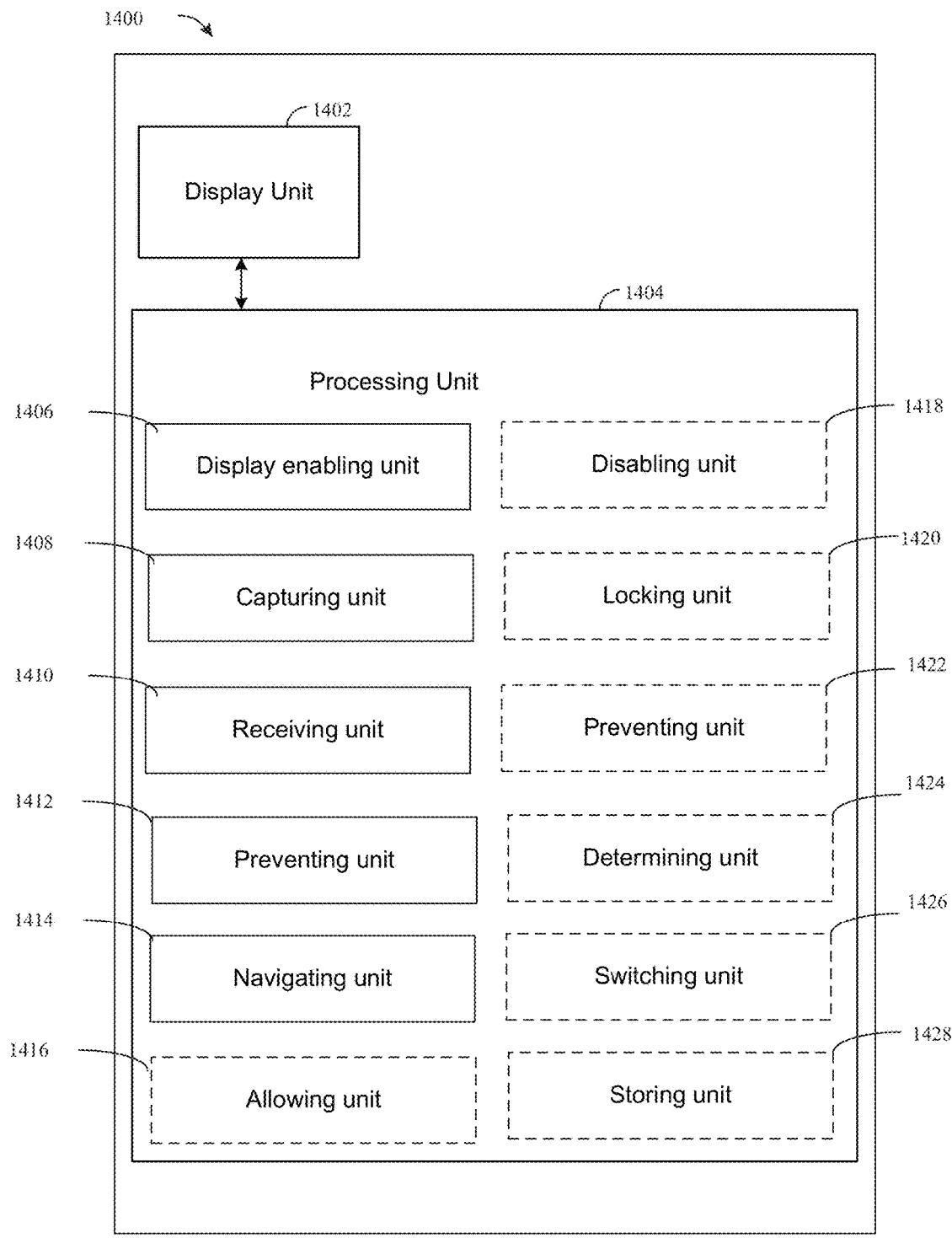
FIG. 14 shows an exemplary functional block diagram of an electronic device.

In accordance with some embodiments, FIG. 14 shows an exemplary functional block diagram of an electronic device 1400 configured in accordance with the principles of the various described embodiments. In accordance with some embodiments, the functional blocks of electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes a display unit 1402 and a processing unit 1404 coupled to the display unit 1402. In some embodiments, the processing unit 1404 includes a display enabling unit 1406, capturing unit 1408, receiving unit 1410, preventing unit 1412, navigating unit 1414, allowing unit 1416, disabling unit 1418, locking unit 1420, preventing unit 1422, determining unit 1424, switching unit 1126, and enabling unit 1128.

The processing unit configured to 1404 is configured to display (e.g., using display enabling unit 1406), on the display, content in an application, wherein the content is displayed while the application is in a first configuration; while displaying the content, capture (e.g., using capturing unit 1408) image data (from the one or more image sensors of the electronic device; after capturing the image data, receive (e.g., using receiving unit 1410) a request to navigate away from the content; and in response to receiving a request to navigate away from the content: in accordance with a determination that a first set of content-lock criteria have been met, prevent (e.g., using preventing unit 1412) navigation away from the content while maintaining display of the content, wherein the first set of content-lock criteria includes a first criterion that is met when the captured image data indicates that an unauthorized user is using the device; and in accordance with a determination that the first set of content-lock criteria have not been met, navigate (e.g., using navigating unit 1414) away from the content in accordance with the request.

In some embodiments, the processing unit 1404 is further configured to, in accordance with a determination that the first set of content-lock criteria is no longer met, allow (e.g., using allowing unit 1416) navigation away from the content.

In some embodiments the first set of lock-criteria includes a second criterion that is met when the captured image data indicates that an authorized user of the electronic device is not using the device.

In some embodiments the first set of lock-criteria includes a third criterion that is met when the captured image data indicates that the unauthorized user is present and an authorized user is not present.

In some embodiments the first set of lock-criteria is met when the captured image data indicates that the unauthorized user is present without regard to whether or not an authorized user is present.

In some embodiments, the processing unit 1404 is further configured to in accordance with a determination that a second set of content-lock criteria has been met, disable (e.g., using disabling unit 1418) at least one function of the electronic device.

In some embodiments the first set of lock-criteria and the second set of lock-criteria are different.

In some embodiments, the processing unit 1404 is further configured to in accordance with a determination that a third set of content-lock criteria has been met, switch (e.g., using switching unit 1126) the application to a second configuration that limits operation of the application as compared to the first configuration.

In some embodiments, the processing unit 1404 is further configured to in accordance with the determination that a fourth set of content-lock criteria have been met, lock (e.g., using locking unit 1420) other functionality of the electronic device while continuing to display the content in the application.

In some embodiments, the processing unit 1404 is further configured to in accordance with the determination that a fifth set of content-lock criteria have been met, prevent (e.g., using preventing unit 1412) the display of a notification related to a communication received at the electronic device.

In some embodiments the fifth set of lock-criteria includes a fourth criterion that is met when the captured image data indicates that an unauthorized user is using the electronic device and the fifth set of lock-criteria is met if the fourth criterion is met; and the first set of lock-criteria includes a fifth criteria that is met when the captured image data indicates the absence of an authorized user.

In some embodiments, the processing unit 1404 is further configured to in accordance with the fourth criterion being met, prevent (e.g., using preventing unit 1412) navigation between applications on the electronic device; and in accordance with the fifth criterion being met, prevent (e.g., using preventing unit 1412) navigation within the application.

In some embodiments, the processing unit 1404 is further configured to determine (e.g., using determining unit 1124) whether the captured image data indicates the presence of an unauthorized user of the electronic device.

In some embodiments the image data includes optical data and depth data, and wherein determining whether the first set of content-lock criteria have been met is based on the optical data and the depth data.

In some embodiments navigating away from the content includes translating currently displayed content.

In some embodiments navigating away from the content includes switching between content items in an application.

In some embodiments navigating away from the content includes switching applications or closing the application to display the home screen.

In some embodiments, the processing unit 1404 is further configured to receive (e.g., using receiving unit 1410) unlock information associated with an authorized user of the electronic device; determine (e.g., using determining unit 1124) whether the unlock information is authentic; and in accordance with a determination that the unlock information is authentic, enable (e.g., using enabling unit 1128) navigation away from the content.

Methods 1700 (described below with respect to FIGS. 16A-16G and 17A-17B), 1900 (described below with respect to FIGS. 18A-18L and 19A-19B), 2100 (described below with respect to FIGS. 20A-20F and 21A-21B), and 2300 (described below with respect to FIGS. 22A 22E and 23A-23B) use captured image data to determine how an electronic device should interpret various input and other information. The image data can be captured at any time, including in response to receiving input, at a predetermined time interval, in response to receiving other information (e.g., messages or alerts), or under other circumstances. In some embodiments, the electronic device analyzes captured image data that represents a scene that is present in a field of view of a camera of the electronic device when a corresponding user input is received at the electronic device. The analysis identifies characteristics about the captured image data and/or particular objects (e.g., people, objects on walls, buildings, etc.) that are represented within the captured image data. FIGS. 15A-15F depicts examples of characteristics of people and other objects that can be identified in captured image data. In some embodiments, the electronic device uses one or more of these characteristics or other identified characteristic in determining how to process inputs and other information, such as user inputs, alerts, messages, and notifications.

Figure 15A:
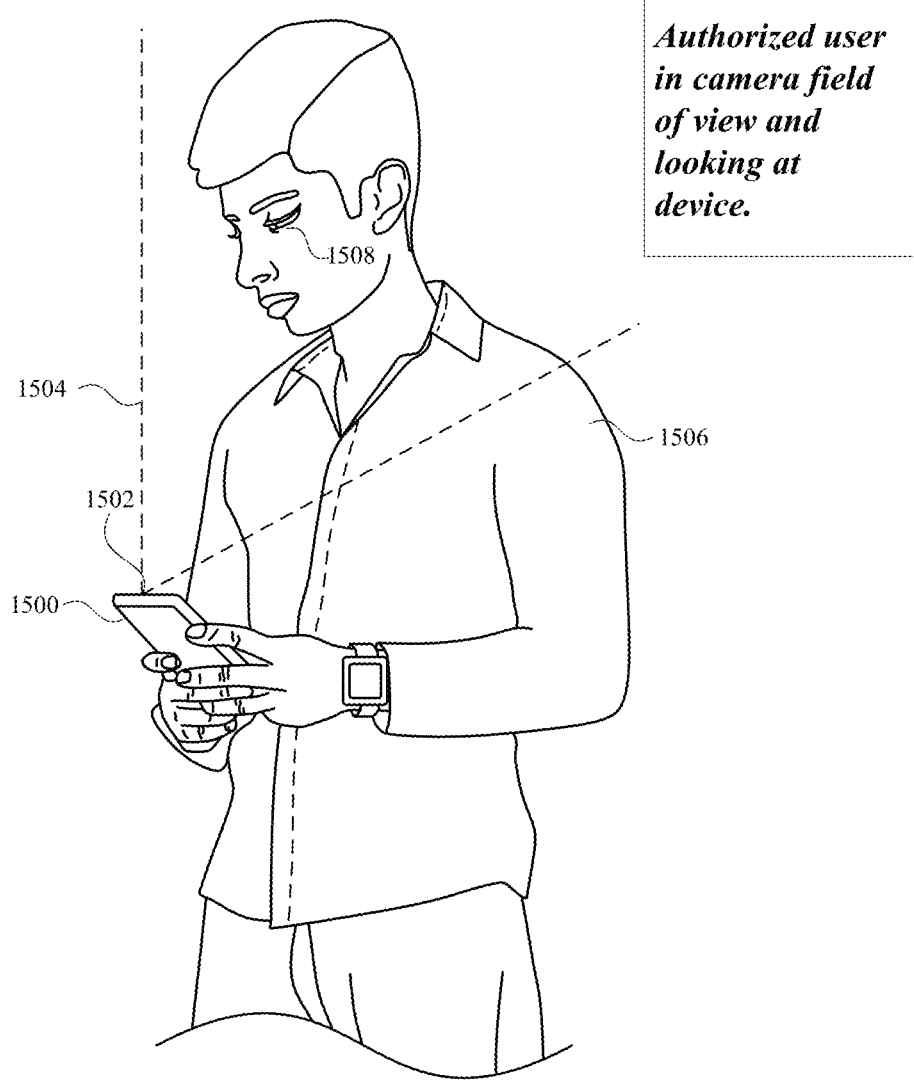
FIG. 15A-15F illustrates exemplary scenes that an electronic device can capture using a camera.

In FIG. 15A, electronic device 1500, which in some embodiments is device 100, 300, or 500 described above, includes camera 1502 having field of view 1504 (indicated by dashed lines) facing the front of electronic device 1500 (e.g., camera 1502 is a front-facing camera). In some embodiments, electronic device 1500 also includes a second camera that is back-facing but is otherwise the same as camera 1502. Camera 1502 includes one or more image sensors each of which is sensitive to and/or detects characteristics of a scene within the camera's field of view, such as light in one or more bands of the electromagnetic spectrum or depth data (e.g., the distance from the camera to points in the field of view). In one example, camera 1502 includes a visible light sensor that captures image data representing visible light. In another example, camera 1502 includes a visible light sensor that captures image data representing visible light and an infrared (IR) sensor that captures image data representing IR light. In another example, camera 1502 includes a time-of-flight sensor (e.g., as part of an IR sensor) that provides depth data for associated visible light data captured from a visible light sensor. The captured image data from camera 1502 in FIG. 15A would include user 1506. Based on the captured image data, electronic device 1500 identifies one or more characteristics of the scene that was captured, such as that the user is an authorized user, that the user is looking at the electronic device (e.g., user's eyes 1508 are directed towards the display of the electronic device or just the electronic device generally), that the user is using the electronic device (e.g., based on the user's eyes directed towards the electronic device and moving indicating that the user is interacting with the electronic device), or other characteristics.

In some embodiments, electronic device 1500 uses image data that includes depth data and visible light data to determine the characteristics. In one example, electronic device 1500 analyzes image data to determine the position and orientation of a user's head based on visible light and depth data and to determine the direction that the user's eyes are pointing based on visible light data. Based on these factors, and optionally others, electronic device 1500 determines whether the user is looking at the display of the electronic device. In some embodiments, electronic device 1500 uses these factors, and optionally other factors to determine where on electronic device 1500's display the user is focusing.

In addition to time-of-flight techniques mentioned above, other techniques can be used to measure depth data for associated visible light data or to extract depth data from other types of image data. For example, using two or more image sensors, parallax techniques can be used. As another example, using an IR emitter and IR detector, speckle techniques speckle can be used. As another example, focus information for the camera can be used to determine depth information. Any depth information determined from one or more sensors in camera 1502 is optionally stored as part of the captured image data.

Figure 15B:
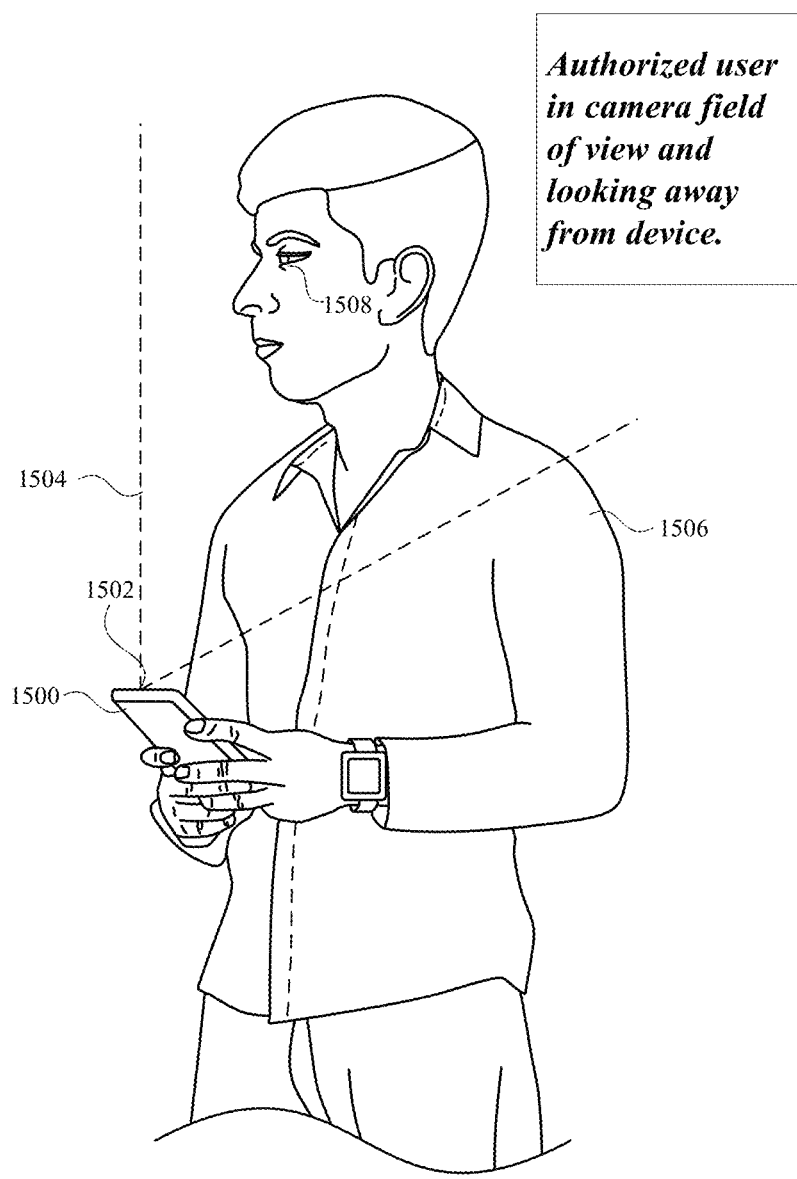

In FIG. 15B, electronic device 1500 captures image data representing a similar scene as that captured with respect to FIG. 15A. User 1506, however, is not looking at electronic device 1500, as indicated by user's eyes 1508. In the captured image data representing this scene, electronic device 1500 identifies characteristics, such as that user 1506 is an authorized user, that user 1506 is not looking at the electronic device, or other characteristics.

Figure 15C:
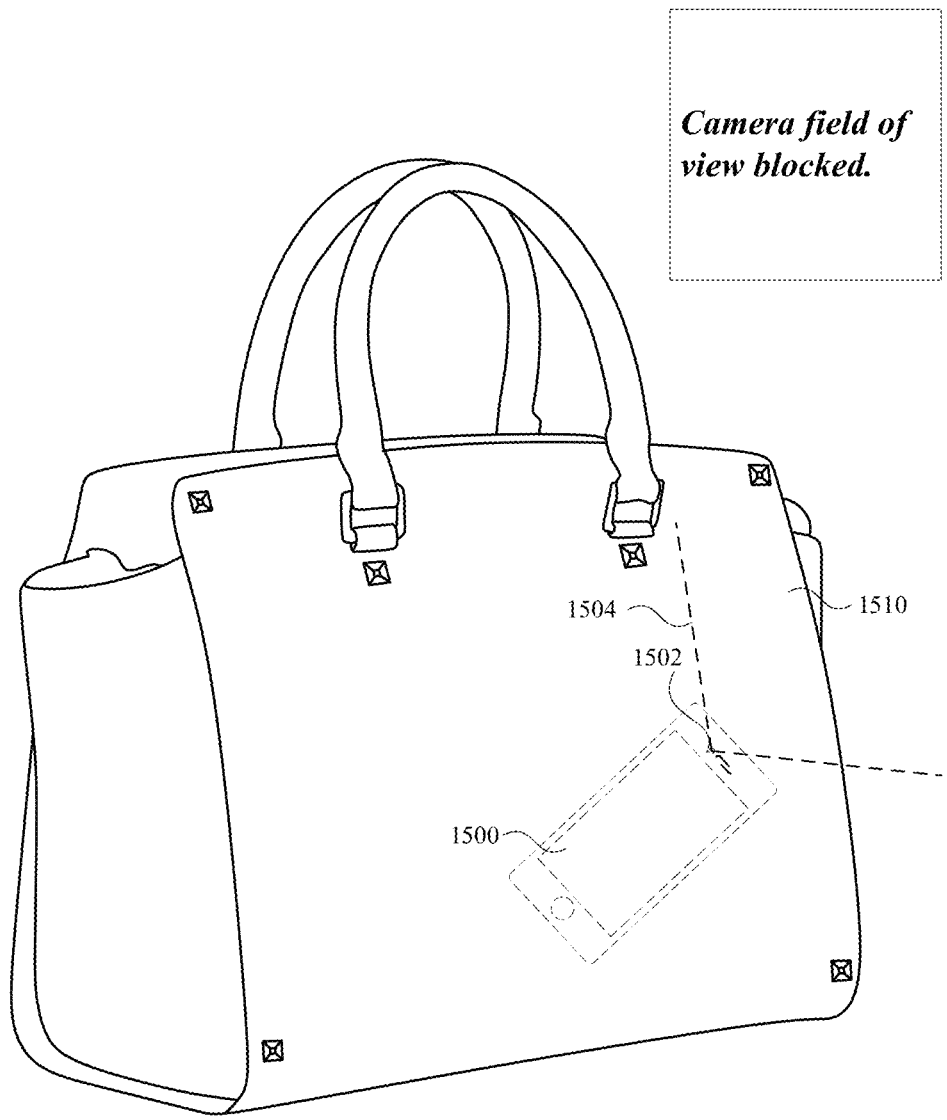

In FIG. 15C, electronic device 1500 captures image data from inside of bag 1510. In the captured image data representing this scene, electronic device 1500 identifies characteristics, such as that field of view 1504 is occluded or that no authorized user is present.

Figure 15D:
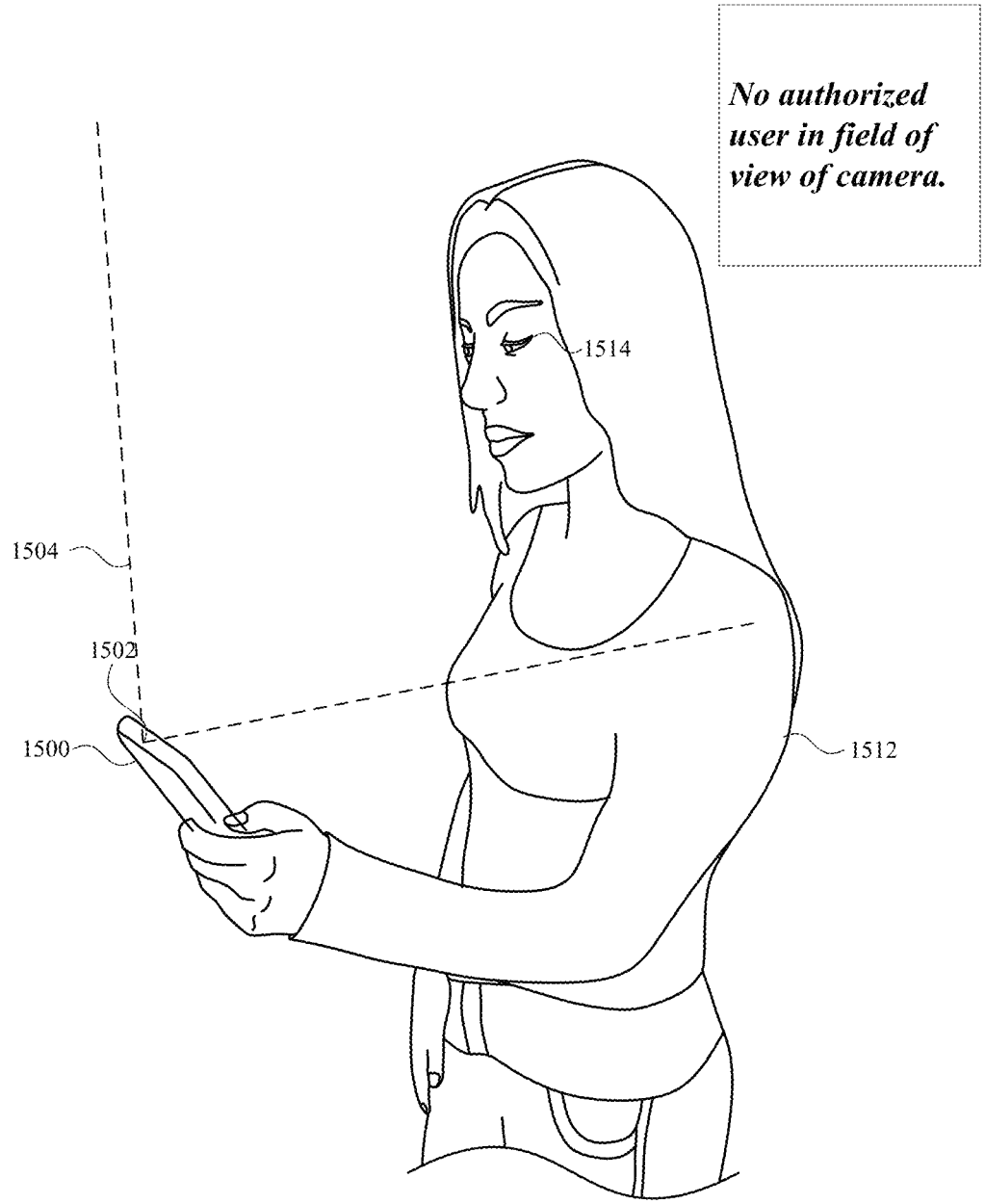

In FIG. 15D, electronic device 1500 captures image data representing a similar scene as that captured with respect to FIGS. 15A and 15B. User 1506 (FIGS. 15A-15B), however, is no longer present in field of view 1504 of camera 1502. Instead, user 1512 is present. In the captured image data representing this scene, electronic device 1500 identifies characteristics, such as that user 1512 is not an authorized user, that user 1512 is looking at the electronic device, that no authorized user is present, or other characteristics.

Figure 15E:
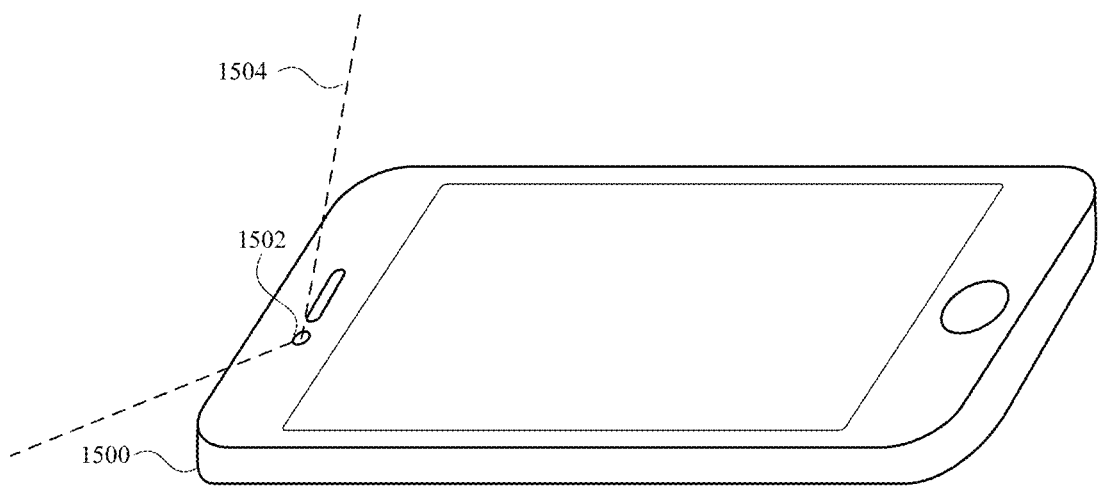

In FIG. 15E, electronic device 1500 captures image data representing no objects of interest (e.g., electronic device 1500 is on a table with camera 1502 facing up so that only the ceiling or sky is within field of view 1504). In the captured image data representing this scene, electronic device 1500 identifies characteristics, such as that no authorized user is present, that no unauthorized user is present, that the camera's field of view is not occluded, or other characteristics.

Figure 15F:
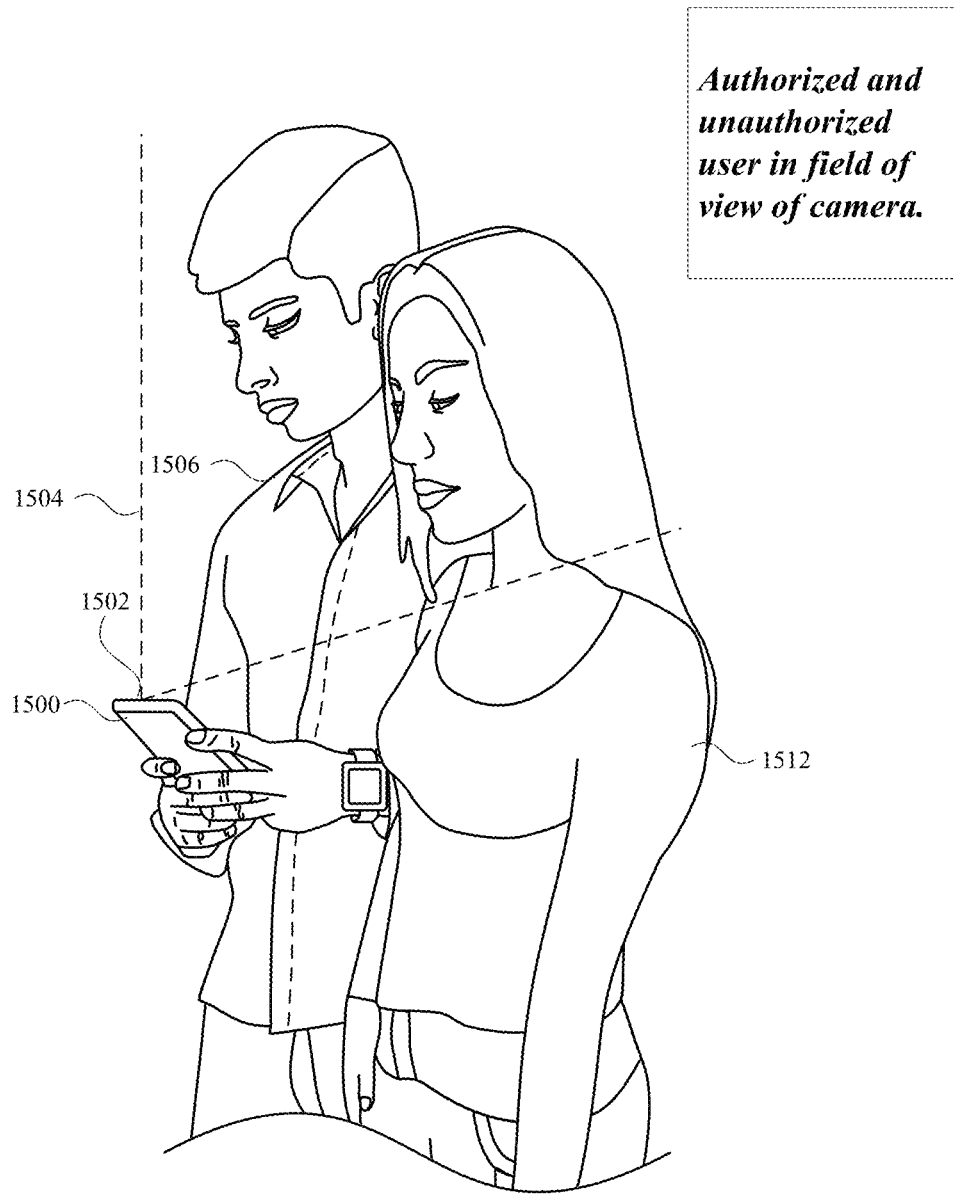

In FIG. 15F, electronic device 1500 captures image data representing a scene representing both user 1506 and user 1512. In the captured image data representing this scene, electronic device 1500 identifies characteristics, such as that user 1512 is not an authorized user, that user 1506 is an authorized user, that user 1506 and user 1512 are each looking at the electronic device, that an unauthorized user is present, or other characteristics.

Figure 16A:
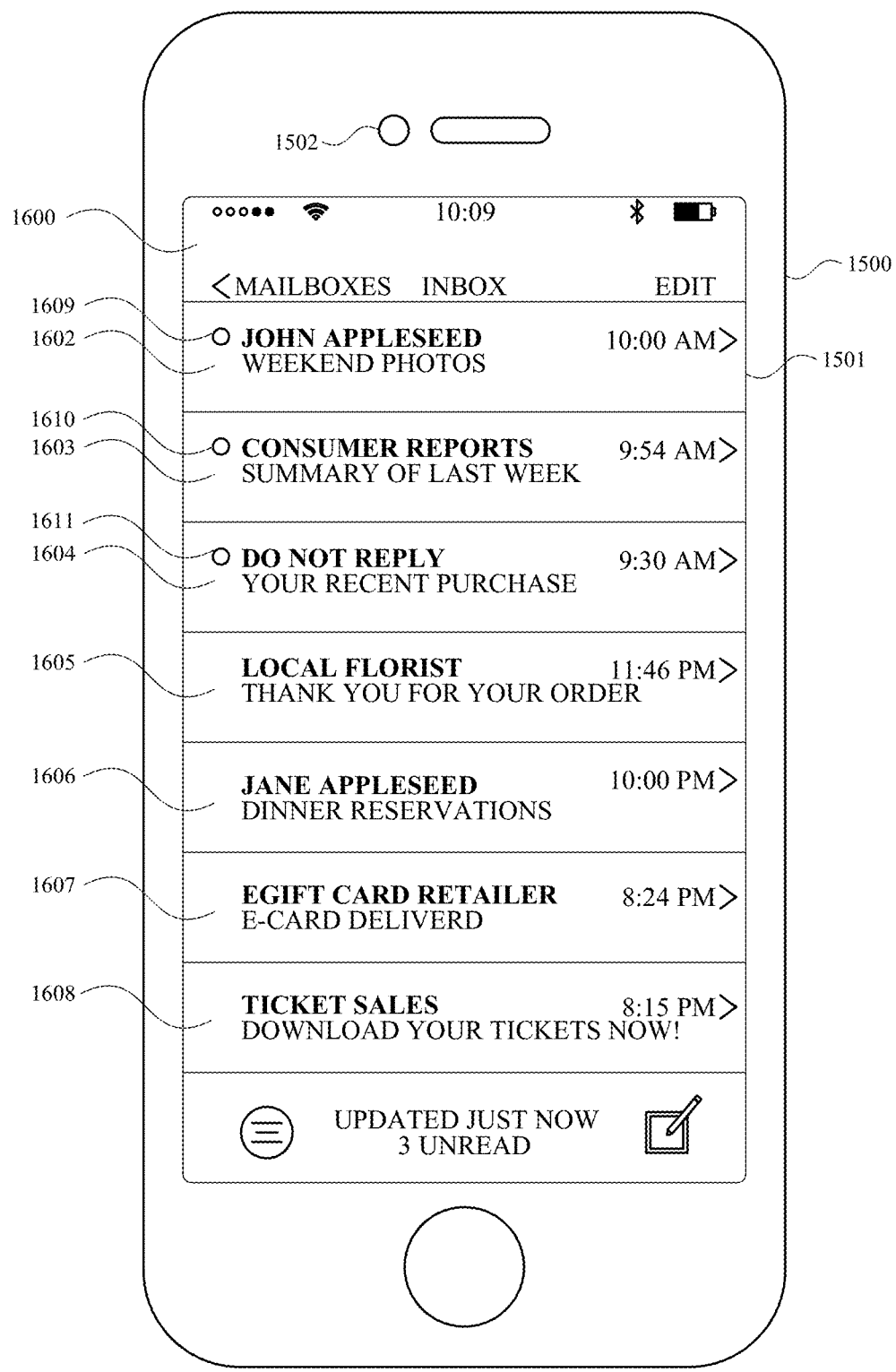
FIGS. 16A-16G illustrate exemplary user interfaces for performing actions on an electronic device based on captured image data.
Figure 16B:
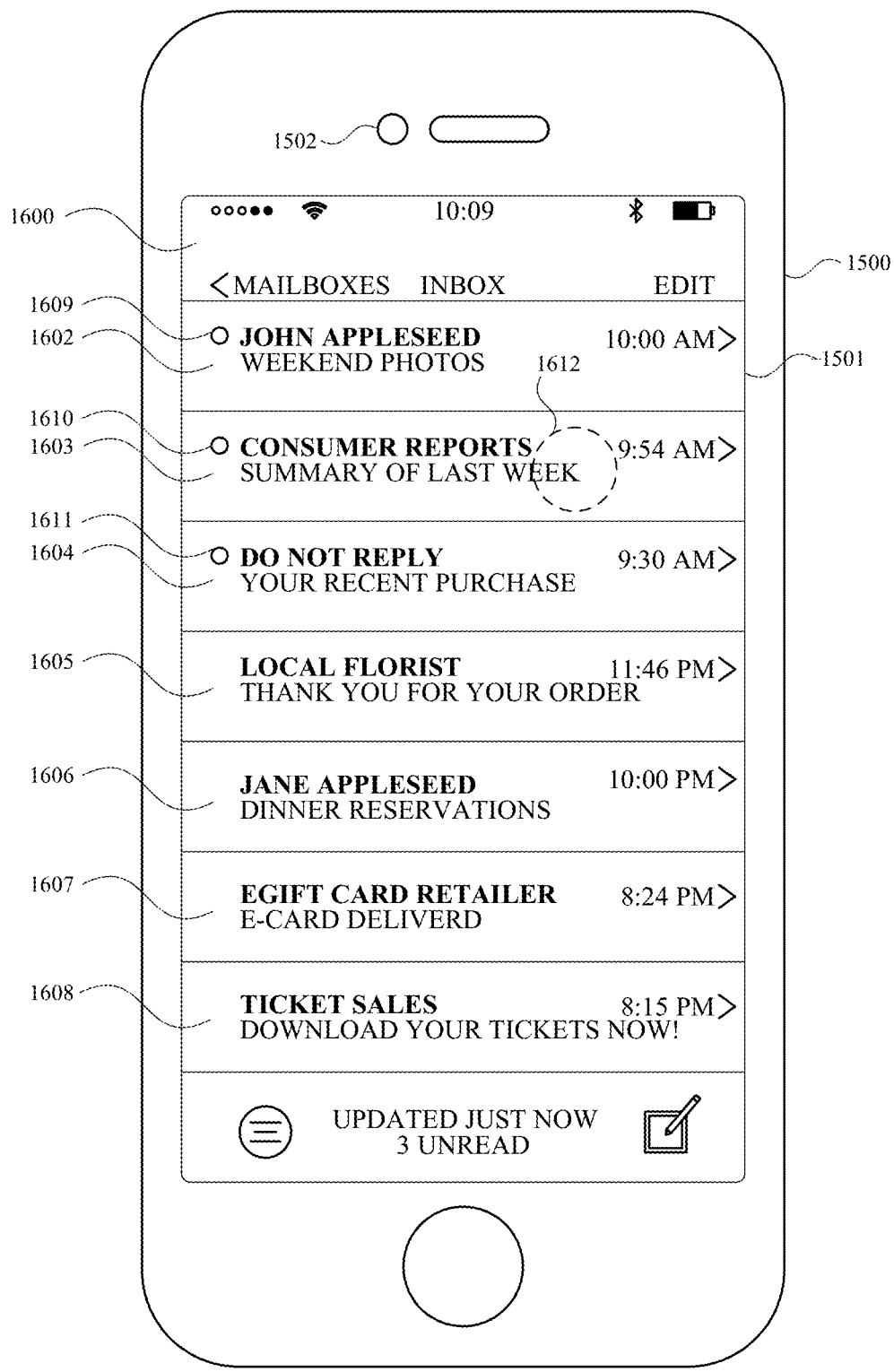
Figure 16C:
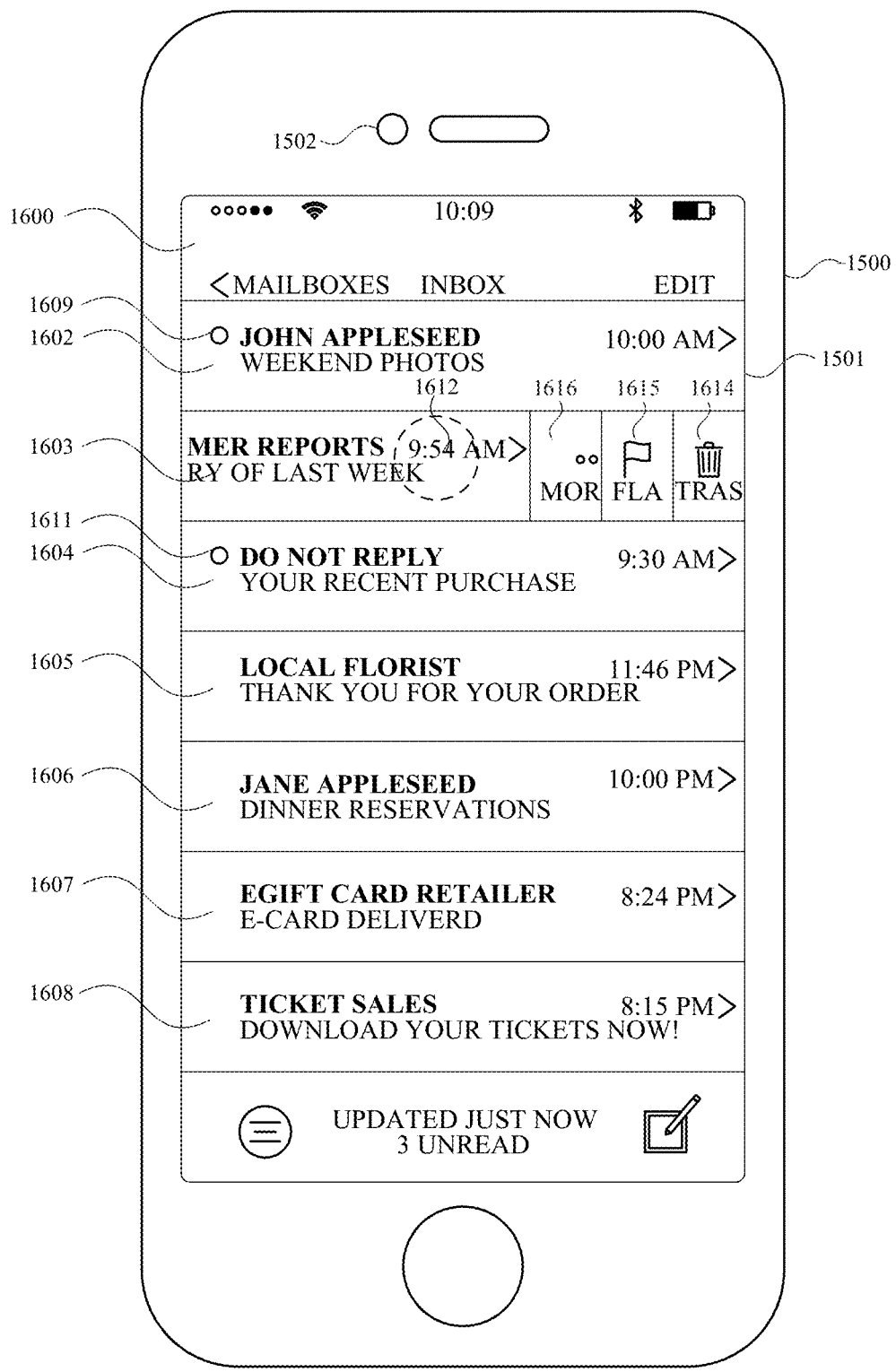
Figure 16D:
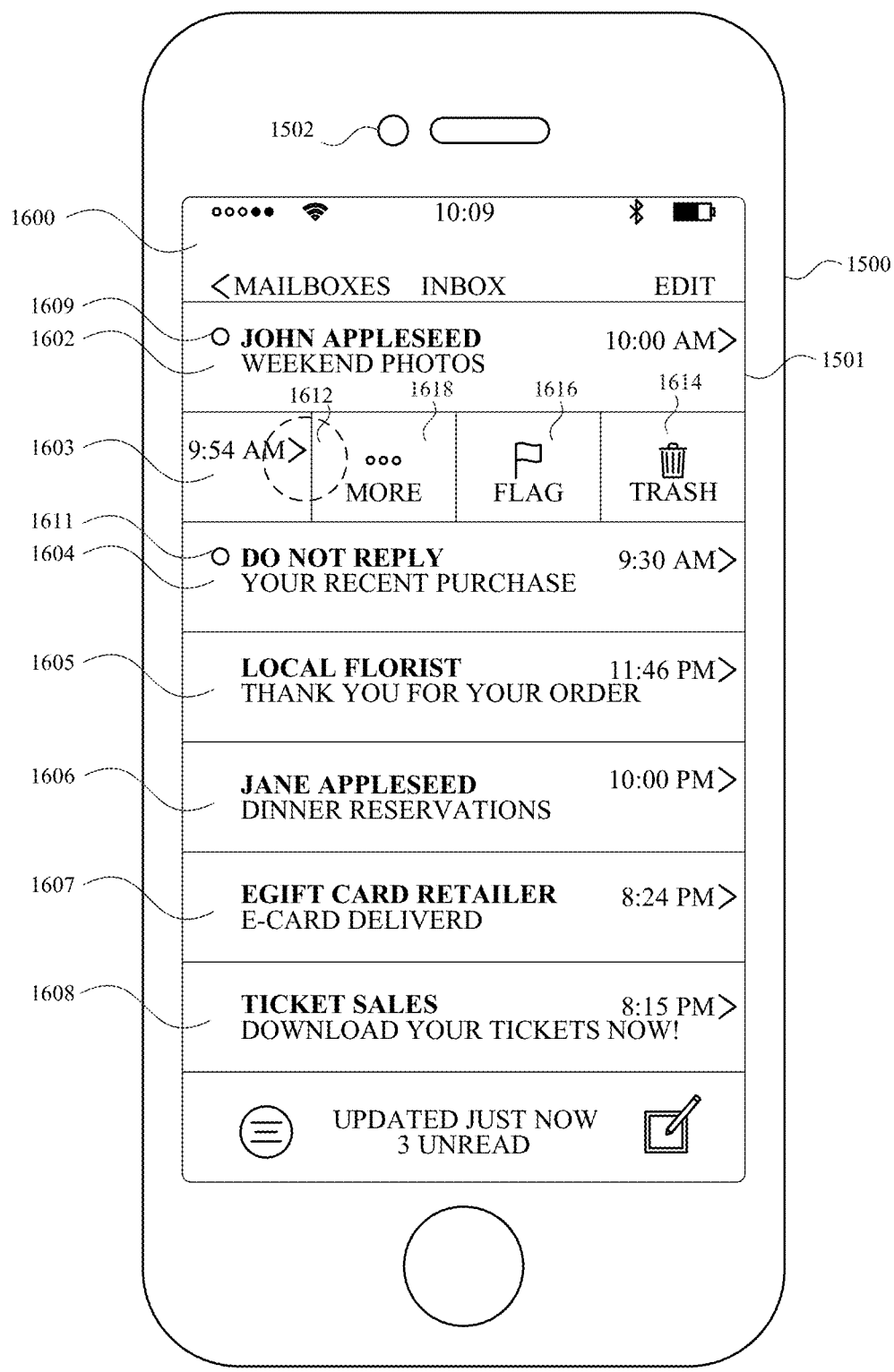
Figure 16E:
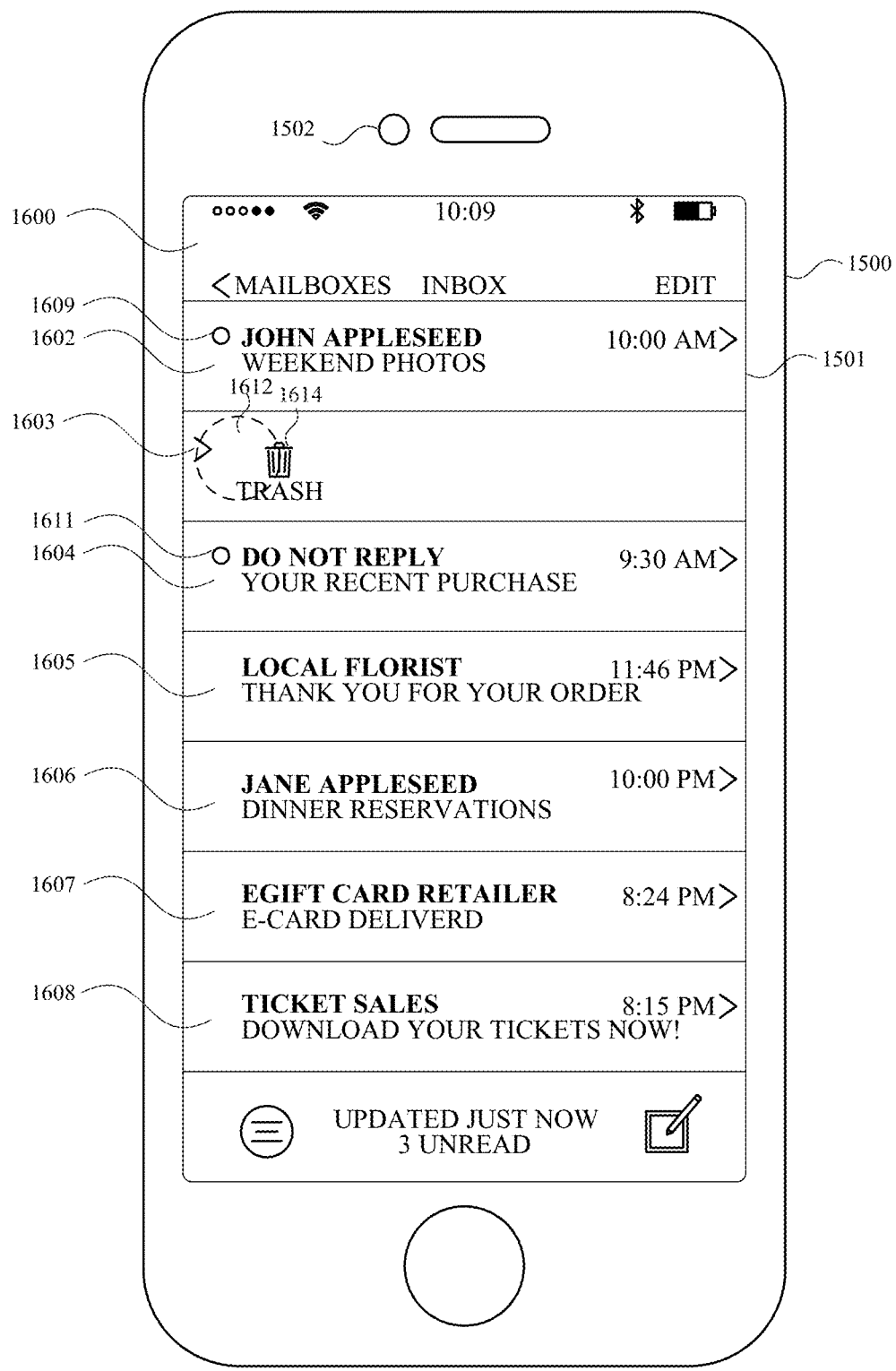
Figure 16F:
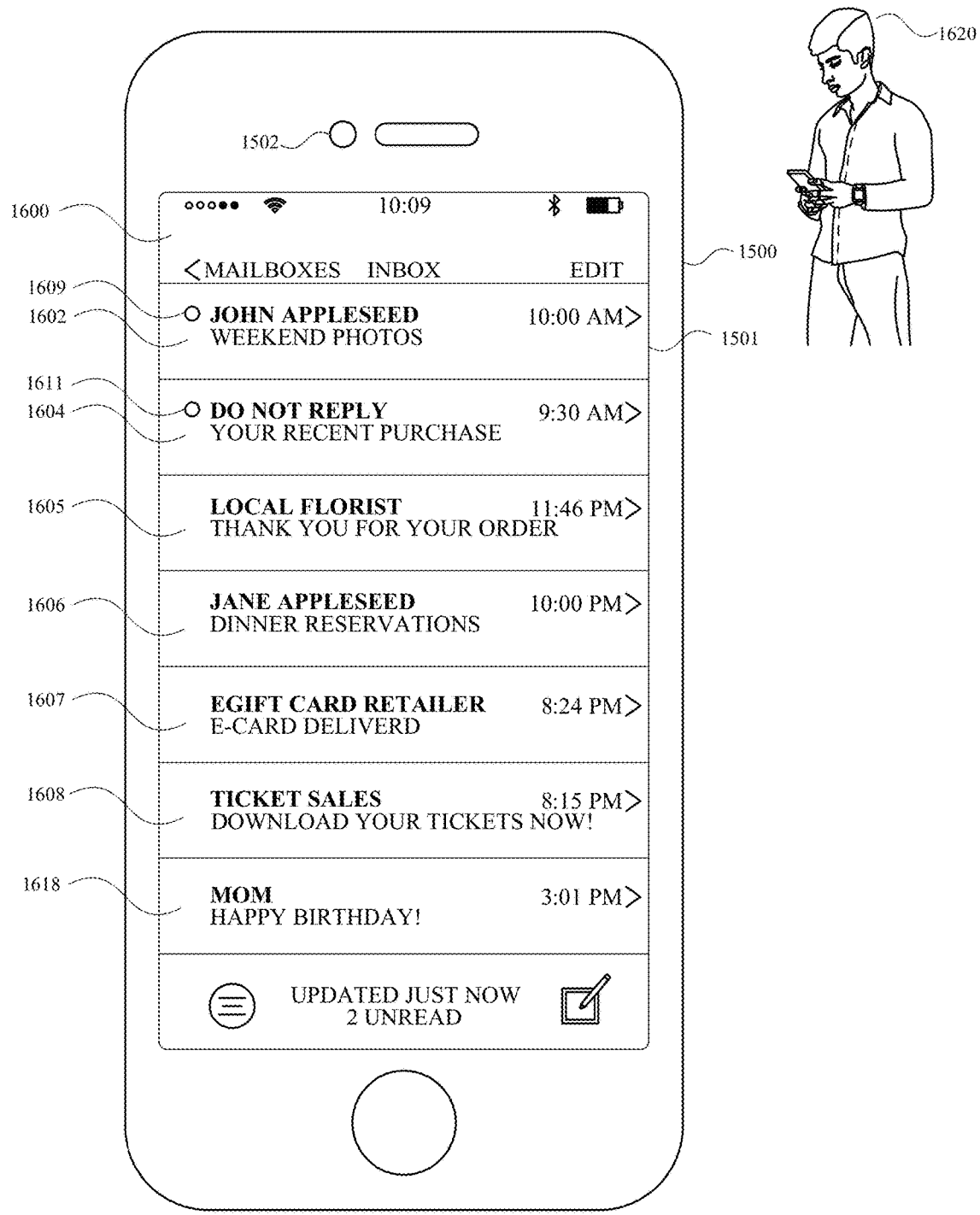
Figure 16G:
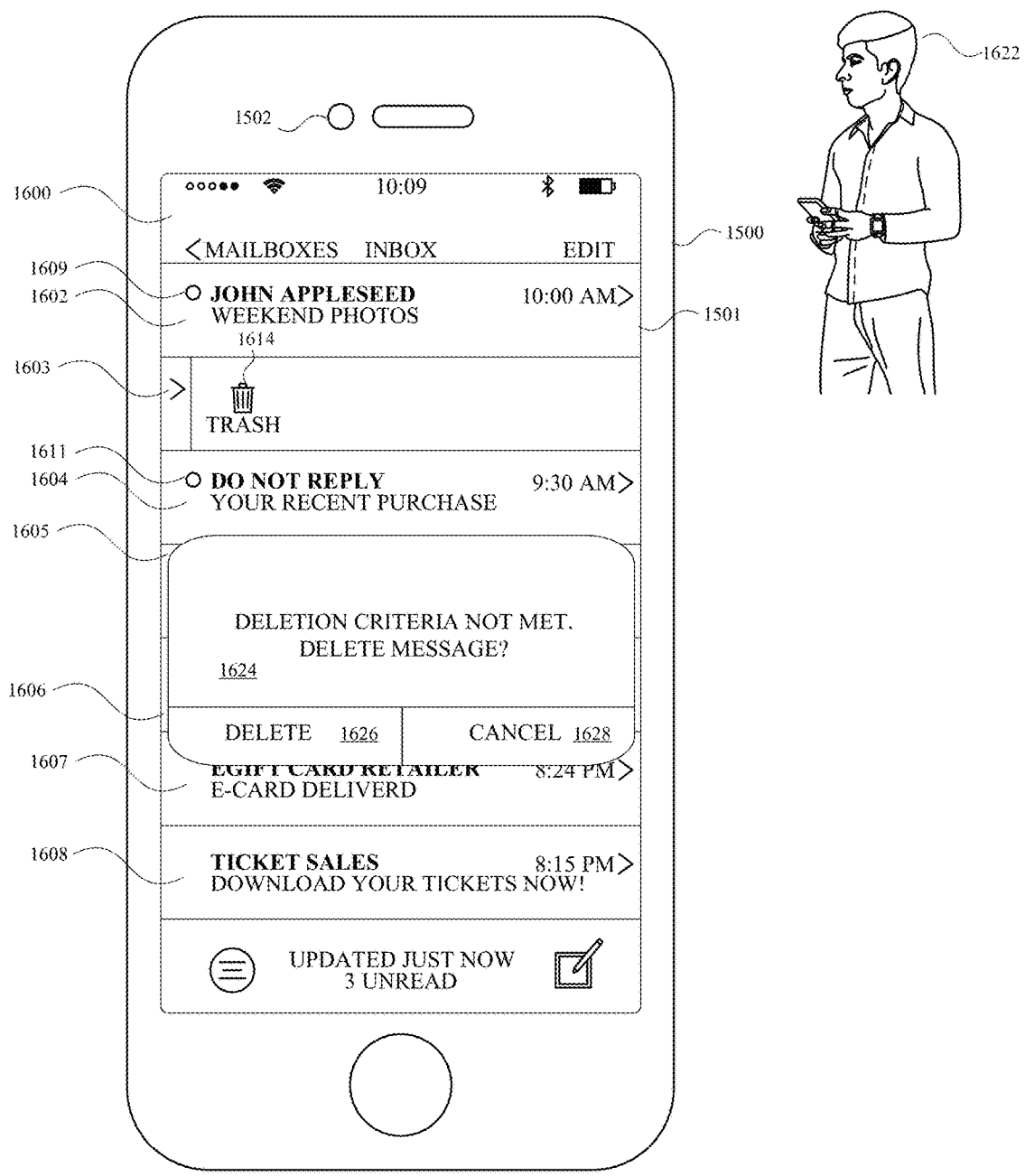
Figure 17A:
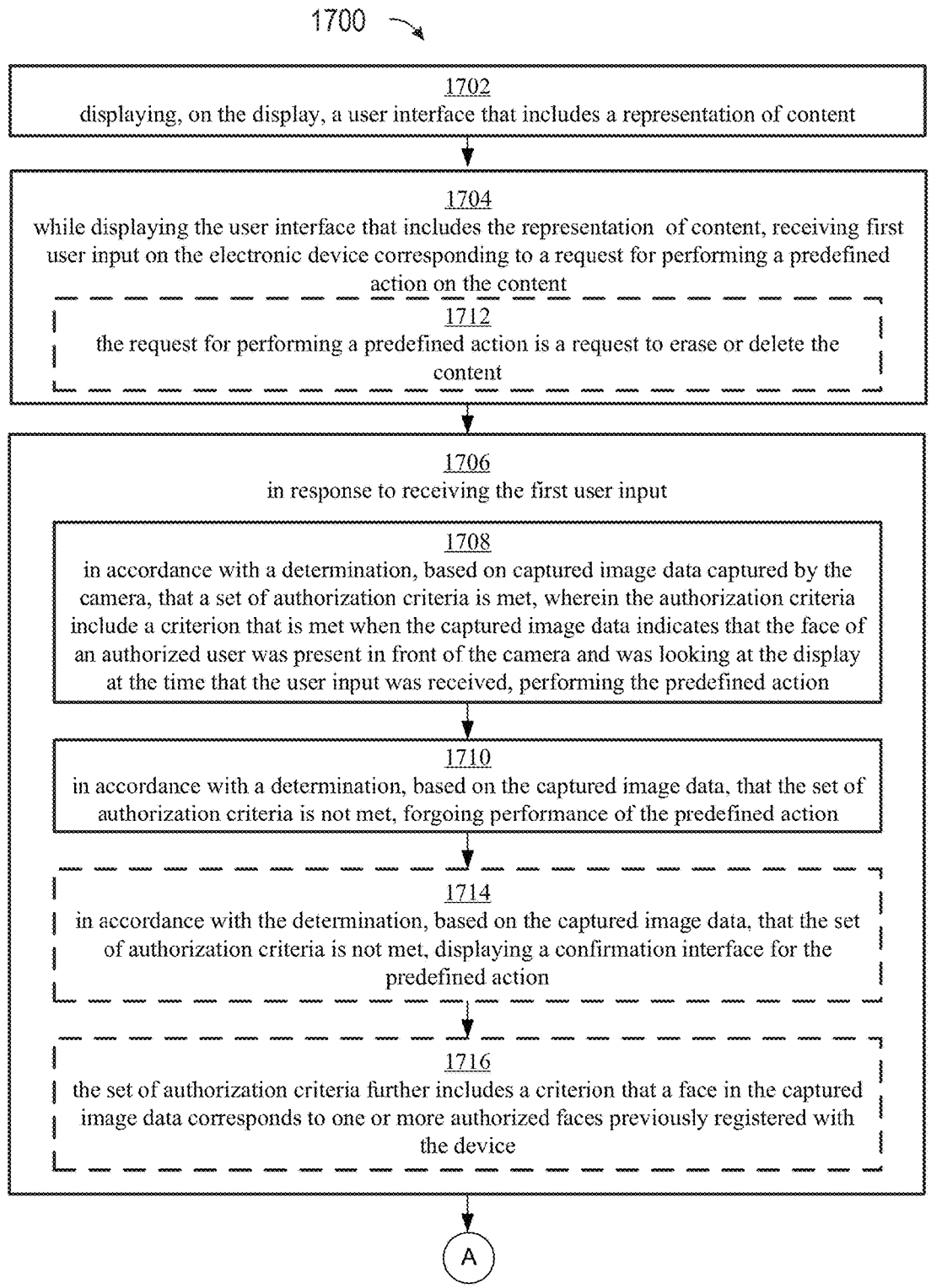
FIGS. 17A-17B are a flow diagram illustrating a method for performing actions on an electronic device based on captured image data.
Figure 17B:
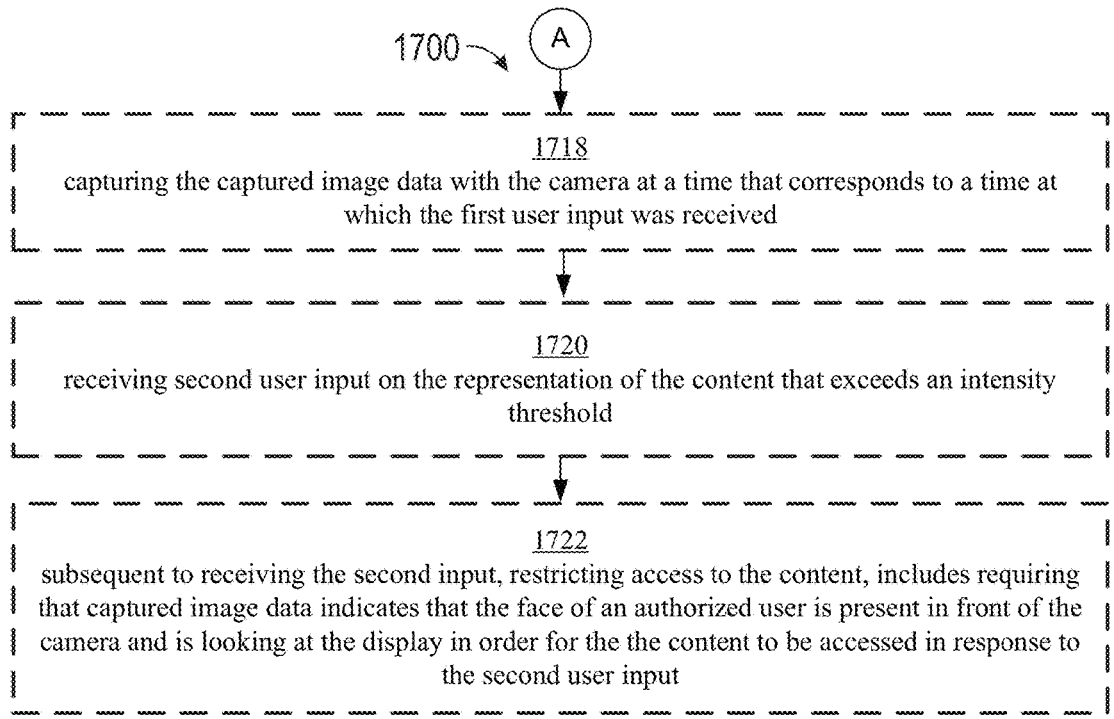

FIGS. 16A-16G illustrate exemplary user interfaces for restricting execution of operations based on a set of one or more authorization criteria. FIGS. 17A-17B are a flow diagram illustrating methods for restricting execution of operations based on a set of one or more authorization criteria in accordance with some embodiments. The user interfaces in FIGS. 16A 16G illustrate the processes described below, including the processes in FIGS. 17A-17B.

FIG. 16A depicts device 1500 (see FIGS. 15A-15F), which in some examples is a specific form factor for device 100, device 300, or device 500 described above. Device 1500 includes display 1501, which in some embodiments is a touch-sensitive display, and camera 1502 (described with respect to FIGS. 15A-15F). Additionally, in some embodiments of device 1500, additional sensors and/or other components (e.g., flash or IR emitter) are present along with camera 1502.

In FIG. 16A, device 1500 is displaying email user interface 1600 on display 1501. Email user interface 1600 includes graphical representations 1602-1608 that corresponds to respective email messages. The graphical representation includes information identifying the sender, information from the subject of the corresponding email, and a time that the email message was received. Graphical representations 1602-1604 include unread indicators 1609-1611, respectively.

FIGS. 16B-16E depict device 1500 responding to a gesture received on graphical representation 1602. As contact 1612 touches touch sensitive display 1501 (FIG. 16B) and moves across touch-sensitive display (FIGS. 16C 16E), several affordances are displayed. Specifically, as depicted in FIGS. 16C and 16D, trash button 1614, flag button 1615, and more button 1616 are displayed after contact 1612 has moved part away across graphical element 1603 without contact liftoff with touch-sensitive display 1501. Selection of trash button 1614 moves the email message associated with graphical representation 1603 to a trash folder, deletes the email message, or erases the email message. Selection of flag button 1615 causes a flag to be associated with the email message (e.g., causing an additional indicator to be displayed in graphical representation 1603). Selection of more button 1616 causes display of an additional menu of options for the associated email message, such as options for replying, forwarding, marking the email message as read, moving the message, or notifications.

If the device detects liftoff of contact 1612 from touch sensitive display 1501 at the locations depicted in FIG. 16C or 16D, the device maintains display of buttons 1614-1616 in a static location for a user to select any of the buttons via, for example, a tap gesture on the button's location on touch-sensitive display 1501. If, on the other hand, the device continues to detect contact 1612 moving across graphical representation 1603 without liftoff, as depicted in FIG. 16E, the device no longer displays flag button 1615 and more button 1616, as depicted in FIG. 16E. This indicates that once contact 1612 lifts off from touch-sensitive display 1501, the device will execute the function associated with trash button 1614.

After the device detects contact 1612 of FIG. 16E lifts off from touch-sensitive display 1501, device 1500 determines, based on captured image data, whether a set of one or more criteria are met before performing the action associated with delete button 1614. In some embodiments, device 1500 performs a similar determination when trash button 1614 is directly selected (e.g., via a tap gesture while trash button 1614 is displayed on FIG. 16D). In some examples of a set of one or more criteria, the set of one or more criteria is a set of one or more authorization criteria that ensures that the action to be performed is at the request of an authorized user. In some examples of a set of one or more criteria, the set of one or more criteria is one criterion that requires the face of an authorized user to be in a field of view of the device's front facing camera and that the user is looking at the device. To determine whether this criterion is met, device 1500 analyzes image data that was captured with camera 1502 before, during, or after the gesture input corresponding to contact 1612 was received. For example, the image data is optionally captured in response to the start or end of a gesture, in response to a determination that an action should be performed, in response to some predetermined interval for capturing image data, or based on other factors that allow for the association of the request action with captured image data. Once the image data is captured, the data is analyzed to determine if an authorized face is detected in the captured image data. For example, data representing any combination of visible light, non-visible light, depth, or any other types of image data are analyzed to determine if there is a face in the captured image data. If a face is detected, the captured image data is further analyzed to determine if the face belongs to an authorized user. For example, features of the face detected in the captured image data may be compared to features from a database that stores data for one or more faces of authorized users that were previously enrolled with device 1500. If the face belongs to an authorized user, device 1500 further analyzes the captured image data to determine if the authorized user is looking at device 1500. If it is determined that the authorized user is looking at device 1500 when delete button was selected, as described above, then the delete function is performed.

FIG. 16F depicts an example response of email user interface 1600 to the above example. FIG. 16F depicts email user interface 1600 after contact 1612 is no longer touching touch-sensitive screen 1501 as depicted in FIG. 16E. Scene 1620, which corresponds to FIG. 15A, represents the status of the user when device 1500 captures image data with camera 1502. Specifically, captured image data from camera 1502 that represents scene 1620 will show a face of an authorized user who is looking at device 1500 when the request is received to delete the email message corresponding to graphical representation 1603. Because the set of one or more criteria was a single criterion that requires the face of an authorized user to be looking at device 1500 when the delete request was received, the set of one or more criteria is met based on device 1500's analysis of the captured image data. Accordingly, as depicted in FIG. 16F, the email message corresponding to graphical representation 1603 is deleted and is no longer displayed in email user interface 1600 and graphical representation 1618 corresponding to a different email is added to email user interface 1600. The result would be the same if the camera captured a scene represented by FIG. 15F (e.g., FIG. 15F includes an authorized user that is looking at the display even though it also includes an unauthorized user).

FIG. 16G depicts an example of when the above example set of one or more criteria is not met. Specifically, as depicted in scene 1622 (which corresponds to FIG. 15B), while the captured image data shows the face of an authorized user, the authorized user is not looking at the device. Accordingly, the set of one or more authorization criteria is not met. In this case, device 1500 will prompt the user to confirm that the user in fact wants to perform the requested action. For example, as depicted in FIG. 16G, device 1500 displays messaging 1624 prompting the user to confirm that the email message corresponding to graphical representation 1603 should be deleted. If the user confirms the deletion via delete button 1626, then device 1500 will delete the email message associated with graphical representation 1603 and update email user interface 1600, as depicted in FIG. 16F. If the user instead selects cancel button 1628, device 1500 will not perform the requested delete action and will instead return email user interface 1600 to the state depicted in FIG. 16A. This same confirmation process would result if any of the other scenes represented in FIGS. 15C-15E were captured, as none of these scenes includes an authorized user in the field of view of the camera who is also looking at the device. In some embodiments, electronic device 1500 responds to the set of one or more criteria not being met in a different manner. For example, electronic device 1500 optionally can prompt the user to authentic via a password/pin prompt, request the user to provide fingerprint information, prompt the user to position their face in view of the front facing camera, cause the device to enter a locked state, or just ignore the request.

While the set of one or more criteria above included only a single criterion, in other embodiments, the set of one or more criteria includes a different criterion or multiple criteria. As an example, the set of one or more criteria includes a criterion met when an authorized user's face is present in the captured image data (regardless of whether the authorized user is looking at the device). In another example, the set of one or more criteria includes a criterion that an authorized user's face is in the captured image data and no unauthorized or unrecognized users' faces are in the captured image data. In another example, the set of one or more criteria only requires that the field of view of the camera not be occluded. For example, this set would be met if the scene represented by FIG. 15E is captured but would not be met if the scene represented by FIG. 15C is captured.

While FIGS. 16A-16F depicts one example of method 1700 with respect to an email user interface, a similar process could be applied to any number of user interfaces, such as a photo album interface, other messaging interfaces, a file manager interface, a music or video interface, or any other interface. Similarly, while the example action discussed above is a delete action, the same process can apply to any number of other actions or classes of actions. Examples of possible actions include deleting content, erasing content, sending content, moving content, changing status of content (e.g., marking as read), discarding content, turning off the device, uninstalling an application, resetting an application, changing a setting of the device, changing a setting of an application or the OS on the device, or other actions. Examples of possible classes of actions include destructive actions, actions that send data to a remote device, actions that are potentially harmful to the device or its content, and actions that initiate communication with a remote user.

FIGS. 17A-17B are a flow diagram illustrating a method for restricting execution of operations based on a set of one or more authorization criteria. in accordance with some embodiments. Method 1700 is performed at a device (e.g., 100, 300, 500, 1500) with a display and a camera. Some operations in method 1700 are, optionally, combined, the order of some operations are, optionally, changed, and some operations are, optionally, omitted.

As described below, method 1700 provides an intuitive way for restricting execution of operations based on a set of one or more authorization criteria. The method reduces the cognitive burden on a user for restricting execution of operations based on a set of one or more authorization criteria, thereby creating a more efficient human-machine interface. For battery-operated computing devices, enabling a user to restrict execution of operations faster and more efficiently conserves power and increases the time between battery charges.

An electronic device (e.g., 1500) having a display (e.g., 1501) and a camera (e.g., 1502) and includes one or more visible light sensors, IR sensors, time of flight sensors, or combination of these and other sensors) displays (1702), on the display, a user interface (e.g., 1600) that includes a representation of content (e.g., 1602-1608). In some embodiments, the device is already in an unlocked state when the user interface is displayed.

While displaying the user interface (e.g., 1600) that includes the graphical representation (e.g., item 1603) (e.g., an icon, a thumbnail, or an item in a list) of content (e.g., the email message associated with item 1603), the electronic device receives (1704) first user input (e.g., 1612) (e.g., a touch input, such as a gesture on a touch-sensitive surface, a mechanical button input, such as a conventional keyboard, mouse input, voice input, or some other type of input) on the electronic device corresponding to a request (e.g., a specific gesture, entry of a command, selecting of an affordance) for performing a predefined action (e.g., deleting data, formatting memory, closing an application, powering off a device, uninstalling an application, declining to save data) on the content. In some embodiments, the content is an email message, a contact, or a photo.

In response to receiving (1706) the first user input and in accordance with a determination, based on captured image data captured by the camera (e.g., 1502) (e.g., using image analysis, such as facial recognition using visible light data, IR light data, depth image data, and/or other data stored in the captured image data), that a set of authorization criteria is met, the electronic device performs (1708) the predefined action (e.g., deleting, erasing, marking read, navigating through, or moving content) (e.g., as depicted in FIG. 16F). The authorization criteria include a criterion that is met when the captured image data indicates that the face of an authorized user was present in front of the camera and was looking at the display at the time that the user input was received (e.g., FIG. 15A). In some embodiments, the set of authorization criteria includes one or more criterion. In some embodiments, examples of authorization criteria include an authorized user is using the electronic device, include an authorized user is looking at the electronic device, an authorized user is using the device without an unauthorized user (or, in some examples, any other user) also using the device, an authorized user is using the device without an unauthorized user (or, in some examples, any other user) looking at the device (or in some examples, near the device), an unauthorized user is not using the device, an authorized user has used the device within a threshold amount of time). In accordance with a determination, based on the captured image data, that the set of authorization criteria is not met, the electronic device forgoes (1710) performance of the predefined action (FIG. 16G).

Determining whether an authorized user is in front of and looking the electronic device ensures that actions are not inadvertently performed by errant inputs and are not performed by people unauthorized to use the device. This provides for data security and data privacy by ensuring that the device is being used in an authorized manner and an authorized person prior to allow access to data. Additionally, by having the authentication and verification performed based on captured image data, the interface of the electronic device is improved by requiring fewer user inputs to authenticate and verify actions performed on the device. By ensuring that the user is looking at the display of the electronic device, there is a higher chance that a false positive could occur. For example, if a user is present in captured image data, it may appear that the user is using the electronic device, but the presence of the user does not guarantee that the user is actually using the electronic device. Instead, the user's attention could be elsewhere. Determining whether the user is present in the captured image data and actually looking at the display of the electronic device increases the probability that the user is actually using the electronic device. This improves the security of the data on the device and ensures that actions are not performed inadvertently when the user is not actually using the electronic device.

In some embodiments the electronic device captures (1718) the captured image data (e.g., image data corresponding to scene 1620) with the camera at a time that corresponds to a time at which the first user input was received. In some embodiments, the image data is captured before receiving the user input (e.g., 1612), the image data is captured after receiving the user input, in response to receiving the user input, in response to a determination that the user input corresponds to a request for a destructive action to data (e.g., action corresponding to trash button 1614), some combination of the forgoing, or at some other time based on other factors.

In some embodiments, the predefined action is a destructive action. In some embodiments, the predefined action (1712) is for deleting or erasing the content from the electronic device or elsewhere. In some embodiments, the predefined action is for removing an account associated with the content from the electronic device. In some embodiments, the predefined action is a request to erase or delete the content (e.g., action corresponding to trash button 1614). In some embodiments, deleting data includes removing access to data on storage and erasing is removing the data from storage. In some embodiments, the predefined action includes navigating to a particular view of the user interface associated with the content. In some embodiments, the user interface is a map application and the user interface navigation operation corresponds to a request to move the displayed map, change a navigation direction, stop providing navigation instructions, or perform other navigation operations. In some embodiments, the user interface is a photos application and the user interface navigation operation is a request to switch photos, photo albums, delete photos, edit photos, or perform other photo edit operations. Requiring a user to be present in front of a device and/or looking at the device before a destructive action is performed enhances the operation of the device. For example, this technique improves data reliability by preventing inadvertent actions that would otherwise remove wanted content from the device. This improves the availability of needed data on the device and reduces the cognitive burden of the user associated with having to search for data that was inadvertently deleted or removed. Providing for better data reliability and security enhances the operability of the device and makes the user-device interface more efficient (e.g., by helping avoid unintended results) which, additionally, reduces power usage and improves battery life of the device by enabling the user to use the device more quickly and efficiently.

In some embodiments the display is a touch-sensitive display (e.g., display 1501) and the first user input is a gesture (e.g., 1612) on the touch-sensitive display. For example, the user input is a swipe on an object (e.g., 1612 in FIGS. 16A-16E), tap of an affordance, such as a confirmation, delete, or remove affordance, or other types of gestures. Devices with touch-sensitive displays specifically benefit from the above method. For example, touch-sensitive display on the electronic device can be inadvertently activated and actions inadvertently performed when electronic devices with such screens are placed in pockets, exposed to water, and in other circumstances. By verifying that a user of an electronic device with a touch-sensitive display is in front of the device and/or looking at the device, the electronic device is improved by reducing the number of inadvertent actions.

In some embodiments, the determination (based on the captured image data) that the set of authorization criteria is not met includes a determination that the captured image data does not indicate that the face of the authorized user was present in front of the camera (e.g., FIGS. 15C, 15D, and 15E) or that the authorized user was not looking at the display at the time that the user input was received (e.g., scene 1622). Ensuring that an authorized user is present in image data captured by the electronic device increases the security of data on the electronic device by preventing certain actions when it is more likely that an authorized user is not responsible for the requested action. Ensuring that an authorized user is looking at the electronic device provides another level of security by ensuring that the authorized is not only present but is also paying attention to the electronic device. This prevents actions, such as destructive actions, requested by unauthorized users who happen to be near an authorized user and prevents performance of inadvertent actions that are requested by accident when the authorized user is not actively pay attention to the electronic device. Further, by implementing this improved data security using captured image data, the electronic device is improved by providing for enhanced data security without requiring additional user inputs or adding complexity to the user interface.

In some embodiments, in response to receiving the first user input and in accordance with the determination, based on the captured image data, that the set of authorization criteria is not met, the electronic device prompts the user to authenticate (e.g., 1624). In some embodiments, in response to receiving the first user input and in accordance with the determination, based on the captured image data, that the set of authorization criteria is not met, the electronic device prompts the user to authenticate by looking at the camera (e.g., 1624). In some embodiments, the predefined action is launching an application or navigating to a new photo graph within a photo application. If the authorized user is not in front of the camera when the user input was received or, alternatively, if the authorized user was not looking at the display at the time the user input was received, then the device prompts the user to authenticate by looking at the camera of the device. In some embodiments, the user is prompted to enter a pin code or password or provide other authenticating information, such as a fingerprint. In some embodiments, in accordance with the determination (based on the captured image data) that the set of authorization criteria is not met, the electronic device switches into a locked state. In some embodiments, the predefined action is launching an application or navigating to a new photo graph within a photo application. If an authorized user is not in front of the camera when the user input was received or, alternatively, if the authorized user was not looking at the display at the time the user input was received, then the device is switched to a lock mode that restricts the operation of the device to protect the data on the electronic device and prevent further attempts to access data on the electronic device. Prompting the user to confirm that an action should be performed when authorization criteria are not met provides for the data reliability and security benefits described above while also providing for an easy process for overriding the device's determination that the requested action should not be performed (e.g., when the lighting conditions are not sufficient for the device to detect the user in captured image data or the user's appearance has changed so that the device no longer recognizes the user). This technique enhances the operability of the device and makes the user-device interface more efficient (e.g., by helping the user to achieve an intended result by providing a way of overriding the device's determination and reducing user mistakes when operating/interacting with the device) which, additionally, reduces power usage and improves battery life of the device by enabling the user to use the device more quickly and efficiently.

In some embodiments, in accordance with the determination (based on the captured image data) that the set of authorization criteria is not met, electronic device displays (1714) a confirmation interface (e.g., 1624) for the predefined action. In some embodiments, the predefined action is launching an application or navigating to a new photo graph within a photo application. If the authorized user is not in front of the camera when the user input was received or, alternatively, if the authorized user was not looking at the display at the time the user input was received, then the device prompts the user to confirm that the predefined action should be performed.

In some embodiments, the user interface includes a list of graphical elements (FIG. 16A) (e.g., a list in a vertical or horizontal column or a grid) representing a plurality of data objects (e.g., in some embodiments, the list displays a plurality of email graphical elements, such as a box containing email information (sender, subject, time, and/or other information) or a plurality of photo elements, such as thumbnails or photo album covers). The representation of the content is one of the graphical elements and the content is an associated data object (e.g., an email message, a photo, or a photo album) of the plurality of data objects.

In some embodiments, the electronic device receives (1720) second user input on the representation of the content that exceeds an intensity threshold (e.g., display a menu with the affordance and optionally with other various affordances is displayed, such as an affordance corresponding to a request to share information associated with the content or the content itself or an affordance corresponding to a request to perform a certain function associated with the content). The electronic device, subsequent to receiving the second input, restricts (1722) access to the content (e.g., storing an indication on the electronic device that that accessing the content requires that a set of access criteria be met), by requiring that captured image data indicates that the face of an authorized user is present in front of the camera and is looking at the display in order for the content to be accessed in response to the second user input (e.g., in the case of the content being a photo, if a security flag is associated with the photo, when any attempt to access the photo, such as viewing, sharing, or deleting the photo, the electronic device will verify that an authorized user is looking at the display of the device before the access is allowed). In some embodiments, in response to receiving the second input, the electronic device displays an affordance corresponding to a request to mark an associated icon, application or function for enhanced security. The electronic device stores the indication of enhanced security on the electronic device in response to selection of the affordance. In some embodiments, in response to receiving the first user input, the electronic devices whether the indication of enhanced security is present for the content. Allowing a user to enable enhanced security for content and/or actions on the device based on a contact that reaches an intensity threshold reduces the likelihood that a user will inadvertently apply enhanced security to content and/or actions by mistake. Additionally, the intensity threshold still allows the user to quickly apply the enhanced security with a minimum number of interactions with the device. The above enhances the operability of the device and makes the user-device interface more efficient (e.g., by helping the user to achieve an intended result with minimal interactions and reducing user mistakes when operating/interacting with the device) which, additionally, reduces power usage and improves battery life of the device by enabling the user to use the device more quickly and efficiently.

In some embodiments, the set of authorization criteria (1716) further includes a criterion that a face in the captured image data corresponds to one or more authorized faces previously registered with the device. In some embodiments, an enrollment process was previously used to capture, analyze, and store information for a face of an authorized user.

It should be understood that the particular order in which the operations in FIGS. 17A-17B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1000, 1300, 1900, 2100, 2300, 2500, 2700) are also applicable in an analogous manner to method 1700 described above with respect to FIGS. 17A-17B. For example, the authorization criteria and a determination of whether the criteria are met based on captured image data described above with reference to method 1700 optionally has one or more of the characteristics of the sets of authorization/alert/content-lock criteria and determinations of whether those criteria are met described herein with reference to other methods described herein (e.g., methods 700, 1900, 2100). For brevity, these details are not repeated here.

The operations in the information processing methods described above are, optionally, implemented by running one or more functional modules in an information processing apparatus such as general purpose processors (e.g., as described with respect to FIGS. 1A, 3, 5A) or application specific chips. Further, the operations described above with reference to FIGS. 17A-17B are, optionally, implemented by components depicted in FIGS. 1A-1B. For example, receiving the first input is, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 18A:
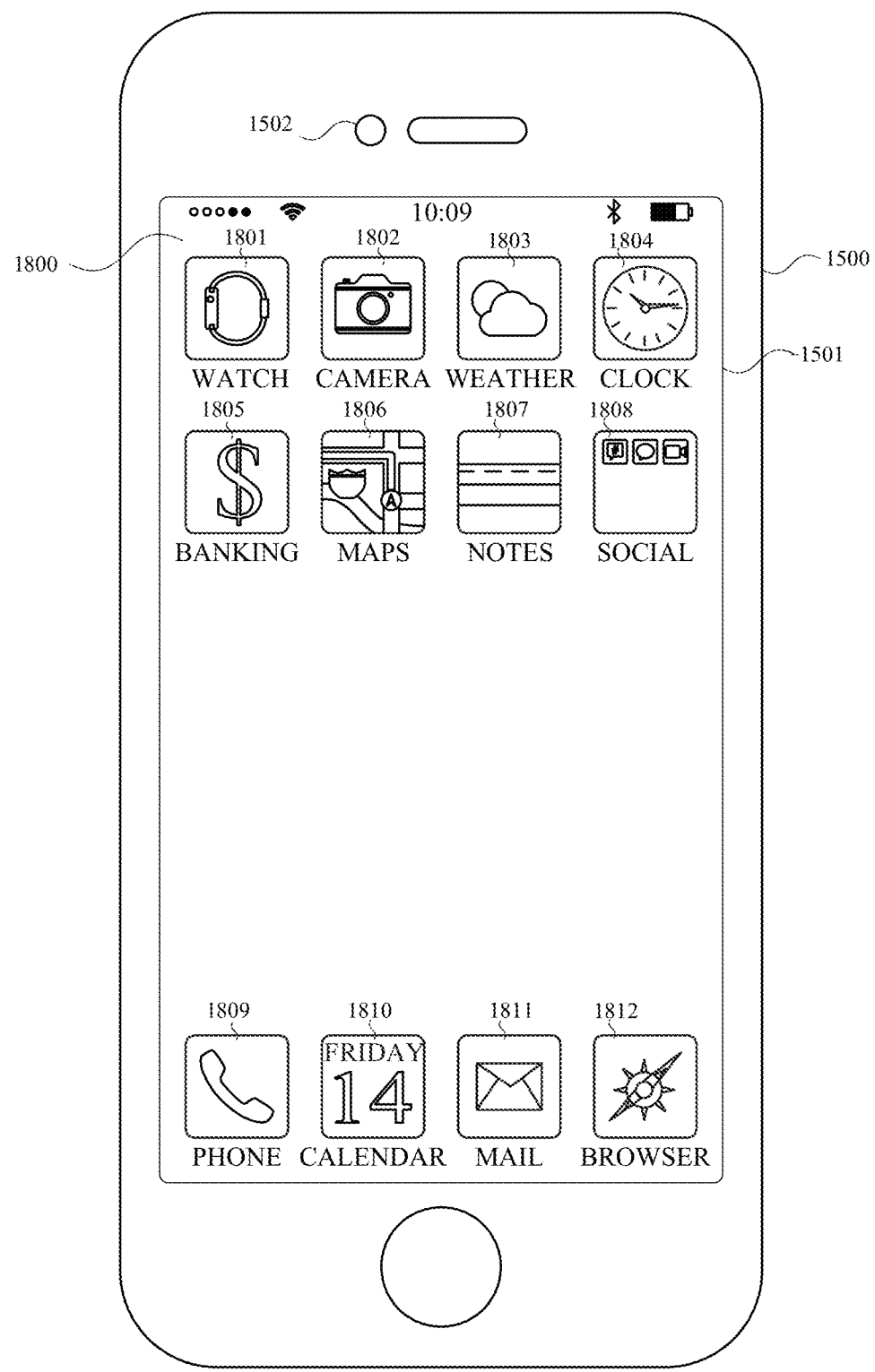
FIGS. 18A-18L illustrate exemplary user interfaces for enhancing security and/or privacy an electronic device based on captured image data.
Figure 18B:
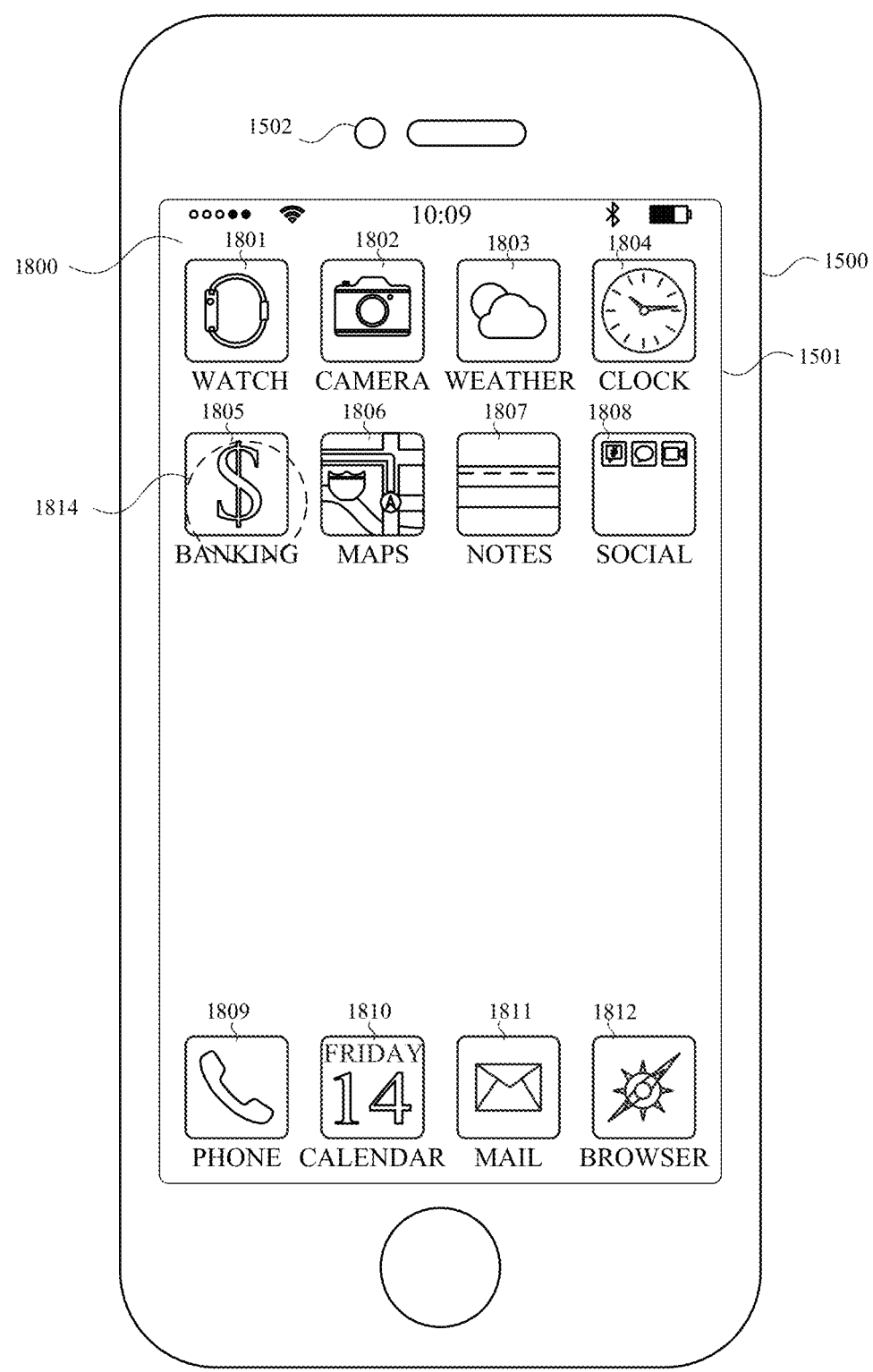
Figure 18C:
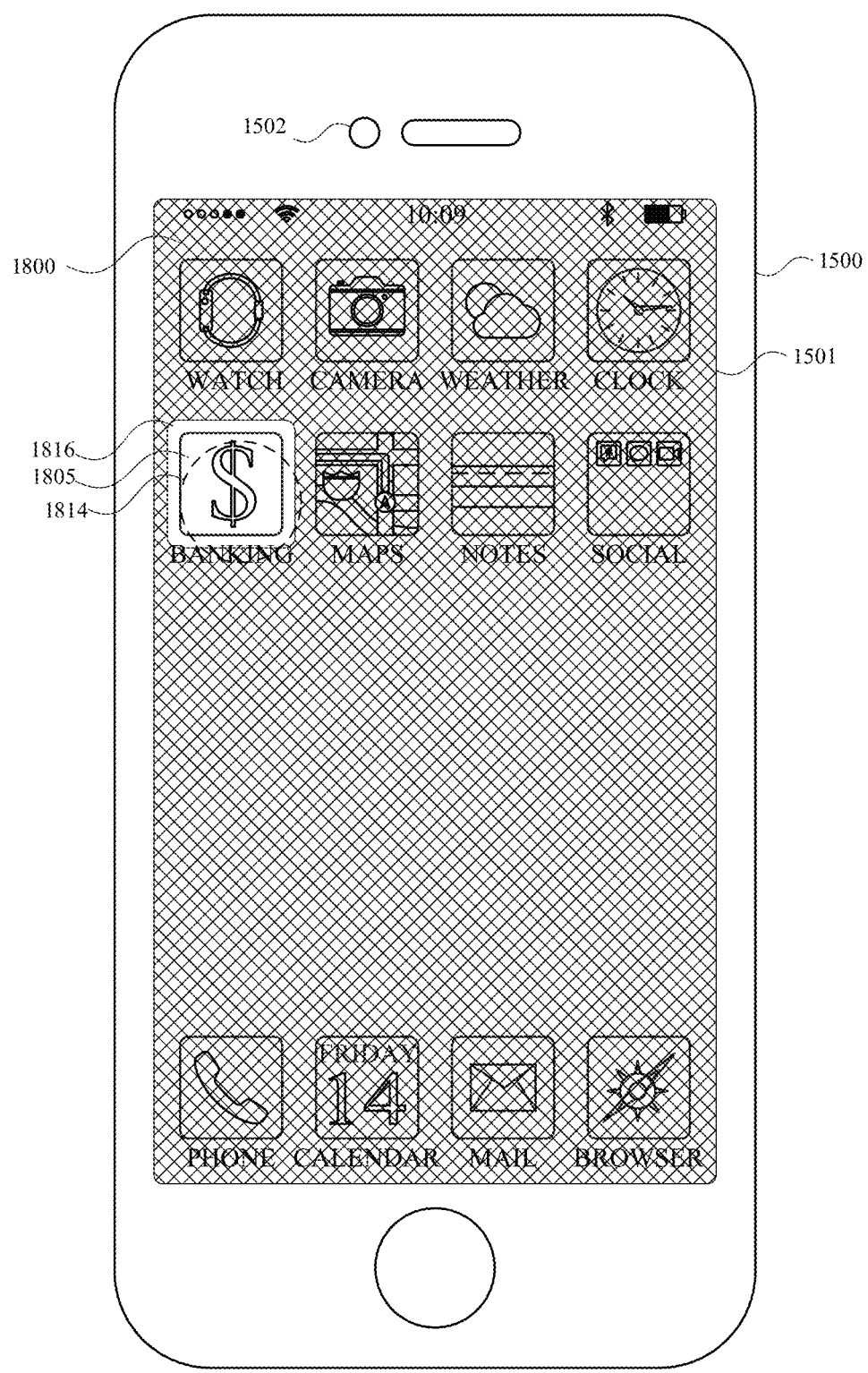
Figure 18D:
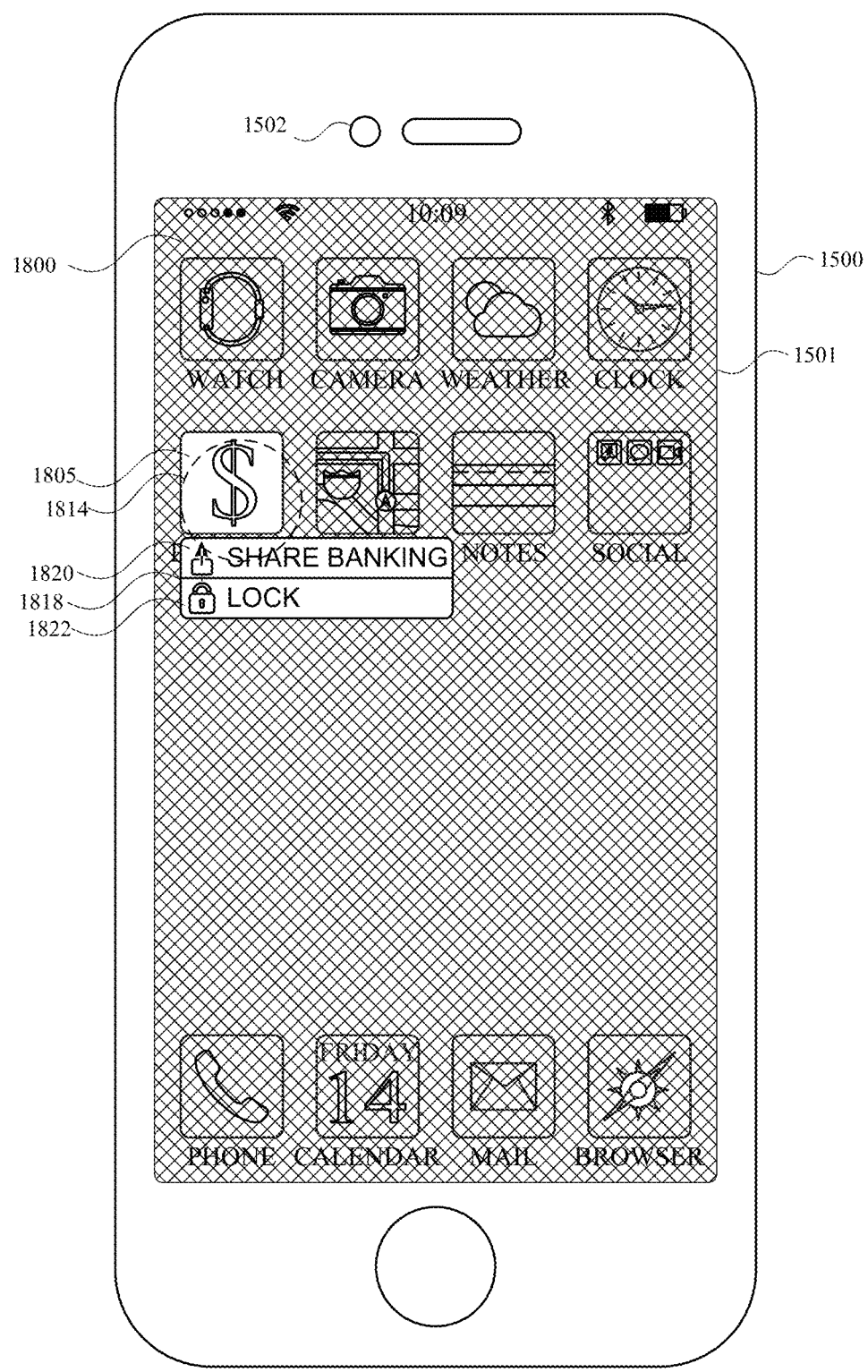
Figure 18E:
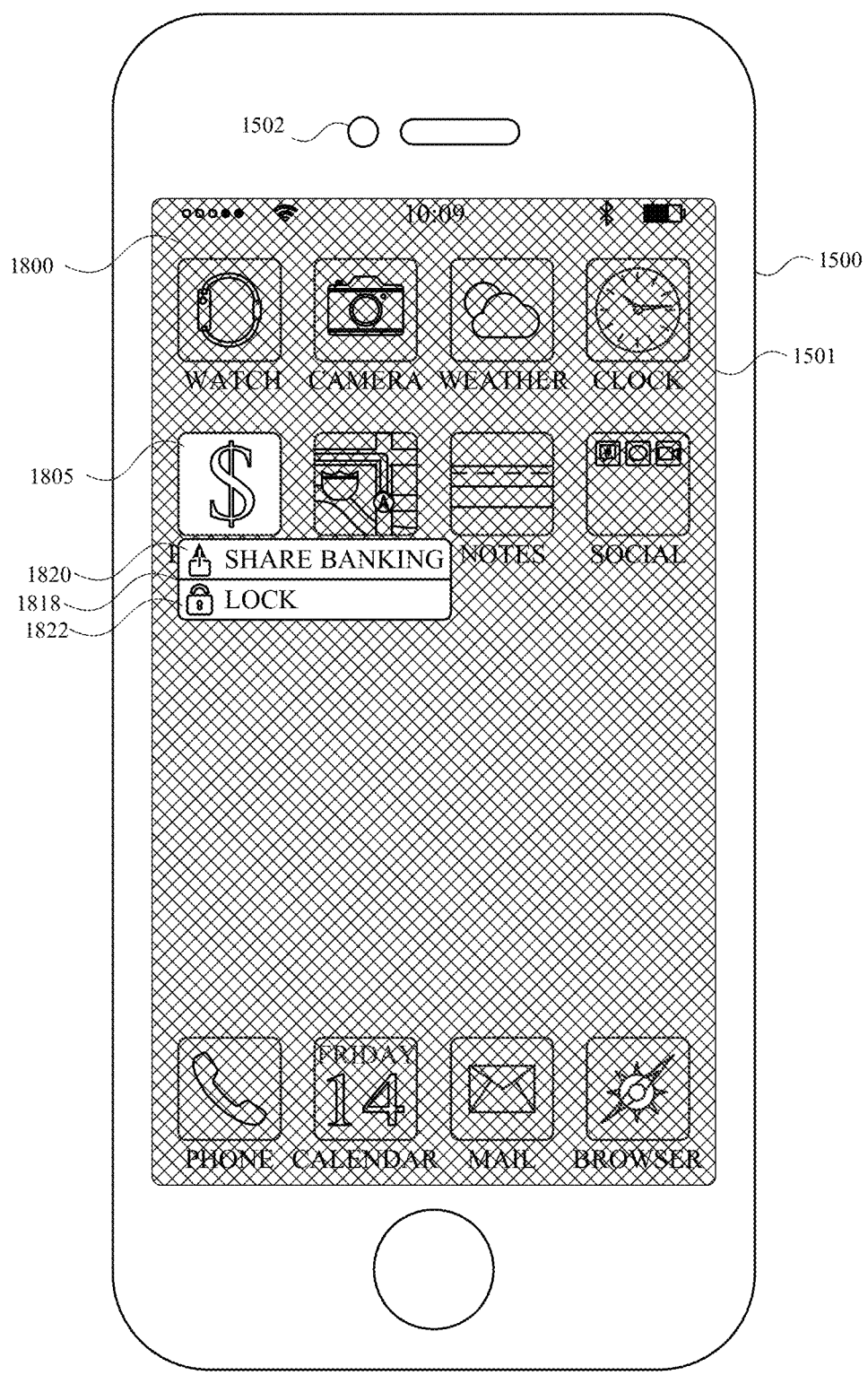
Figure 18F:
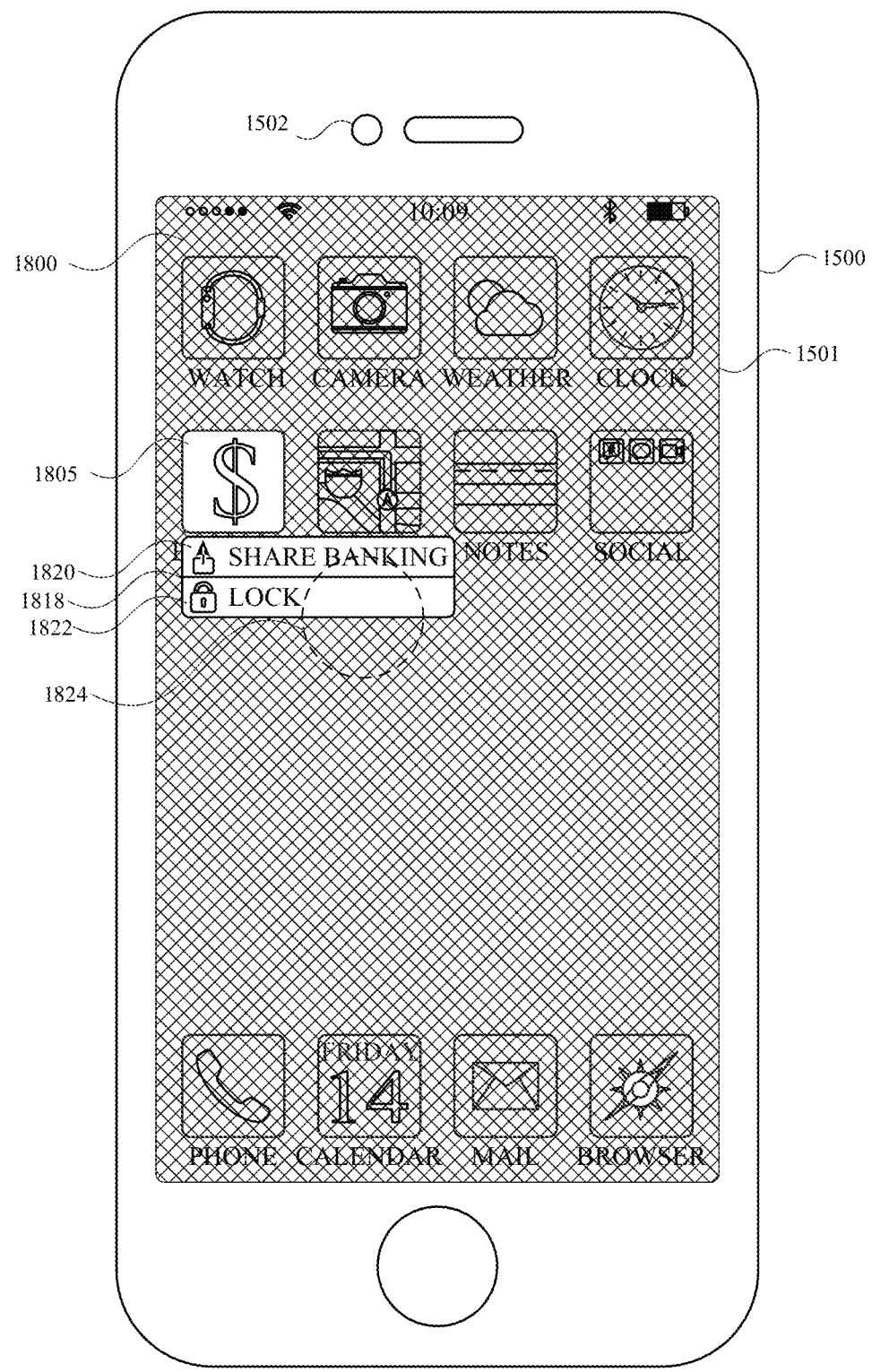
Figure 18G:
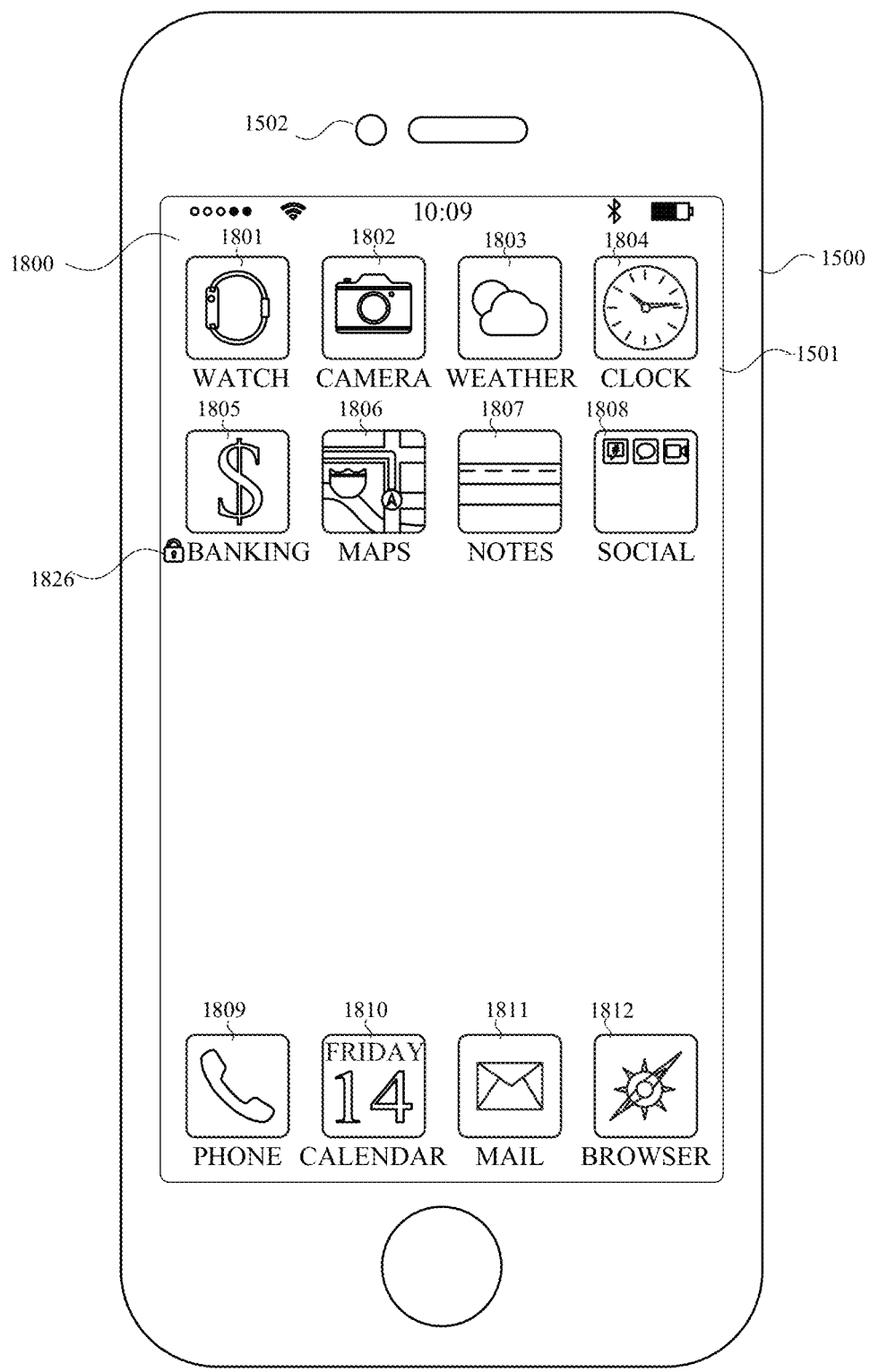
Figure 18H:
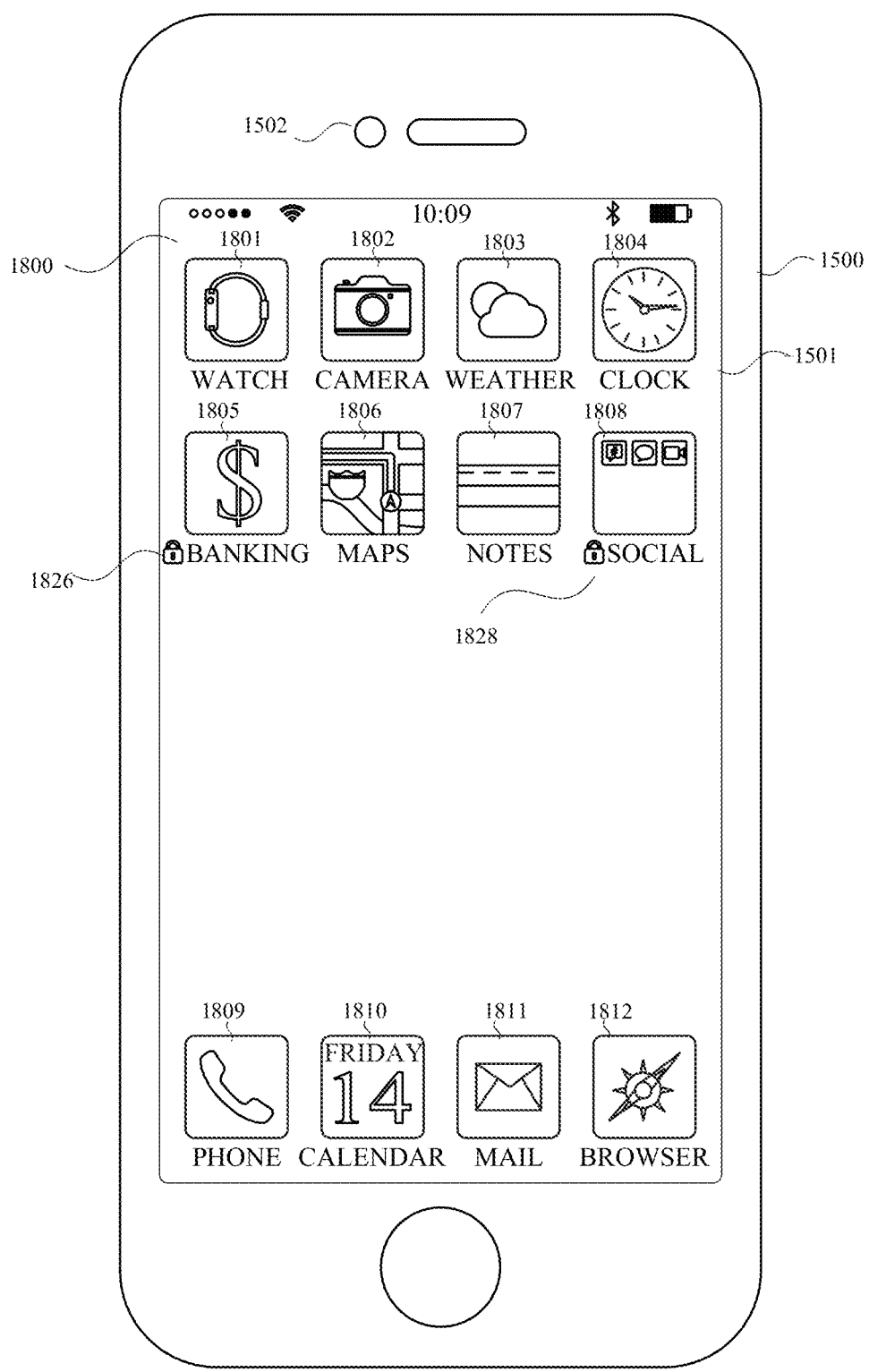
Figure 18I:
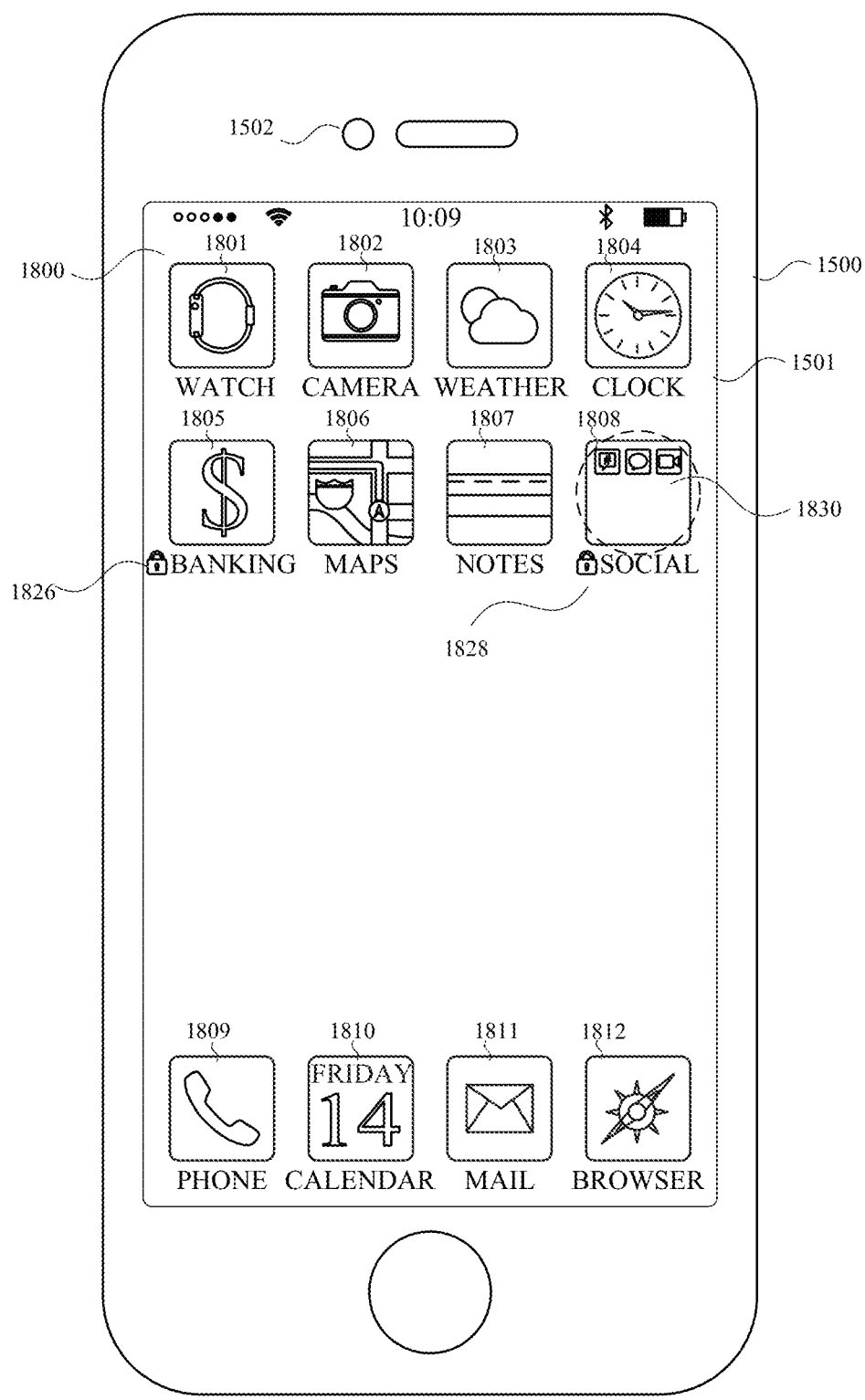
Figure 18J:
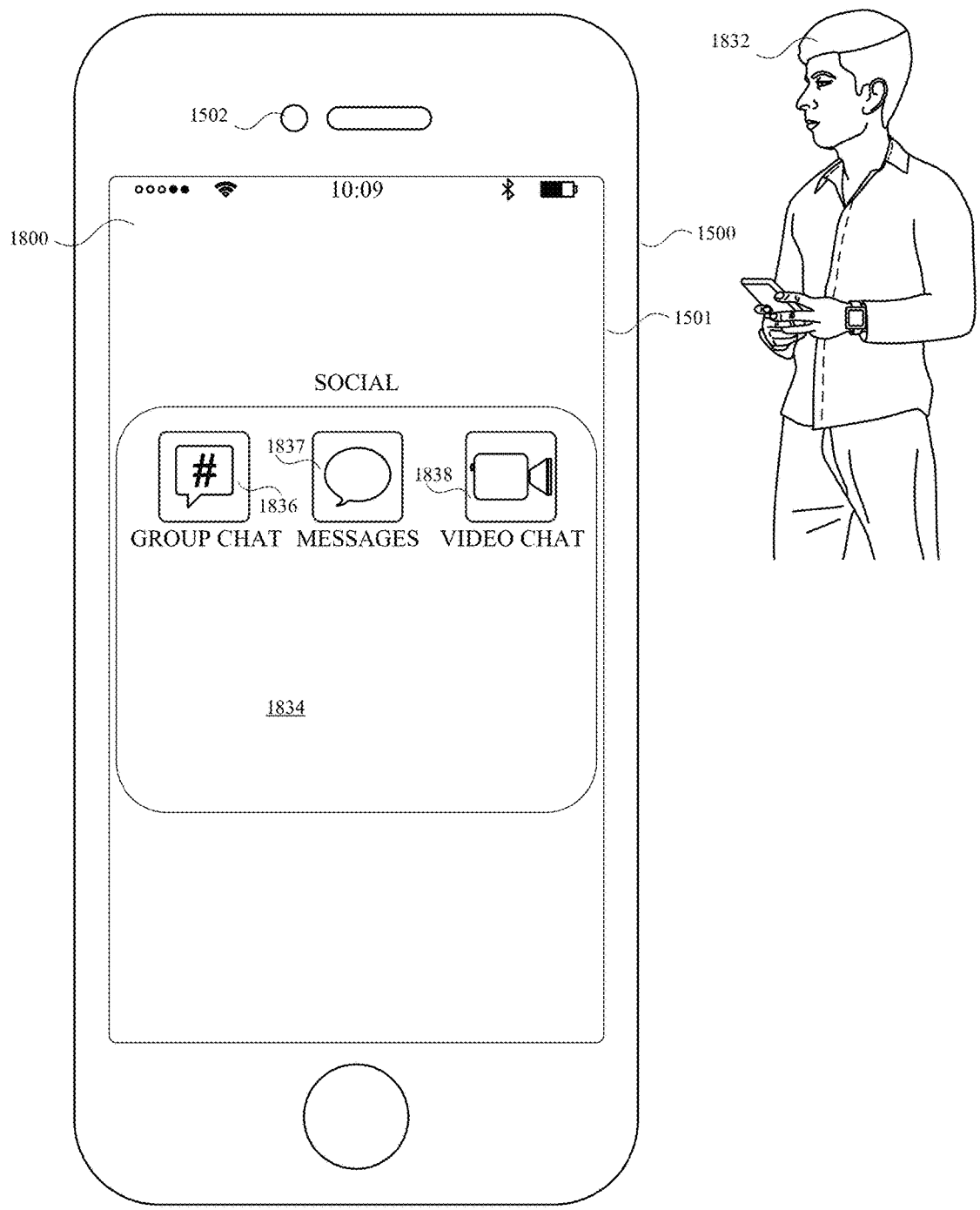
Figure 18K:
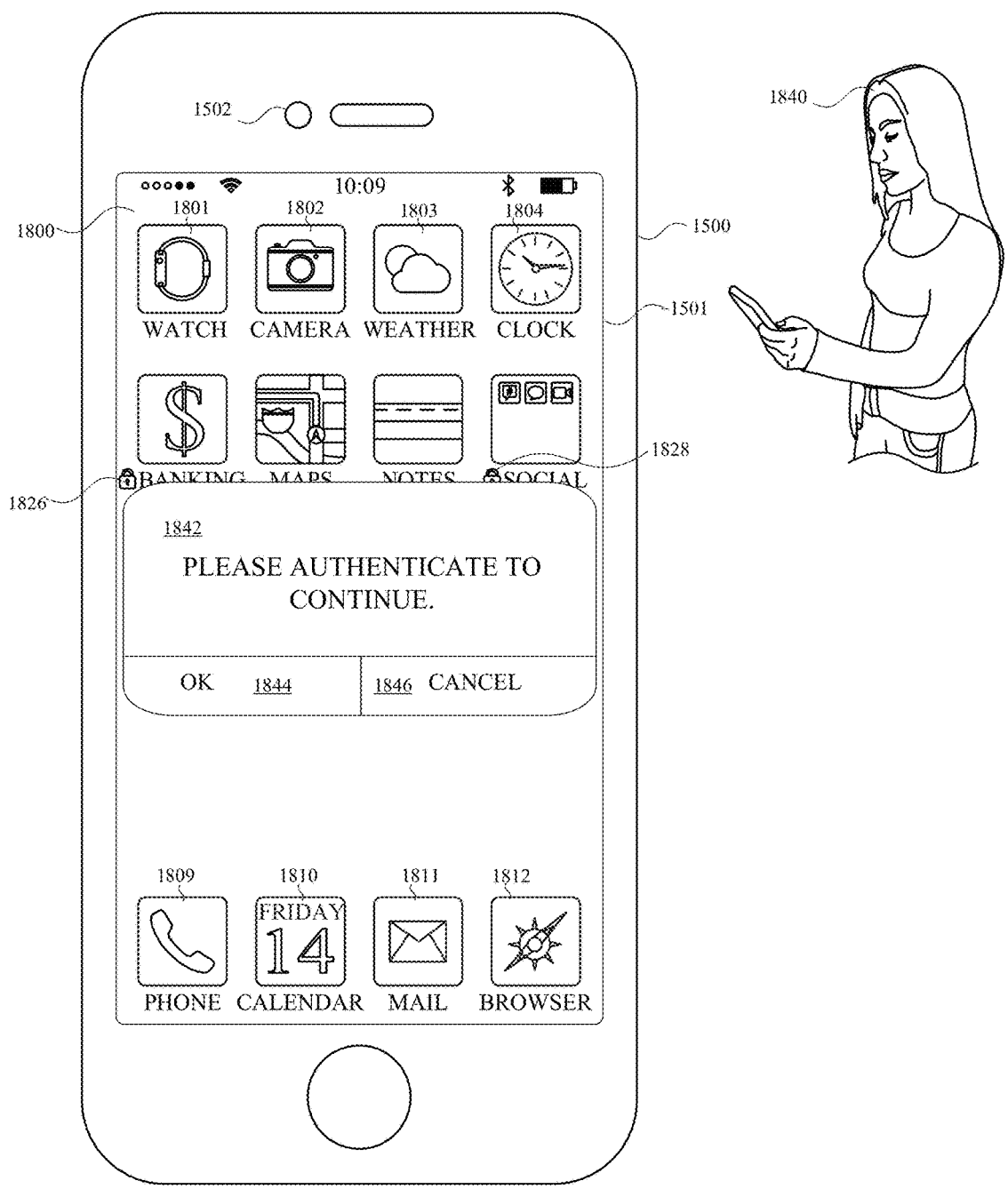
Figure 18L:
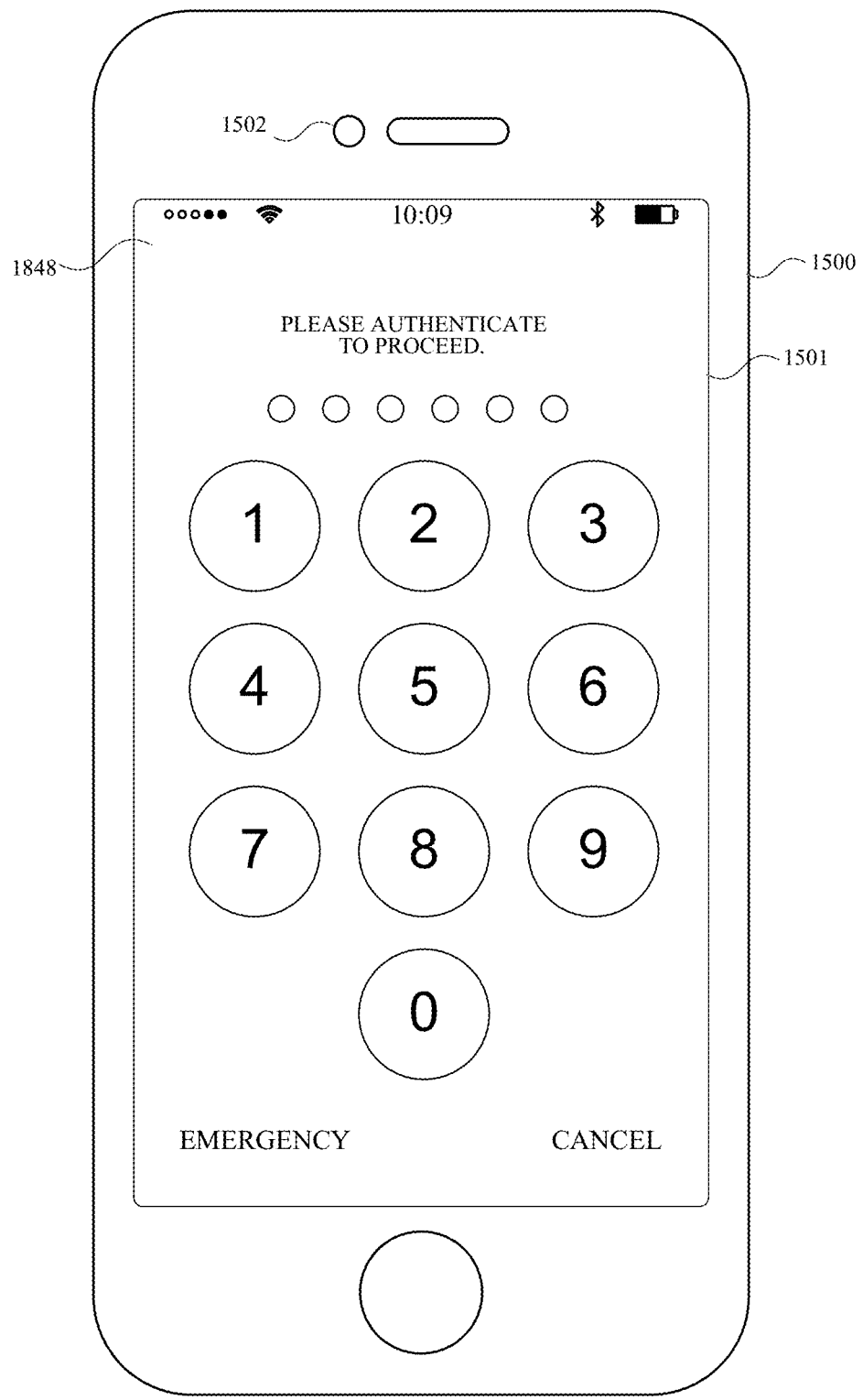
Figure 19A:
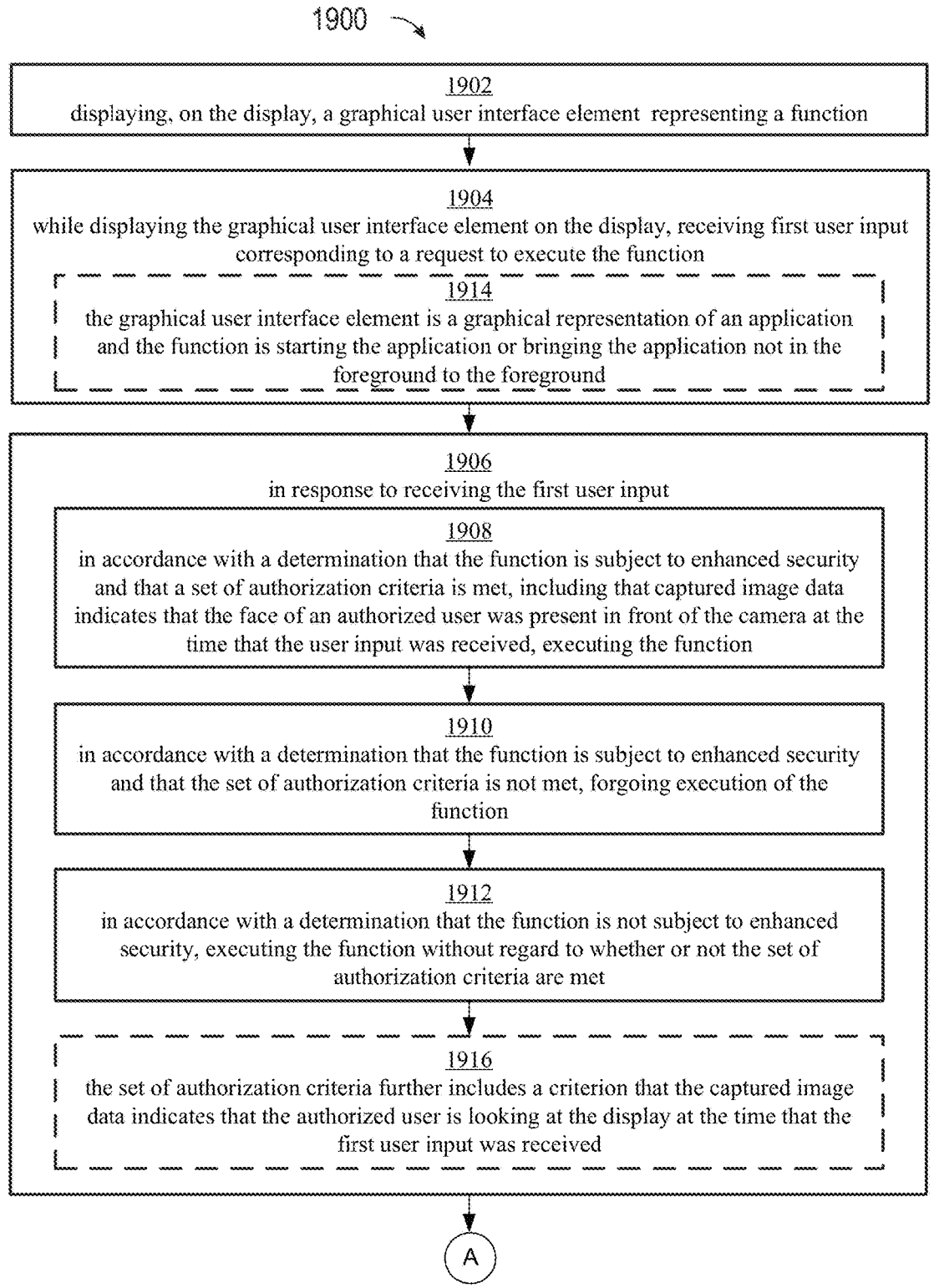
FIGS. 19A-19B are a flow diagram illustrating a method for enhancing security and/or privacy an electronic device based on captured image data.
Figure 19B:
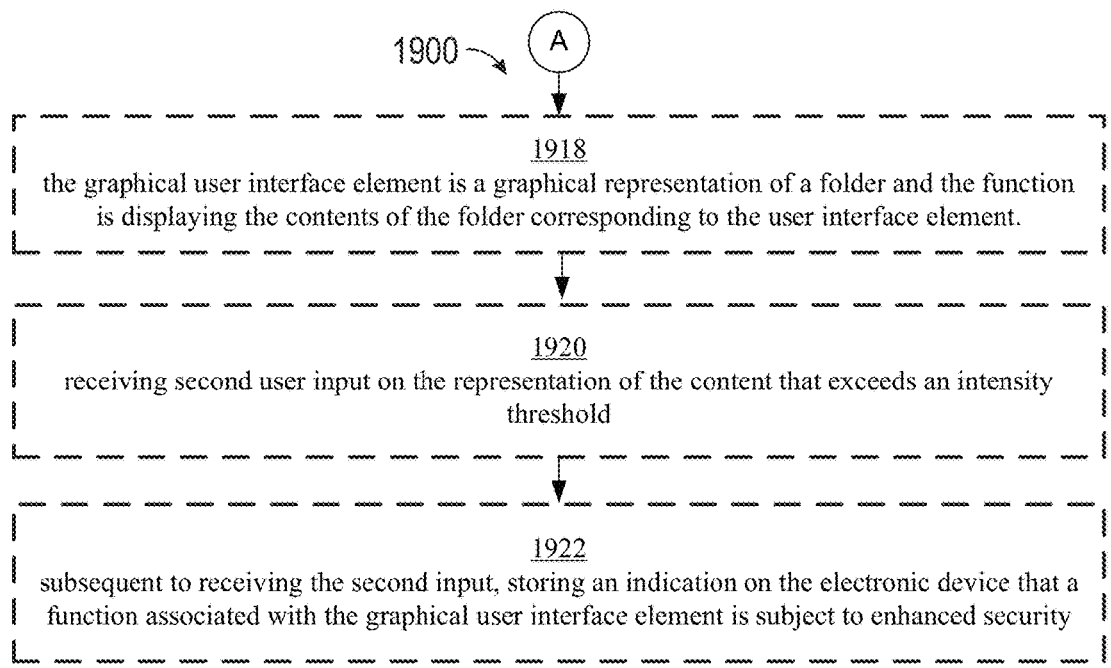

FIGS. 18A-18L illustrate exemplary user interfaces for enhanced security of functions associated with graphical elements of a user interface. FIGS. 19A-19B are a flow diagram illustrating methods for enhanced security of functions associated with graphical elements of a user interface in accordance with some embodiments. The user interfaces in FIGS. 18A 18L illustrate the processes described below, including the processes in FIGS. 17A-17B.

FIG. 18A depicts device 1500 (see FIGS. 15A-15F), which in some examples is a specific form factor for device 100, device 300, or device 500 described above. Device 1500 includes display 1501, which is a touch-sensitive display, and camera 1502 (described with respect to FIGS. 15A-15F). Additionally, in some embodiments of device 1500, additional sensors and/or other components (e.g., flash or IR emitter) are present along with camera 1502.

In FIG. 18A, device 1500 is displaying home screen interface 1800 that includes graphical elements in the form of icons 1801-1812. Icons 1801-1807 and 1809-1812 correspond to applications on device 1500. For example, icon 1802 corresponds to a camera application and icon 1805 corresponds to a banking application. Icon 1808 corresponds to a folder containing additional icons corresponding to other applications on device 1500 (see FIG. 18J). In response to user input selecting (e.g., a tap gesture) one of the icons corresponding to an application, device 1500 interprets the user input as a request to display the corresponding application by either executing the application or bringing the application to the foreground if the application was previously executed but is now in the background.

In FIG. 18B, gesture input is received on touch-sensitive display 1501 in the form of contact 1814 on icon 1805. If the gesture input is a tap gesture, then the banking application that corresponds to icon 1805 is displayed. On the other hand, if the gesture input meets criteria, such as contact intensity criteria as described with respect to FIGS. 18C and 18D or contact time criteria, other actions are performed with respect to icon 1805, such as displaying a menu for functions associated with icon 1805, or the application corresponding to icon 1805, as depicted in FIG. 18E.

FIG. 18C depicts the response of user interface 1800 to contact 1814 meeting a first contact intensity threshold criteria. Specifically, indication 1816 is displayed to indicate that contact 1814 has reached the first threshold. Additionally, the rest of user interface 1800 is optionally changed (e.g., blurred or grayed out) to indicate that the contact intensity has passed the first threshold and corresponds to icon 1805.

FIG. 18D depicts the response of user interface 1800 to contact 1814 meeting a second contact intensity threshold that is greater than the first threshold. Specifically, menu 1818 is displayed for icon 1805. Menu 1818 includes two affordances: share button 1820 and lock button 1822.

Subsequent to contact 1814 meeting or surpassing the second threshold and after contact 1814 ceases to be in contact with touch-sensitive display 1501, menu 1818 remains displayed to enable a user to select one of the menu buttons. In some embodiments, in response to user input (e.g., a tap gesture) selecting share button 1820, an additional menu is displayed providing options for sharing the application corresponding to icon 1805 or data associated with the application.

In response to user input (e.g., a tap gesture represented by contact 1824 of FIG. 18F) selecting lock button 1822, data is stored on device 1500 indicating that the function, application, or other data associated with icon 1805 is subject to enhanced security. For example, in the case of FIG. 18F, a security flag or other data is stored to indicate that display of the banking application corresponding to icon 1805 is subject to enhanced security.

FIG. 18G depicts user interface 1800 after selection of lock button 1822 of FIG. 18F. Specifically, lock indication 1826 is now displayed with icon 1805 to indicate to the user that a function associated with icon 1805 is subject to enhanced security.

FIG. 18H depicts user interface 1800 after device 1500 has received user input indicating that a function associated with icon 1808 corresponding to the "SOCIAL" folder is subject to enhanced security. For example, the same or a similar process described with respect to assigning enhanced security for a function associated with icon 1805 is also applied to icon 1808. In FIG. 18H, lock indication 1828 is displayed with icon 1808 to indicate to the user that a function associated with icon 1808 is subject to enhanced security.

In FIG. 18I, gesture input in the form of contact 1830 is received on icon 1808. If the gesture input is a tap gesture, device 1500 determines whether the requested function associated with icon 1808 (e.g., displaying the contents of the folder) is subject to enhanced security. For example, if a security flag or other security indication stored on device 1500 (e.g., in a database or elsewhere) is present for icon 1808 or the corresponding folder, then device 1500 determines that the requested function is subject to enhanced security and performs further analysis as described below before determining whether to perform the requested function. Otherwise, device 1500 determines that the requested function is not subject to enhanced security and performs the requested function (e.g., device 1500 displays the contents of folder 1808 as depicted in FIG. 18J).

In response to determining that the requested function is subject to enhanced security device, device 1500 analyzes image data captured with camera 1502. Device 1500 further determines whether a set of one or more authorization criteria is met based on the analysis of the captured image data. For example, if the set of one or more authorization is a single criterion that requires the face of an authorized user in be in the captured image data, device 1500 will analyze the captured image data to determine whether the face of an authorized user is present. If the face of an authorized user is present (e.g., as represented by scene 1832 of FIG. 18J corresponding to FIG. 15B), device 1500 will perform the requested function, as depicted in FIG. 18J (e.g., display contents 1834 of the selected folder, which includes icons 1836-1838 in FIG. 18J). If the face of the authorized user is not present (e.g., as represented by scene 1840 of FIG. 18K corresponding to FIG. 15D), device 1500 will prompt the user to perform additional authentication, as depicted in FIG. 18K. Specifically, FIG. 18K depicts message 1842 that prompts the user to authenticate in order to complete the requested function. If the user selects OK button 1844, the device 1500 causes touch-sensitive display 1501 to display authentication interface 1848, as depicted in FIG. 18L. If the user selects CANCEL button 1846, device 1500 returns user interface 1800 to the state depicted in FIG. 18H.

In some embodiments, electronic device 1500 responds to the set of one or more authorization criteria not being met in a different manner. For example, electronic device 1500 optionally prompts the user to authentic via a specific method (e.g., fingerprint), prompts the user to position their face in view of the front facing camera, causes the device to enter a locked state, or ignores the request to perform the function.

While the set of one or more authorization criteria above included only a single criterion the face of an authorized user in be in the captured image data, in other embodiments, the set of one or more authorization criteria includes a different criterion or multiple criteria. As an example, the set of one or more authorization criteria includes a criterion met when an authorized user's face is present in the captured image data and the authorized user is looking at the device. In another example, the set of one or more authorization criteria includes a criterion that an authorized user's face is in the captured image data and no unauthorized or unrecognized users' faces are in the captured image data (e.g., the scene represented in FIG. 15F would not meet this criterion). In another example, the set of one or more authorization criteria only requires that the field of view of the camera not include a face of any unauthorized users (e.g., the scenes represented by FIGS. 15A-15C and 15E would meet this meet this criterion).

While FIGS. 18A-18L depicts one example with respect to displaying an application or the contents of a folder from a home screen, a similar process could be applied to any number of user interfaces, such as a photo album interface, messaging interfaces, a file manager interface, a music or video interface, or any other interface. Similarly, while the example function discussed above is a display or view action, the same process can apply to any number of other actions. Examples of possible actions include deleting content, erasing content, sending content, moving content, changing status of content (e.g., marking a read), discarding content, turning off the device, uninstalling an application, resetting an application, changing a setting of the device, changing a setting of an application or the OS on the device, or other actions.

FIGS. 19A-19B are a flow diagram illustrating a method for enhanced security of functions associated with graphical elements of a user interface in accordance with some embodiments. Method 1700 is performed at a device (e.g., 100, 300, 500, 1500) with a display and a camera. Some operations in method 1900 are, optionally, combined, the order of some operations are, optionally, changed, and some operations are, optionally, omitted.

As described below, method 1900 provides an intuitive way for enhanced security of functions associated with graphical elements of a user interface. The method reduces the cognitive burden on a user for enhanced security of functions associated with graphical elements of a user interface, thereby creating a more efficient human-machine interface. For battery-operated computing devices, enabling a user to enhance security of functions associated with graphical elements of a user interface faster and more efficiently conserves power and increases the time between battery charges.

An electronic device (e.g., 1500) having a display (e.g. 1501) and a camera (e.g., 1502) (e.g., a camera that includes one or more visible light sensors, IR sensors, time of flight sensors, or combination of these and other sensors) displays (1902), on the display, a graphical user interface element (e.g., 1808) (e.g., an application icon, a folder icon, an affordance, content) representing a function (e.g., execute an application, bring a running application to the foreground, view the contents of a folder, change the value of a setting, view content, navigate away from content). In some embodiments, the device is already in an unlocked state (e.g., FIG. 18A).

While displaying the graphical user interface element on the display, the electronic device receives (1904) first user input (e.g., a touch input (e.g., 1830), such as a gesture on a touch-sensitive surface, a mechanical button input, such as on a conventional keyboard, mouse input, voice input, or some other type of input) corresponding to a request to execute the function.

In response to receiving (1906) the first user input (e.g., 1830) and in accordance with a determination that the function (e.g., the function associated with icon 1808) is subject to enhanced security (e.g., the function is associated with a security flag or a setting indicating that authorization criteria should be checked prior to executing the function) and that a set of authorization criteria is met, including that captured image data (e.g., visible light data, IR light data, time of flight data, depth data, or combination of these or other types of data captured from the camera on the electronic device) indicates that the face of an authorized user was present in front of the camera at the time that the user input was received (e.g., FIGS. 15A-15B and 15F), the electronic device executes (1908) the function (e.g., displaying 1834 in FIG. 18J). In some embodiments, the set of authorization criteria includes one criterion or more than one criterion. In some embodiments, examples of authorization criteria include an authorized user is using the electronic device, include an authorized user is looking at the electronic device, an authorized user is using the device without an unauthorized user (or, in some examples, any other user) also using the device, an authorized user is using the device without an unauthorized user (or, in some examples, any other user) looking at the device (or in some examples, near the device), an unauthorized user is not using the device, an authorized user has used the device within a threshold amount of time. Determining whether an authorized user is in front of and looking the electronic device ensures that actions are not inadvertently performed by errant inputs and are not performed by people unauthorized to use the device. This provides for better data security and data privacy. Additionally, by having the authentication and verification performed based on captured image data, the interface of the electronic device is improved by requiring fewer user inputs to authenticate and verify actions performed on the device. Further, by applying the enhance security function on an element-by-element basis, the computing requirements of the electronic device thereby making the electronic device more efficient, which, for example, improves battery life. In accordance with a determination that the function is subject to enhanced security and that the set of authorization criteria is not met, the electronic device forgoes (1910) execution of the function (e.g., FIG. 18K). In accordance with a determination that the function is not subject to enhanced security, the electronic device executes (1912) the function without regard to whether or not the set of authorization criteria are met (e.g., FIG. 18J)

In some embodiments, the electronic device captures the captured image data (e.g., image data corresponding to scene 1832) with the one or more image sensors at a time that corresponds to a time at which the first user input was received. In some embodiments, the image data is captured before receiving the user input, the image data is captured after receiving the user input, in response to receiving the user input, in response to a determination that the user input corresponds to a request for a destructive action to data, some combination of the forgoing, or at some other time based on other factors. Capturing image data at the time the first user input was received increases the likelihood that the user responsible for the first user input is present in the captured image data. Increasing the chance that the captured image data includes the user providing the first user input enhances the operability of the device and makes the user-device interface more efficient (e.g., by allowing the device to determine whether captured image data of the user responsible for the first user input meets authorization criteria and avoid inadvertent or unauthorized actions when operating/interacting with the device) which, additionally, reduces power usage and improves battery life of the device by enabling the user to use the device more quickly and efficiently.

In some embodiments, the set of authorization criteria (1916) further includes a criterion that the captured image data indicates that the authorized user is looking at the display at the time that the first user input was received (e.g., FIG. 15A). By ensuring that the user is looking at the display of the electronic device, there is a higher chance that a false positive could occur. For example, if a user is present in captured image data, it may appear that the user is using the electronic device, but the presence of the user does not guarantee that the user is actually using the electronic device. Instead, the user's attention could be elsewhere. Determining whether the user is present in the captured image data and actually looking at the display of the electronic device increases the probability that the user is actually using the electronic device. This improves the security of the data on the device and ensures that actions are not performed inadvertently when the user is not actually using the electronic device.

In some embodiments, the graphical user interface element (1914) is a graphical representation of an application (e.g., an application icon, icon 1805) and the function is starting the application or bringing the application not in the foreground to the foreground. Applying enhanced security to an application allows better protection of the data (local and remote) that is accessible through the application. Providing enhanced security for the user enhances the operability of the device and makes the user-device interface more efficient (e.g., by helping the user to achieve an intended result by better protecting access to sensitive data and reducing user mistakes when operating/interacting with the device) which, additionally, reduces power usage and improves battery life of the device by enabling the user to use the device more quickly and efficiently.

In some embodiments, the graphical user interface element (1918) is a graphical representation of a folder (e.g., 1808) (e.g., a folder icon) and the function is displaying the contents of the folder corresponding to the user interface element (e.g., FIG. 18J). In some embodiments, the electronic device displays a graphical user interface (e.g., 1800) (e.g., a home screen of the electronic device) and the graphical user interface element is an icon for a folder. For example, the folder can contain icons for one or more applications (e.g., 1836-1838) or one or more data items, such as photos, text documents, emails, music, video, etc. Before the contents of the folder are display in response to, for example, selecting the folder icon via a touch on a touch-sensitive surface, the set of authentication criteria are checked as described above. If the authentication criteria are met, then the contents of the folder are displayed. If the authentication criteria are not met then the contents of folder are not shown. In some embodiments, the graphical user interface element is alternatively an application icon. Before launching or switching to (if the application has already been executed) the corresponding application in response to, for example, a gesture on a touch-sensitive surface selecting the application icon, the set of authentication criteria are checked as described above. If the authentication criteria are met, then the application is launched if, or the application is brought to the foreground if the application was previously launched. If the authentication criteria are not met then the application is not launched and it is not brought to the foreground even if the application was previously launched. Applying enhanced security to a folder allows for more efficient protection of sensitive applications and content by grouping them together. Providing enhanced security for the user enhances the operability of the device and makes the user-device interface more efficient (e.g., by helping the user to achieve an intended result by better protecting access to sensitive data and reducing user mistakes when operating/interacting with the device) which, additionally, reduces power usage and improves battery life of the device by enabling the user to use the device more quickly and efficiently.

In some embodiments, the determination (based on the captured image data) that the set of authorization criteria is not met includes a determination that the captured image data does not indicate that the face of the authorized user was present in front of the camera at the time that the user input was received (e.g., FIGS. 15C-15E).

In some embodiments, in accordance with the determination (based on the captured image data) that the set of authorization criteria is not met, the electronic device prompts the user to authentic (e.g., 1842) and, optionally, displays an authentication interface (e.g., 1848). In some embodiments, in accordance with the determination (based on the captured image data) that the set of authorization criteria is not met, the electronic device switches to a locked state. In some embodiments, if a set of one or more authorization criteria are not met, for example by the absence of an authorized user in captured image data or failure of some other criterion, then the electronic device switches to a locked stated that limits the functionality of electronic device as compared to the electronic device in a unlocked state.) In some embodiments, in accordance with the determination (based on the captured image data) that the set of authorization criteria is not met, the electronic device prompts the user to authenticate by positioning the user's face in the camera field of view. In some embodiments, if a set of one or more authorization criteria are not met, for example by the absence of an authorized user in captured image data or failure of some other criterion, then the electronic device displays a message box instructing the user to places the user's face in the field of view of the camera. In some embodiments, the message box also instructs the user to look at the camera. Prompting the user to authenticate when authorization criteria are not met provides for the data security and protection benefits described above while also providing for an easy to solution to override the device's determination that the requested action should not be performed (e.g., when the lighting conditions are not sufficient for the device to detect the user in captured image data or the user's appearance has changed so that the device no longer recognizes the user). This technique enhances the operability of the device and makes the user-device interface more efficient (e.g., by helping the user to achieve an intended result by providing a way of overriding the device's determination and reducing user mistakes when operating/interacting with the device) which, additionally, reduces power usage and improves battery life of the device by enabling the user to use the device more quickly and efficiently.

In some embodiments, the electronic device receives (1920) second user input on the graphical user interface element that exceeds an intensity threshold. In response, for example, a menu (e.g., 1818) is displayed with various affordances (e.g., 1820 and 1822) is displayed, such as an affordance corresponding to a request a corresponding icon or application be subject to enhance security (e.g., 1820), an affordance corresponding to a request to share information (e.g., 1822) associated with the content or the content itself, or an affordance corresponding to a request to perform a certain function associated with the content. The electronic device, subsequent to receiving the second input, stores (1922) an indication on the electronic device that a function associated with the graphical user interface element is subject to enhanced security (e.g., in the case of the content being a photo, if a security flag associated with the photo, when any attempt to access the photo, such as viewing, sharing, or deleting the photo, the electronic device will verify that an authorized user is looking at the display of the device before the access is allowed). Optionally, the electronic device also cause to be displayed an indicator (e.g., 1826) to show that the icon or content/application associated with the icon is subject to enhanced security. Allowing a user to enable enhanced security for content and/or actions on the device based on a contact that reaches an intensity threshold reduces the likelihood that a user will inadvertently apply enhanced security to content and/or actions by mistake. Additionally, the intensity threshold still allows the user to quickly apply the enhanced security with a minimum number of interactions with the device. The above enhances the operability of the device and makes the user-device interface more efficient (e.g., by helping the user to achieve an intended result with minimal interactions and reducing user mistakes when operating/interacting with the device) which, additionally, reduces power usage and improves battery life of the device by enabling the user to use the device more quickly and efficiently.

In some embodiments, in response to receiving the second input, the electronic device stores the indication on the electronic device occurs in response to selection of the affordance corresponding to the request for enhanced security.

It should be understood that the particular order in which the operations in FIGS. 19A-19B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1000, 1300, 1700, 2100, 2300, 2500, 2700) are also applicable in an analogous manner to method 1900 described above with respect to FIGS. 19A-19B. For example, the set of authorization criteria and a determination of whether the set of authorization criteria is met described above with reference to method 1900 optionally has one or more of the characteristics of the set of authorization/alert/content-lock criteria and the determination of whether these criteria are met described herein with reference to other methods described herein (e.g., methods 700, 1700, 2100). For brevity, these details are not repeated here.

The operations in the information processing methods described above are, optionally, implemented by running one or more functional modules in an information processing apparatus such as general purpose processors (e.g., as described with respect to FIGS. 1A, 3, 5A) or application specific chips. Further, the operations described above with reference to FIGS. 19A-19B are, optionally, implemented by components depicted in FIGS. 1A-1B. For example, receiving first user input is, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 20A:
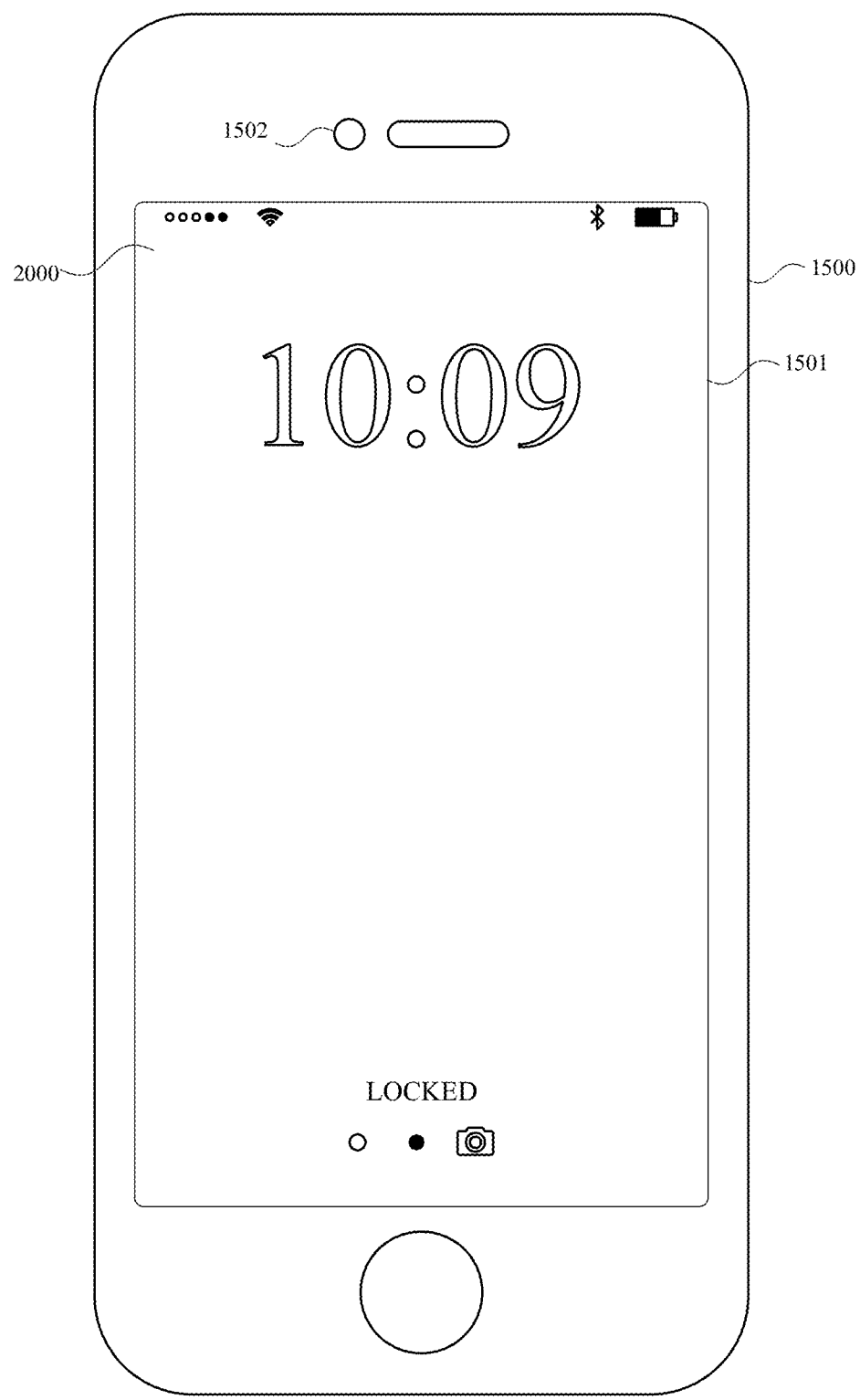
FIGS. 20A-20F illustrate exemplary user interfaces and scenes for processing alert conditions for events on electronic devices.
Figure 20B:
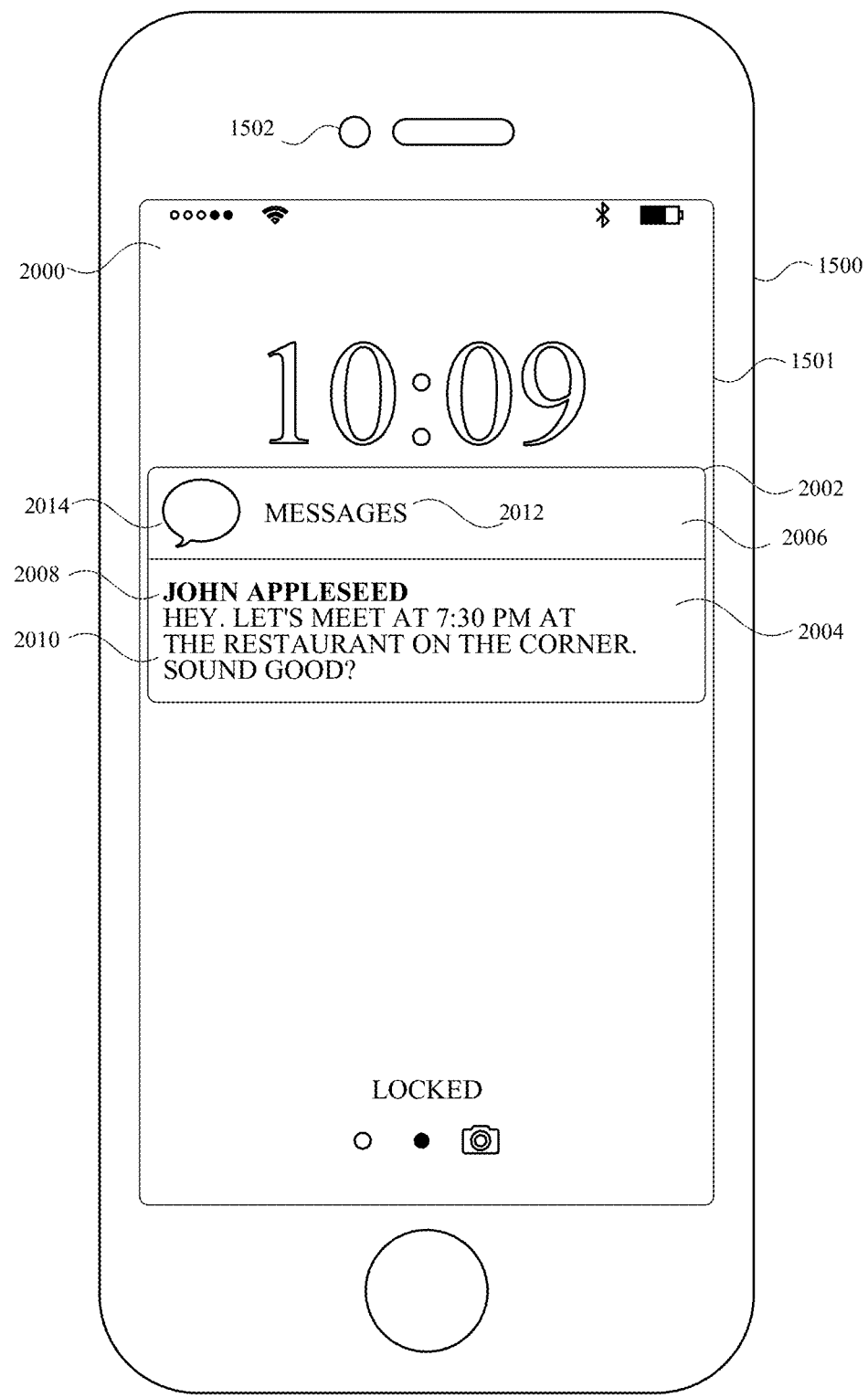
Figure 20C:
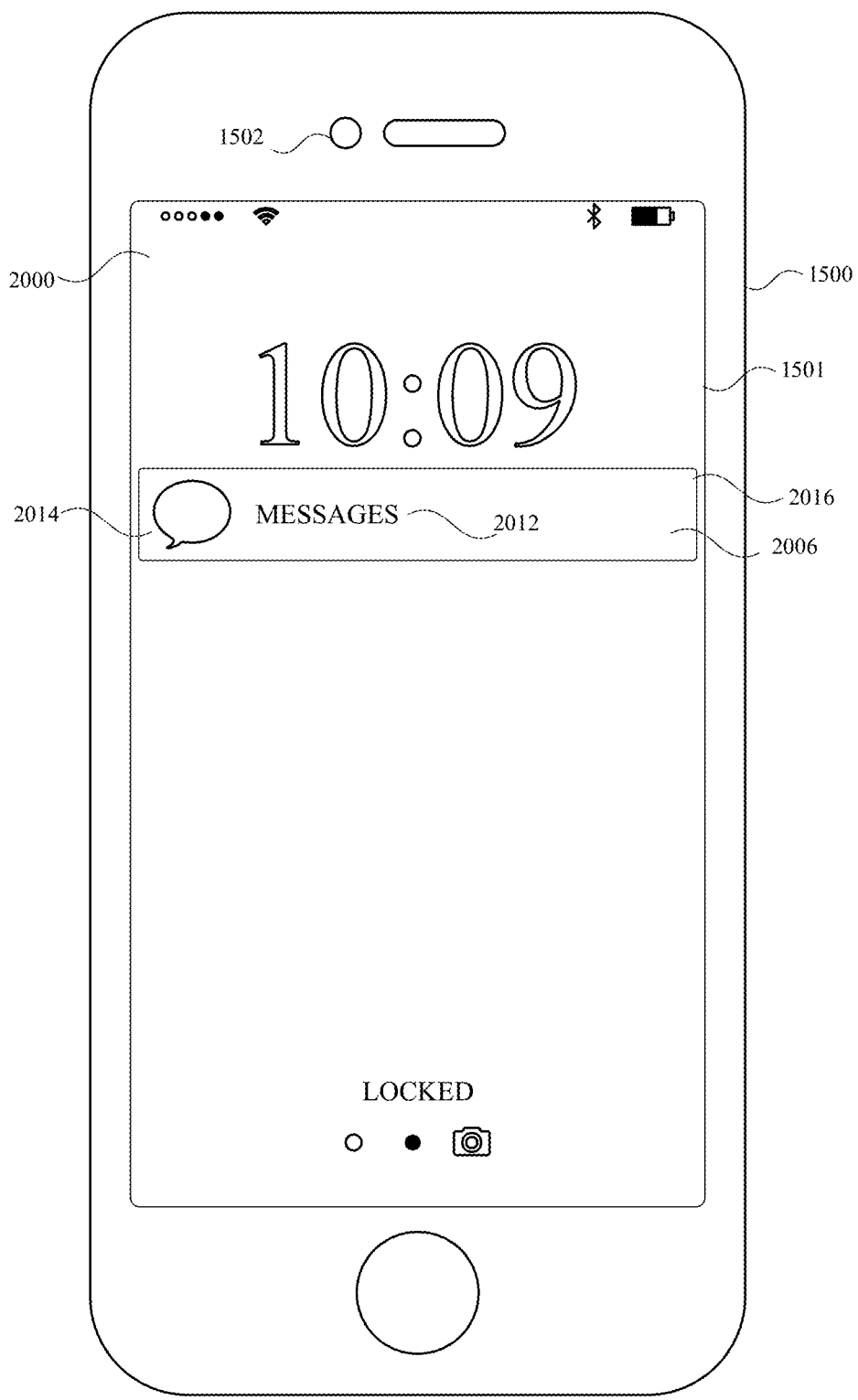
Figure 20D:
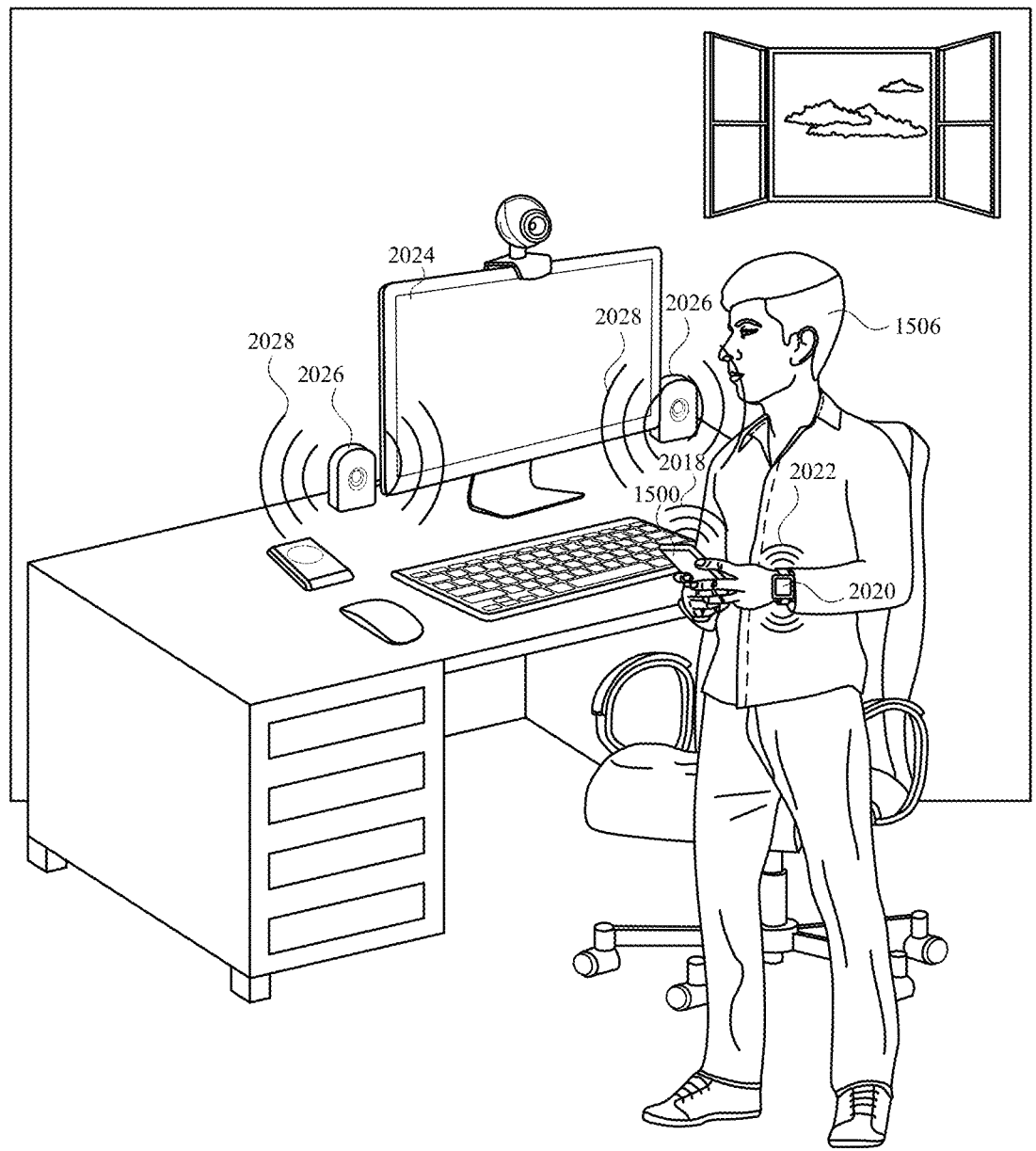
Figure 20E:
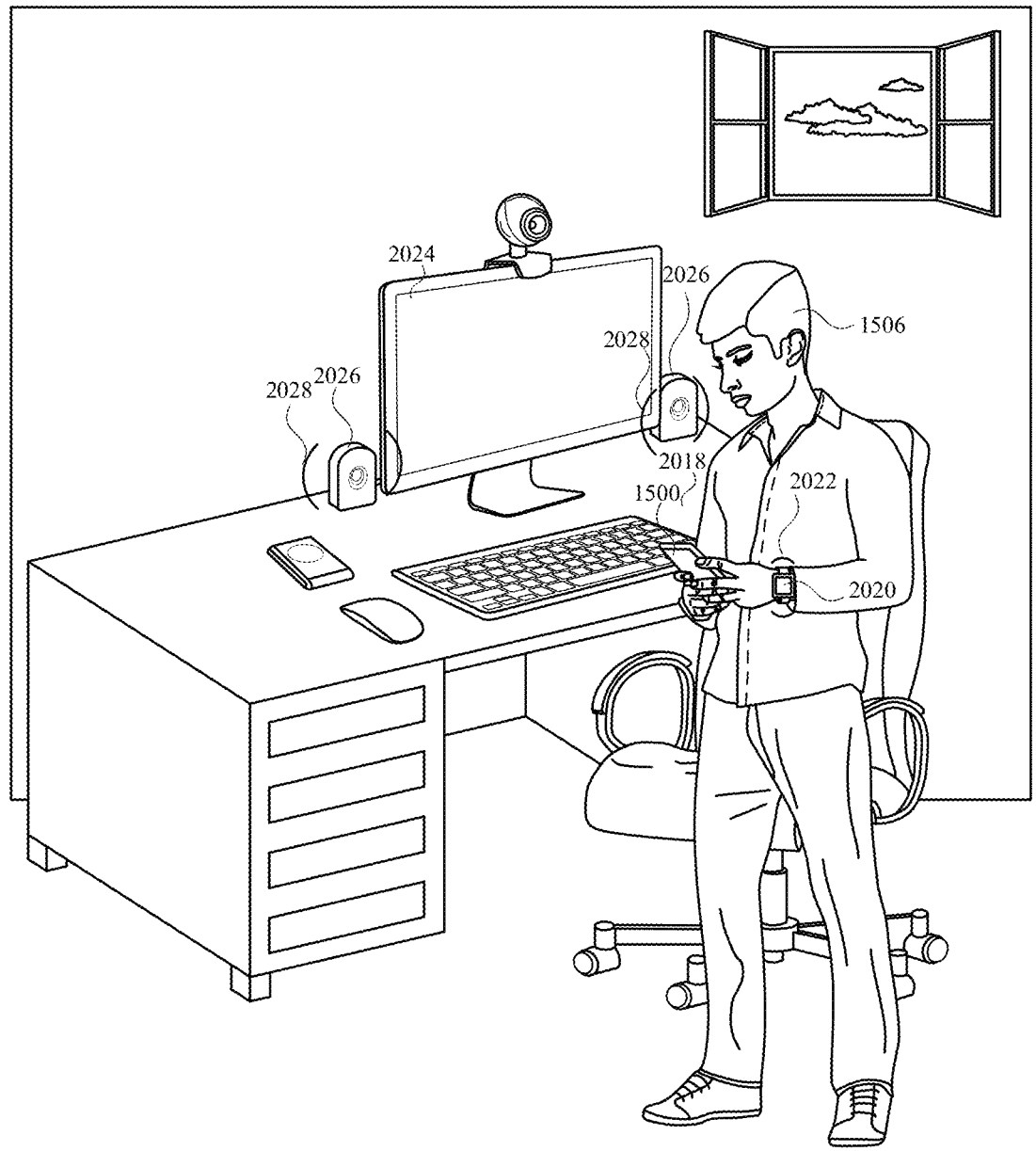
Figure 20F:
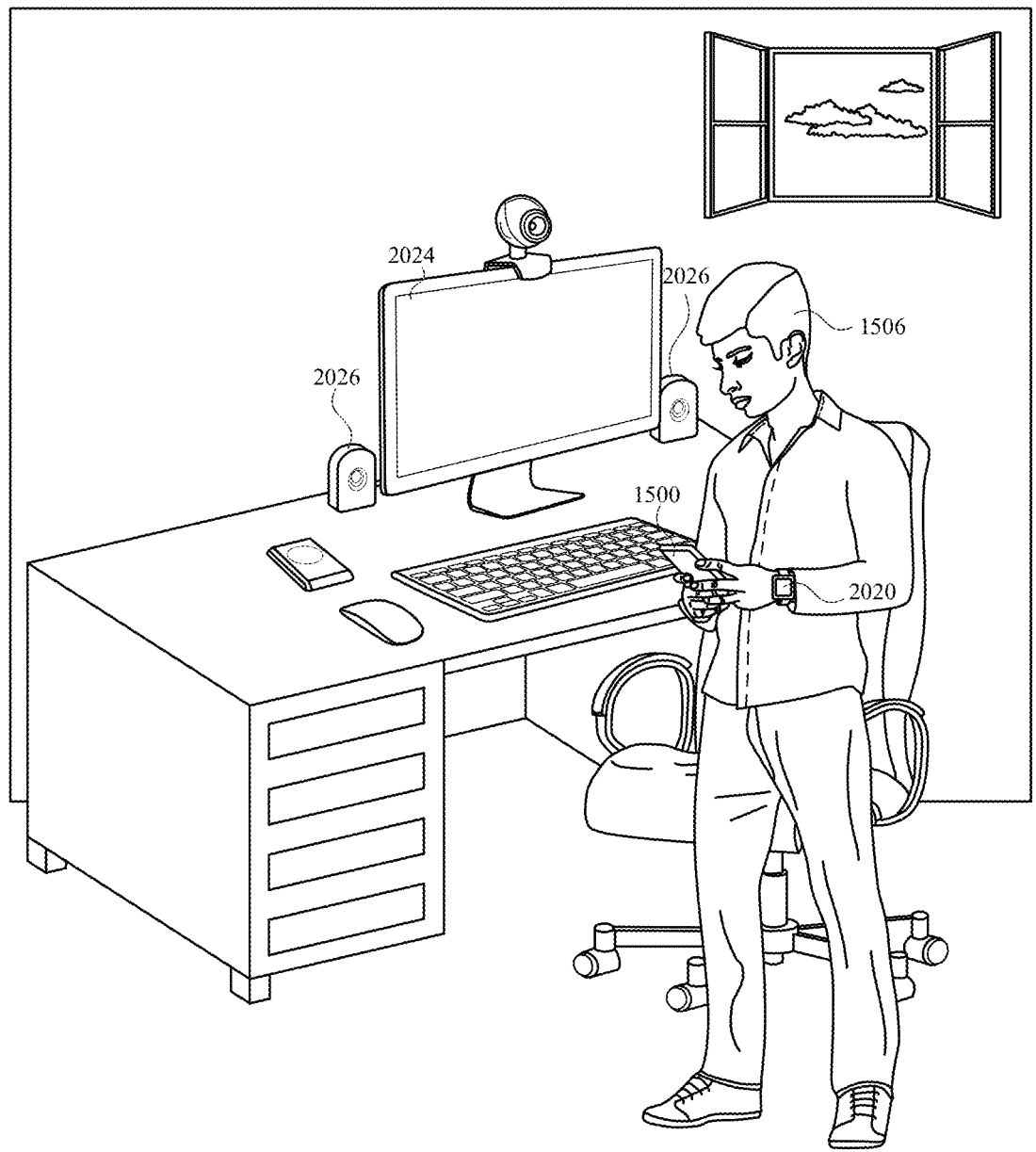
Figure 21A:
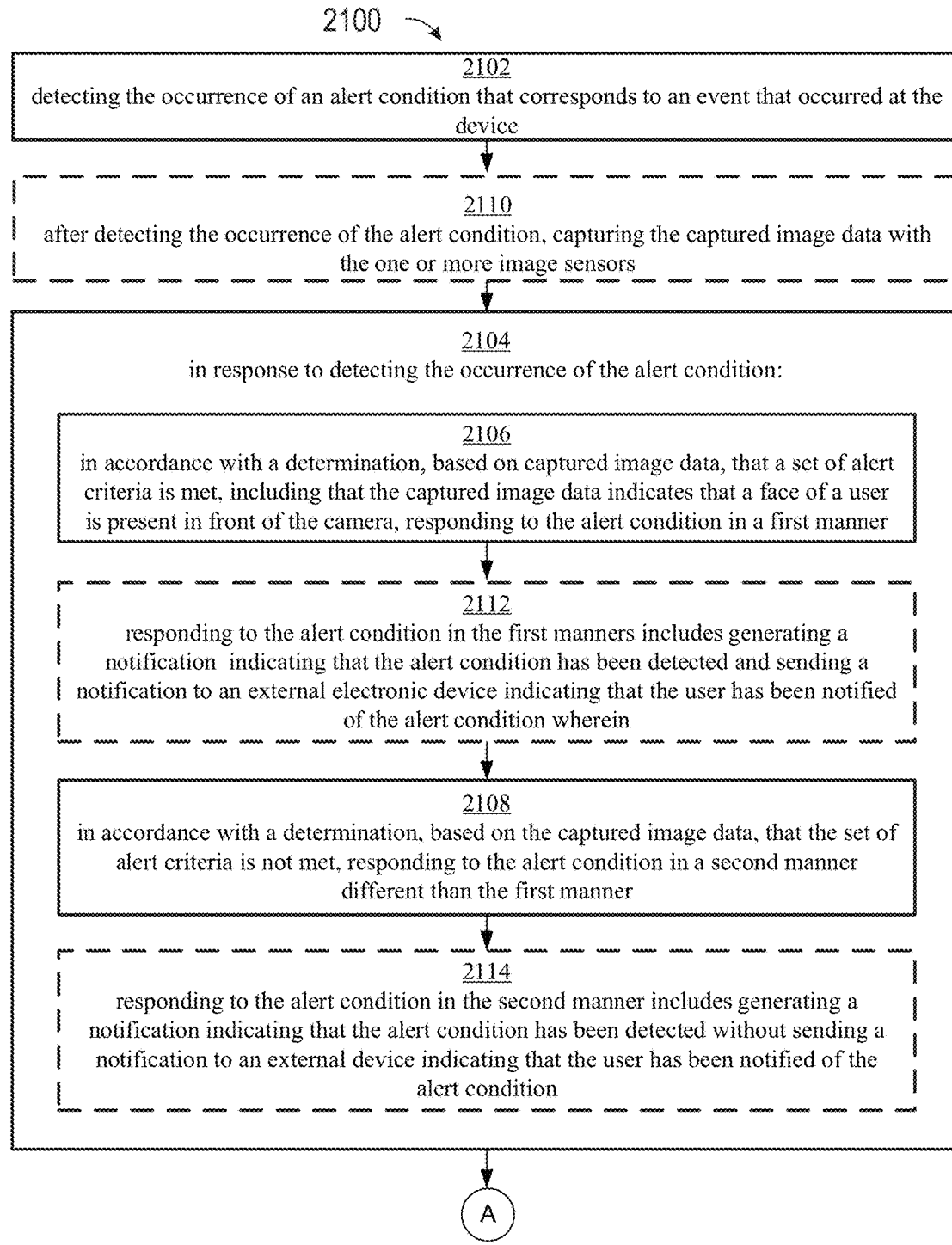
FIGS. 21A-21B are a flow diagram illustrating a method for processing alert conditions for events on electronic devices.
Figure 21B:
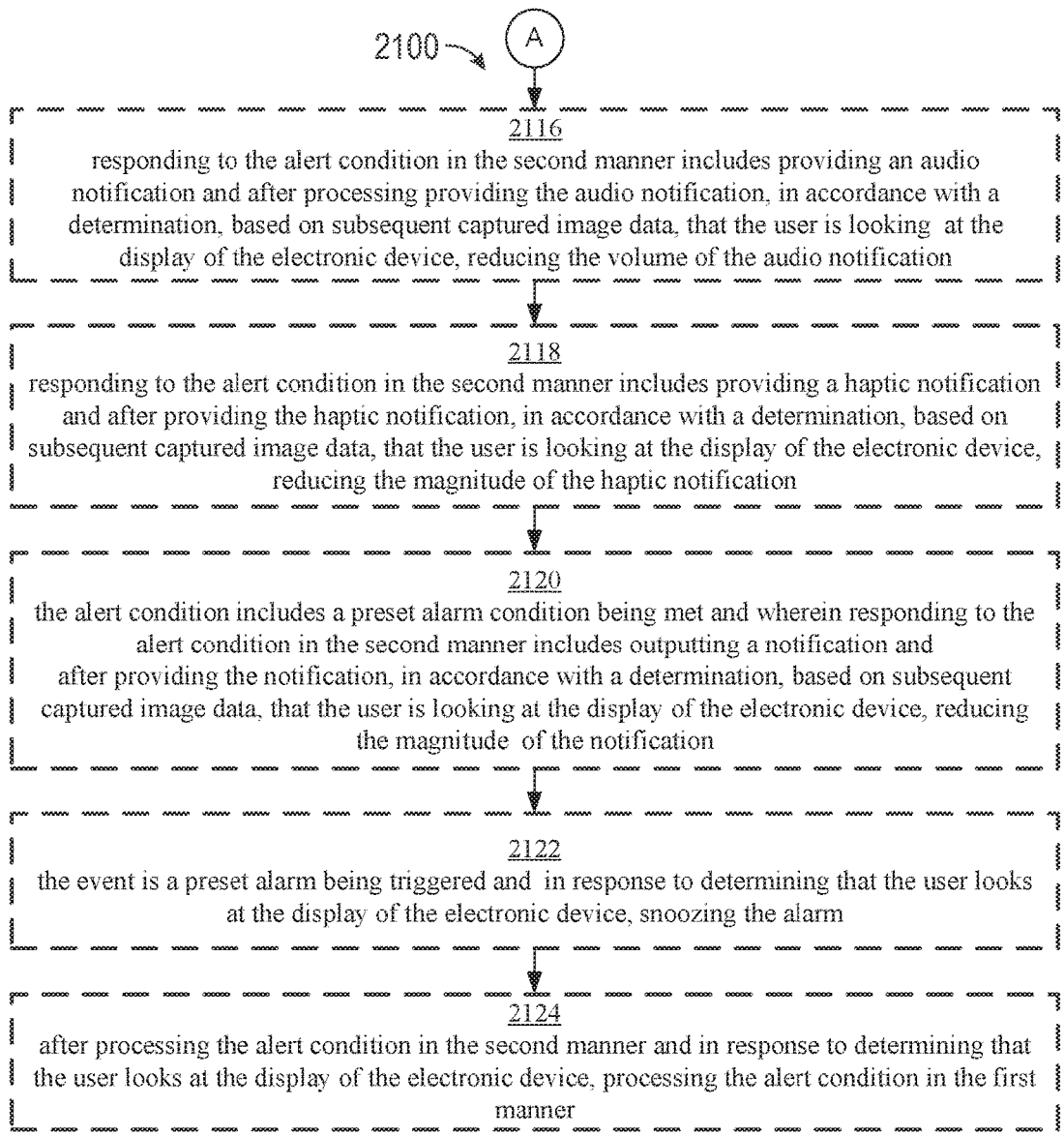

FIGS. 20A-20C illustrate exemplary user interfaces for responding to an alert condition detected at device 1500. FIGS. 20D-20F illustrate scenes depicting examples of responding to an alert condition detected across multiple devices. FIGS. 21A-21B is a flow diagram illustrating methods for responding to an alert condition. The user interfaces in FIGS. 20A 20C and scenes in FIGS. 20D-20F illustrate the processes described below, including the processes in FIGS. 21A-21B.

FIG. 20A depicts device 1500 (see, e.g., FIGS. 15A-15F), which in some examples is a specific form factor for device 100, device 300, or device 500 described above. Device 1500 includes display 1501, which in some embodiments is a touch-sensitive display, and camera 1502 (described with respect to FIGS. 15A-15F). Additionally, in some embodiments of device 1500, additional sensors and/or other components (e.g., flash or IR emitter) are present along with camera 1502.

In FIG. 20A, device 1500 is displaying lock interface 2000 on display 1501. Device 1500 displays lock interface 2000 when device 1500 is in a locked stated. In some embodiments, when device 1500 is in a locked state, the functionality of device 1500 is restricted as compared to the full functionality of device 1500. In one example, when in a lock state, device 1500 allows for access to the camera program and for emergency calls but access to all other functionality is disabled or prevented. Although lock interface 2000 is used as an example, the processes described here to respond to alert conditions can also be applied to other interfaces, such as a home screen interface or application interfaces.

When device 1500 detects an alert condition, device 1500 determines how to respond to the alert condition based on analysis of captured image data (e.g., image data captured from camera 1502). In some embodiments, the alert condition corresponds to an event that occurred on device 1500. Examples of events include receiving notifications (e.g., social media or news notifications), alarms/timers being triggered (e.g., based on a time or location), and receiving communications requests (e.g., audio/video communication requests). An example of an alert condition is an alert that is generated from the occurrence of any of these example events. In the case of the example depicted in FIGS. 20A-20C, the alert condition corresponds to an alert generated from receipt of a new message at device 1500.

After detecting the occurrence of the alert condition corresponding to the receipt of the message, device 1500 determines how to respond to the alert condition based on captured image data and whether a set of one or more alert criteria are met. If the set of one or more alert criteria are met, device 1500 responds in a first manner (e.g., displaying or communicating the alert using a predetermined technique). If the set of one or more alert criteria are not met, device 1500 responds in a second manner (e.g., forgoing display or communication of the alert).

In one example, the set of one or more alert criteria includes criterion that is met when an authorized user's face is present in the captured image data and the captured image data indicates that the authorized user is looking at the device (this is, in some embodiments, processed as two criteria), which corresponds to the scene in FIG. 15A. If device 1500 determines that, based on analysis of the captured image data, that this criterion is met, then device 1500 responds to the alert condition corresponding to the receipt of the message in a first manner, by displaying a notification on lock screen interface 2000, such as depicted in FIG. 20B. In FIG. 20B, device 1500 causes notification 2002 to be displayed. Notification 2002 includes notification summary area 2004 and application identification area 2006. Notification summary area 2004 includes remote user identification 2008 (e.g., a sender of the message) and message summary 2010 (e.g., an excerpt of the message when the message is long or the entire message when the message is short). Application identification area 2006 includes application identification 2012 (e.g., the application for which the received message is intended) and application icon 2014 (e.g., a graphical element correspond to the application identified by application identification 2012).

In the above example, if device 1500 determines that the captured image data indicates that a face of an authorized user is not present or that the face of an authorized user is present but that the authorized user is not looking at device 1500, then the set of one or more alert criteria is not met. In this case, device 1500 responds to the alert condition corresponding to receipt of the message in a second manner, different than the first manner, by displaying a different notification on lock screen interface 2000, such as depicted in FIG. 20C. In. FIG. 20C, device 1500 causes notification 2016 to be displayed, which is similar to notification 2002 of FIG. 20B except notification 2016 contains only application identification area 2006. In some embodiments, notification 2016 contains more (e.g., a sender or a time) or less information (e.g., no identification of the application that corresponds to the received message).

In addition to a visible notification on device 1500 (such as those in FIGS. 20B and 20C), device 1500 may also respond to an alert condition with an audible or haptic alert. Additionally, other devices associated with the user may also detect alert conditions corresponding to the same event that occurred at device 1500. For example, in FIG. 20D, device 1500 is responding to a detected alert condition corresponding to receipt of a message by providing feedback 2018 (e.g., haptic or audible feedback). Additionally, watch 2020 and computer 2024 (which has speakers 2026) are responding to a similar alert condition corresponding to receipt of the same message by providing feedback 2022 (e.g., haptic or audible feedback) and audible feedback 2028, respectively. The response depicted in FIG. 20D is based on a determination (e.g., by device 1500) that user 1506 is not looking device 1500 or, in some embodiments, any other device. Optionally, this determination is made as part of the determination of whether the set of one or more alert criteria are met or is made as part of a separate determination with one or more different criteria (e.g., whether an authorized user is looking at the device).

FIG. 20E depicts the same scene as in FIG. 20D, except that user 1506 is now looking at device 1500. In response to device 1500 analyzing captured image data and determining that user 1506 is now looking at device 1500 or that user 1506 has been looking at device 1500 for a predetermined amount of time, device 1500 sends data to watch 2020 and computer 2024 indicating that user 1506 has seen the notification on device 1500 or that feedback 2020 and audible feedback 2028 should be reduced. In response, watch 2020 and computer 2024 reduce the intensity (e.g., volume or amplitude) of the feedback that is being provided, as depicted in FIG. 20E. Alternatively, or after user 1506 has looked at device for a further threshold of time, device 1500 sends data to watch 2020 and computer 2024 indicating that user 1506 has seen the notification on device 1500 for a threshold amount of time or that feedback 2020 and audible feedback 2028 should be eliminated. In response, watch 2020 and computer 2024 stop providing the feedback, as depicted in FIG. 20F.

In some embodiments, device 1500 responds to the alert condition in other manners, such as changing the status of an item (e.g., marking an email message read), sending a communication regarding the status of an item (e.g., sending a read receipt), powering on the display (e.g., turning on the display when the user is looking at the device or in the field of view of the camera but not turning on the display if the user is not present in the field of view of the camera), or forwarding a notification of the alert to a different device.

FIGS. 21A-21B are a flow diagram illustrating a method for responding to an alert condition detected at an electronic device in accordance with some embodiments. Method 2100 is performed at a device (e.g., 100, 300, 500, 1500) with a display and a camera. Some operations in method 2100 are, optionally, combined, the order of some operations are, optionally, changed, and some operations are, optionally, omitted.

As described below, method 2100 provides an intuitive way for responding to an alert condition detected at an electronic device. The method reduces the cognitive burden on a user for responding to an alert condition detected at an electronic device, thereby creating a more efficient human-machine interface. For battery-operated computing devices, enabling an electronic device to respond to an alert condition detected at an electronic device faster and more efficiently conserves power and increases the time between battery charges.

An electronic device (e.g., 1500) having a display (e.g., 1501), one or more cameras 1502 (e.g., having a visible light sensor, IR sensor, and/or time of flight sensor) causes the display of a graphical user interface (e.g., 2000) (e.g., an operating system home screen, a lock screen, a photo viewing application, an email application, a web browser application, a map application, or a navigation application). The electronic device detects (2102) the occurrence of an alert condition (e.g., an incoming communication was received or timing or location criteria have been met for some operation such as a calendar event) that corresponds to an event that occurred at the device (e.g., a new message is received (such as an email, text, or other message), a news item is available, a calendar event due or coming due, an alarm expired or was trigged, or a social media notification has been received).

In response (2104) to detecting the occurrence of the alert condition and in accordance with a determination (based on captured image data (e.g., using image analysis, such as facial recognition using visible light data, IR light data, depth image data, and/or other data stored in the captured image data)) that a set of alert criteria is met, the electronic device responds (2106) to the alert condition in a first manner (e.g., display of notification 2002). In some embodiments, the set of alert criteria requires that the captured image data indicates that a face of a user is present in front of the camera (e.g., 15A-15B and 15F). In some embodiments, the set of authorization criteria includes one criterion or more than one criterion. In some embodiments, examples of authorization criteria include an authorized user is using the electronic device, include an authorized user is looking at the electronic device, an authorized user is using the device without an unauthorized user (or, in some examples, any other user) also using the device, an authorized user is using the device without an unauthorized user (or, in some examples, any other user) looking at the device (or in some examples, near the device), an unauthorized user is not using the device, an authorized user has used the device within a threshold amount of time), (e.g., displaying a banner over the graphical user interface (the banner optionally includes content of the notification, a source of the notification, an application associated with the notification, etc.), providing haptic feedback, providing audible feedback, any combination of the forgoing, and/or other actions. In accordance with a determination (based on the captured image data) that the set of alert criteria is not met, the electronic device responds (2108) to the alert condition in a second manner (e.g., display of notification 2016) (e.g., forgoing providing any indication that the notification was received, displaying a banner for the notification without including any details about the content and/or source of the notification) different than the first manner. In some embodiments, the first manner and the second manner are different in at least one step but also have other steps in common. In some embodiments, the first manner and the second manner are different in every step in that no steps are shared between the first manner and the second manner.

By determining whether the user is present before processing an alert condition the man-machine interface is improved, data privacy is increased, and the performance of the electronic device is increased. For example, determining whether a user is present in front of the display of the electronic device before responding to an alert conditions ensures that an appropriate response (e.g., an appropriate notification is displayed or other notification is provided). For example, if the user is present in the captured image data, displaying a notification banner informs the user of the alert condition with a minimal disruption to the user. In contrast, if the user is not present in the captured image data, a haptic or audible notification may be more suitable so that it is more likely that the user is notified of the alert condition. This provides for a more efficient and less distracting man-machine interface. As another example, by ensuring that a user is present before responding to an alert condition in a certain manner (e.g., displaying a notification banner) increases data privacy by ensuring sensitive information is not displayed when the user is not present. Similarly, by avoiding turning on the display and displaying a notification, the performance of the electronic device is increased by reducing power consumption and lengthening battery life.

In some embodiments, after detecting the occurrence of the alert condition, the electronic device captures (2110) the captured image data (e.g., image data of user 1506 of FIG. 20D) with the one or more image sensors. In some embodiments, the image data is captured before detecting the alert condition, the image data is captured after detecting the alert condition, in response to detecting the alert condition, in response to, some combination of the forgoing, or at some other time based on other factors. Capturing image data at the time the alert condition is detected allows for the device to process the alert based on the most currently available information. This enhances the operability of the device and makes the user-device interface more efficient (e.g., by notifying the user in an appropriate manner and providing for better data privacy based on what users are in the captured image data) which, additionally, reduces power usage and improves battery life of the device by enabling not notifying the user in manners that are not useful.

In some embodiments, the set of alert criteria further includes a criterion that the captured image data indicates that an authorized user is using the device. In some embodiments, determining whether the captured image data indicates that an authorized user is using the device is based on whether the authorized user is present in the captured image data (e.g., presence of user 1506 of FIG. 20D). In some embodiments, determining whether the captured image data indicates that an authorized user is using the device is based on a determination of whether authorized user is looking (e.g., FIG. 15B) at the display of the electronic device in the captured image data). Checking a criterion that is met when an authorized user is using the device allows the device to process an alert condition in the most appropriate manner. This enhances the operability of the device and makes the user-device interface more efficient (e.g., by reducing the cognitive burden on the user by not providing a distracting notification when the user is using the device and providing more noticeable notifications when the user is not using the device) which, additionally, reduces power usage and improves battery life of the device by enabling the user to use the device more quickly and efficiently.

In some embodiments, the set of alert criteria further includes a criterion that the captured image data indicates that the user is looking at the display of the electronic device (e.g., FIG. 15B) (e.g., based on an orientation of the face, whether the user's eyes are open, and/or gaze information indicating that the user's eyes are directed toward the display of the device). Checking a criterion that is met when an authorized user is looking at the device allows the device to process an alert condition in the most appropriate manner. This enhances the operability of the device and makes the user-device interface more efficient (e.g., by providing a less distracting, such as a non-audible notification, when the user is looking at the device and providing more noticeable notifications when the user is not looking the device) which, additionally, reduces power usage and improves battery life of the device by enabling the user to use the device more quickly and efficiently.

In some embodiments, responding to the alert condition in the first manner includes displaying a notification corresponding to the alert condition (e.g., displaying a banner (e.g., notification 2002) with information, such as an associated application, an associated user, a summary of the alert condition, or data associated with the alter condition or its corresponding event) about the alert condition across the top of the display over the graphical user interface and responding to the alert condition in the second manner includes delaying display of a notification corresponding to the alert condition until the set of alert criteria are met (e.g., until the electronic device determines that captured image data indicates that an authorized user (or, in some cases, other users) are looking at the display of the electronic device). By basing the response of the electronic device on captured image data, the functionality and performance of the electronic device is improved by enhancing data privacy by only providing information about an alert condition when appropriate (e.g., when an authorized user is present) and by only expending computing resources in appropriate conditions (e.g., when someone is present to receive the information), which conserves battery power.

In some embodiments, the alert condition is receipt of an email or text message (e.g., the message associated with notification 2002) and responding to the alert condition in the first manner includes displaying a notification (e.g., notification 2002) corresponding to the alert condition and marking the email or text message as read and processing the alert condition in the second manner includes displaying a notification corresponding to the alert condition and forgoing marking the email or text message as read. For example, if the alert condition is for an event corresponding to receipt of a new message (such as SMS message, instant message, or chat message), then, in a first manner, a notification is displayed for the new message and the new message is marked as read but, in the second manner, a notification, either the same or different than the notification of the first manner, is displayed for the new message without marking the message as read (e.g., leaving the message marked as unread). By updating the status of a received email or text message based on the captured image data, a user can manage received messages without fewer user inputs (e.g., by simply looking at the electronic device). This provides for a more efficient man-machine interface that allows a user to complete tasks quicker.

In some embodiments, responding to the alert condition in the first manner includes sending a message to a sender of the email or text message that the email or text message has been marked as read (e.g., sending a "read receipt" to the sender indicating that the email or text message has been read by the recipient). Sending a message to a sender of a message when alert criteria are met allows for a more accurate message to be sent. This enhances the operability of the device and makes the user-device interface more efficient (e.g., by providing for more accurate read notification and reducing the transmission of inaccurate data in the form of read notifications when the corresponding message has not been read yet) which, additionally, reduces power usage and improves battery life of the device by enabling the user to use the device more quickly and efficiently.

In some embodiments, the set of alert criteria includes a criterion that the captured image data indicates that the user looked at the display of the electronic device for at least a threshold amount of time (e.g., FIGS. 20D-20F). For example, if the alert condition is for an event corresponding to receipt of a new message (e.g., message correspond to summary 2004) (such as SMS message, instant message, or chat message), and, in a first manner, a notification for the event is displayed (e.g., FIG. 20B) and if the user looks at the display for at least a threshold amount of time while the notification is being displayed, then a message indicating that the message has been read will be sent to the sender of the message (e.g., if the user looks at device 600 in FIG. 20B for a threshold amount of time and, optionally, the entire message is displayed, then device 600 sends a read receipt to the sender of the message). As another example, if the alert condition is for an event corresponding to receipt of a new message and the graphical user interface is a messaging program that corresponds to the new message, in the first manner, the new message may be displayed and if it is determined based on captured image data that the user looked at the display for at least a threshold period of time while the new message is displayed, a read notification message is sent to the sender of the new message. Sending the read notification when the user looks at the display of the electronic device for a predetermined about of time without requiring further user input enhances the operability of the device. Waiting until the user looks at the display of the electronic device for a threshold amount of time before sending a read notification improves the reliability of the read notification by increasing the likelihood that the user saw and read the alert.

In some embodiments, responding to the alert condition in the first manners includes the electronic device generating (2112) a notification (e.g., audio, visual, or haptic feedback, feedback 2018 of FIG. 20D) indicating that the alert condition has been detected and sending a notification to an external electronic device indicating that the user has been notified of the alert condition (e.g., so that the other devices do not generate the same feedback or generated reduced feedback, such as only display feedback instead of providing audible or haptic feedback). In some embodiments, processing the alert condition in the second manner includes the electronic device generating (2114) a notification indicating that the alert condition has been detected without sending a notification to an external device indicating that the user has been notified of the alert condition (e.g., if the user is associated with multiple devices, such as a smart phone and a tablet computer, both the phone and the tablet may generate notifications for the user that alert conditions on the respective devices related to the same event have occurred). By indicating to other device whether the user has looked at the alert, the user's interaction with the electronic device and other devices is simplified by being able to silence or dismiss an alert by simply looking at the electronic device. This places less cognitive burden on the user and provides for an improved man-machine interface.

In some embodiments, responding to the alert condition in the second manner includes the electronic device providing (2116) an audio notification (e.g., 2018 of FIG. 20D) (e.g., a ring tone, music, or other audible sound). In some embodiments, after processing providing the audio notification and in accordance with a determination (based on subsequent captured image data) that the user is looking at the display of the electronic device (e.g., based on captured imaged data), the electronic device reduces the volume of the audio notification (e.g., 2018 of FIG. 20E and, separately FIG. 20F). Providing audible notifications enables for a more noticeable notification to a user that is not looking at or using a device, which enhances the operability of the device and makes the user-device interface more efficient (e.g., by alerting the user using haptic feedback when the feedback is likely to be most effective) and additionally, reduces power usage and improves battery life of the device by enabling the user to use the device more quickly and efficiently.

In some embodiments, responding to the alert condition in the second manner includes the electronic device providing (2118) a haptic notification (e.g., 2018 of FIG. 20D) (e.g., a single buzz of the phone or a series of buzzes). In some embodiments, after providing the haptic notification, in accordance with a determination (based on subsequent captured image data) that the user is looking at the display of the electronic device, the electronic device reduces the magnitude of the haptic notification (e.g., 2018 of FIG. 20E and, separately FIG. 20F). Providing haptic notification enables a more noticeable notification to a user that is not looking at or using a device, which enhances the operability of the device and makes the user-device interface more efficient (e.g., by alerting the user using haptic feedback when the feedback is likely to be most effective) and additionally, reduces power usage and improves battery life of the device by enabling the user to use the device more quickly and efficiently.

In some embodiments, responding to the alert condition in the second manner includes the electronic device generating a first notification indicating that the alert condition has been detected, the first notification (e.g., 2016 of FIG. 20C) including a first set of information (e.g., 2012 and 2014) and, after generating the first notification and in accordance with a determination (based on subsequent captured image data captured by the camera) that the user is looking at the display of the electronic device (e.g., FIG. 15A), the electronic device generating a second notification (e.g., 2002 of FIG. 20B) associated with the alert condition, the second notification including a second set of information (e.g., 2004) not present in the first set of information. For example, if a notification is display for a new message received at the electronic device but the notification does not indicate who sent the new message, then the sender of the new message is displayed after the user looks at the display of the electronic device. By providing additional information to the user after the user has met some criteria, the man-machine interface is improved by requiring fewer interactions from the user to access information. For example, displaying additional information about an alert automatically after the user at looks at the display of the electronic device improves the operation of the electronic device by providing for a more efficient and less burdensome man-machine interface.

In some embodiments, the alert condition includes a preset alarm condition being met and wherein responding to the alert condition in the second manner includes outputting a notification (e.g., 2018 of FIG. 20D) (e.g., a haptic, audio, and/or visual notification). After providing the notification, in accordance with a determination (based on subsequent captured image data) that the user is looking at the display of the electronic device, the electronic device reduces the magnitude (e.g., FIGS. 20E and 20F) (e.g., modulating a parameter of the perceptual notification downwards or ceasing the perceptual notification) of the notification. This enhances the electronic device by providing an improved man-machine interface that requires few interactions (or no interactions other than looking at the device) to respond to an alarm condition, which places less cognitive burden on the user.

In some embodiments, the event (2122) is a preset alarm being triggered. In response to determining that the user looks at the display of the electronic device, the electronic device snoozes the alarm (e.g., ceasing to provide a notification that the alarm was triggered and resetting the alarm to trigger some period of time in the future or causing a different alarm to trigger at some period of time in the future). Snoozing an alarm when the device determines that the user is looking at the display of the device enhances the operability of the device by reducing false positives (e.g., inadvertent activation of the snooze function) and makes the user-device interface more efficient (e.g., by helping the user to achieve an intended result with minimal interaction) which, additionally, reduces power usage and improves battery life of the device by enabling the user to use the device more quickly and efficiently.

In some embodiments, after processing the alert condition in the second manner (e.g., FIG. 20C) and in response to determining that the user looks at the display of the electronic device, the electronic device processes (2124) the alert condition in the first manner (e.g., FIG. 20B). For example, if the user is initially not looking at the electronic device when a message is received (e.g., FIG. 20D) (which is an alert condition in this example), the electronic device may response to the alert condition by display a notification banner without any details of the message (e.g., FIG. 20C). If, however, the user subsequently looks at the electronic device, the electronic device may further respond to the alert condition by updating the displayed notification to include a summary of the content of the received message (FIG. 20B). Processing an alert in a first manner after a user has looked at the device enhances the operability of the device, improves data privacy (e.g., by not displaying a potentially confidential summary to an unauthorized user) and makes the user-device interface more efficient (e.g., by helping the user obtain additional information about the alert/notification with minimal interaction) which, additionally, reduces power usage and improves battery life of the device by enabling the user to use the device more quickly and efficiently.

In some embodiments, the graphical user interface is a lock screen interface (e.g., FIG. 20A) (e.g., and notifications are displayed on the lock screen interface in a missed notification region). In some embodiments, the graphical user interface is a home screen (e.g., FIG. 18A) interface or an application interface (e.g., FIG. 22A), and notifications pop up over a portion of the graphical user interface and then automatically cease to be displayed after a predetermined time period if the user does not interact with them. Applying the above alert condition processing techniques when the device is locked, the device's operability is enhanced by providing for better data privacy. For example, when the device is locked, it likely means that the user is not using the device and potentially not using the device. In this circumstance, the device can improve data privacy by providing only limited information about an alert condition unless the device can confirm that an authorized user is looking at the device.

It should be understood that the particular order in which the operations in FIGS. 21A-21B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1000, 1300, 1700, 1900, 2300, 2500, 2700) are also applicable in an analogous manner to method 2100 described above with respect to FIGS. 21A-21B. For example, the set of alert criteria and whether those criteria are met based on captured image data described above with reference to method 2100 optionally has one or more of the characteristics of the content-lock/authorization criteria and the determination of whether those criteria are met described herein with reference to other methods described herein (e.g., methods 700, 1700, 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A) or application specific chips. Further, the operations described above with reference to FIGS. 21A-21B are, optionally, implemented by components depicted in FIGS. 1A-1B. For example, detecting the occurrence of an alert condition is, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 22A:
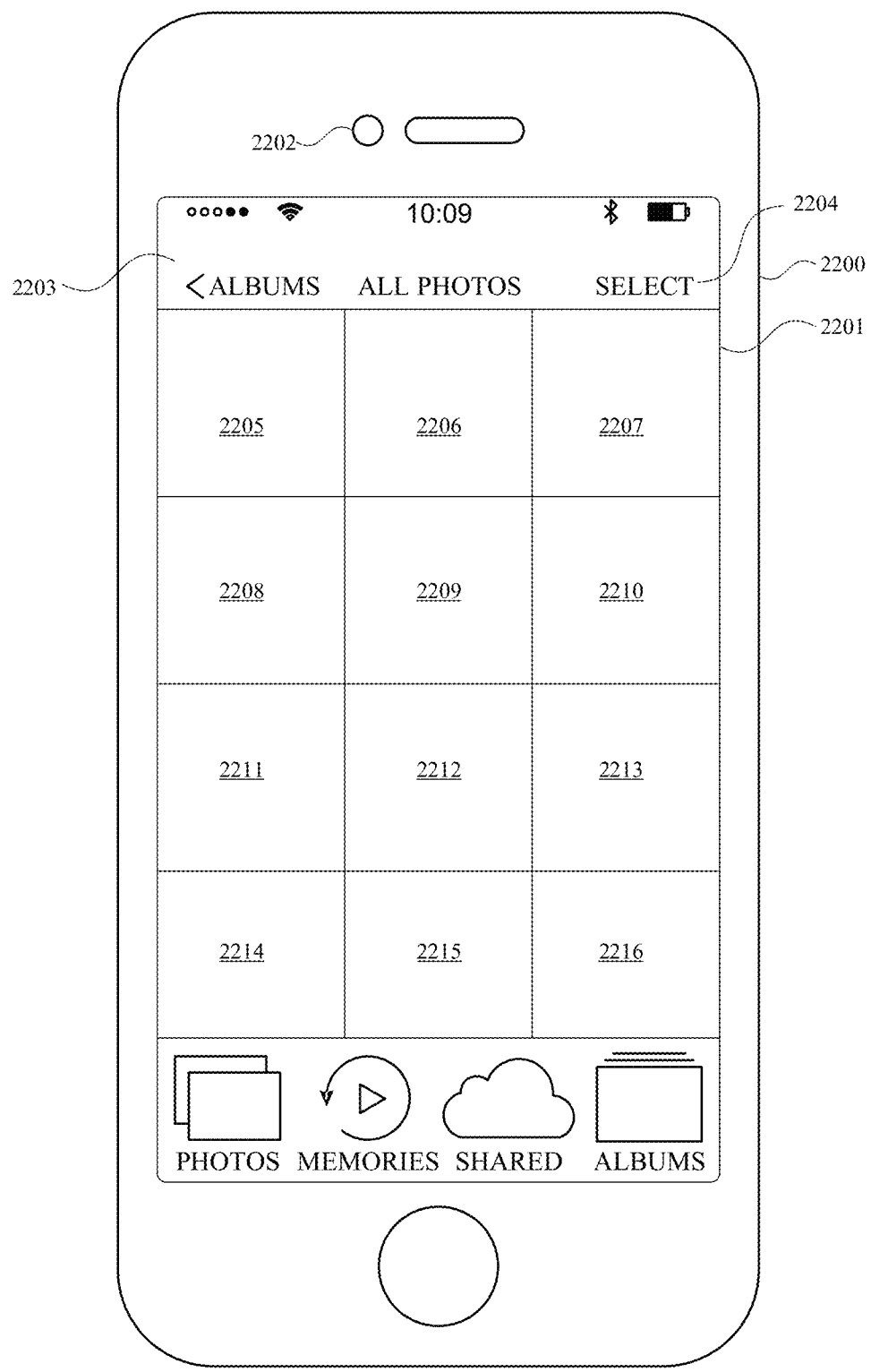
FIGS. 22A-22F illustrate exemplary user interfaces and scenes for performing functions based on voice input and captured image data.
Figure 22B:
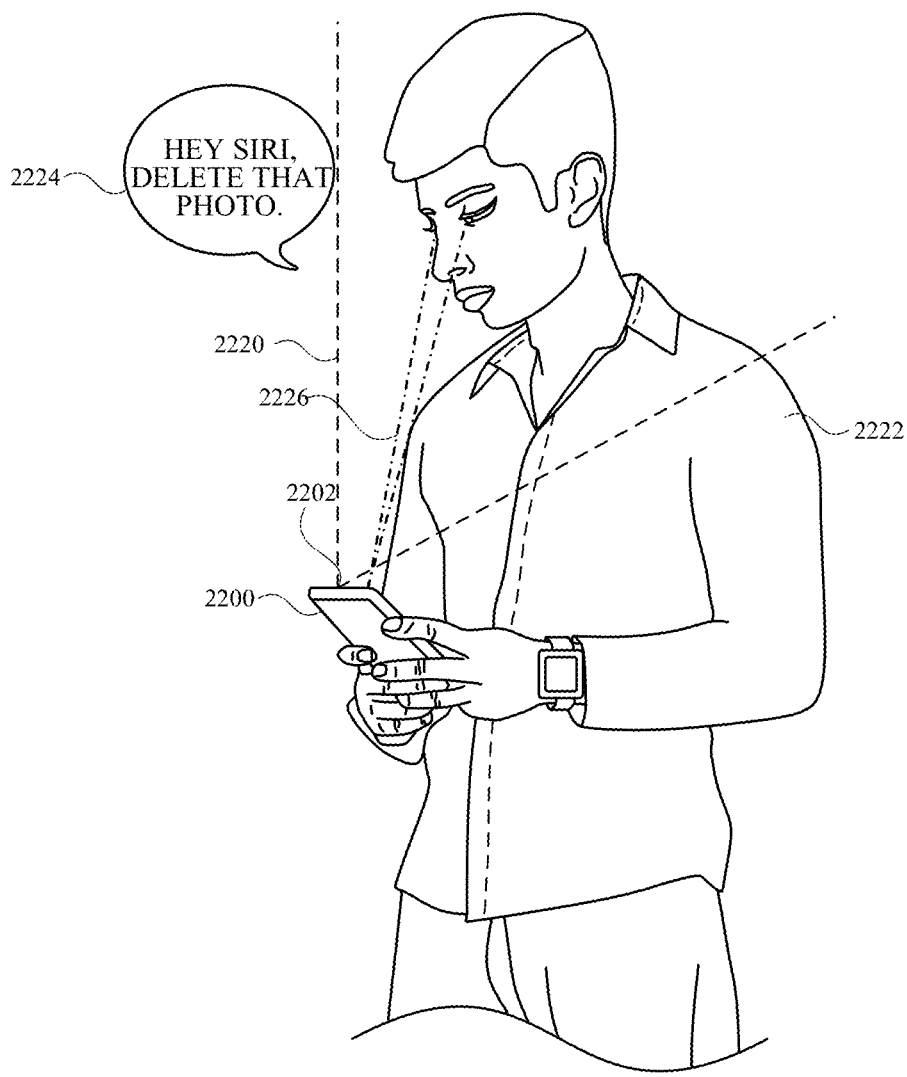
Figure 22C:
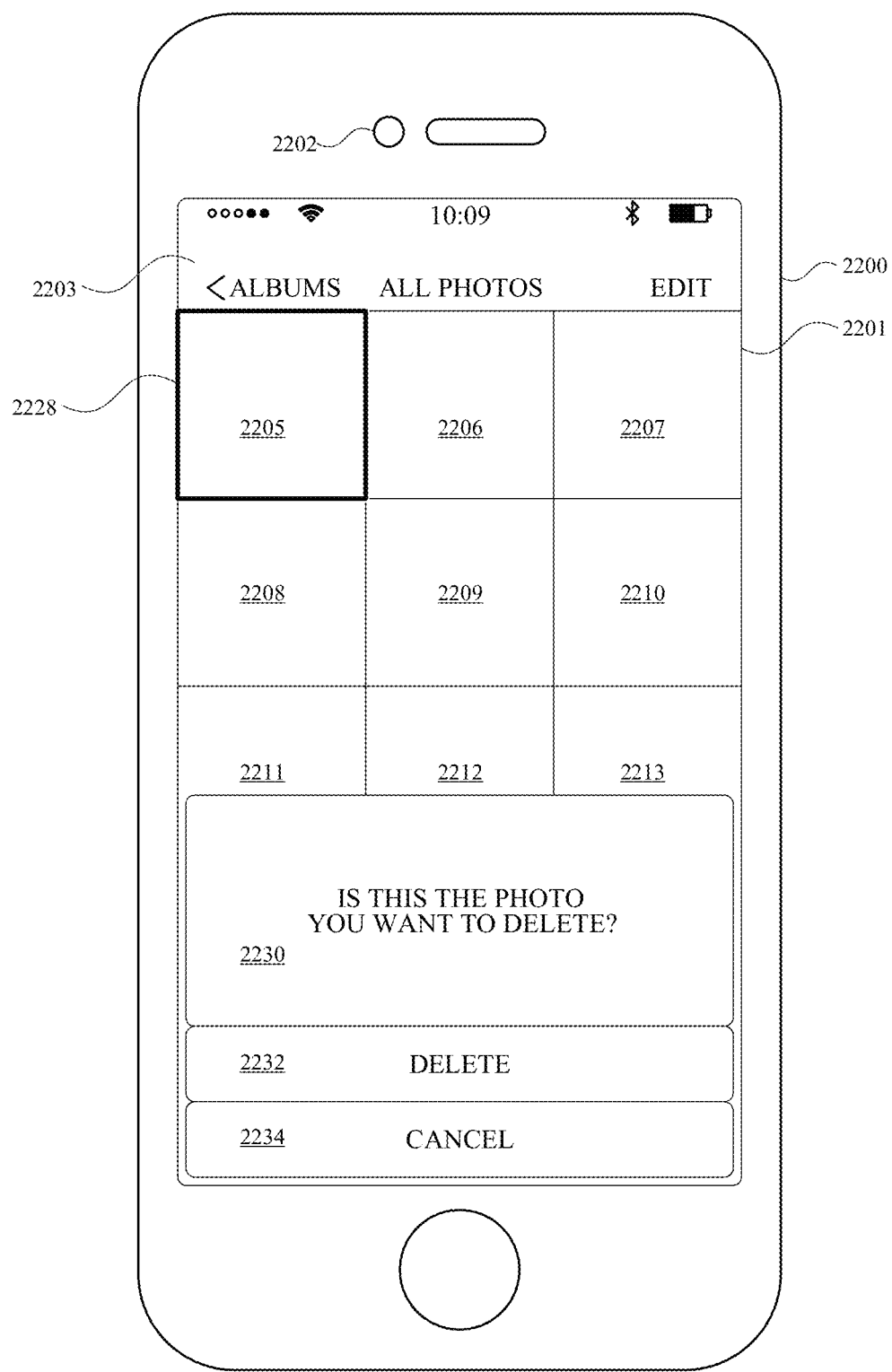
Figure 22D:
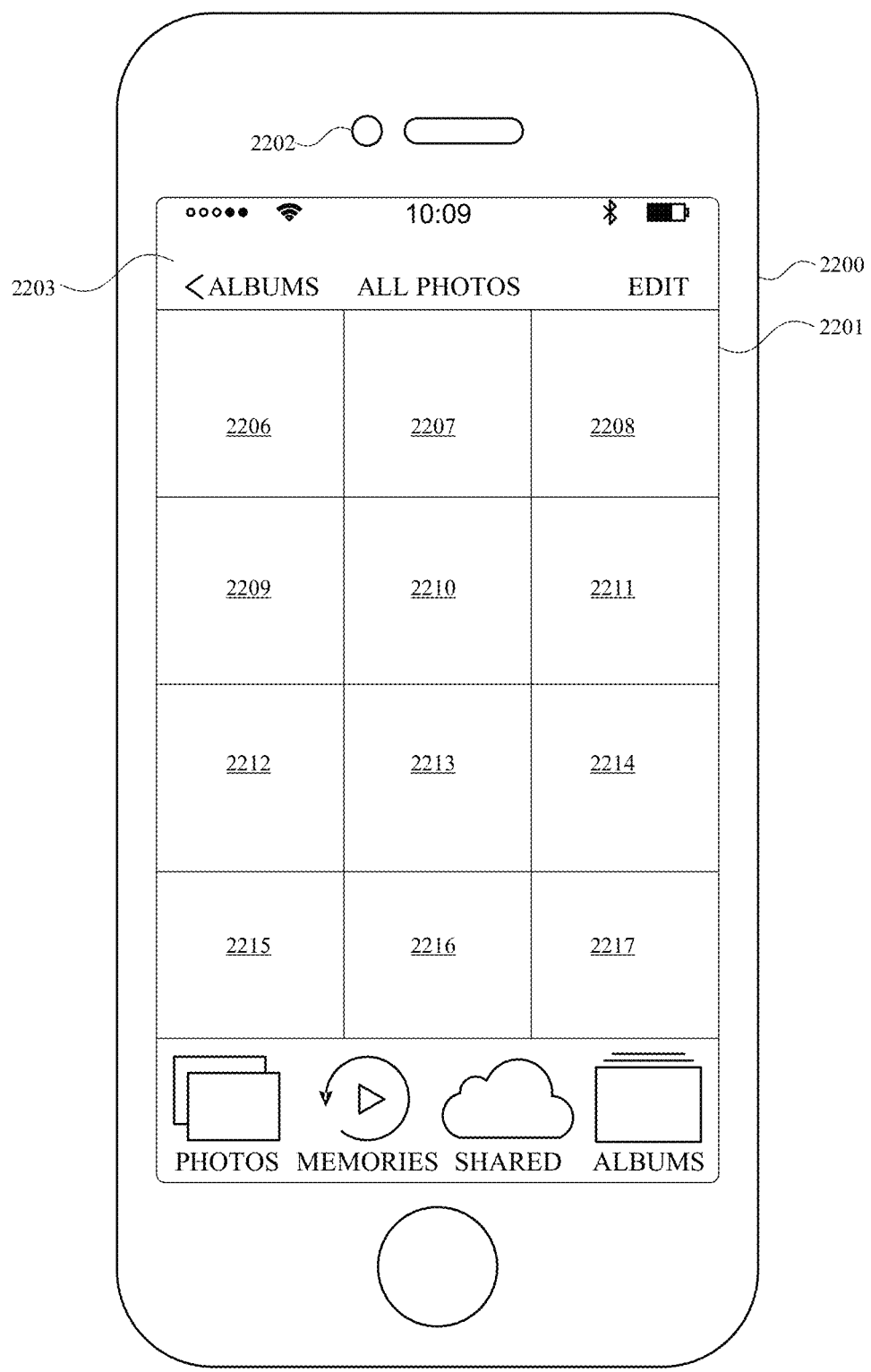
Figure 22E:
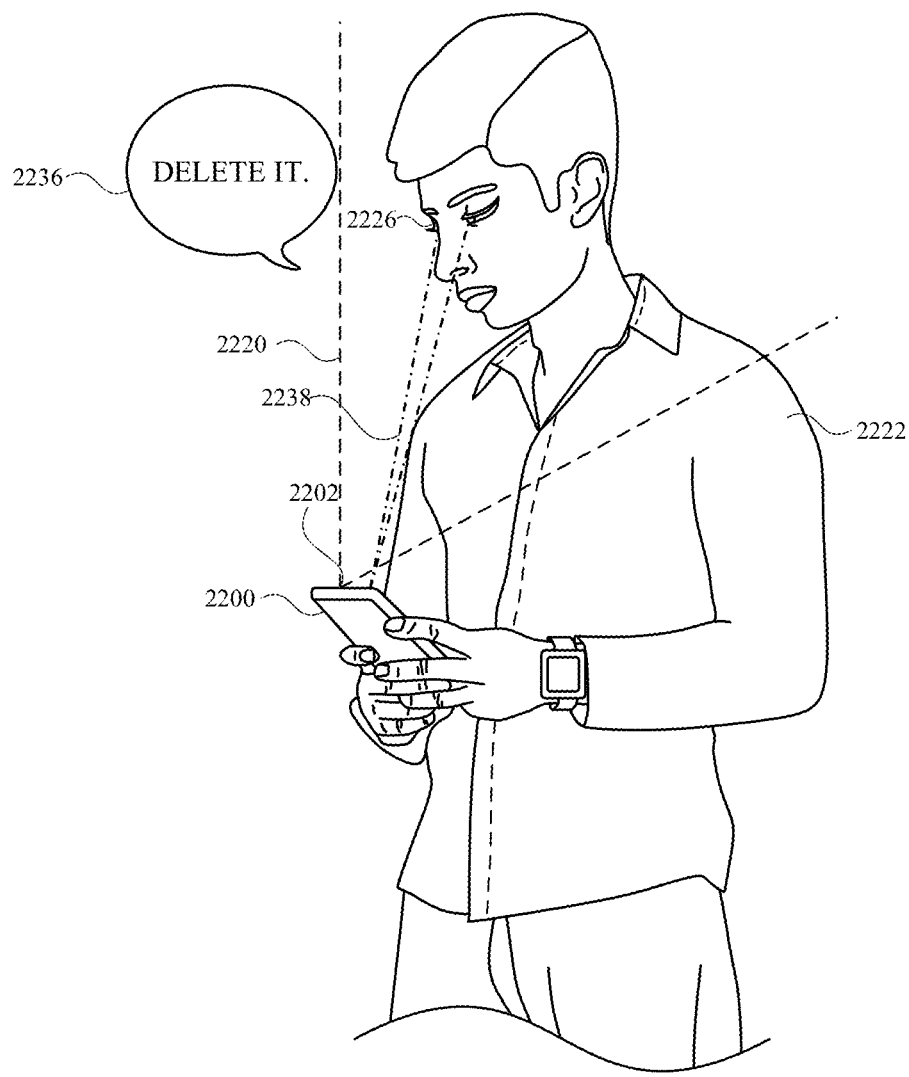
Figure 22F:
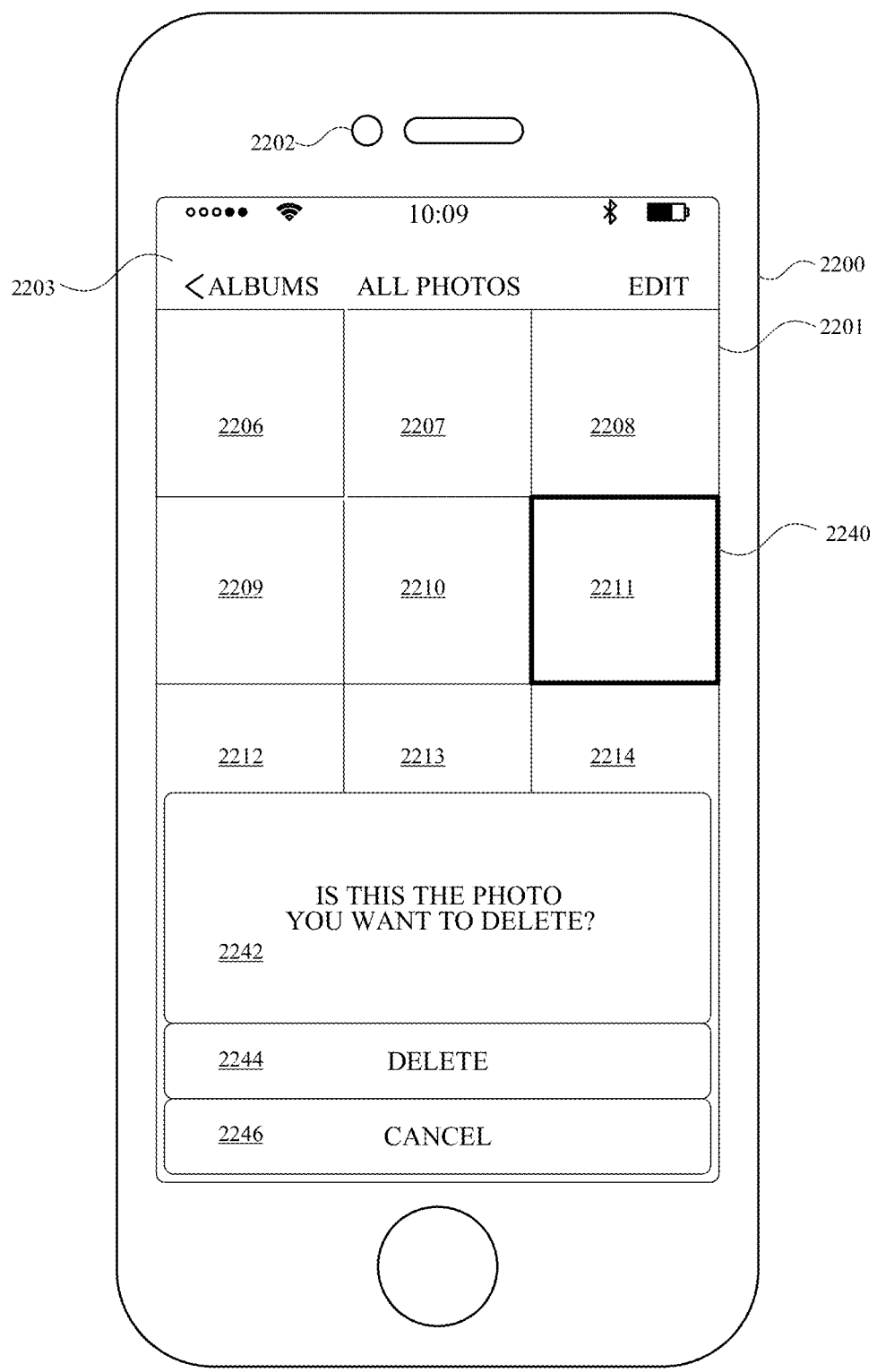
Figure 23A:
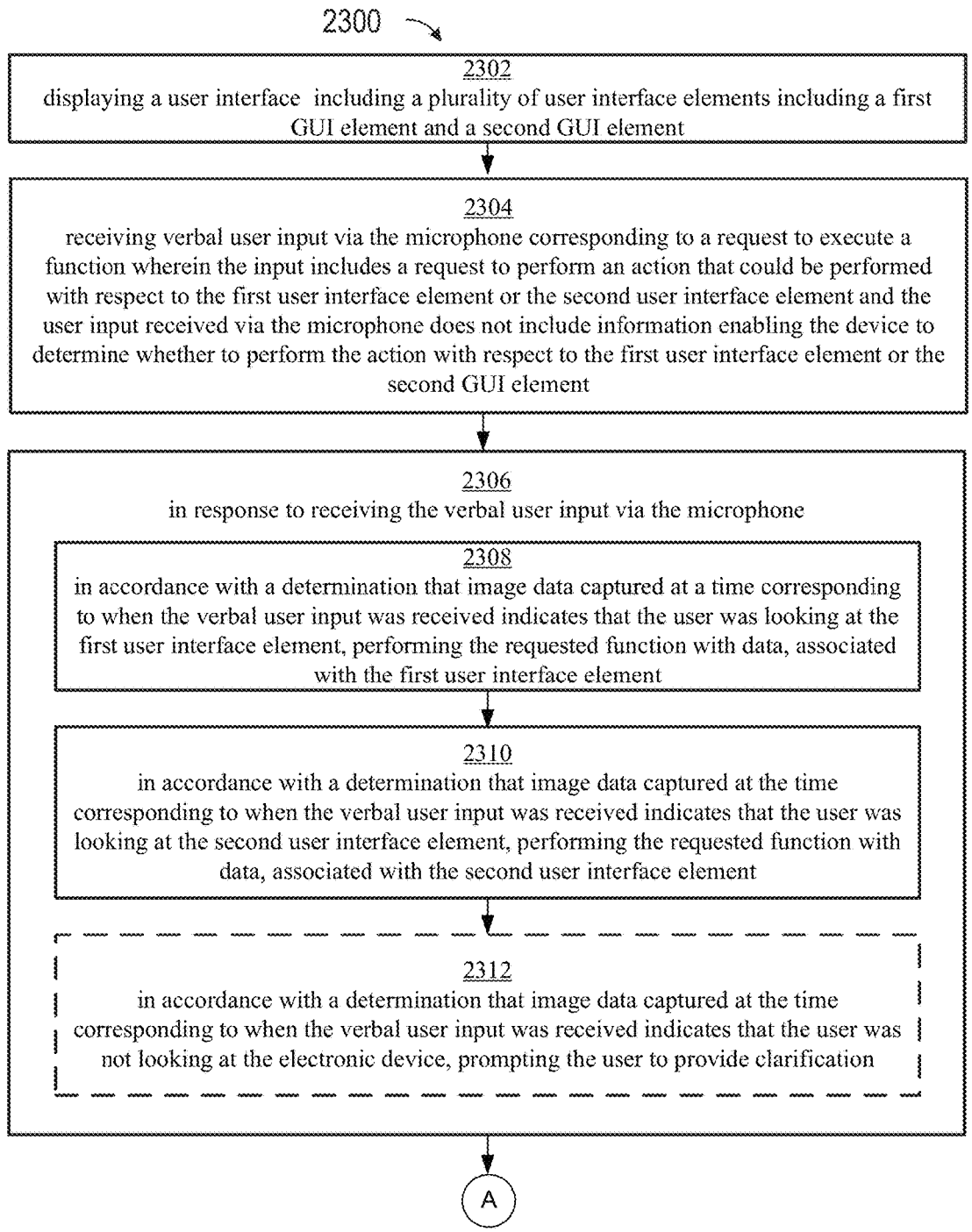
FIGS. 23A-23B are a flow diagram illustrating a method for performing functions based on voice input and captured image data.
Figure 23B:
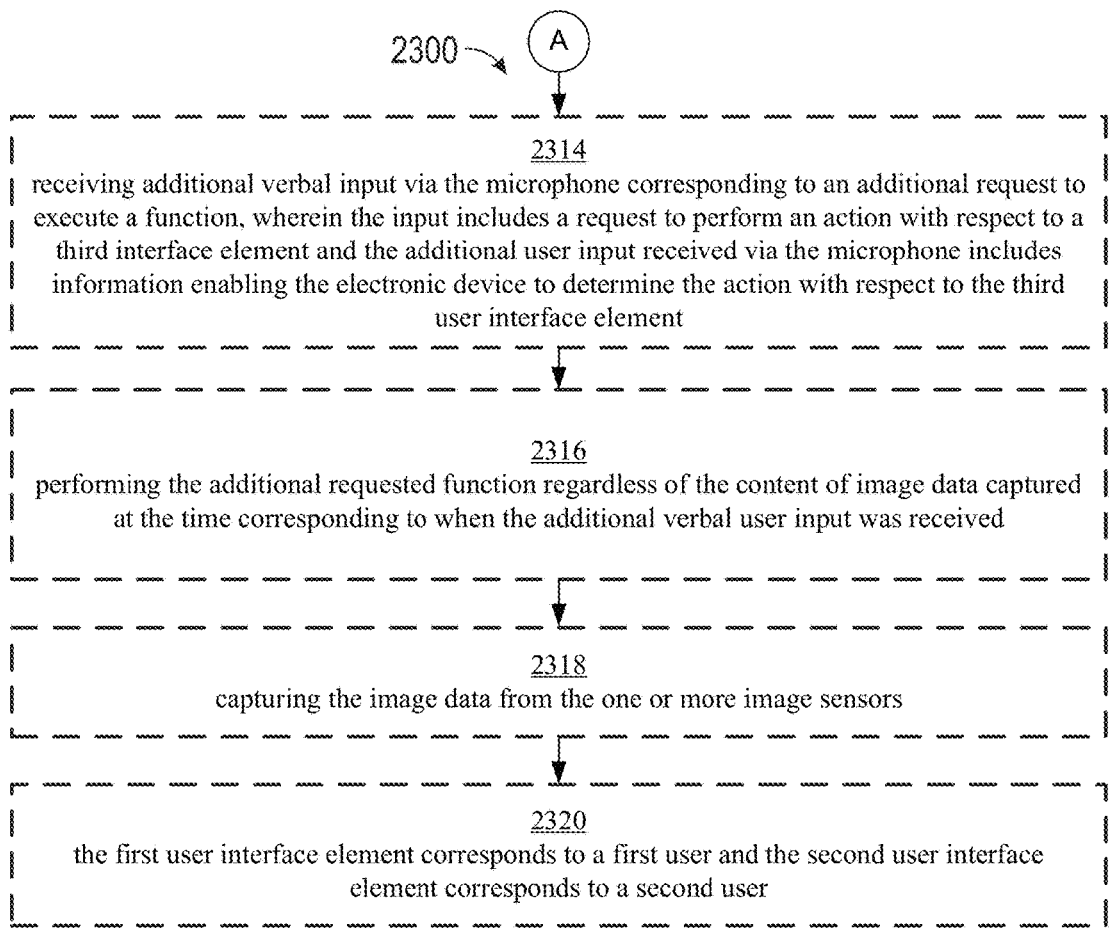

FIGS. 22A-22F illustrate exemplary interfaces and processes for using captured image to disambiguate an otherwise ambiguous voice command. FIGS. 23A-23B are a flow diagram illustrating methods for using captured image to disambiguate an otherwise ambiguous voice command in accordance with some embodiments. The user interfaces and scenes in FIGS. 22A 22F illustrate the processes described below, including the processes in FIGS. 23A-23B.

FIG. 22A depicts device 2200, which in some examples is a specific form factor for device 100, device 300, device 500, device 1500 described above. Device 2200 includes display 2201, which in some embodiments is a touch-sensitive display, and camera 2202 (which, in some embodiments is camera 1502 of FIG. 15A). Additionally, in some embodiments of device 2200, additional sensors and/or other components (e.g., flash or IR emitter) are present along with camera 2202.

In FIG. 22A, device 2200 is displaying photo viewing interface 2203 on display 2201. Photo view interface 2203 includes thumbnails 2205-2216 corresponding to photos that are in a currently selected album. Photo viewing interface 2203 includes select button 2204. In response to receiving user input selecting select button 2204, photo viewing interface 2203 is updated to include affordances for performing various operations, such as selecting one or more thumbnails via touch input on touch-sensitive screen 2201 and deleting or sharing photos corresponding to selected thumbnails.

As an alternative to deleting, sharing, or performing other operations on photos that correspond to photos that have been manually selected (e.g., after selecting select button 2204 of FIG. 22A), FIG. 22B depicts user 2222 providing voice command 2224 requesting that a photo be deleted. Voice command 2224 ("Hey Siri, delete that photo."), however, does not provide enough information about which photo should be deleted if there are multiple photos represented on the display of device 2200. In FIG. 22B, device 2200 uses image data captured using camera 2202 to determine what item (e.g., photo) user 2222 (who appears in field of view 2220 of camera 2202) is referring to based on what item on the display of device 2200 user 2222 is looking at (e.g., which item is indicated by direction 2226 that user 2222 is looking).

If device 2200 determines a particular item that user 2222 was looking at (e.g., based on captured image data that optionally includes depth data), then device 2200 attempts to perform a function specified in the received voice command (e.g., voice command 2224) on content associated with the particular item. For example, in the case of voice command 2224, the designated function is delete. If device 2200 determines that user 2222 was looking at thumbnail 2205 based on captured image data of user 2222, device 2200 deletes the photo associated with thumbnail 2205 and updates photo viewing interface as depicted in FIG. 22D. Optionally, as depicted in FIG. 22C, before performing the action from the voice command, device 2200 updates photo viewing interface 2203 to include visual indication 2228 that identifies thumbnail 2205 as the item that user 2222 was looking at when providing voice command 2224. Confirmation prompt 2230 is also displayed asking the user to confirm that the action should be carried out on the identified content. In some embodiments, an operation (e.g., deletion) is performed without providing a confirmation prompt, once device identifies the target item, based on image data. If input selecting delete button 2232 is received, the identified content is deleted and photo viewing interface 2203 is updated as depicted in FIG. 22D. FIG. 22D shows that the photo associated with thumbnail 2205 has been deleted by no longer displaying thumbnail 2205, rearranging the remaining thumbnails, and displaying thumbnail 2217 to fill the space created by removal of thumbnail 2205. If input selecting cancel button 2234 is received, the identified content is not deleted and photo viewing interface 2203 is returned to the state depicted in FIG. 22A.

FIG. 22E depicts another example of device 2200 receiving a voice command (e.g., voice command 2236). Like voice command 2224 (FIG. 22B), voice command 2236 ("Delete it.") specifies a requested function ("delete") but is ambiguous about what item the function should be performed with or on. Upon receiving voice command 2236, device 2200 analyzes captured image data to determine an item at which user 2222 was looking when voice command 2236 was received (e.g., an item on the display of device 2200 that direction 2238 indicates user 2222 was looking at). If device 2200 determines that user 2222 was looking at thumbnail 2211 based on captured image data of user 2222, device 2200 deletes the photo associated with thumbnail 2211 and updates photo viewing interface to remove thumbnail 2211. Optionally, as depicted in FIG. 22F, before performing the action from the voice command, device 2200 updates photo viewing interface 2203 to include visual indication 2240 that identifies thumbnail 2211 as the item that user 2222 was looking at when providing voice command 2236. Confirmation prompt 2242 is also displayed asking the user to confirm that the action should be carried out on the identified content. If input selecting delete button 2244 is received, the identified content is deleted and photo viewing interface 2203 is updated (e.g., updated to show that the photo associated with thumbnail 2211 has been deleted by no longer displaying thumbnail 2211, rearranging the remaining thumbnails, and displaying any additional thumbnail to fill the space created by removal of thumbnail 2211). If input selecting cancel button 2246 is received, the identified content is not deleted and photo viewing interface 2203 is returned to the state depicted in FIG. 22D.

FIGS. 23A-23B are a flow diagram illustrating a method for using captured image to disambiguate an otherwise ambiguous voice command in accordance with some embodiments. Method 2300 is performed at a device (e.g., 100, 300, 500) with a display and a camera. Some operations in method 2300 are, optionally, combined, the order of some operations are, optionally, changed, and some operations are, optionally, omitted.

As described below, method 2300 provides an intuitive way for using captured image to disambiguate an otherwise ambiguous voice command. The method reduces the cognitive burden on a user for responding to an alert condition detected at an electronic device, thereby creating a more efficient human-machine interface. For battery-operated computing devices, enabling an electronic device to use captured image to disambiguate an otherwise ambiguous voice command conserves power and increases the time between battery charges.

An electronic device (e.g., 2200) having a display (e.g., 2201), camera 2202 (e.g., having a visible light sensor, IR sensor, time of flight sensor), and a microphone, causes the display of a user interface (e.g., 2203)(e.g., an operating system home screen, a photo viewing application, an email application, a web browser application, a map application, or a navigation application) including a plurality of user interface elements (e.g., 2205-2216 and other elements of FIG. 22A) including a first GUI element (e.g., 2205) and a second GUI element (e.g., 2206) (e.g., graphical or textural elements for photos, contacts, messages, applications, etc. including affordances, icons, and other GUI elements).

The electronic device receives (2304) verbal user input (e.g., 2224) via the microphone (e.g., a voice command) corresponding to a request to execute a function (e.g., to send a message or photo, to move an email, to respond to a message, to call a contact, etc.). The input includes a request to perform an action (e.g., "delete this photo," "send this photo," "respond to that message," "respond to this," "reply to her," "call him," "remind me about that," "ignore it") that could be performed with respect to the first user interface element (e.g., 2205) or the second user interface element (e.g., 2206) (e.g., the verbal user input is "message him how about 6 pm?" and the first and second GUI elements correspond to contacts for or messages from two different remote users that are male; or the verbal user input is "reply to this message 'no thanks'" and the first and second GUI elements correspond to two different messages). The user input received via the microphone does not include information enabling the device to determine whether to perform the action with respect to the first user interface element or the second GUI element (e.g., the user input is ambiguous with respect to which of at least two GUI elements with which the function is to be executed (such as using a pronoun or other word that could apply to more than one GUI element being displayed on the display)).

In response (2306) to receiving the verbal user input via the microphone and in accordance with a determination that image data captured at a time corresponding to when the verbal user input was received (e.g., just before the user input is received, just after the user input was received, or while the user input is being received) indicates that the user was looking at the first user interface element (e.g., 2226), the electronic device performs (2308) the requested function with data (e.g., a photo, a phone number, an email address, an instant message username, a text message) associated with the first user interface element (e.g., FIG. 22C). In accordance with a determination that image data captured at the time corresponding to when the verbal user input was received indicates that the user was looking at the second user interface element, the electronic device performs (2310) the requested function with data (e.g., a photo, a phone number, an email address, a text message) associated with the second user interface element. In some embodiments, the electronic device captures (2318) the image data (e.g., visible light data, IR light data, depth image data, etc.) from the camera.

By determining an element that is the subject of the request function from captured image data, the man-machine interface is improved by reducing the number of user input necessary to perform functions on the electronic device and the complexity of the required user input. For example, by allowing for an ambiguous designation of the target of a requested function, the user's interaction with the electronic device is simplified by not requiring the user to determine an unambiguous designation of the function target.

In some embodiments, in accordance with a determination that image data captured at the time corresponding to when the verbal user input was received indicates that the user was not looking at the electronic device (e.g., FIG. 15B), the electronic device prompts (2312) the user to provide clarification (e.g., similar to prompt 2230 but asking for the user to select the photo to delete). For example, the electronic device displays a message asking the user to select (e.g., via a touch gesture) a graphical object corresponding to content that the requested function should be performed on. This enhances the operability of the electronic device by allowing the electronic device to respond to the user's voice requests even when the voice requests are ambiguous and the use is not looking at the electronic device. This allows for longer sustained interactions with a user by providing an improved man-machine interface that properly responds to a wider variety of user inputs, even when the user inputs are ambiguous.

In some embodiments, the electronic device receives (2314) additional verbal input via the microphone corresponding to an additional request to execute a function, wherein the input includes a request to perform an action with respect to a third interface element and the additional user input received via the microphone includes information enabling the electronic device to determine the action with respect to the third user interface element (e.g., "delete the album" while FIG. 22A is displayed can only refer to one album). The electronic device performs (2316) the additional requested function regardless of the content of image data captured at the time corresponding to when the additional verbal user input was received. Performing the additional request function regardless of the content of image data enables a user to provide voice commands without worry about where the user's focus is located. This enhances the operability of the device and makes the user-device interface more efficient (e.g., by reducing the cognitive burden on the user associated with having to look at a particular object on the screen and reducing the load on computing resources by not processing (or even capturing) image data) which, additionally, reduces power usage and improves battery life of the device by enabling the user to use the device more quickly and efficiently.

In some embodiments, the verbal user input (e.g., 2236 of FIG. 22E) includes an ambiguous reference (e.g., "it") to a user interface element of the plurality of user interface elements (e.g., FIGS. 22B and 22E). In some embodiments, the request includes a reference to a user interface element that is applicable to both the first and second GUI elements (e.g., "it" could refer to any of the photos represented in the interface of FIG. 22F), such as "send a response" when there are representations of multiple messages displayed on the display or "remind me about that" when there are multiple calendar events or to do items displayed on the display. In some embodiments, the request includes an identification of the function to execute (e.g., the request includes "delete," "send," "reply," "move," "remind," etc. and/or, optionally, other data that further refines the function, such as a destination, recipient, method for carrying out the function, or other information).

In some embodiments, the first user interface element (e.g., 634 of FIG. 6I) (2320) corresponds to a first user and the second user interface element corresponds to a second user (e.g., 635 of FIG. 6I). In some embodiments, the GUI is a messaging application and the first and second GUI elements represent different messages from the first user and the second user. Examples of functions that could be executed include sending a reply to the identified message or calling the user that sent the corresponding message. In some embodiments, the data associated with the first user interface element corresponds to first contact information and the data associated with the second user interface element corresponds to second contact information. In some embodiments, the GUI is a contact information interface and the first and second GUI elements correspond to different users whose contact information is stored on the electronic device. Examples of functions that could be executed with the identified GUI element include sending a message or calling the identified user based on information in the associated contact information. In some embodiments, the function is a communication function (e.g., sending a message, replying to a message, calling a user, sharing a photo, etc.).

In some embodiments, the first user interface element (e.g., 2205 of FIG. 22A) corresponds to a first photo and the second user interface element (e.g., 2206 of FIG. 22A) corresponds to a second photo. In some embodiments, the GUI is a photo album application (e.g., 2203) and the first and second GUI elements correspond to different photos stored on the electronic device and displayed on the display (FIG. 22A). Examples of functions that could be performed include deleting, moving, sharing, sending, editing, etc. In some embodiments, the function is a function that deletes data.

It should be understood that the particular order in which the operations in FIGS. 23A-23B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1000, 1300, 1700, 1900, 2100, 2500, 2700) are also applicable in an analogous manner to method 2300 described above with respect to FIGS. 23A-23B. For example, the determination of where a user is looking described above with reference to method 2300 optionally has one or more of the characteristics of the analysis of captured image data to determine whether an authorized users is looking at the device described herein with reference to other methods described herein (e.g., methods 1700, 1900). For brevity, these details are not repeated here.

The operations in the information processing methods described above are, optionally, implemented by running one or more functional modules in an information processing apparatus such as general purpose processors (e.g., as described with respect to FIGS. 1A, 3, 5A) or application specific chips. Further, the operations described above with reference to FIGS. 23A-23B are, optionally, implemented by components depicted in FIGS. 1A-1B. For example, detecting the occurrence of the alert condition is, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 24C:
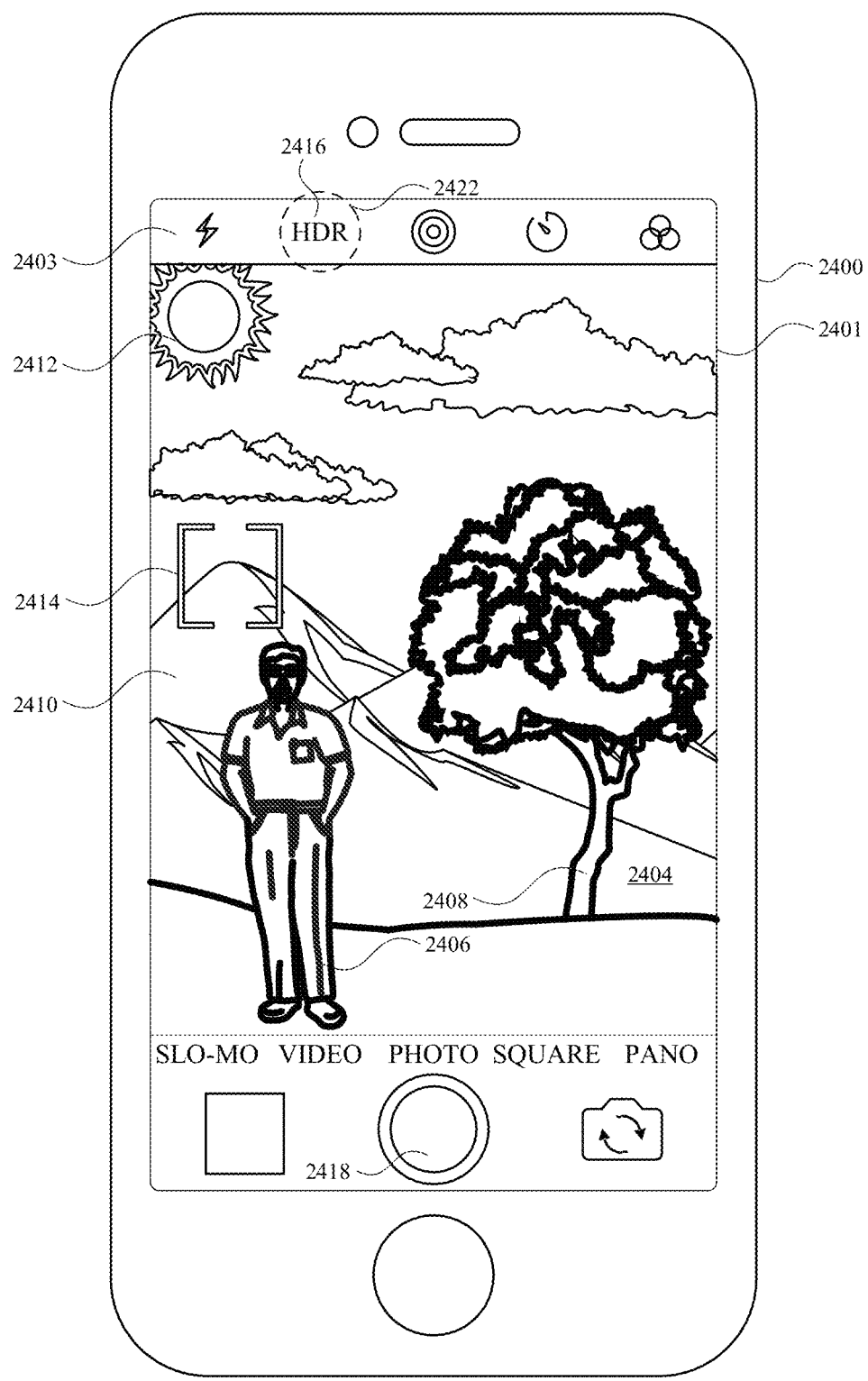
Figure 24D:
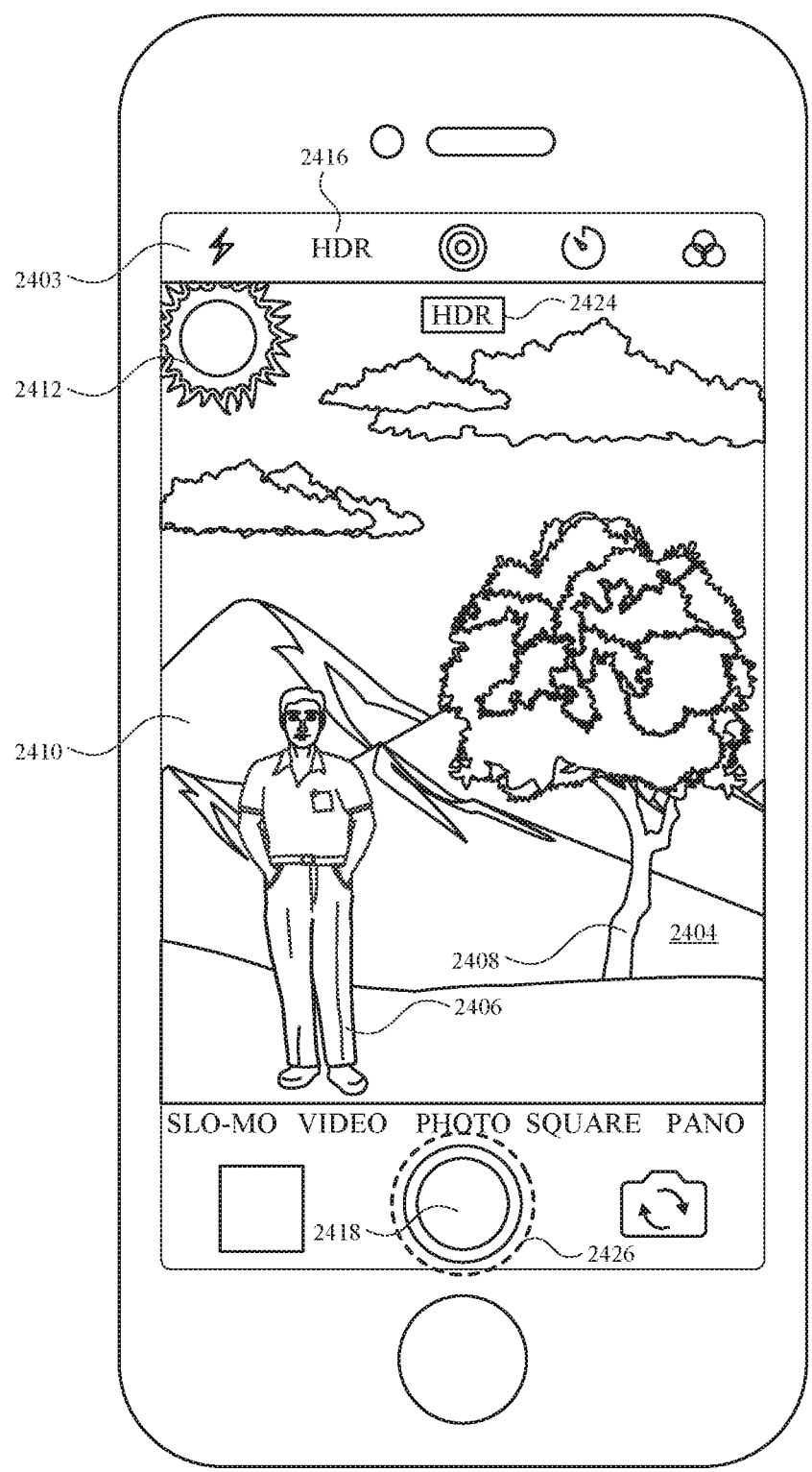
Figure 24E:
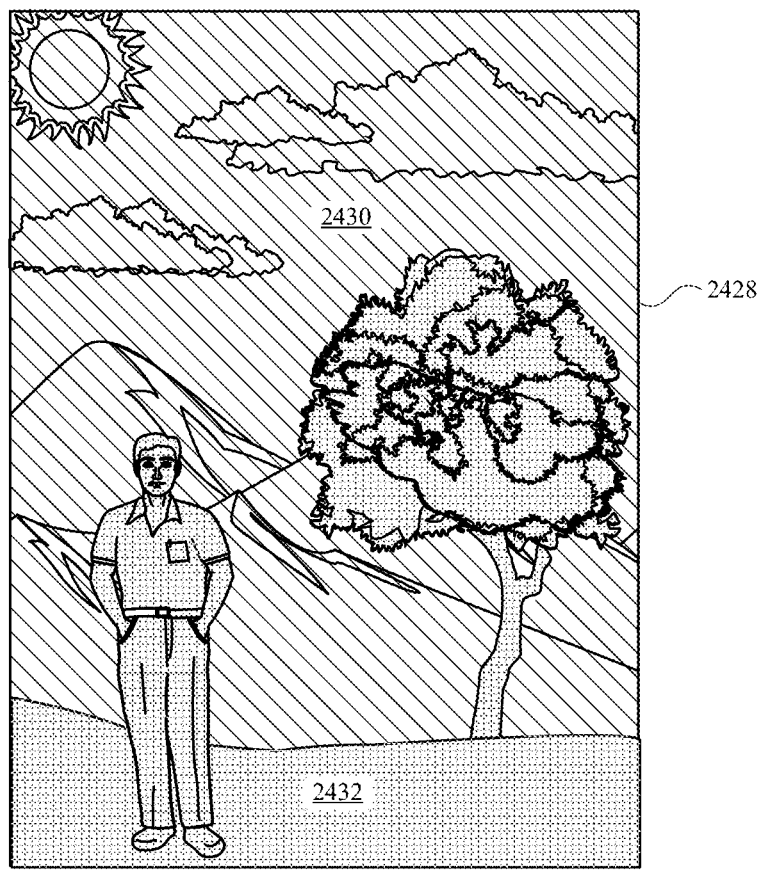
Figure 24F:
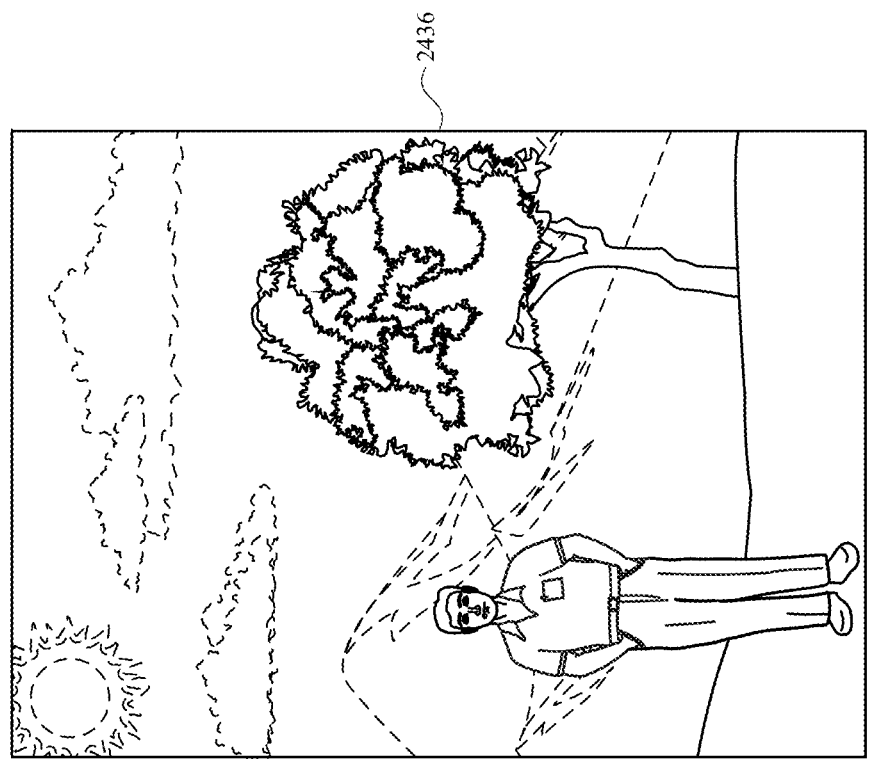
Figure 24F:
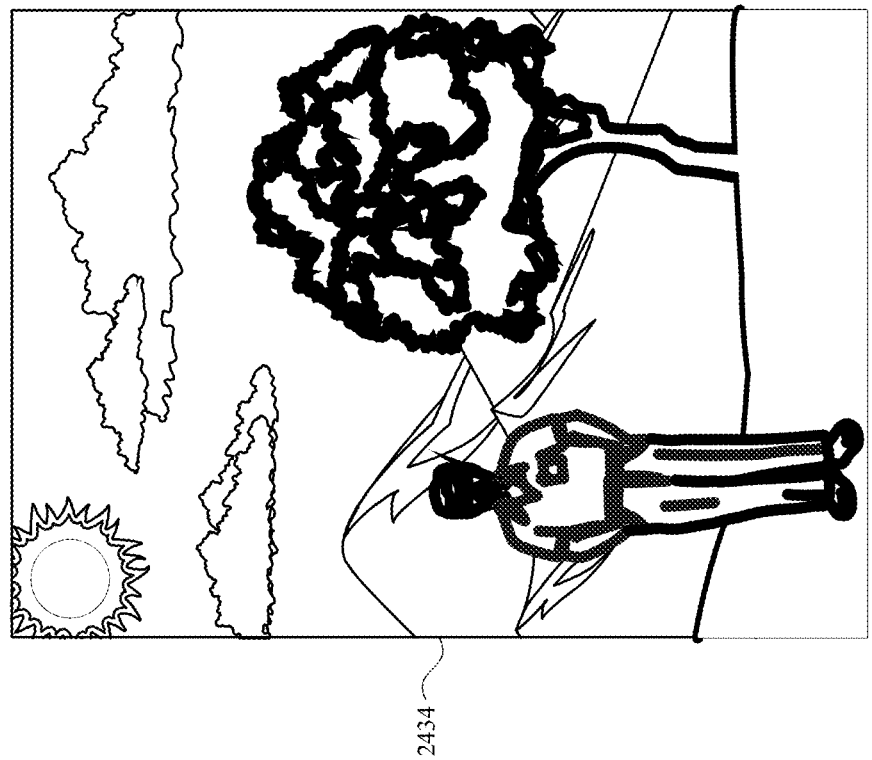
Figure 24G:
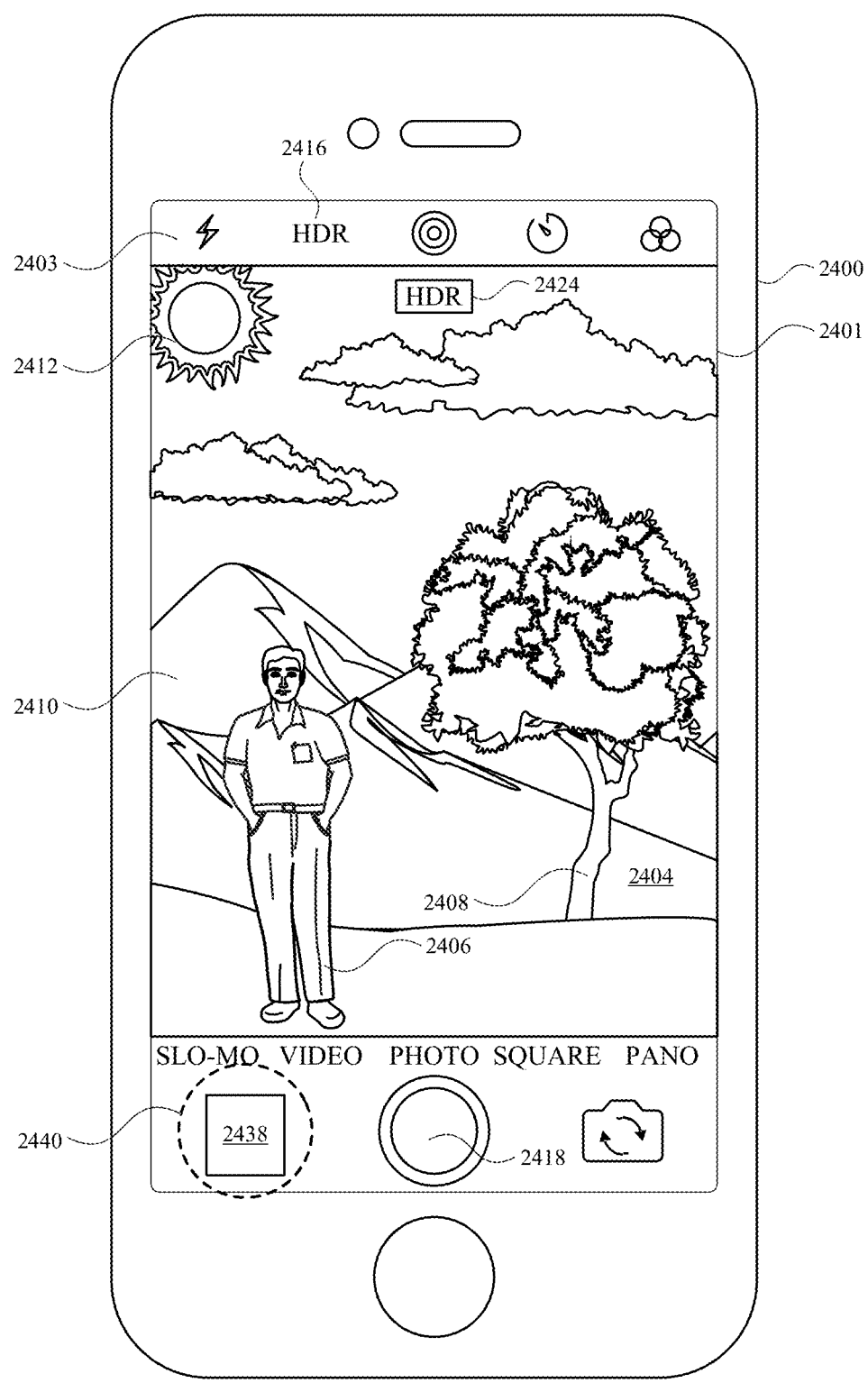
Figure 24H:
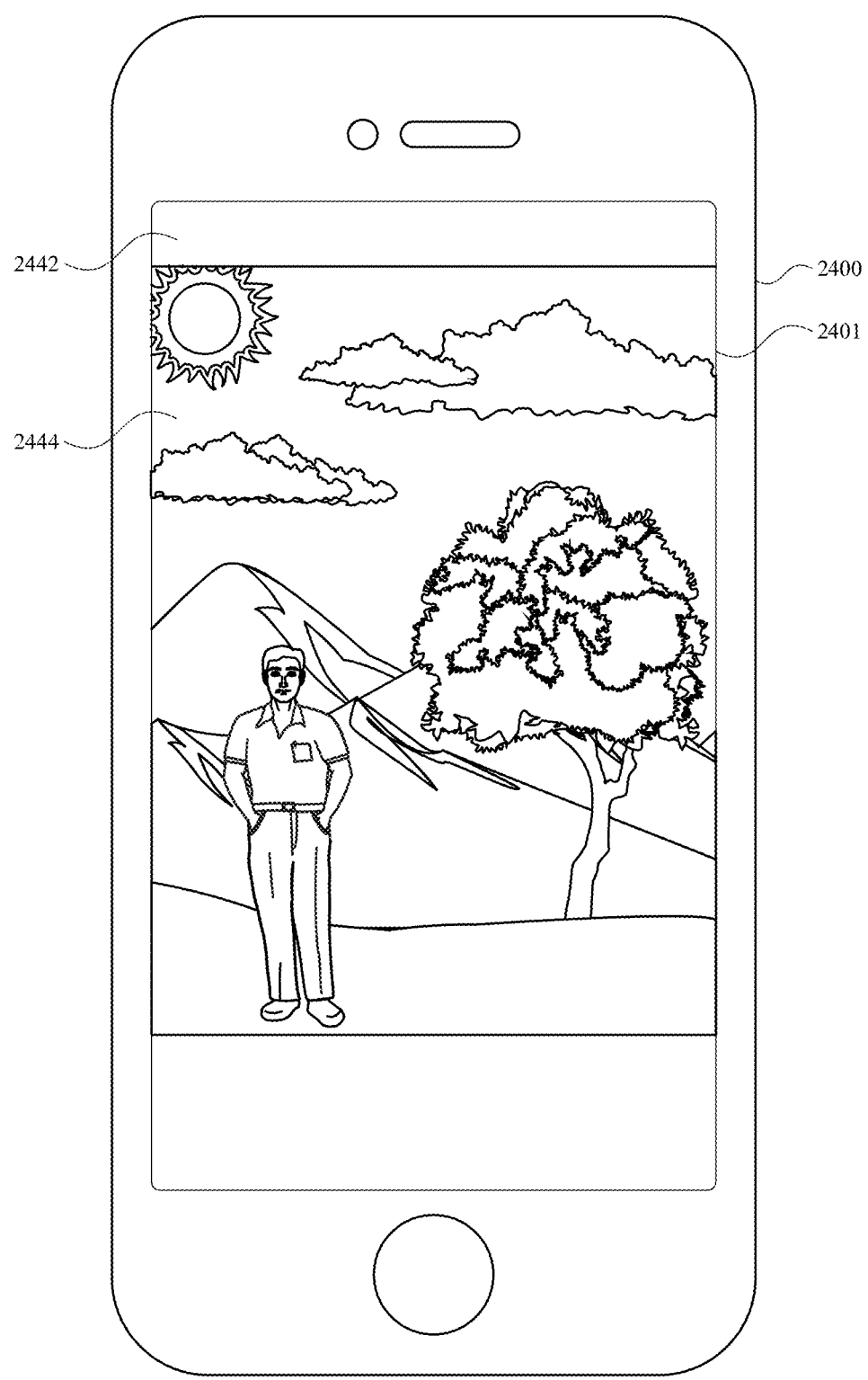
Figure 25A:
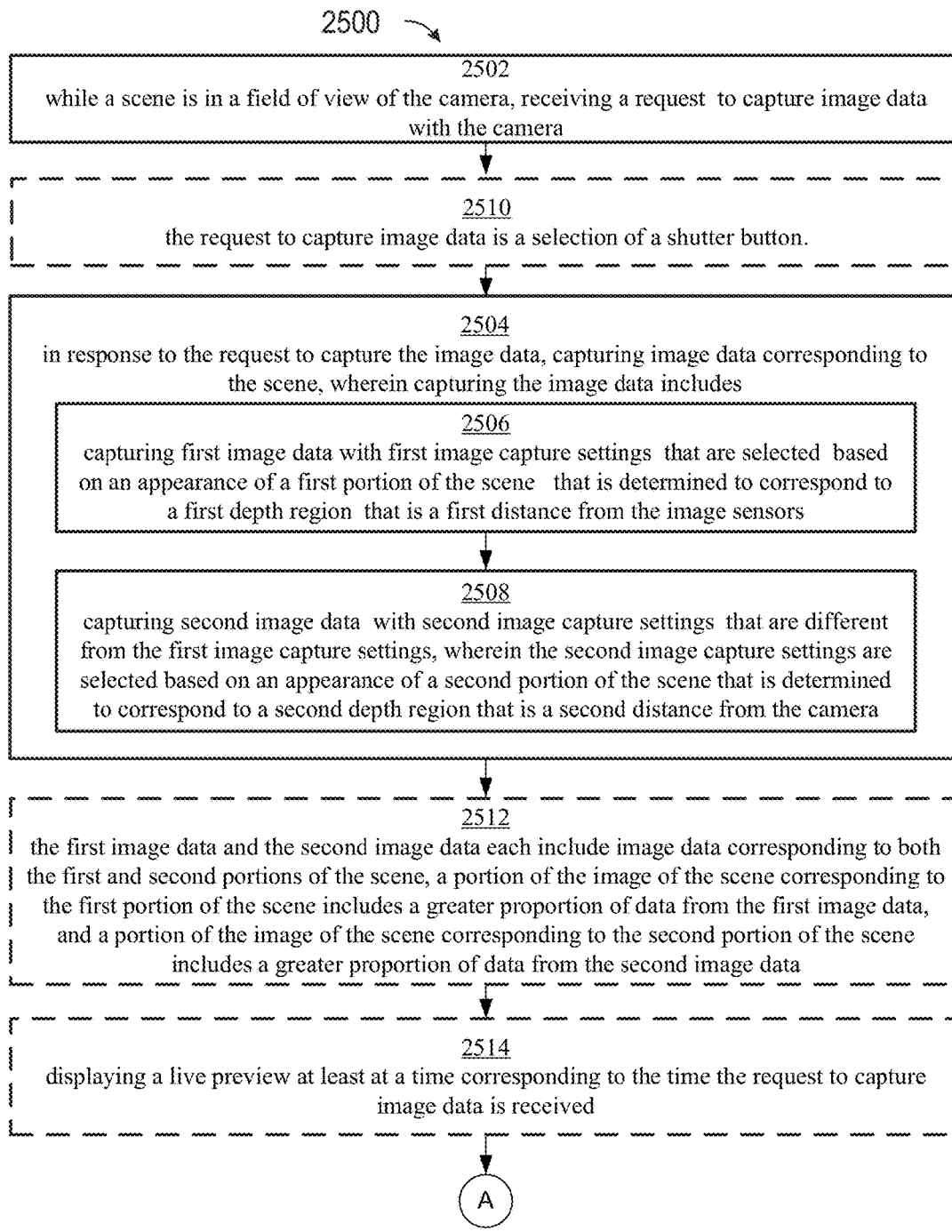
FIGS. 25A-25B are a flow diagram illustrating a method for generating a high dynamic range (HDR) image.
Figure 25B:
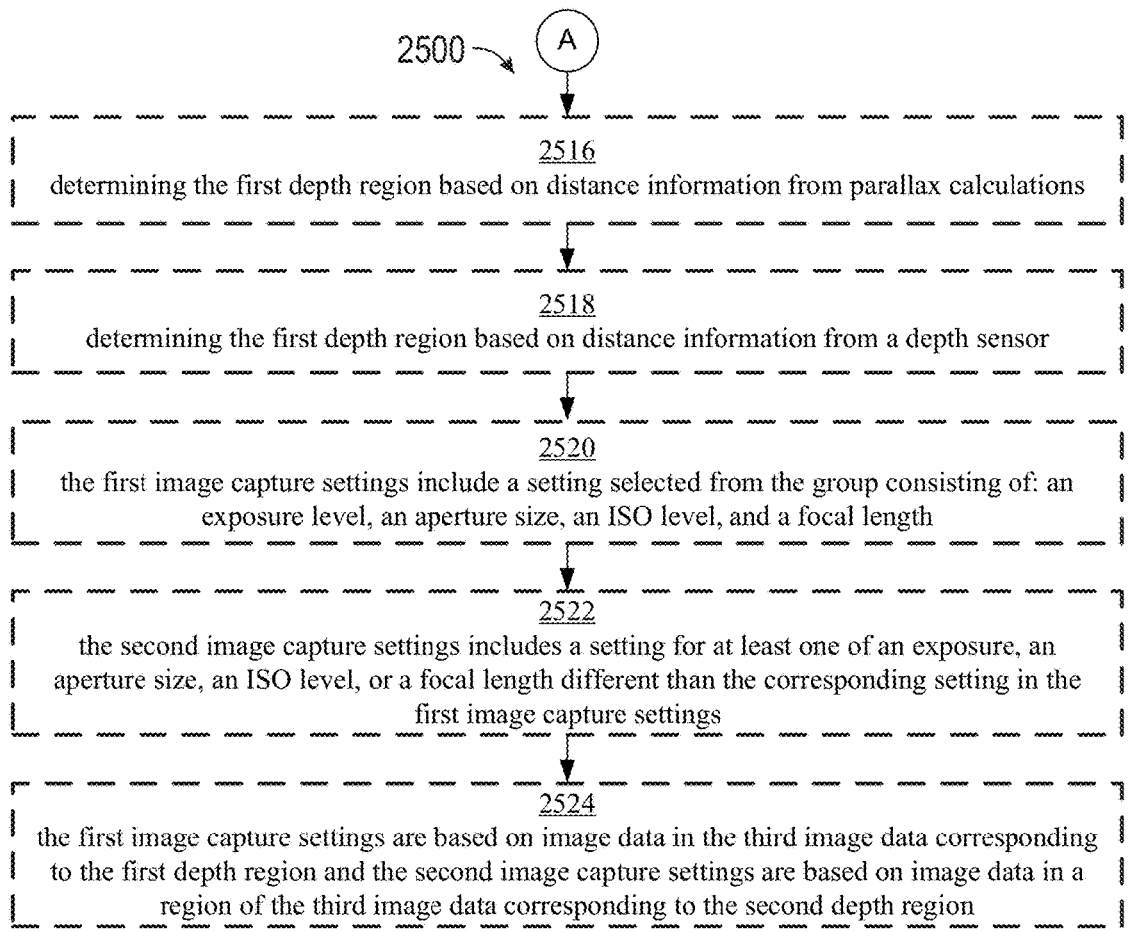

FIGS. 24A-24H illustrate exemplary user interfaces and captured image data for generating a high dynamic range (HDR) image. FIGS. 25A-25B is a flow diagram illustrating methods for generating an HDR image in accordance with some embodiments. The user interfaces in FIGS. 24A 24H illustrate the processes described below, including the processes in FIGS. 25A-25B.

FIG. 24A depicts device 2400, which in some examples is a specific form factor for device 100, device 300, device 500, or device 1500 described above. Device 2400 includes display 2401, which is a touch-sensitive display, and camera (e.g., camera 2402 on backside of device 2400 depicted in FIG. 24B). In some embodiments, camera 2402 is the same type of camera as camera 1502 (FIG. 15A). Additionally, in some embodiments of device 2400, additional sensors and/or other components (e.g., flash or IR emitter) are present along with camera 2402.

In FIG. 24A, device 2400 is displaying camera application interface 2403 on touch-sensitive display 2401. Camera application interface 2403 includes preview area 2404 that reflects a scene that is within the field of view of camera 2402 (FIG. 24B). The scene includes person 2406, tree 2408, mountains 2410, and sun 2412. Focus indicator 2414 shows where in the scene camera 2402 is currently focused. In FIG. 24A, focus indicator 2414 shows that camera 2402 is currently focused on person 2406. In the case of the scene in FIG. 24A, sun 2412 is in a position such that mountains 2410 are brightly illuminated while sun 2412 is behind person 2406 and tree 2408 causing both to be in their own shadows in the scene. Because the focus of camera 2402 is on person 2406, the exposure settings for camera 2402 are also set for person 2406. While these exposure settings work well for person 2406 and tree 2408 (which are in their own shadows), these exposure settings will cause mountains 2410 (and possibly the clouds and/or sun) to be over exposed (e.g., washed out or faded). This is represented by the dotted lines of the mountains, clouds, and sun in FIG. 24A. Camera application interface 2403 also includes HDR button 2416, which will be described with respect to FIG. 24D, and shutter button 2418 that causes camera 2402 to capture image data representing the scene within camera 2402's field of view.

In response to receiving gesture input in the form of contact 2420, device 2400 changes camera 2402's point of focus to correspond to the location of contact 2402, as depicted in FIG. 24C. In FIG. 24C, the location of focus indicator 2414 has moved to show that the focus of camera 2402 (FIG. 24B) is now on mountains 2410. Additionally, the exposure settings are now set based on mountains 2410 so that they are properly exposed but person 2406 and tree 2408 are now under exposed (e.g., dark). This is represented in FIG. 24D by the thick lines of person 2406 and tree 2408.

In response to receiving gesture input in the form of contact 2422 on HDR button 2416, the camera application switches to an HDR mode, which is depicted in FIG. 24D, so that different parts of the scene are captured with different camera settings (e.g., exposure settings) so that more of the scene is captured with camera settings that are appropriate for the respective portion of the scene. In FIG. 24D, camera application interface 2403 includes display of HDR indicator 2424 to show that the camera application is in HDR mode. Because different parts of the scene are captured with different camera settings tailored to the lighting conditions in the respective portion of the scene, more of the image data for the scene is captured with appropriate camera settings. For example, in the scene of FIG. 24D, person 2406, tree 2408, and mountains 2410 all appear to have the correct exposure settings.

In response to receiving gesture input in the form of contact 2426 on shutter button 2418, device 2400 captures image data, using camera 2402 (FIG. 24B), for the scene within the field of view of camera 2402. To create an HDR image, device 2400 captures image data from camera 2402 (FIG. 24B) at least twice. The first image data is captured from camera 2402 with a first set of camera settings that are based on an analysis of a first region of the scene. The second image data is captured from camera 2402 with a second set of camera settings that are based on an analysis of a second region of the scene that is different than the first region. In some cases, the first region is the inverse of the second region, the first region and the second region do not overlap but are also not inverse of each other, or the first region and the second region overlap but not completely. In some embodiments, the first region represents an area in the scene that is within a range of distances from the camera and the second region represents an area in the scene that is within a different range of distances from the camera. The distance from the camera to various points in the scene can be determined based on depth data for the scene. The depth data can be determined from one or more sensors (e.g., a time of flight sensor or a speckle-based sensor) within or external to camera 2402. Alternatively, depth data for the scene can be based on other techniques, such as parallax (e.g., using more than one camera or more than one image sensor within one camera) or focal length measurements.

FIG. 24E depicts an example first region and an example second region used to determine settings for different regions of the scene. In FIG. 24E, captured image data 2428 includes depth data (not shown) for associated visible light data (shown in FIG. 24E) that is also in capture image data 2428. The depth data is used to partition the captured image data (and the scene) into two regions. Region 2430 represents the portion of the scene that is at a distance greater than the distance to the tree (e.g., the range of distances in region 2430 is the range of distances greater than the distance to the tree). Region 2432 represents the portion of the scene that is at a distance less than or equal to the distance to the tree (e.g., the ranges of distance in region 2432 is the range of distances less or equal to distance to the tree). Device 2400 then analyzes captured image data 2428 to determine camera settings for first region 2430 and second region 2432. The camera settings can contain any one or more camera setting, such as exposure, white balance, ISO, aperture, etc. The first camera settings are different than the second camera settings in that at least one camera setting is different between the two (e.g., the exposure is different).

Once the first and second camera settings are determined, device 2400 captures first image data and second image data from camera 2402 using the first camera settings and the second camera settings, respectively. For example, in FIG. 24F, captured image data 2434 is captured using camera settings most appropriate for the mountains and sun (e.g., camera settings based on region 2430 of FIG. 24E) and that leave the person and the tree underexposed, as indicated by the thick lines in captured image data 2434. Still referring to FIG. 24F, captured image data 2436 is captured using camera settings most appropriate for the person and the tree (e.g., camera settings based on region 2432 of FIG. 24E) that leave the mountains and the tree overexposed, as indicated by the dashed lines in captured image 2436.

Once device 2400 obtains captured image data 2434 and captured image data 2436, device 2400 combines the image data to produce an HDR image. For example, the portion of captured image data 2434 (FIG. 24F) corresponding to region 2430 (FIG. 24E) and the portion of captured image data 2436 (FIG. 24F) corresponding to region 2440 (FIG. 24E) are combined (e.g., stitched) together, and optionally post-processed, to produce an HDR image that device 2400 stores for later viewing or sharing. As another example, device 2400 combines captured image data 2434 and captured image data 2436 by blending the image data using a blend mode, such as standard, dissolve, or multiply and screen blend mode.

After (or while) device 2400 combines captured image data 2434 and captured image data 2436 to generate an HDR image, device 2400 displays camera application interface 2403 as described with respect to FIG. 24D again, as depicted in FIG. 24G. In response to receiving gesture input in the form of contact 2440 on photo view button 2438 (which may be a thumbnail of a recently captured photo), device 2400 replaces display of camera application interface 2403 with photo view interface 2442, which displays HDR image 2444, as depicted in FIG. 24H.

FIGS. 25A-25B are a flow diagram illustrating a method for generating a HDR image in accordance with some embodiments. Method 2500 is performed at a device (e.g., 100, 300, 500) with a display and a camera. Some operations in method 2500 are, optionally, combined, the order of some operations are, optionally, changed, and some operations are, optionally, omitted.

As described below, method 2500 provides an intuitive way for generating a HDR image. The method reduces the cognitive burden on a user for generating a HDR image, thereby creating a more efficient human-machine interface. For battery-operated computing devices, enabling an electronic device to generate a HDR image conserves power and increases the time between battery charges.

An electronic device (e.g., 2400) has a display and a camera (e.g., 2402) including one or more image sensors (e.g., a visible light sensor, a light sensor outside the visible spectrum (such as infrared light sensors), and/or non-light sensors (such as time-of-flight sensors or other depth sensors). While a scene (e.g., 2404) is in a field of view of the camera, the electronic device receives (2502) a request (e.g., activation of a physical button or selection of an affordance displayed on a touch-sensitive display) to capture image data with the camera.

In response to the request to capture the image data, the electronic device captures (2504) image data (e.g., visible light data, non-visible light data (such as IR data), and/or depth data (such as time-of-flight data)) corresponding to the scene. Capturing the image data includes the electronic device capturing (2506) first image data (e.g., 2434) with a first image capture settings (e.g., one or more settings for the camera, such as exposure level, exposure time, ISO, aperture size, focal length, etc.) that are selected based on an appearance of a first portion (e.g., 2430) of the scene (e.g., an exposure level is chosen that is optimized for the first portion but is not optimized for another portion) that is determined to correspond to a first depth region (e.g., a range of distances from the one or more image sensors as determined by, for example, depth information) that is a first distance from the image sensors. The electronic device captures (2508) second image data (e.g., 2436) (e.g., of the same or different type than the first image data) with second image capture settings that are different from the first image capture settings (e.g., a set of image capture settings that has at least one setting different than the set of image capture settings corresponding to the first image capture settings or a set of image capture settings that are completely different than the set of image capture settings corresponding to the first image capture settings). The second image capture settings are selected based on an appearance of a second portion (e.g., 2432) of the scene that is determined to correspond to a second depth region that is a second distance from the camera. After capturing the image data corresponding to the scene, the electronic device causes the display of, on the display, an image (e.g., 2444) of the scene, wherein the image of the scene is generated by combining the first image data and the second image data (e.g., the first image data is cropped so that the cropped first image data represents the first image data corresponding to the first portion of the scene and the cropped first image data is overlaid and optionally blended with the second image data). Capturing second image data with settings that are different than the settings used for the first image data enables a user to capture image data using suitable settings adapted to a larger portion of the scene. This enhances the operability of the device and makes the user-device interface more efficient (e.g., by enabling the user to create an image with a larger portion of the image having been captured with proper camera settings and preventing the need to take multiple images and combine them later) which, additionally, reduces power usage and improves battery life of the device by enabling the user to use the device more quickly and efficiently.

In some embodiments, the electronic device causes display (2514) of a live preview (e.g., FIG. 24D) at least at a time corresponding to the time the request to capture image data is received. In some embodiments, live image data is captured from the camera and displayed on the display.

In some embodiments, the request (2510) to capture image data is a selection of a shutter button (e.g., 2418) (e.g., a virtual shutter button or a physical button that serves as a shutter button). In some embodiments, a camera application is being displayed, and the camera application that includes a displayed affordance for a virtual shutter button. In response to selection of the affordance (e.g., a tap gesture on the virtual shutter button) the first and second image data is captured.

In some embodiments, the first image data and the second image data (2512) each include image data corresponding to both the first and second portions of the scene, a portion of the image of the scene corresponding to the first portion of the scene includes a greater proportion of data from the first image data, and/or a portion of the image of the scene corresponding to the second portion of the scene includes a greater proportion of data from the second image data. In some embodiments, in the combined image scene, the first region from the first image data is emphasized over the corresponding region in the second image data by using a blending function that weights the first image data higher than the second image data in the first portion. In some embodiments, in the combined image scene, the second region from the second image data is emphasized over the corresponding region in the first image data by using a blending function that weights the second image data higher than the first image data in the second portion.

In some embodiments, the electronic device determines (2518) the first depth region based on distance information from parallax calculations. In some embodiments, the camera uses two or more image sensors to capture image data and generate depth data using the parallax between the two or more image sensors. In some embodiments, the electronic device determines the first depth region based on distance information from a depth sensor (e.g., the camera includes a speckle-based sensors or a time-of-flight sensor). In some embodiments, the first depth region corresponds to a first range of distance values (e.g., less than 5 m from the camera or between 1 m and 1.5 m). In some embodiments, the second depth region corresponds to a second range of distance values different than the first range of distance values. (e.g., greater than 5 m from the camera or between 6 m and 10 m). In some embodiments, the first depth region and the second depth region are mutually exclusive (e.g., FIG. 24E) (e.g., the first depth region is a lower half of the scene and the second depth region is the upper third).

In some embodiments, the first image capture settings (2520) include a setting selected from the group consisting of: an exposure level, an aperture size, an ISO level, and a focal length; (or other settings that affect how image data is captured). In some embodiments, the second image capture settings (2522) includes a setting for at least one of an exposure, an aperture size, an ISO level, or a focal length (or other settings that affect how image data is captured) different than the corresponding setting in the first image capture settings.

In some embodiments, the first image capture settings (2524) are based on third image data (e.g., 2428) captured before capturing the first image data. In some embodiments, third image data is captured prior to the first image data and the second image data. The third image data is then analyzed to determine a first and second region and corresponding image capture settings. In some embodiments, the third image data is the live preview image data discussed above. In some embodiments, the first image capture settings are based on image data in the third image data corresponding to the first depth region (e.g., a region corresponding to the first depth region in the third image data is analyzed to determine optimal image capture settings for the first image capture settings) and the second image capture settings are based on image data in a region of the third image data corresponding to the second depth region (e.g., a region corresponding to the second depth region in the third image data is analyzed to determine optimal image capture settings for the second image capture settings). In some embodiments, the first image data, the second image data, and the image of the scene have the same resolution (e.g., the first image data, the second image data, the image of the scene have the same number of pixels arranged in the same horizontal and vertical dimensions). Using third image data to determine settings to use for capturing first image data and second image data enables the device to use data representing the scene itself to determine proper camera settings for two or more portions of the scene. This enhances the operability of the device (e.g., by using captured image data to determine two sets of camera settings additional analysis of image data is avoided) which, additionally, reduces power usage and improves battery life of the device by enabling the user to use the device more quickly and efficiently.

It should be understood that the particular order in which the operations in FIGS. 25A-25B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1000, 1300, 1700, 1900, 2100, 2300, 2700) are also applicable in an analogous manner to method 2500 described above with respect to FIGS. 25A-25B. For example, the capture of image data described above with reference to method 2500 optionally has one or more of the characteristics of the capture of image data described herein with reference to other methods described herein (e.g., method 2700). For brevity, these details are not repeated here.

The operations in the information processing methods described above are, optionally, implemented by running one or more functional modules in an information processing apparatus such as general purpose processors (e.g., as described with respect to FIGS. 1A, 3, 5A) or application specific chips. Further, the operations described above with reference to FIGS. 25A-25B are, optionally, implemented by components depicted in FIGS. 1A-1B. For example, receiving a request to capture image data with the camera is, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIG. 26A-26K illustrate exemplary user interfaces, scenes, and captured image data for generating composite images based on depth data. FIGS. 27A-27B are a flow diagram illustrating method for generating composite images based on depth data. The user interfaces, scenes, and captured image data in FIGS. 26A-26K illustrate the processes described below, including the processes in FIGS. 27A-27B.

Figure 26A:
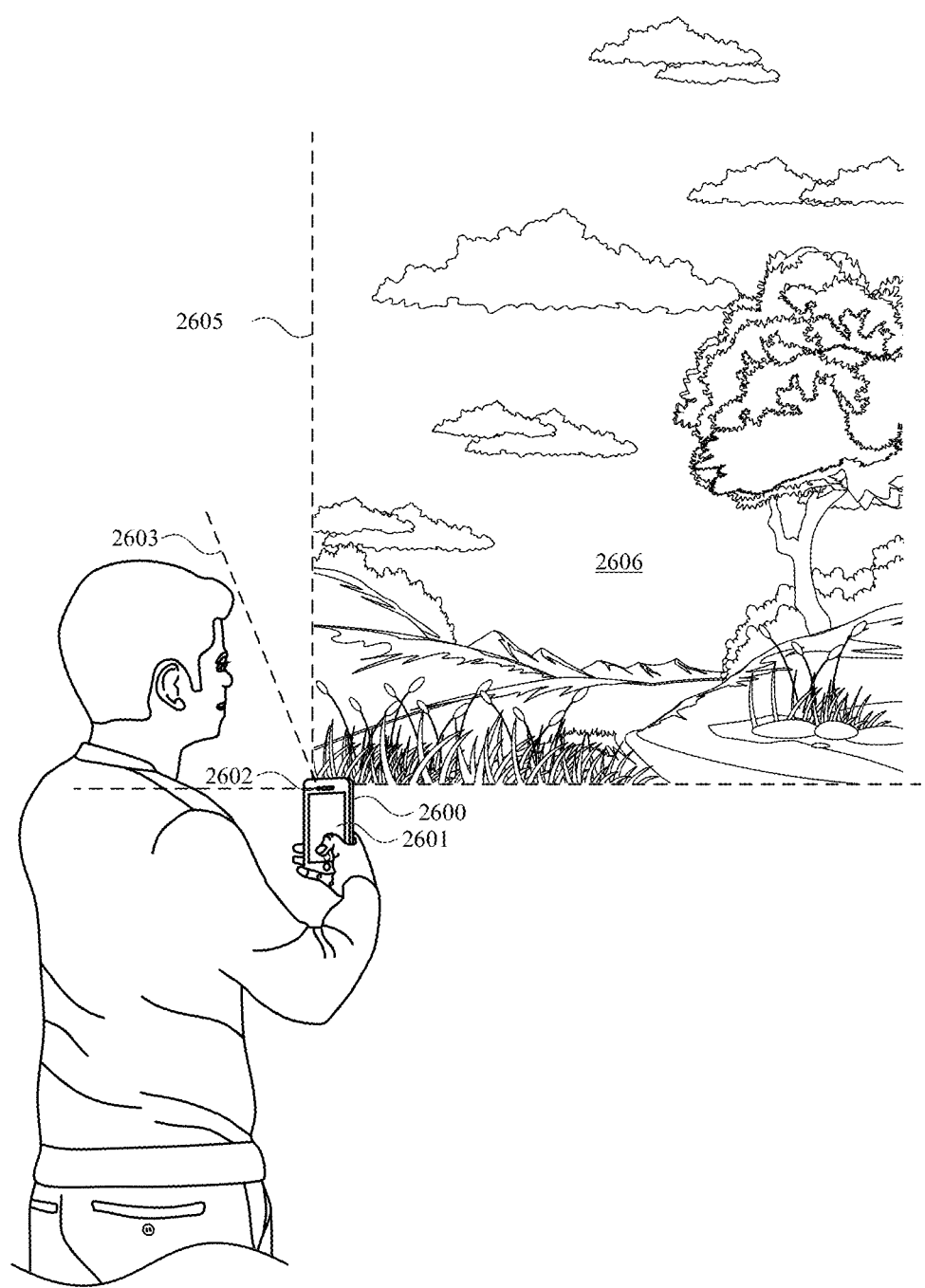
FIGS. 26A-26K illustrate exemplary user interfaces for generating a composite image.

FIG. 26A depicts a user holding device 2600, which in some examples is a specific form factor for device 100, device 300, device 500, or device 1500 described above. Device 2600 includes display 2601, which is a touch-sensitive display, and camera 2601 facing the front of device 2600 and camera 2604 on backside of device 2600 depicted in FIG. 26C. Additionally, in some embodiments of device 2600, additional sensors and/or other components (e.g., flash or IR emitter) are present along with camera 2602 and camera 2604. Camera 2602 has field of view 2603 encompassing a scene in front of device 2600. Camera 2604 has field of view 2605 encompassing scene 2606 in back of device 2600. In some embodiments camera 2602 and camera 2604 are the same type of camera as camera 1502 of FIG. 15A.

Figure 26B:
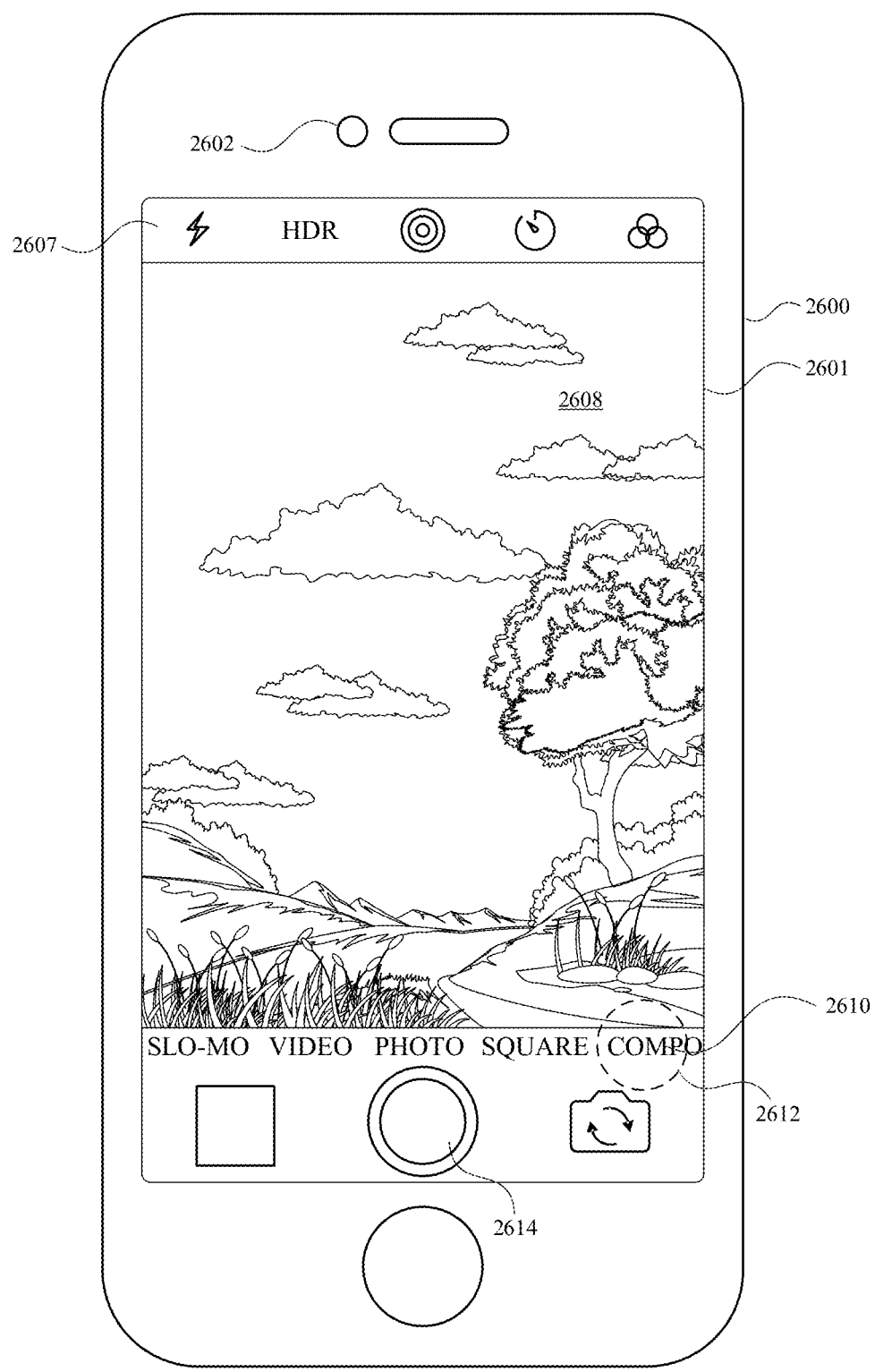
Figure 26C:
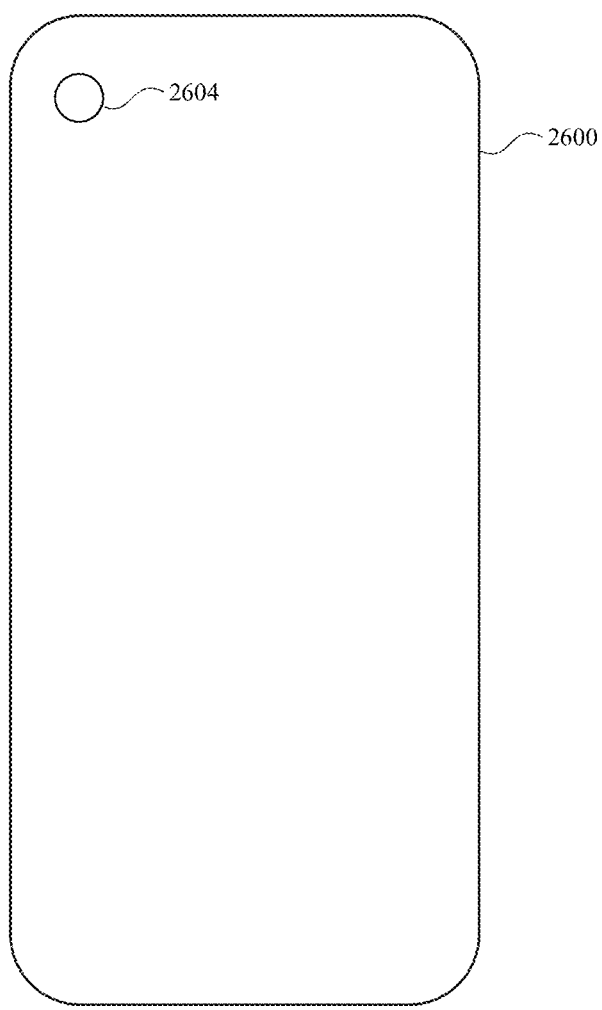

FIG. 26B depicts device 2600 displaying camera application interface 2607 on touch sensitive display 2601. Camera application interface 2607 includes a display of image data 2608 representing scene 2606 within field of view 2605 of camera 2604 (FIG. 26C). Camera application interface 2607 also includes shutter button 2614 and composite mode button 2610. In response to gesture input in the form of contact 2612 on composite mode button 2610, the camera application enters a composite mode as depicted in FIG. 26D or 26E.

FIG. 26C depicts the back of device 2600, which includes camera 2604. Camera 2604 has field of view 2605 that encompasses a scene behind device 2600, as depicted in FIG. 26A.

Figure 26D:
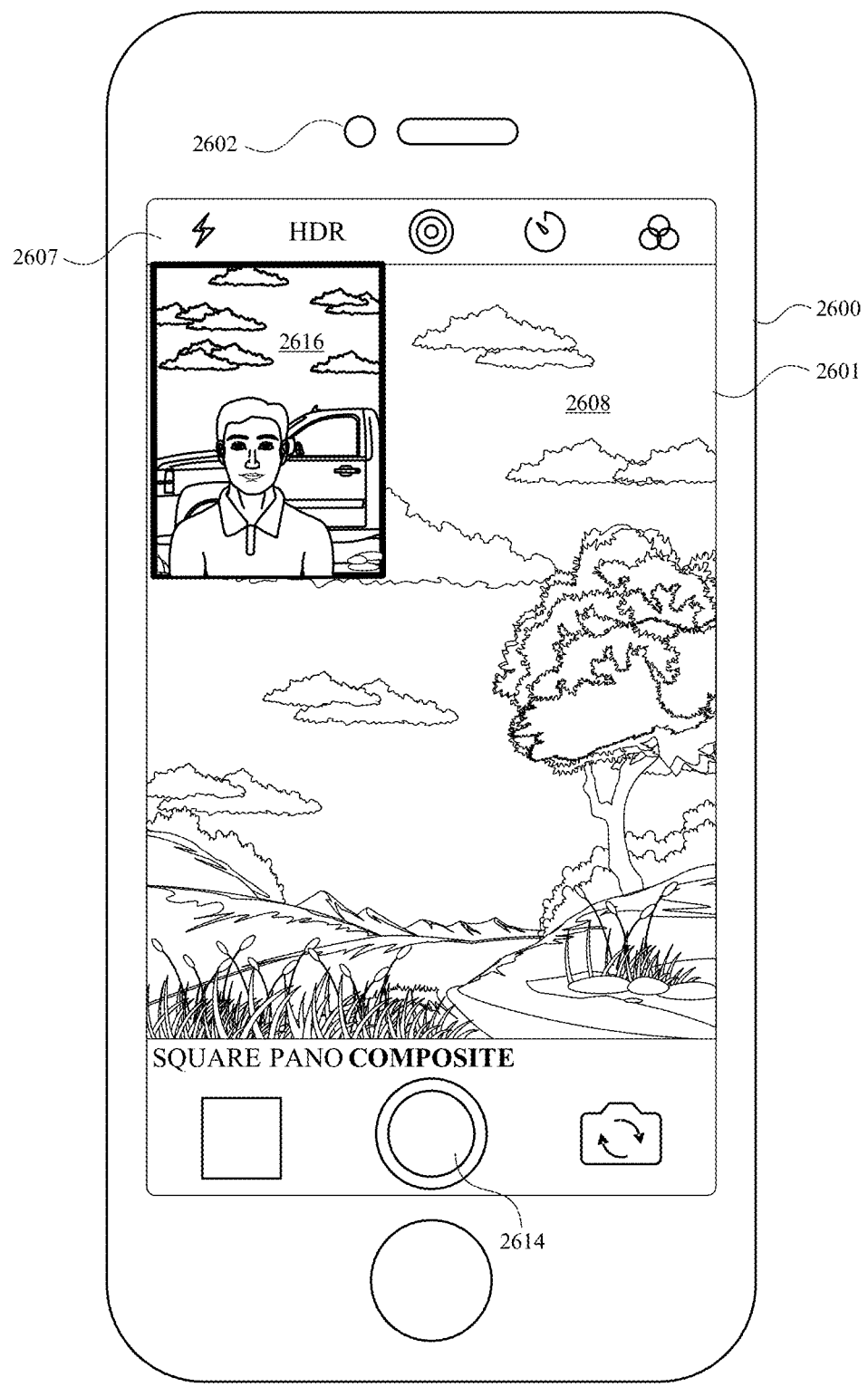
Figure 27A:
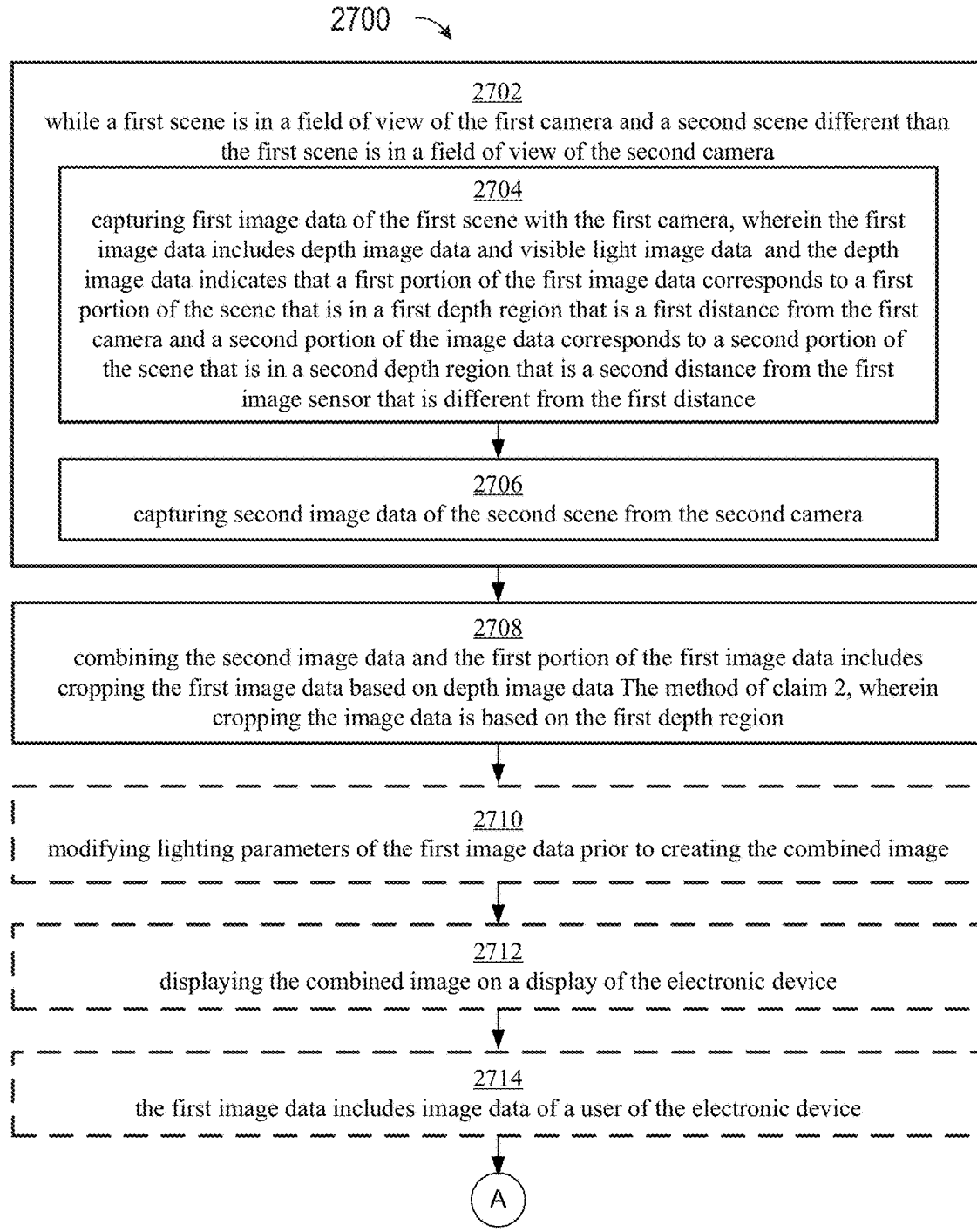
FIGS. 27A-27B are a flow diagram illustrating a method for generating a composite image.
Figure 27B:
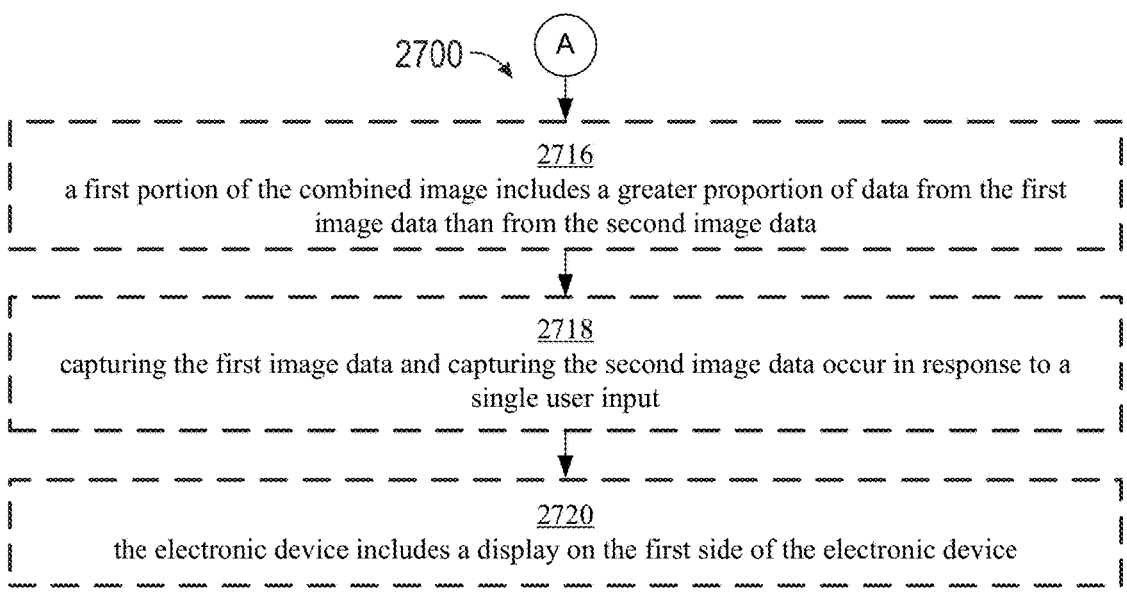

FIG. 26D depicts camera application interface 2607 after the camera application has entered composite mode. In addition to image data 2608 from camera 2604, camera application interface 2607 now also includes image data 2616 captured from camera 2602. Image data 2616 shows the user of device 2600 that is holding device 2600 (see FIG. 26A).

Figure 26E:
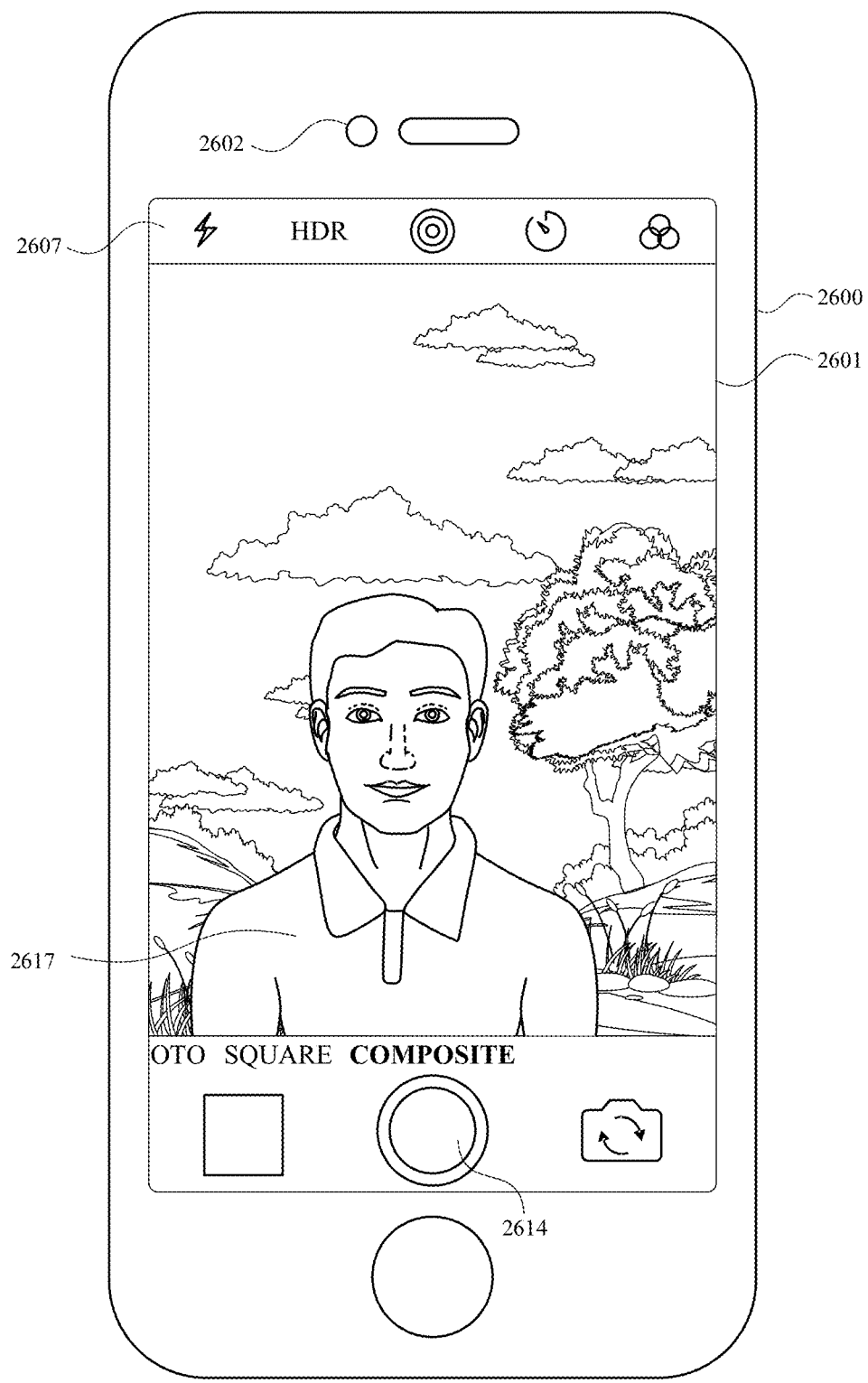
Figure 26F:
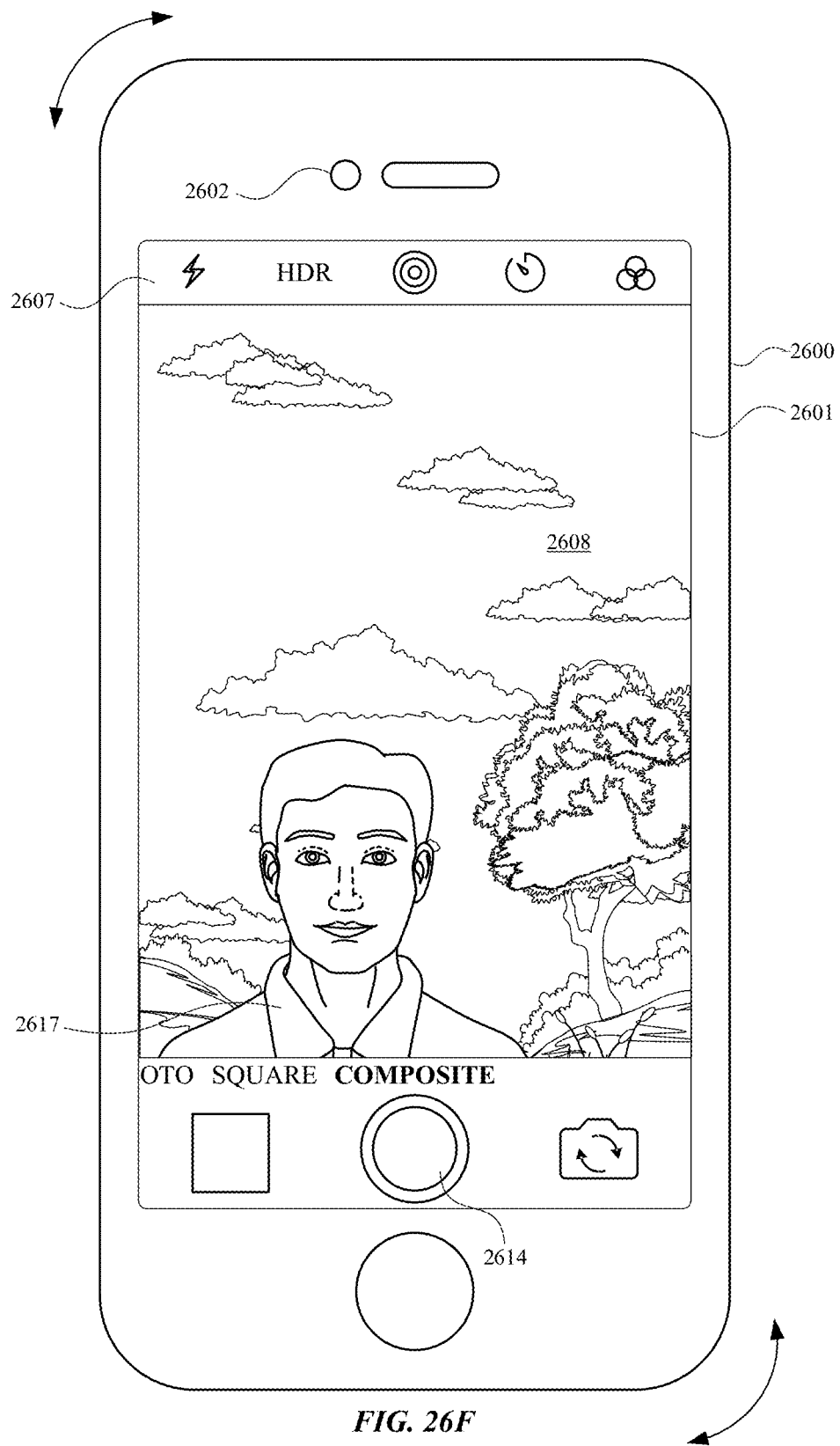

FIG. 26E depicts an alternative embodiment of camera application interface 2607 after the camera application has entered composite mode. As opposed to FIG. 26D, in FIG. 26E, camera application interface 2607 provides a preview of the composite of image data 2608 and image data 2616 by displaying image data 2608 with image data portion 2617 of image data 2616.

The preview in camera application interface 2607 is optionally a "live" preview that updates as device 2600 is moved. For example, in FIG. 26F, device 2600 has been tilted as compared to FIG. 26E. In response, the preview in camera application interface 2600 is updated to reflect the new scenes that are within the cameras' fields of view.

Figure 26G:
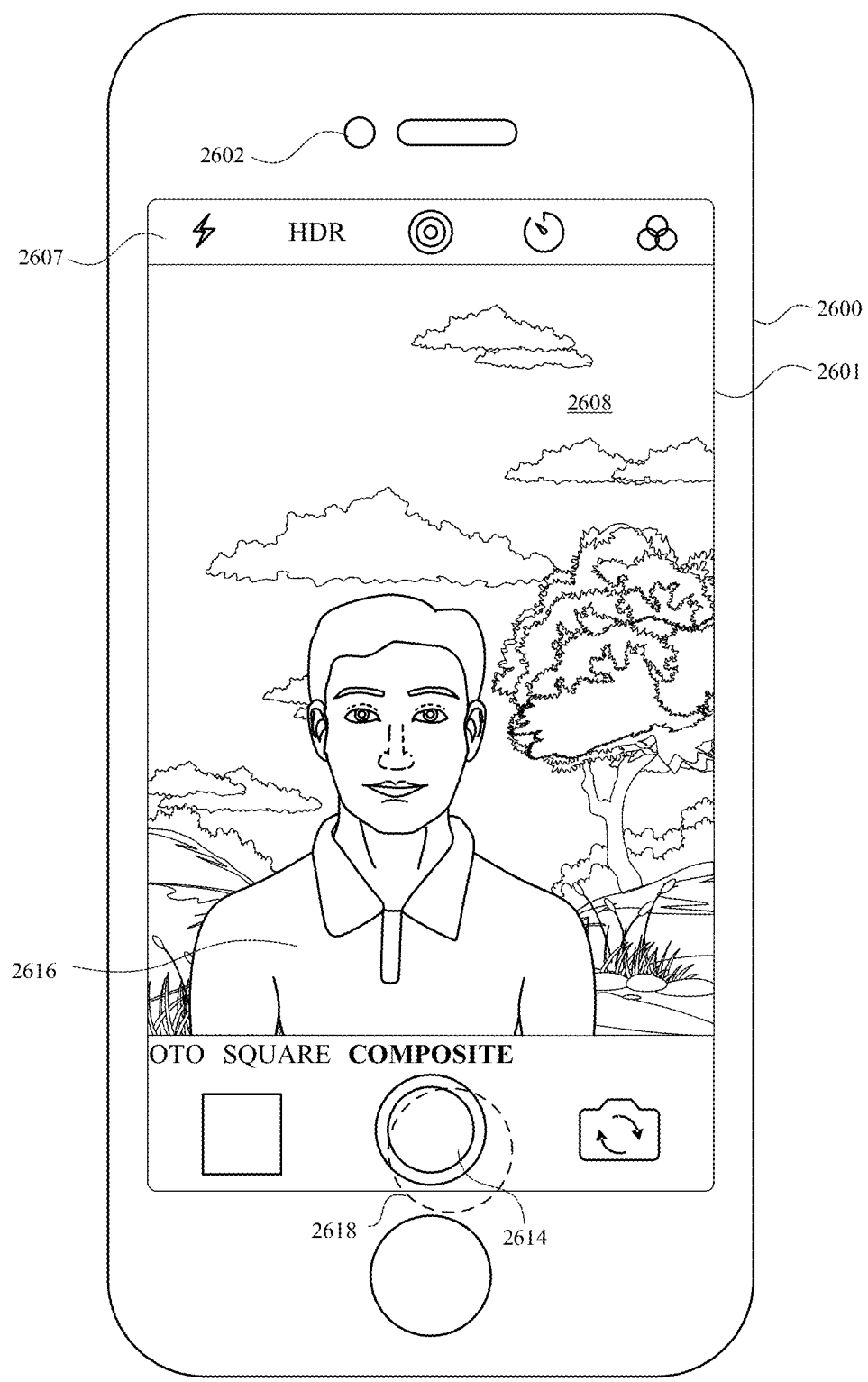

In FIG. 26G, which depicts device 2600 after returning to the same tilt as was present in FIG. 26E, device 2600 receives gesture input in the form of contact 2618 on shutter button 2614. In response, device 2600 captures image data from camera 2602 and camera 2604.

Figure 26H:
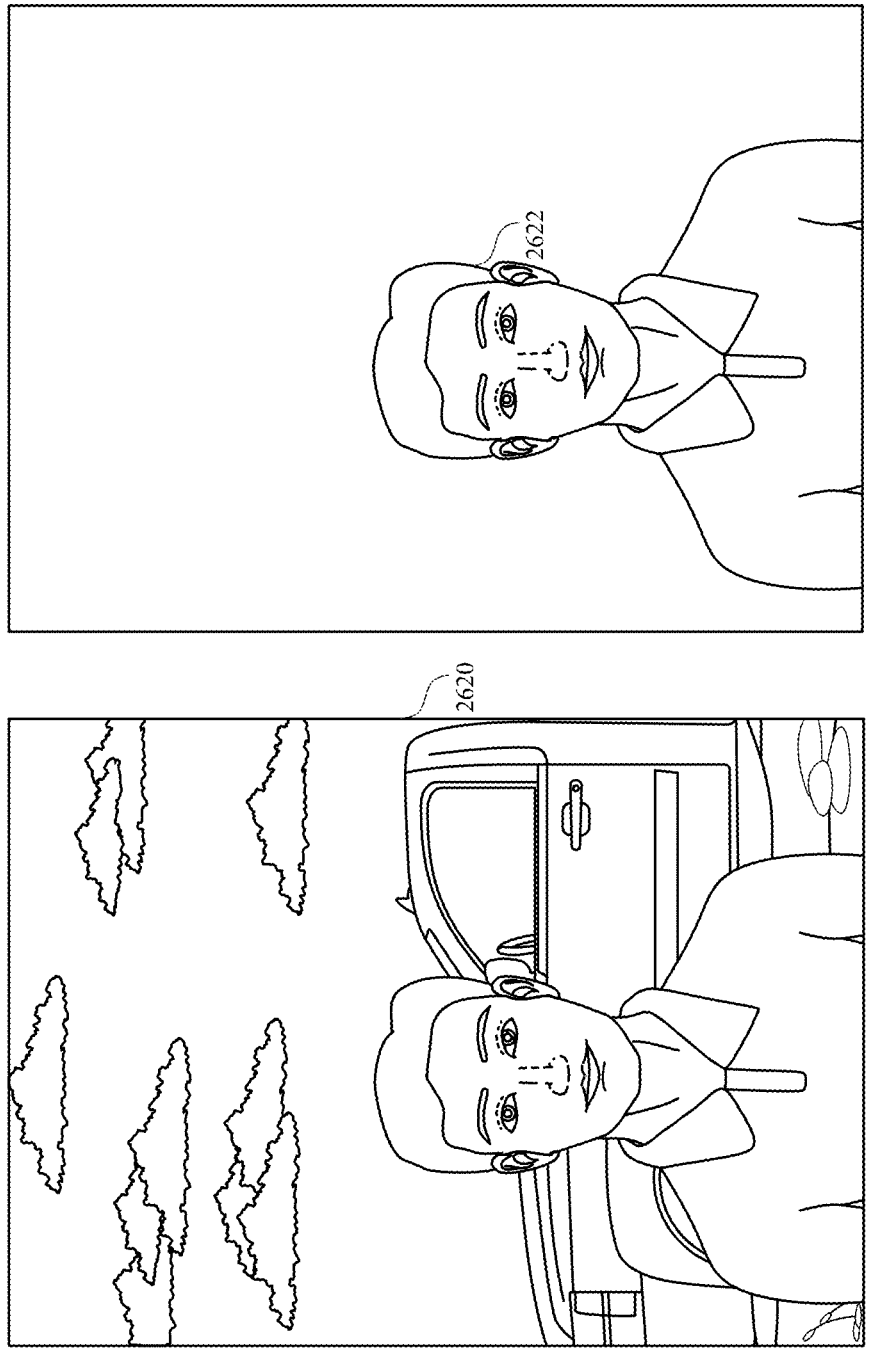

FIG. 26H depicts image data 2620 captured from back-facing camera 2604. Image data 2620 is of a scene within field of view 2605 (FIG. 26A) of camera 2604 (FIG. 26C). Device 2600 uses depth data for image data 2620 to determine a first region in image data 2620 that corresponds to a portion of the scene that is within a range of distances from camera 2604. For example, device 2600 uses depth data to determine that portion 2622 of image data 2620 is within 1.5 m of camera 2604.

Figure 26I:
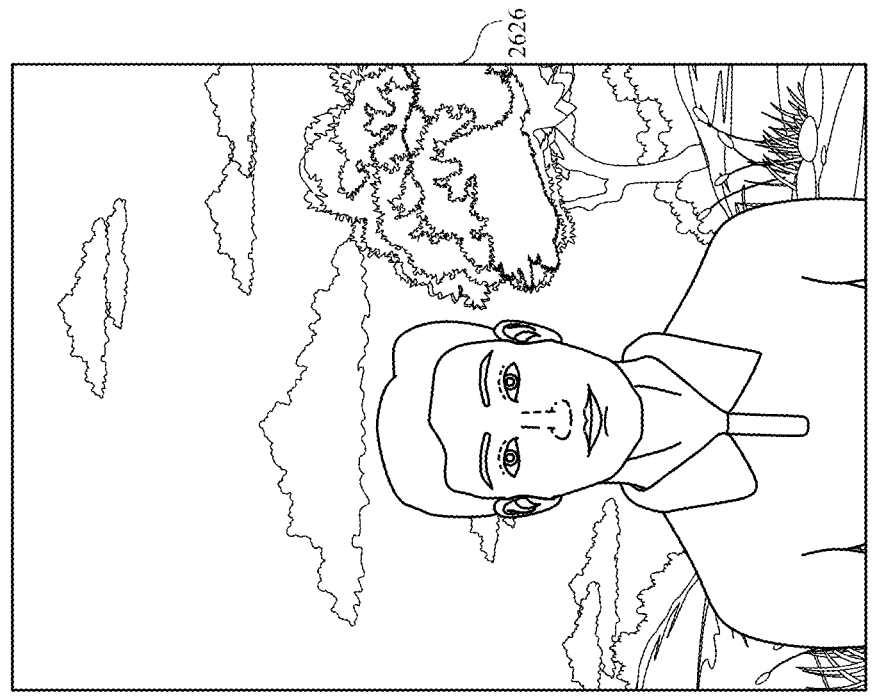
Figure 26I:
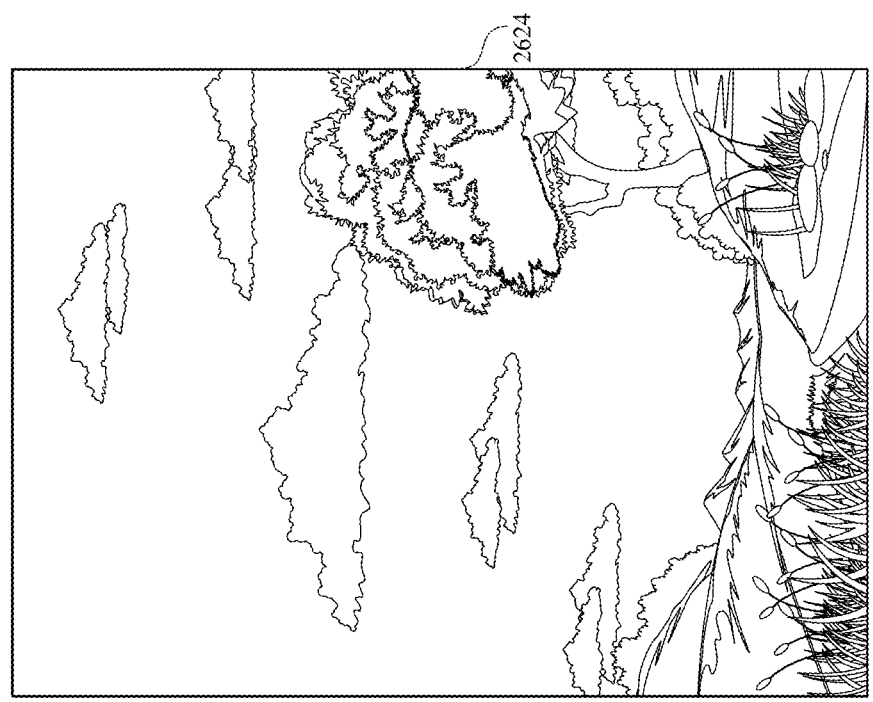

FIG. 26I depicts image data 2624 captured from front-facing camera 2602. Image data 2624 is of a scene within field of view 2603 (FIG. 26A) of camera 2602. After capturing image data 2620 and 2624, device 2600 combines image data 2620 and image data 2624 to create image data representing a composite image. In one example, device 2600 combines image data 2620 and image data 2624 by overlaying portion 2622 of image data 2620 over image data 2624, as depicted in image data 2626, which device 2600 stores for later viewing or sharing. In another example, device 2600 blends a portion (e.g., determined based on depth data) of image data 2620 with image data 2624. Device 2600 optionally blends another, different portion (e.g., also determined based on depth data) of image data 2620 with image data 2624 using a different blend mode.

Figure 26J:
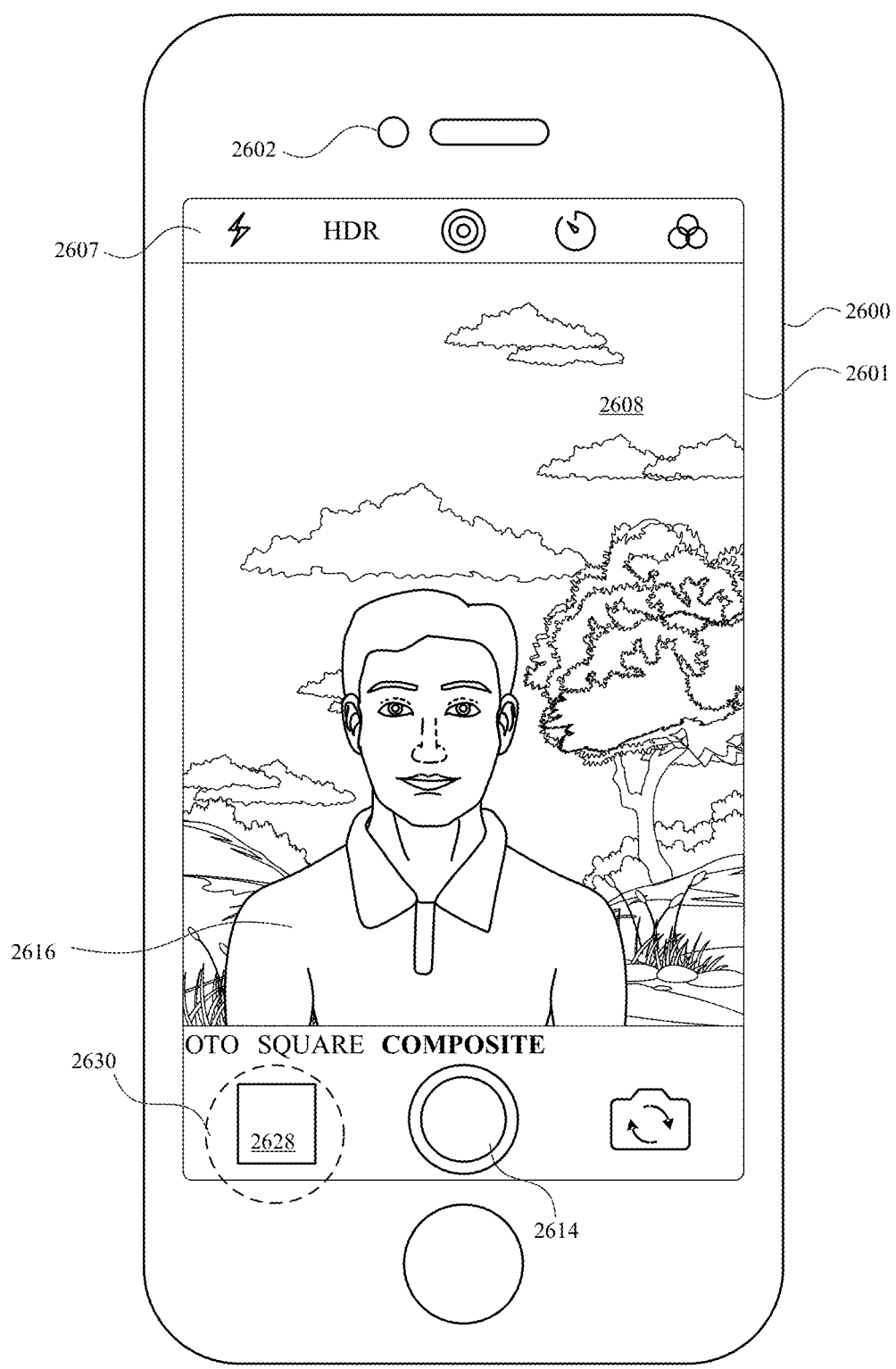
Figure 26K:
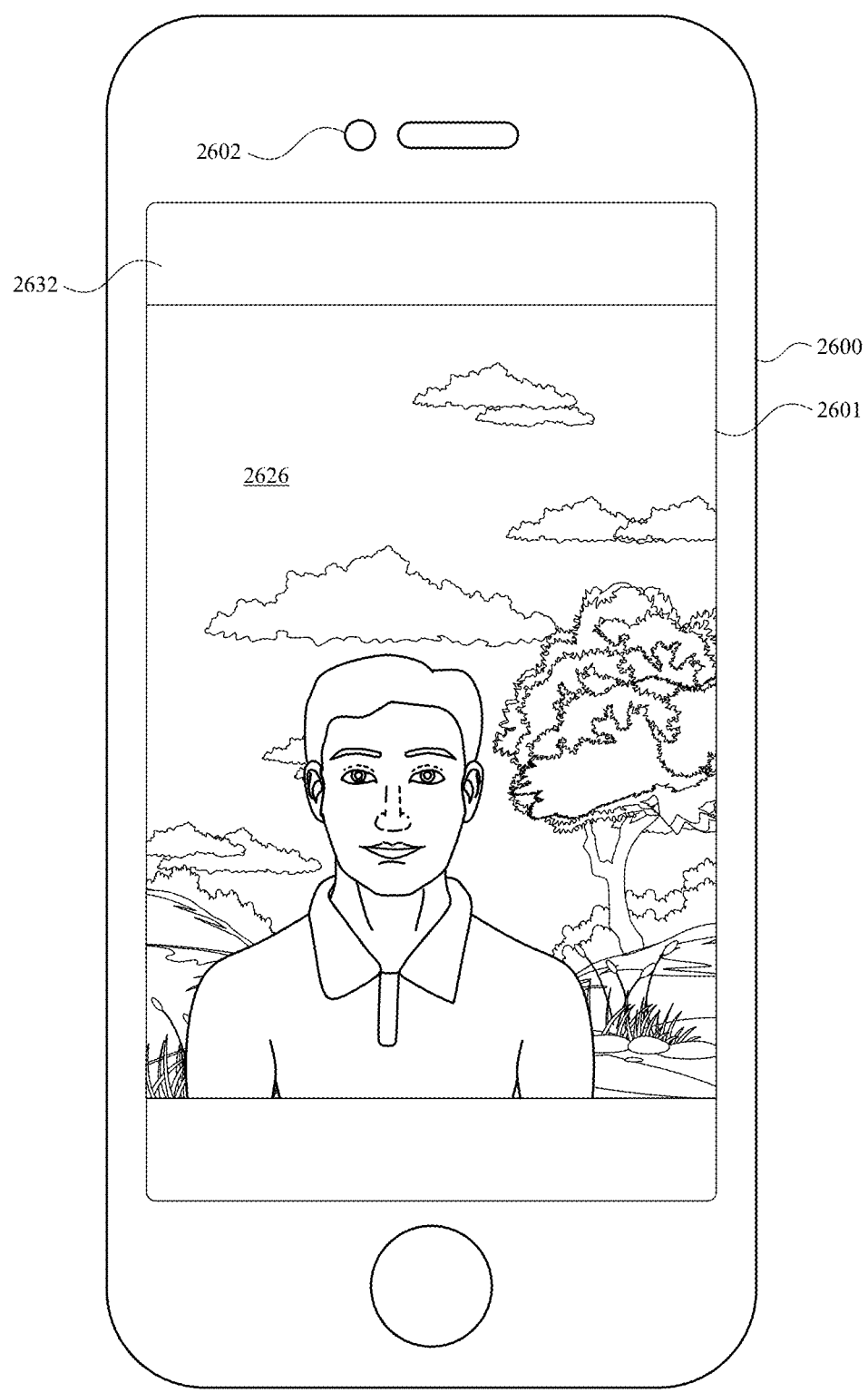

After (or while) device 2600 combines a portion of captured image data 2620 and captured image data 2624 to generate a composite image, device 2600 displays camera application interface 2607 as described with respect to FIG. 26E, as depicted in FIG. 26J. In response to receiving gesture input in the form of contact 2630 (FIG. 26J) on photo view button 2628 (which may be a thumbnail of a recently captured image), device 2600 replaces display of camera application interface 2607 with photo view interface 2632, which displays composite image data 2626, as depicted in FIG. 26K.

FIGS. 27A-27B are a flow diagram illustrating a method for generating composite images based on depth data in accordance with some embodiments. Method 2700 is performed at a device (e.g., 100, 300, 500, 2600) with a display and a camera. Some operations in method 2700 are, optionally, combined, the order of some operations are, optionally, changed, and some operations are, optionally, omitted.

As described below, method 2700 provides an intuitive way for generating composite images based on depth data. The method reduces the cognitive burden on a user for generating composite images based on depth data, thereby creating a more efficient human-machine interface. For battery-operated computing devices, enabling an electronic device to generate composite images based on depth data conserves power and increases the time between battery charges.

An electronic device (e.g., 2600) has a first camera (e.g., 2602) (e.g., front facing camera having a visible light sensor, a light sensor outside the visible spectrum (such as infrared light sensors), and/or non-light sensors (such as time-of-flight sensors or other depth sensors)) on a first side (e.g., the front or same side as the display) of the electronic device and a second camera (e.g., 2604) (e.g., back facing camera having a visible light sensor, a light sensor outside the visible spectrum (such as infrared light sensors), and/or non-light sensors (such as time-of-flight sensors or other depth sensors)) on a second side (e.g., the back or opposite side as the display) of the electronic device opposite the first side. In some embodiments, the display (2720) of the electronic device is on the first side of the electronic device. For example, the first camera faces the user of the electronic device when the user is positioned in front of the display of the electronic device.

While (2702) a first scene (e.g., a scene of the user of the electronic device) is in a field of view (e.g., 2603) of the first camera and a second scene (e.g., a scene that the user of the electronic device wishes to appear in) different than the first scene is in a field of view (e.g., 2605) of the second camera: the electronic device captures (2704) first image data (2620) of the first scene with the first camera, wherein the first image data includes depth image data (e.g., time-of-flight information, distance information, data derived from parallax of multiple image sensors in the first camera, etc.) and visible light image data (e.g., from one or more visible light sensors in the first camera) and the depth image data indicates that a first portion (e.g., 2622) of the first image data corresponds to a first portion of the scene that is in a first depth region (e.g., a range of distances from the camera as determined by, for example, depth image data) that is a first distance from the first camera and a second portion of the image data corresponds to a second portion of the scene that is in a second depth region that is a second distance from the first image sensor that is different from the first distance; and captures (2706) second image data (e.g., 2624) of the second scene from the second camera (e.g., simultaneously with or in close succession to capturing the first image data and, optionally, in response to a single user input). After capturing the first image data and the second image data, the electronic device combines (2708) the second image data and the first portion of the first image data to create a combined image (e.g., 2626) (e.g., overlaying the cropped first image data onto the second captured image data to make it appear like the first cropped first image data was part of the second captured image data). Combining the first image data and second image data enables a user to create an image that would be difficult or impossible for the user to otherwise create. This enhances the operability of the device and makes the user-device interface more efficient (e.g., by allowing the user to create an image that could not otherwise be captured and to allow for the creation of the image without further user interaction) which, additionally, reduces power usage and improves battery life of the device by enabling the user to use the device more quickly and efficiently.

In some embodiments, combining the second image data and the first portion of the first image data includes cropping the first image data based on depth image data (e.g., cropping a person in the captured first image data based on the person being represented by a shallower depth in the depth image data). In some embodiments, cropping the image data is based on the first depth region (e.g., analyzing data in the first image data to determine depth data or extracting the depth image data from the first image data when the depth image data is stored within the first image data).

In some embodiments, the electronic device modifies (2710) lighting parameters of the first image data prior to creating the combined image. For example, if a lighting source, such as the sun, lights the first image data from one side but the lighting source lights the second image data from a different side, such as the opposite side, then the lighting in the first portion of the first image data is adjusted using image processing techniques. The modifications to the lighting can be done before or after combining the first portion of the first image data with the second image data. In some embodiments, the lighting is modified so that the brightness or other image characteristics in the first portion of the first image data matches or is otherwise based on the brightness or corresponding characteristics in the second image data. In some embodiments, modifying the lighting parameters of the first image data is based on a direction of light detected in the second image data. In some embodiments, modifying the lighting parameters of the first image data is based on a brightness of light detected in the second image data. In some embodiments, modifying the lighting parameters of the first image data is based on depth image data for the first image data. Modifying the lighting parameters of the first image data enables creation of a combined image that looks less like an image that was created from two separate images and more like an image that was the result of a single capture. This enhances the operability of the device and makes the user-device interface more efficient (e.g., by helping the user to achieve an intended result with minimal interactions and reducing user mistakes when operating/interacting with the device) which, additionally, reduces power usage and improves battery life of the device by enabling the user to use the device more quickly and efficiently.

In some embodiments, the electronic device causes display (2712) of the combined image (e.g., 2626) on a display of the electronic device (e.g., 26K) (e.g., display a user that was captured in the first image data with a scene that was captured in the second image data). In some embodiments, capturing (2718) the first image data and capturing the second image data occur in response to a single user input (e.g., 2618) (e.g., both image data are captured simultaneously or substantially simultaneously). In some embodiments, the single user input is received while displaying a live preview based on image data from the first or second camera (e.g., FIG. 26G) (e.g., a live preview of the first image data, the second image data, or a composite of a portion of the first image data and the second image data). In some embodiments, the combined image is not based on the second portion of the first image data, wherein the second portion does not overlap the first portion.

In some embodiments, a first portion (2716) of the combined image includes a greater proportion of data from the first image data than from the second image data. In some embodiments, a portion of the combined image is primarily constructed or completely constructed using data from the first image data with a lesser proportion (or no proportion) of data from the second image data. For example, the first image data is captured from a front-facing camera and captures image data that includes the user of the electronic device. The second image data is captured from a back-facing camera and captures image data of a scene that the user wishes to appear in. Using depth data for the first image data, the first image data is cropped to include image data corresponding to a range of distances from the front-facing camera. The cropped first image data is then combined with the second image data by, for example, overlaying the cropped first image data onto the second image data and, optionally, using one or more blending functions. In some embodiments, the first image data (2714) includes image data of a user of the electronic device (e.g., FIG. 26H). Using primarily data from one image capture with a first camera as opposed to another image capture from a second camera enables for a higher quality/resolution image where the first camera is a better (e.g., more sensitive, higher quality, higher resolution) than the second camera. Additionally, using two separate cameras allows for images with different fields of view to capture image data that a single camera cannot capture. This enhances the operability of the device by providing for better composite images the depicts scenes that could not otherwise be captured.

In some embodiments, combining the second image data and the first portion of the first image data is based on a first blend setting. In some embodiments, the electronic device combines the second image data and a second portion of the first image data based on a second blend setting different than the first blend settings. In some embodiments, the first portion of the first image data is combined with the second image data with a first weighting factor or a first blend mode. The second portion of the first image data is combined with the second image data based on a second weighting factor that is different (e.g., smaller) than the first weighting factor or a different, second blend mode. Using different blend settings for different parts of a scene while combing first and second captured image data for the scene enables for more realistic composite images by choosing specific blend settings for different parts of the scene. This enhances the operability of the device by providing for better composite images.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to communicate with or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
   a display;
   a camera;
   one or more processors; and
   memory storing one or more programs configured to be executed by the one or more processors, the one or more programs including instructions for:
   displaying, on the display, a user interface that includes a representation of content;
   while displaying the user interface that includes the representation of content, receiving first user input on the electronic device corresponding to a request for performing a predefined action on the content; and
   in response to receiving the first user input:
   in accordance with a determination, based on captured image data captured by the camera, that a set of authorization criteria is met, wherein the authorization criteria include a criterion that is met when the captured image data indicates that the face of an authorized user was present in front of the camera and was looking at the display at the time that the user input was received, performing the predefined action; and
   in accordance with a determination, based on the captured image data, that the set of authorization criteria is not met because the captured image data indicates that the face of an authorized user was present in front of the camera and was not looking at the display, forgoing performance of the predefined action and displaying a confirmation interface providing an affordance that, when activated, performs the predefined action.

2. The electronic device of claim 1, the one or more programs further including instructions for:
   capturing the captured image data with the camera at a time that corresponds to a time at which the first user input was received.

3. The electronic device of claim 1, wherein the predefined action is a destructive action.

4. The electronic device of claim 1, wherein the request for performing the predefined action is a request to erase or delete the content.

5. The electronic device of claim 1, wherein the predefined action includes navigating to a particular view of the user interface associated with the content.

6. The electronic device of claim 1, the one or more programs further including instructions for:
   in accordance with the determination, based on the captured image data, that the set of authorization criteria is not met, switching the electronic device into a locked state.

7. The electronic device of claim 1, the one or more programs further including instructions for:
   in response to receiving the first user input:
   in accordance with the determination, based on the captured image data, that the set of authorization criteria is not met, prompting the user to authenticate by looking at the camera.

8. The electronic device of claim 1, wherein the user interface includes a list of graphical elements representing a plurality of data objects, wherein the representation of the content is one of the graphical elements and the content is an associated data object of the plurality of data objects.

9. The electronic device of claim 1, the one or more programs further including instructions for:
   receiving second user input on the representation of the content that exceeds an intensity threshold; and
   subsequent to receiving the second user input, restricting access to the content, including requiring that captured image data indicates that the face of an authorized user is present in front of the camera and is looking at the display in order for the content to be accessed in response to the second first user input.

10. The electronic device of claim 9, the one or more programs further including instructions for:
    in response to receiving the second user input, displaying an affordance, wherein, in response to selection of the affordance, the electronic device stores an indication on the electronic device that accessing the content requires that a set of access criteria be met.

11. The electronic device of claim 10, the one or more programs further including instructions for:
  in response to receiving the first user input, determining whether the indication is present for the content.

12. The electronic device of claim 1, wherein the set of authorization criteria further includes a criterion that a face in the captured image data corresponds to one or more authorized faces previously registered with the device.

13. A non-transitory computer-readable storage medium storing one or more programs configured to be executed by one or more processors of an electronic device with a display and a camera, the one or more programs including instructions for:
  displaying, on the display, a user interface that includes a representation of content;
  while displaying the user interface that includes the representation of content, receiving first user input on the electronic device corresponding to a request for performing a predefined action on the content; and
  in response to receiving the first user input:
    in accordance with a determination, based on captured image data captured by the camera, that a set of authorization criteria is met, wherein the authorization criteria include a criterion that is met when the captured image data indicates that the face of an authorized user was present in front of the camera and was looking at the display at the time that the first user input was received, performing the predefined action; and
    in accordance with a determination, based on the captured image data, that the set of authorization criteria is not met because the captured image data indicates that the face of an authorized user was present in front of the camera and was not looking at the display, forgoing performance of the predefined action and displaying a confirmation interface providing an affordance that, when activated, performs the predefined action.

14. The non-transitory computer-readable storage medium of claim 13, the one or more programs further including instructions for:
  capturing the captured image data with the camera at a time that corresponds to a time at which the first user input was received.

15. The non-transitory computer-readable storage medium of claim 13, wherein the predefined action is a destructive action.

16. The non-transitory computer-readable storage medium of claim 13, wherein the request for performing the predefined action is a request to erase or delete the content.

17. The non-transitory computer-readable storage medium of claim 13, wherein the predefined action includes navigating to a particular view of the user interface associated with the content.

18. The non-transitory computer-readable storage medium of claim 13, the one or more programs further including instructions for:
  in accordance with the determination, based on the captured image data, that the set of authorization criteria is not met, switching the electronic device into a locked state.

19. The non-transitory computer-readable storage medium of claim 13, the one or more programs further including instructions for:
  in response to receiving the first user input:
    in accordance with the determination, based on the captured image data, that the set of authorization criteria is not met, prompting the user to authenticate by looking at the camera.

20. The non-transitory computer-readable storage medium of claim 13, wherein the user interface includes a list of graphical elements representing a plurality of data objects, wherein the representation of the content is one of the graphical elements and the content is an associated data object of the plurality of data objects.

21. The non-transitory computer-readable storage medium of claim 13, the one or more programs further including instructions for:
  receiving second user input on the representation of the content that exceeds an intensity threshold; and
  subsequent to receiving the second user input, restricting access to the content, including requiring that captured image data indicates that the face of an authorized user is present in front of the camera and is looking at the display in order for the content to be accessed in response to the first user input.

22. The non-transitory computer-readable storage medium of claim 21, the one or more programs further including instructions for:
  in response to receiving the second user input, displaying an affordance, wherein, in response to selection of the affordance, the electronic device stores an indication on the electronic device that accessing the content requires that a set of access criteria be met.

23. The non-transitory computer-readable storage medium of claim 22, the one or more programs further including instructions for:
  in response to receiving the first user input, determining whether the indication is present for the content.

24. The non-transitory computer-readable storage medium of claim 13, wherein the set of authorization criteria further includes a criterion that a face in the captured image data corresponds to one or more authorized faces previously registered with the device.

25. The method of claim 14, further comprising:
  capturing the captured image data with the camera at a time that corresponds to a time at which the first user input was received.

26. A method comprising: at an electronic device having a display and a camera:
  displaying, on the display, a user interface that includes a representation of content;
  while displaying the user interface that includes the representation of content, receiving first user input on the electronic device corresponding to a request for performing a predefined action on the content; and
  in response to receiving the first user input:
    in accordance with a determination, based on captured image data captured by the camera, that a set of authorization criteria is met, wherein the authorization criteria include a criterion that is met when the captured image data indicates that the face of an authorized user was present in front of the camera and was looking at the display at the time that the first user input was received, performing the predefined action; and
    in accordance with a determination, based on the captured image data, that the set of authorization criteria is not met because the captured image data indicates that the face of an authorized user was present in front of the camera and was not looking at the display, forgoing performance of the predefined action and displaying a confirmation interface providing an affordance that, when activated, performs the predefined action.

27. The method of claim 26, wherein the predefined action is a destructive action.

28. The method of claim 26, wherein the request for performing the predefined action is a request to erase or delete the content.

29. The method of claim 26, wherein the predefined action includes navigating to a particular view of the user interface associated with the content.

30. The method of claim 26, further comprising:
in accordance with the determination, based on the captured image data, that the set of authorization criteria is not met, switching the electronic device into a locked state.

31. The method of claim 26, further comprising:
in response to receiving the first user input:
in accordance with the determination, based on the captured image data, that the set of authorization criteria is not met, prompting the user to authenticate by looking at the camera.

32. The method of claim 26, wherein the user interface includes a list of graphical elements representing a plurality of data objects, wherein the representation of the content is one of the graphical elements and the content is an associated data object of the plurality of data objects.

33. The method of claim 26, further comprising:
receiving second user input on the representation of the content that exceeds an intensity threshold; and
subsequent to receiving the second user input, restricting access to the content, including requiring that captured image data indicates that the face of an authorized user is present in front of the camera and is looking at the display in order for the content to be accessed in response to the first user input.

34. The method of claim 33, further comprising:
in response to receiving the second user input, displaying an affordance, wherein, in response to selection of the affordance, the electronic device stores an indication on the electronic device that accessing the content requires that a set of access criteria be met.

35. The method of claim 34, further comprising:
in response to receiving the first user input, determining whether the indication is present for the content.

36. The method of claim 26, wherein the set of authorization criteria further includes a criterion that a face in the captured image data corresponds to one or more authorized faces previously registered with the device.

* * * * *

UNITED STATES PATENT AND TRADEMARK OFFICE
CERTIFICATE OF CORRECTION

PATENT NO. : 10,444,963 B2
APPLICATION NO. : 16/035419
DATED : October 15, 2019
INVENTOR(S) : Marek Bereza et al.

It is certified that error appears in the above-identified patent and that said Letters Patent is hereby corrected as shown below:

In the Claims

Claim 1, Column 106, Line 9, between "the" and "user" add -first-.

Claim 9, Column 106, Line 60, after "the" delete "second".

Claim 25, cancel the text beginning with "25. The method of claim 14" in Column 108, Line 40 to and ending with "input was received." in Column 108, Line 43 and insert the following claim:
--25. A method comprising: at an electronic device having a display and a camera:
displaying, on the display, a user interface that includes a representation of content;
while displaying the user interface that includes the representation of content, receiving first user input on the electronic device corresponding to a request for performing a predefined action on the content; and in response to receiving the first user input:
    in accordance with a determination, based on captured image data captured by the camera, that a set of authorization criteria is met, wherein the authorization criteria include a criterion that is met when the captured image data indicates that the face of an authorized user was present in front of the camera and was looking at the display at the time that the first user input was received, performing the predefined action; and
    in accordance with a determination, based on the captured image data, that the set of authorization criteria is not met because the captured image data indicates that the face of an authorized user was present in front of the camera and was not looking at the display, forgoing performance of the predefined action and displaying a confirmation interface providing an affordance that, when activated, performs the predefined action.--.

Claim 26, cancel the text beginning with "26. A method comprising" in Column 108, Line 44 to and ending with "the predefined action" in Column 109, Line 3 and insert the following claim:
--26. The method of claim 25, further comprising:
capturing the captured image data with the camera at a time that corresponds to a time at which the first user input was received.--.

Signed and Sealed this
Eleventh Day of February, 2020

Andrei Iancu
*Director of the United States Patent and Trademark Office*

Claims 27-33 and 36, Column 109, Lines 4, 6, 9, 12, 17, and 23, and Column 110, Lines 3 and 21, for the claim reference numeral '26', each occurrence, should read -25-.